United States Patent
Jockish et al.

(10) Patent No.: US 8,782,069 B2
(45) Date of Patent: Jul. 15, 2014

(54) METHOD AND SYSTEM OF PROVIDING A SEARCH TOOL

(75) Inventors: Jeffrey Jockish, Westfield, IN (US); Michael B. Burroughs, Indianapolis, IN (US); Esther M. Friend, Indianapolis, IN (US); Scott A. Jones, Carmel, IN (US); Mark Stephen Malseed, Alexandria, VA (US); Eugene Murphy ODonnell, Fishers, IN (US)

(73) Assignee: ChaCha Search, Inc, Carmel, IN (US)

( * ) Notice: Subject to any disclaimer, the term of this patent is extended or adjusted under 35 U.S.C. 154(b) by 595 days.

(21) Appl. No.: 12/813,771

(22) Filed: Jun. 11, 2010

(65) Prior Publication Data

US 2011/0010367 A1 Jan. 13, 2011

Related U.S. Application Data

(60) Provisional application No. 61/219,219, filed on Jun. 22, 2009, provisional application No. 61/186,067, filed on Jun. 11, 2009, provisional application No. 61/219,739, filed on Jun. 23, 2009.

(51) Int. Cl.
*G06F 17/30* (2006.01)
*G06Q 10/10* (2012.01)

(52) U.S. Cl.
CPC .......... *G06F 17/30675* (2013.01); *G06Q 10/10* (2013.01)
USPC ........... 707/759; 707/705; 707/706; 707/707; 707/708; 707/722; 707/723; 707/769; 707/760; 707/731; 709/201; 709/203; 709/213; 709/217

(58) Field of Classification Search
CPC .................... G06F 17/30011; G06F 17/30002; G06F 17/3005; G06F 17/30023
USPC ......... 707/705–708, 722–723, 769, 759–760, 707/731; 704/257; 709/201, 203, 213, 217
See application file for complete search history.

(56) References Cited

U.S. PATENT DOCUMENTS

| | | | |
|---|---|---|---|
| 5,412,753 A * | 5/1995 | Alston et al. | 706/11 |
| 5,845,278 A | 12/1998 | Kirsch | |
| 6,029,141 A | 2/2000 | Bezos | |
| 6,405,175 B1 * | 6/2002 | Ng | 705/14.26 |
| 6,505,166 B1 | 1/2003 | Stephanou | |

(Continued)

OTHER PUBLICATIONS

Fleischman, Michael and Eduard Hovy, "Towards Emotional Variation in Speech-Based Natural Language Generation", USC Information Science Institute, http://citeseerx.ist.psu.edu/viewdoc/download?doi=10.1.1.19.8325&rep=rep1&type=pdf.

(Continued)

*Primary Examiner* — Frantz Coby
(74) *Attorney, Agent, or Firm* — Staas & Halsey

(57) ABSTRACT

A system and method of providing information to improve efficiency of human searchers obtaining information on behalf of users is described. A first responder to a request is provided with specialized tools for responding to a request. An initial evaluation of a query may be used to determine the responder and the type of tools which will be provided initially. A toolset which allows rapid responses based on data resources, common queries, and contextual information of a user, a request, partially matching queries and previous responses to previous queries is used to improve the probability that a first responder may provide a suitable response to a query.

20 Claims, 40 Drawing Sheets

(56) References Cited

U.S. PATENT DOCUMENTS

| | | | |
|---|---|---|---|
| 6,594,799 B1 | 7/2003 | Robertson | |
| 6,751,591 B1* | 6/2004 | Gorin et al. | 704/257 |
| 6,968,513 B1 | 11/2005 | Rinebold | |
| 7,028,261 B2 | 4/2006 | Smyth | |
| 7,127,395 B1* | 10/2006 | Gorin et al. | 704/257 |
| 7,136,845 B2* | 11/2006 | Chandrasekar et al. | 1/1 |
| 7,158,935 B1* | 1/2007 | Gorin et al. | 704/257 |
| 7,231,341 B2 | 6/2007 | Bangalore | |
| 7,233,375 B2* | 6/2007 | Chu et al. | 349/114 |
| 7,249,064 B1 | 7/2007 | Carmen | |
| 7,287,021 B2* | 10/2007 | De Smet | 707/600 |
| 7,397,912 B2* | 7/2008 | Aasman et al. | 379/266.03 |
| 7,475,072 B1 | 1/2009 | Ershov | |
| 7,477,909 B2 | 1/2009 | Roth | |
| 7,496,548 B1 | 2/2009 | Ershov | |
| 7,650,381 B2* | 1/2010 | Peters | 709/205 |
| 7,957,970 B1* | 6/2011 | Gorin et al. | 704/257 |
| 7,962,466 B2* | 6/2011 | Jones et al. | 707/706 |
| 7,991,764 B2* | 8/2011 | Rathod | 707/713 |
| 8,010,537 B2* | 8/2011 | Prasad Kantamneni et al. | 707/748 |
| 8,065,286 B2* | 11/2011 | Jones | 707/706 |
| 8,117,196 B2* | 2/2012 | Jones et al. | 707/731 |
| 8,200,663 B2* | 6/2012 | Jones et al. | 707/723 |
| 8,255,383 B2* | 8/2012 | Jones et al. | 707/708 |
| 8,380,710 B1* | 2/2013 | Finne et al. | 707/723 |
| 2002/0082960 A1 | 6/2002 | Goedken | |
| 2002/0140715 A1* | 10/2002 | Smet | 345/700 |
| 2003/0014331 A1 | 1/2003 | Simons | |
| 2004/0024752 A1* | 2/2004 | Manber et al. | 707/3 |
| 2004/0030751 A1* | 2/2004 | Aasman et al. | 709/206 |
| 2004/0034561 A1 | 2/2004 | Smith | |
| 2004/0083195 A1 | 4/2004 | McCord | |
| 2004/0153352 A1 | 8/2004 | Berns | |
| 2004/0199397 A1 | 10/2004 | Dresden | |
| 2005/0130685 A1 | 6/2005 | Jenkin | |
| 2005/0144158 A1 | 6/2005 | Capper | |
| 2005/0154717 A1 | 7/2005 | Watson | |
| 2006/0041476 A1* | 2/2006 | Zheng | 705/14 |
| 2006/0136298 A1 | 6/2006 | Klein | |
| 2006/0178868 A1 | 8/2006 | Billerey-Mosier | |
| 2007/0043583 A1 | 2/2007 | Davulcu | |
| 2007/0088801 A1 | 4/2007 | Levkovitz | |
| 2007/0088851 A1 | 4/2007 | Levkovitz | |
| 2007/0088852 A1 | 4/2007 | Levkovitz | |
| 2007/0143264 A1 | 6/2007 | Szeto | |
| 2007/0174273 A1 | 7/2007 | Jones | |
| 2007/0192168 A1 | 8/2007 | Van Luchene | |
| 2007/0208570 A1 | 9/2007 | Bhardwaj | |
| 2007/0250305 A1 | 10/2007 | Maxwell, III | |
| 2007/0260601 A1 | 11/2007 | Thompson | |
| 2007/0260605 A1 | 11/2007 | Norman | |
| 2007/0288312 A1 | 12/2007 | Wang | |
| 2008/0027995 A1* | 1/2008 | Beigel | 707/104.1 |
| 2008/0028039 A1 | 1/2008 | Christopher | |
| 2008/0033770 A1 | 2/2008 | Barth | |
| 2008/0033823 A1 | 2/2008 | Monteverde | |
| 2008/0104040 A1 | 5/2008 | Ramakrishna | |
| 2008/0147462 A1* | 6/2008 | Muller | 705/7 |
| 2008/0243619 A1 | 10/2008 | Sharman | |
| 2009/0030755 A1 | 1/2009 | Altberg | |
| 2009/0030774 A1* | 1/2009 | Rothschild et al. | 705/10 |
| 2009/0076917 A1 | 3/2009 | Jablokov | |
| 2009/0100047 A1* | 4/2009 | Jones et al. | 707/5 |
| 2009/0119263 A1* | 5/2009 | Jones et al. | 707/3 |
| 2009/0187515 A1* | 7/2009 | Andrew et al. | 706/12 |
| 2009/0299853 A1* | 12/2009 | Jones et al. | 705/14.46 |
| 2010/0251094 A1* | 9/2010 | Holm et al. | 715/230 |
| 2010/0255865 A1 | 10/2010 | Karmarkar | |
| 2011/0022578 A1* | 1/2011 | Fotev | 707/706 |
| 2012/0109924 A1* | 5/2012 | Jones et al. | 707/706 |
| 2012/0317101 A1* | 12/2012 | Jones et al. | 707/723 |

OTHER PUBLICATIONS

Guo, Yuqing, et al., "Dependency-Based N-Gram Models for General Purpose Sentence Realisation", Proceedings of the 22nd International Conference on Computational Linguistics (Coling 2008), p. 297-304, Manchester, Aug. 2008.

Oh, Alice H., and Alexander I. Rudnicky, "Stochastic Natural language Generation for Spoken Dialog Systems", Computer Speech and Language (2002), 16, 387-407. http://www.idealibrary.com.

Wong, Yuk Wah and Raymond J. Mooney, "Generation by Inverting a Semantic Parser that Uses Statistical Machine Translation", Proceedings of NAACL HLT 2007, pp. 172-179.

Bhandari, Shruti K. and Brian D. Davison, "Leveraging Search Engine Results for Query Classification", Technical Report LU-CSE-07-013, Dept. of Computer Science and Engineering, Lehigh University, Bethlehem, PA 18015.

Elliott, John, et al., "Language Identification in Unknown Signals", http://www.aclweb.org/anthology/C/C00/C00-2150.pdf.

Kardkovacs, Zsolt T., et al., "The Ferrety Algorithm for the KDD Cup 2005 Problem", SIGKDD Explorations, vol. 7, Iss 2, p. 111-116.

Li, Shanjian, et al., "A composite approach to language/encoding detection", http://web.mit.edu/ghudson/old/dev/nokrb/third/firefox/extensions/universalchardet/doc/UniversalCharsetDetection.doc.

Shruti K. Bhandari and Brian D. Davison , "Leveraging Search Engine Results for Query Classification", pp. 1-13.

Zsolt T. Kardkovács, Domonkos Tikk, and Zoltán Bánsághi, "The Ferrety Algorithm for the KDD Cup 2005 Problem", SIGKDD Explorer Newsletter, vol. 7, No. 2, 2005, issn: 1931-0145, pp. 111-116, ACM, New York, NY, USA.

John Elliott et al., "Language Identification in Unknown Signals" International Conference on Computational Linguistics, Proceedings of the 18th conference on Computational linguistics—vol. 2, Saarbrücken, Germany, Session: Project notes and demos pp. 1021-1025, Year of Publication: 2000.

S. Li, K. Momoi "A composite approach to language/encoding detection",—Proc. 19th International Unicode Conference, 2001, pp. 1-14 (http://www.mozilla.org/projects/intl/UniversalCharsetDetection.html).

International Preliminary Report on Patentability Dated Jun. 11, 2010.

* cited by examiner

REQUEST RECORD TABLE
202

| | Description | 200a Example Content | 200b Example Content | 200c Example Content |
|---|---|---|---|---|
| 205 | Request ID | 'Request1' | 'Request2' | 'Request3' |
| 210 | Request content | 'What team won the 1960 series?' | 'Tell me how to call Bill's Grill.' | 'Does ne1 luv me?' |
| 215 | Request user ID | 'User1' | 'User1' | 'User2' |
| 220 | Request vetted query ID | 'Who won the 1960 World Series?'; 'Who won the 1960 Grand National Series?' | 'What is the phone number for Bill's Grill?'; 'What do they call bill's grill?'; 'What is the bill for a new grille?' | 'Does anyone love me?'; 'What is love?'; 'Why does love make me happy?'; 'What is love for anyone?' |
| 225 | Request category ID | 'Sports>Baseball' | 'Finder>Business DA' | 'Conversation>Social' |
| 230 | Request profile ID | 'Profile1' | 'Profile1' | 'Profile2' |
| 235 | Request expediter ID | 'Expediter1' | 'Expediter1' | 'Expediter2' |
| 240 | Request searcher ID | 'answer reuse Specialist1' | 'resource directory assistance' | 'quick answer Guide3' |
| 245 | Request result ID | 'Result1.1'; 'Result1.3'; 'Result1.4' | 'Result2.1'; 'Result2.2' | 'Result3.1'; 'Result3.2'; 'Result3.3'; 'Result3.4' |
| 250 | Request result rank | '1'; '3'; '4' | '1'; '2' | '1'; '3'; '4', '2' |
| 255 | Request advertisement ID | 'Advert1'; 'Advert4'; 'Advert2' | 'Advert1'; 'Advert4'; 'Advert2' | 'Advert1'; 'Advert4'; 'Advert2'; 'Advert3' |
| 260 | Request advertisement rank | '3'; '1'; '5' | '1'; '3'; '5' | '5'; '2'; '3'; '1' |

FIG. 2

GUIDE RECORD TABLE
302

| | Description | 300a Example Content | 300b Example Content | 300c Example Content |
|---|---|---|---|---|
| 305 | Guide ID | 'Specialist1' | 'Expediter1' | 'Expediter2' |
| 310 | Guide activity ID | 'Specialist' | 'Expediter' | 'Expediter'; 'Transcriber' |
| 315 | Guide category ID | 'Sports>Baseball'; 'Music>Hip-hop'; 'Shopping>Music' | 'Humor>Jokes'; | 'Conversation' |
| 320 | Guide keyword ID | 'World Series'; 'Yankees'; 'Slick Ray'; 'Jamie'; 'RingTones'; 'MP3' | | |
| 325 | Guide profile ID | 'DemoprofileS1'; 'GeoprofileS1'; 'PersprofileS1' | 'DemoprofileA1'; 'GeoprofileA1'; 'PersprofileA1' | 'DemoprofileA2'; 'GeoprofileA2'; 'PersprofileA2' |
| 330 | Guide communication info | guidecomtyp1='spec1'; guidecomtyp2='spec1@chacha.com'; guidecomtyp3='twitter:spec1'; guidecomtyp4='317.924.2242'; | guidecomtyp1='amb1'; guidecomtyp2='amb1@chacha.com'; guidecomtyp3='twitter:amb1'; guidecomtyp4='555.924.2242'; | guidecomtyp1='exp2'; guidecomtyp2='exp2@chacha.com'; guidecomtyp3='twitter:exp2'; guidecomtyp4='555.224.2242'; |
| 335 | Guide request ID | 'Request1' | 'Request1'; 'Request2' | 'Request3'; 'Request5' |
| 340 | Guide result ID | 'Result1.1'; 'Result5.2'; 'Result7.3' | 'Result1.1'; 'Result2.1' | 'Result3.2'; 'Result7.3' |

| | PROFILE RECORD | |
|---|---|---|
| | Description | Example Content |
| 705 | Profile ID | 'Profile1' |
| 710 | Profile geographic info | 'Indiana' |
| 715 | Profile demographic info | 'under30' AND 'over20' |
| 720 | Profile personality info | 'Hip-hop' |
| 725 | Profile resource ID | 'Resource2'; 'Resource5'; 'Resource6' |
| 730 | Profile resource rating | '9'; '1'; '3'; |

| | CATEGORIZATION RECORD | |
|---|---|---|
| | Description | Example Content |
| 805 | Categorization record ID | 'Category1' |
| 810 | Categorization guide ID | 'Guide1'; 'Guide2'; 'Guide3' |
| 815 | Categorization guide rating | '3'; '5'; '7' |
| 820 | Categorization keyword ID | 'Little John'; 'Polly'; 'LJ n Polly'; 'BadDog'; 'SlickRay' |
| 825 | Categorization advertisement ID | 'Advert1'; 'Advert2' |
| 830 | Categorization advertisement rating | '7'; '7.3' |
| 835 | Categorization resource ID | 'Resource1'; 'Resource2'; 'Resource5' |
| 840 | Categorization resource rating | '2'; '10'; '4' |

REQUEST RECORD

| | Description | Example Content |
|---|---|---|
| 2105 | Request ID | 'Request1' |
| 2110 | Request content | 'what is the name of Polly's new song?' |
| 2115 | Request user ID | 'User1' |
| 2120 | Request guide ID | 'Automatic response' |
| 2125 | Request category ID | 'Category1' |
| 2130 | Request profile ID | 'Profile1' |
| 2135 | Request result ID | 'Result1.1'; 'Result1.3'; 'Result1.4' |
| 2140 | Request result rank | '1'; '3'; '4' |
| 2145 | Request advertisement ID | 'Advert1'; 'Advert4'; 'Advert2' |
| 2150 | Request advertisement rank | '3'; '1'; '5' |
| 2155 | Request ping ID | 'Ping1'; 'Ping2'; 'Ping3' |
| 2160 | Request ping rank | '1'; '2'; '5' |

GUIDE RECORD

|  | Description | Example Content |
|---|---|---|
| 2205 | Guide ID | 'Guide1' |
| 2210 | Guide category ID | 'Category1'; 'Category3' |
| 2215 | Guide keyword ID | 'reggie miller'; 'rap music'; 'fishing' |
| 2220 | Guide profile ID | 'Demoprofileg1'; 'Geoprofileg1'; 'Persprofileg1' |
| 2225 | Guide result ID | 'Result1.1'; 'Result3.1'; 'Result3.2' |
| 2230 | Guide communication info | guidecomg1typ1='guide1';<br>guidecomg1typ2='guide1@chacha.com';<br>guidecomg1typ3='guide1@AIM';<br>guidecomg1typ4='317.224.2242'; |
| 2235 | Guide request ID | 'Request1'; 'Request3' |
| 2240 | Guide advertiser ID | 'Advertiser1'; 'Advertiser3' |

USER RECORD

|  | Description | Example Content |
|---|---|---|
| 2305 | User ID | 'User1' |
| 2310 | User profile ID | 'DemoprofileU1'; 'GeoprofileU1'; 'PersprofileU1' |
| 2315 | User request ID | 'Request1'; 'Request2' |
| 2320 | User result ID | 'Result1.1'; 'Result1.2'; 'Result2.1' |
| 2325 | User advertisement ID | 'Advert1'; 'Advert2'; 'Advert4'; 'Advert8' |
| 2330 | User communication info | usercomu1typ1='user1';<br>usercomu1typ2='user1@chacha.com';<br>usercomu1typ3='twitter:user1';<br>usercomu1typ4='317.924.2242' |
| 2335 | User ping ID | 'Ping1'; 'Ping5'; 'Ping 8' |
| 2340 | User pong ID | 'Pong1.1'; 'Pong5.1' |

PROFILE RECORD

|  | Description | Example Content |
|---|---|---|
| 2605 | Profile ID | 'Profile1' |
| 2610 | Profile geographic info | 'Indiana' |
| 2615 | Profile demographic info | 'under30' AND 'over20' |
| 2620 | Profile personality info | 'Hip hop' |
| 2625 | Profile resource ID | Resource2'; 'Resource5'; 'Resource6' |
| 2630 | Profile resource rating | '5'; '1'; '3' |

CATEGORIZATION RECORD

|  | Description | Example Content |
|---|---|---|
| 2705 | Categorization record ID | 'Category1' |
| 2710 | Categorization guide ID | 'Guide1'; 'Guide2'; 'Guide3' |
| 2715 | Categorization guide rating | '3'; '5'; '7' |
| 2720 | Categorization keyword ID | 'Little John'; 'Polly'; 'LJ n Polly'; 'BadDog'; 'SlickRay' |
| 2725 | Categorization advertisement ID | 'Advert1'; 'Advert2' |
| 2730 | Categorization advertisement rating | '7'; '7.3' |
| 2735 | Categorization resource ID | 'Resource1'; 'Resource2'; 'Resource5' |
| 2740 | Categorization resource rating | '2'; '10'; '4' |
| 2745 | Categorization ping ID | 'Ping1'; 'Ping2'; 'Ping4' |
| 2750 | Categorization ping ranking | '1'; '3'; '4' |

ADVERTISEMENT RECORD

| | Description | Example Content |
|---|---|---|
| 2805 | Advertisement ID | 'Advert1' |
| 2810 | Advertisement description | 'Ticket offer for Polly concerts' |
| 2815 | Advertisement access info | 'https://adserver.chacha.com/pollyconcert1' |
| 2820 | Advertisement usage information | '210'; '114'; '46'; '150'; '10' |
| 2825 | Advertisement keyword ID | 'Little John'; 'Polly'; 'LJ n Polly' |
| 2830 | Advertisement category ID | 'Category1'; 'Category7' |
| 2835 | Advertisement advertiser ID | 'Advertiser2' |

ADVERTISER RECORD

| | Description | Example Content |
|---|---|---|
| 2905 | Advertiser ID | 'Advertiser2' |
| 2910 | Advertiser category ID | 'Category1'; 'Category3'; 'Category7'; 'Category8' |
| 2915 | Advertiser keyword ID | 'Little John'; 'Polly'; 'LJ n Polly'; 'Billy and the Beat'; 'Sixties revival' |
| 2920 | Advertiser profile ID | 'Demoprofilea2'; 'Geoprofilea2'; 'Persprofilea2' |
| 2925 | Advertiser advertisement ID | 'Advert1'; 'Advert3'; 'Advert5' |
| 2930 | Advertiser communication info | Advertisercoma1typ1='Advertiser2'; Advertisercoma1typ2='Advertiser2@chacha.com'; Advertisercoma1typ3='Advertiser2@AIM'; Advertisercoma1typ4='555.924.2242' |

FIG. 29

PING TABLE

| | Description | Example Content (3000a) | Example Content (3000b) |
|---|---|---|---|
| 3005 | Ping ID | 'Ping1' | 'Ping2' |
| 3010 | Ping content | 'Should Polly get back with Little John? YLTL = YES NLTL = NO WLTL = WHO?' | 'Did you watch this season's Top Chef Finale? Send TPCY = YES, TPCN = NO to see who watched.' |
| 3015 | Pong actions | 'YLTL'; 'NLTL'; 'WLTL'; 'timeout' | 'TPCY'; 'TPCN'; 'timeout' |
| 3020 | Pong ID | 'Pong1.1'; 'Pong1.2'; 'Pong1.3' | 'Pong2.1'; 'Pong2.2' |
| 3025 | Pong response | 'record yes vote'; 'send Ping1 poll results'; 'record no vote'; 'send Ping1 poll results'; 'record who vote'; 'send Ping1 poll results' | 'record yes vote'; 'send Ping2 results'; 'send Advert3'; 'record no vote'; 'send Ping2 results'; 'send Advert6' |
| 3030 | Ping user ID | 'User1'; 'User4'; 'User5' | 'User1'; 'User3'; 'User7' |
| 3035 | Ping Category ID | 'Category1'; 'Category3' | 'Category1'; 'Category3' |
| 3040 | Ping Profile ID | 'Profile1'; 'Profile3'; 'Profile8' | 'Profile1'; 'Profile4'; 'Profile6' |

USER RECORD

| | Description | Example Content |
|---|---|---|
| 3705 | User ID | 'User1' |
| 3710 | User profile ID | 'DemoprofileU1'; 'GeoprofileU1'; 'PersprofileU1' |
| 3715 | User request ID | 'User request1'; 'User request2' |
| 3720 | User result ID | 'Result1.1'; 'Result1.2'; 'Result2.1' |
| 3725 | User advertisement ID | 'Advert1'; 'Advert2' |
| 3730 | User communication info | usercomu1typ1='user1';<br>usercomu1typ2='user1@chacha.com';<br>usercomu1typ3='twitter:user1';<br>usercomu1typ4='317.924.2242' |
| 3735 | User settings ID | 'Preference1'; 'Preference2' |

GUIDE RECORD

| | Description | Example Content |
|---|---|---|
| 3805 | Guide ID | 'Guide1' |
| 3810 | Guide category ID | 'Guide Category1'; 'Guide Category3' |
| 3815 | Guide keyword ID | 'Purdue'; 'basketball'; 'fishing' |
| 3820 | Guide profile ID | 'Demoprofileg1'; 'Geoprofileg1'; 'Persprofileg1' |
| 3825 | Guide result ID | 'Result1.1'; 'Result3.1'; 'Result3.2' |
| 3830 | Guide communication info | guidecomg1typ1='guide1';<br>guidecomg1typ2='guide1@chacha.com';<br>guidecomg1typ3='guide1@AIM';<br>guidecomg1typ4='317.224.2242' |
| 3835 | Guide request ID | 'User request1'; 'System request3.1' |
| 3840 | Guide advertisement ID | 'Advert1'; 'Advert3'; 'Advert4' |
| 3845 | Guide system training rank | Setting1='5'; Setting2='9'; Setting3='2' |
| 3850 | Guide vote weighting | '2'; '0.5'; '0.5' |

FIG. 38

METHOD AND SYSTEM OF PROVIDING A SEARCH TOOL

CROSS-REFERENCE TO RELATED APPLICATIONS

This disclosure is related to and claims the benefit of U.S. patent application Ser. No. 12/275,864, inventor Scott A. Jones, et. al., entitled, "METHOD AND SYSTEM FOR IMPROVING UTILIZATION OF HUMAN SEARCHERS", filed Nov. 21, 2008; claims priority to U.S. Provisional Application Ser. No. 61/219,219, inventor Michael B. Burroughs, entitled "METHOD AND SYSTEM OF PERSONALIZING RESPONSES TO USERS", filed Jun. 22, 2009; U.S. Provisional Application Ser. No. 61/186,067, inventor Scott A. Jones, entitled "METHOD AND SYSTEM OF IMPROVING TARGETING OF ADVERTISEMENTS", filed Jun. 11, 2009; and U.S. Provisional Application Ser. No. 61/219,739, inventor Jeffrey Jockish, et. al., entitled "METHOD AND SYSTEM OF PROVIDING SEARCH TOOLS", filed Jun. 23, 2009, the contents of which are incorporated herein by reference in their entirety.

BACKGROUND

1. Field of the Invention

Various embodiments described herein relate to search engine technologies and more specifically to human-assisted search engines. A method and system of providing tools for human searchers is described.

2. Description of the Related Art

In a system where human guides are used to process queries from users, human judgment may greatly increase the ability to respond to natural language and arbitrary questions from users. This flexibility has allowed services such as ChaCha® and Any Question Answered (AQA) to find general acceptance. However, such systems are generally presented with the difficulty of being broadly accepted when a user must pay to use the service. For example, after more than five years of operation, AQA had answered approximately twenty-two million questions. Conversely, the advertising supported ChaCha® service answers over thirty million questions per month.

However, being an advertising supported service requires a highly efficient infrastructure in order to respond to queries at a cost consistent with the advertising revenue which can be obtained. For this reason, a multi-tiered approach to responding to a request may be implemented. Initially a query may be parsed and processed automatically in order to determine whether the query is a match to an existing query and response which is available, or if the query may be answered automatically using an automated resource. However, such automated matching may have limitations. In many instances, a human may be able to rapidly recognize the meaning of a request in context, while machine matching may have a low confidence factor or may be entirely incorrect. For this reason, it is effective to use human judgment in processing queries which are not recognized by an automated system. However, this approach generally increases cost.

In order to solve this and other existing problems, it may be that an intermediary may be provided where a query may be received and interpreted, in order to improve efficiency of a subsequent search by clarifying intent of a request or query and directing the query appropriately.

The tools available to an intermediary are critical to rapid and effective processing of a query. If a toolset is complex, the intermediary may spend more time than required, which may cause frustration and dissatisfaction.

For these and other reasons, a set of tools for improving performance of processing of a search request would be greatly appreciated.

SUMMARY

A method and system of providing a search service is disclosed herein. A method of an embodiment includes receiving a request, automatically determining a type of the request received and providing a portion of the request to a human assistant in an interface selected based on the type.

An embodiment provides a method and system configured to improve a response rate of a user to advertising using a message delivered to the user. Another embodiment provides a search service where a response to a request is customized to a user submitting the request.

Additional aspects and/or advantages will be set forth, in part, in the description which follows and, in part, will be apparent from the description, or may be learned by practice of the invention.

These together with other aspects and advantages which will be subsequently apparent, reside in the details of construction and operation as more fully hereinafter described, reference being had to the accompanying drawings forming a part hereof, wherein like numerals refer to like parts throughout.

BRIEF DESCRIPTION OF THE DRAWINGS

Aspects and advantages of the disclosure will become apparent and more readily appreciated from the following description of the embodiments, taken in conjunction with the accompanying drawings, of which:

FIG. 2 is a database record table for a request.

FIG. 3 is a database record table for a guide.

FIG. 7 is a database record for a profile.

FIG. 8 is a database record for a category.

FIG. 21 illustrates a database for a request.

FIG. 22 illustrates a database for a guide.

FIG. 23 illustrates a database for a user.
FIG. 26 illustrates a database for a profile.
FIG. 27 illustrates a database for a categorization.
FIG. 28 illustrates a database for an advertisement.
FIG. 29 illustrates a database for an advertiser.
FIG. 30 illustrates databases for pings.
FIG. 37 illustrates a database record for a user.
FIG. 38 illustrates a database record for a guide.

DETAILED DESCRIPTION OF THE PREFERRED EMBODIMENTS

Figure 1:
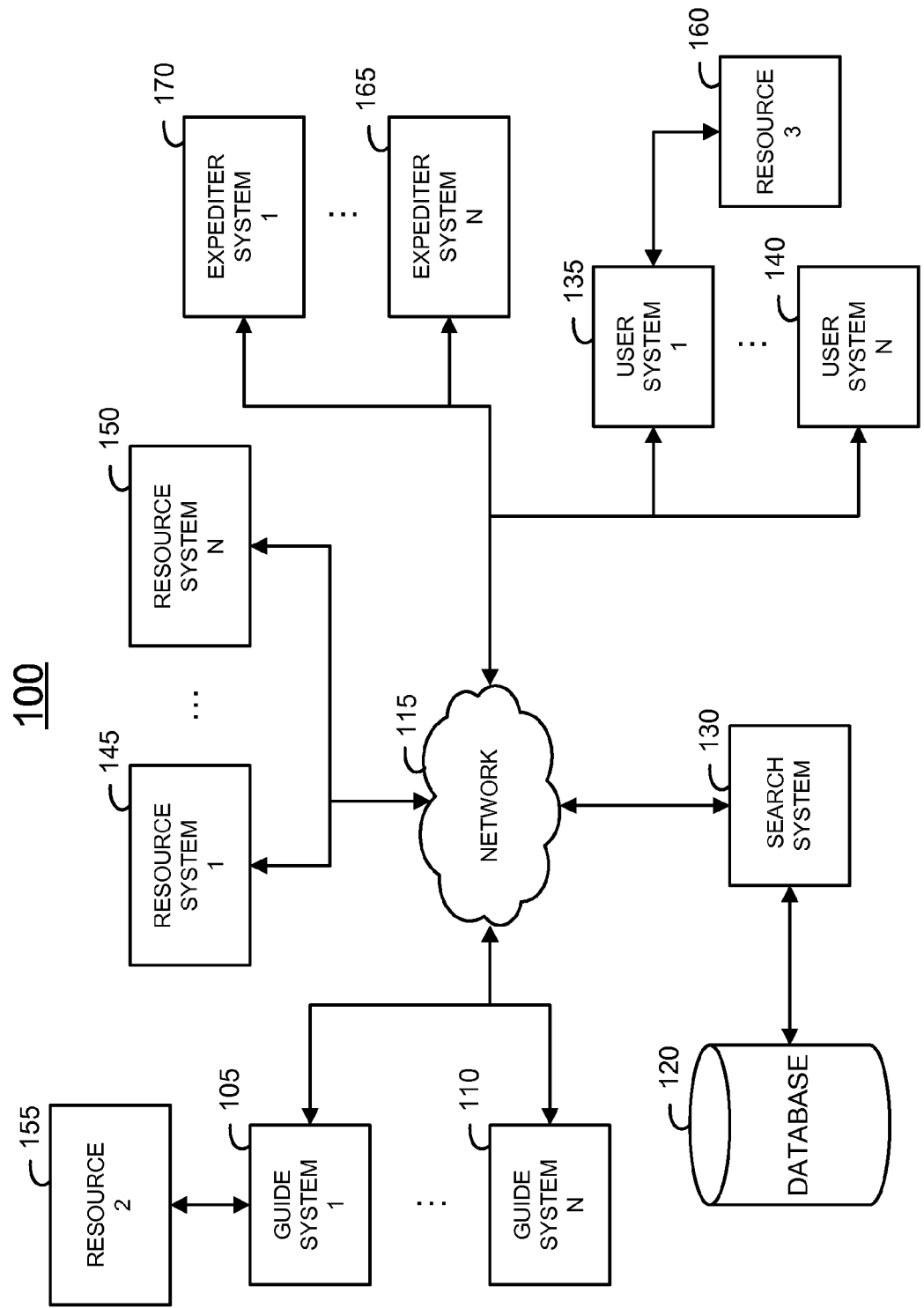
FIG. 1 is a block diagram of an exemplary system embodiment.

Reference will now be made in detail to the present embodiments discussed herein, examples of which are illustrated in the accompanying drawings, wherein like reference numerals refer to the like elements throughout. The embodiments are described below to explain the disclosed system and method by referring to the figures. It will nevertheless be understood that no limitation of the scope is thereby intended, such alterations and further modifications in the illustrated device, and such further applications of the principles as illustrated therein being contemplated as would normally occur to one skilled in the art to which the embodiments relate. As used herein words importing the singular shall include the plural and vice versa unless specifically counter indicated.

It may be that an intermediary, 'expediter', or 'ambassador' guide may be provided including to process a query (request). The expediter may receive a query, and interpret the query, in order to improve efficiency of a subsequent search by clarifying intent of a request or query and directing the query to a searcher based on a categorization appropriate to the query. In addition, an expediter may process a query in order that it may be answered by an automated process such as a data feed, a matching to a database, a query to a search engine, etc. As an expediting task may be performed rapidly and a high percentage of queries may be answered automatically, the expediter's role may improve customer experience and reduce the total cost to process a query. As further described in U.S. Published Patent Application 2009/0132500, Titled METHOD AND SYSTEM FOR IMPROVING UTILIZATION OF HUMAN SEARCHERS, inventor Scott A. Jones, et. al., the query vetting process may have various processes which are performed by the expediter.

The tools available to an expediter are critical to rapid and effective processing of a query. If a toolset is complex, the expediter may spend more time than required, which may cause frustration and dissatisfaction for the expediter and a user submitting the request. A toolset may provide a list of potentially matching queries to an expediter, but this may not offer sufficient context. An expediter may be required to transcribe a query, which may cause a loss of efficiency due to time spent typing and correcting typography. A transcriber may be required to change a tool being used in order to use an available resource to provide a response to a query. As questions are generic and arbitrary, an expediter may have difficulty to respond to common queries with ad lib commentary, which may waste time and damage user experience.

A system and method are provided whereby a user may submit a query to a search service. A query may be submitted using any type of messaging service which is available to a user and a search system. A query is initially processed automatically to determine whether a search result may be obtained. A query may be modified and processed to determine whether the query is a match to a query stored in a database of queries and answers. A query may be modified and processed to determine whether an automated response based on information obtained from a resource such as a data feed, an RSS feed, etc. Natural language processing, which may include stemming, named entity analysis, categorization, etc., may be performed.

If it is determined that a response to a query is not available, information of the query may be provided to a human who is assigned to provide a response to the query with a limited search for information, who may be referred to as an expediter. An expediter is provided with a rich toolset which may allow the expediter to rapidly categorize a request, create a well formed or 'succinct' query, obtain a response to many sorts of queries rapidly or perform any processing with respect to the query.

An expediter toolset provides access to resources which can deliver an automated response with minimal action by the expediter and are classified for rapid retrieval and use. An expediter toolset provides an interface to resources which may rapidly formulate a request and send a response without the need for typing or other forms of search activities by an expediter. An expediter toolset provides a quick review of any search queries and results matching a query constructed by an expediter. An expediter toolset may provide information of search results associated with a query in order to provide context information to an expediter. An expediter may send a query to a searcher or guide even if a matching query exists in the search database if the expediter considers the current answer is unsuitable for any reason.

A system and method are provided whereby a human searcher or guide may more efficiently respond to a user request. A query is received from a user and may be analyzed automatically to determine whether a response may be provided based on automated processing. If it is determined that automated processing may not provide a response, a request or query may be directed to an expediter. An "expediter" may be a guide trained to process a query, to determine context, and to direct the query to an appropriate resource. If it is determined that a guide who is trained to search for information, or "searcher", is required to respond to a request, a query processed by an expediter may be routed to a searcher. A searcher may be a "specialist" searcher who searches for information associated with a specific class or category of information, and/or may be a "generalist" searcher who has registered to respond to requests of any type. Any guide may perform any type of role or task as described herein.

An expediter may be provided with a toolset which allows the expediter to respond to a request more rapidly. If a query is determined to correspond to a particular type of information request, an expediter responding to the request may be automatically provided with an interface appropriate to the type of request. Presentation of a most likely query interface may reduce an amount of time and effort required to process a request. A query processing interface may allow an expediter to transfer information regarding a query to fields associated with further processing of the query more efficiently. In at least one embodiment, any word(s) identified in an interface may be transferred to a field which may include the 'attention' pointer by a mouse click. A query associated with an automated resource may be answered by activation of a completion control without further action by an expediter. An interface appropriate to a type of automated response may be provided automatically to an expediter, and/or may be selected by an expediter.

If a query is determined to be associated with a generalized or conversational response, an expediter may be provided with an interface which provides access to responses associated with generalized queries. An expediter may be able to select common types of responses which may be delivered without the need for the guide to provide a response composed by the guide. In at least one embodiment, a guide may be able to view responses associated with keywords and/or categories of a query which may be used to respond to a query. An expediter may be provided with previous responses associated with a keyword, which may include any or all of a request. An expediter may select a previous response which may be edited prior to being provided as a response to a query. In at least one embodiment, if a response is not an automated response, an expediter may be requested to confirm a response.

If a query is determined to be associated with a category, and/or to be associated with a previous query, an expediter may be provided with an interface which may be used to process the query. A query processing interface may include controls which allow an expediter to make various selections including enabling selection of any or all of an original query, a succinct or processed query provided automatically, and a location associated with a query, which may be provided to a searcher. A query processing interface may provide information of queries and/or answers determined to match a query which may provide context. A query processing interface may allow an expediter to categorize a query. A query processing interface may provide access to historical information including queries and answers associated with a query. A query processing interface may provide the ability to review queries and answers associated with a modified query. A query processing interface may provide the ability to send a query to a guide if an expediter determines that existing results associated with a query are not suitable for any reason. If an expediter determines that a response to a query may be located using a resource associated with a response to an existing query, information of the resource and the response may be provided to a searcher performing a search responsive to a query.

A system and method is provided which allows a user, who may be any person or entity, to submit a search request, search query, or request to a search service, and receive a response to the search request. A search system which allows communication to occur between a user, a searcher or guide, a resource, and/or the search system, allows queries to be processed. A database comprising information regarding users, guides, resources, advertisements, categories, keywords, tags, content requests, search methods, and/or other information is provided.

A search request or query submitted by a user, which may include a keyword, a category, a fully formed question, a statement, any type of media, implicit data, such as information associated with a user identifier and/or device which may request a response, may receive a response which is produced automatically and/or utilizing the assistance of one or more human searchers, guides, or "providers". In at least one embodiment, a search request submitted by a user is compared to a database of search requests in order to determine if a matching search request is found. If a matching request is found, a search result associated with the matching search request may be presented to a user responsive to a search request.

If multiple search results are associated with a search request, the search results may be ranked to determine an order in which the search results will be presented to a user. A ranking of a search result may be based on any type of information associated with the search result or "result". A search request is identified and may be assigned a unique identifier. Information such as a category, geographic information, and/or a profile may be selected to be associated with a search request. A request and/or any information associated with the request may be presented to a searcher or guide. An indicator of items such as a category, keyword, key phrase, named entity or 'interests', geographic information, or time information, previous activities or other information associated with a request may be provided to a guide selected to respond to the request. A guide may be selected based on association of a guide with any or all information associated with a reference item. A guide may be provided with information on one or more types of items, such as a category, a keyword, a tag, an advertisement, a profile, or any sort of content, which a guide may elect to associate with a request and/or to transmit to a user. An 'interest', or keyword, is any type of information which may be associated with a request and/or other information for the purposes of this disclosure. While text-based searching may use words, phrases, or other elements, other forms of information might also be utilized in a search. For example, if a request indicated visual, audio, or other types of media which may be compared to any elements of a resource, such elements or 'atoms' might be used individually and/or in combination to rank and/or rate an item.

A guide, who may be any person, may be associated with or registered for one or more keywords, topics and/or categories. A guide may be associated with any information required by a search system in order that a guide may be identified and may be registered for one or more keywords, categories, or topics. In at least one embodiment, a guide may be required to establish a login account and/or provide information which may be used to establish communication with the guide. A guide who is associated with a category may be provided with access to a resource which may include content and/or other information which may be indexed in order that it may be searched to obtain a search result utilizing a resource. Content and/or resources indicated in a database associated with a category may be compared to keywords and/or other information associated with a request in order to rank a category which may be presented to a user and/or a guide in order to assist in obtaining a search result. Likewise, content associated with a request may be used to determine whether a matching request exists, which may be presented to a user and/or may be used to provide a result or response to the user.

A database of information associated with a category or topic and/or a keyword may be created using various methods. A database may be created and/or modified by a human editor or taxonomist, who may be able to create associations between categories. A database of information associated with a category may be created and/or modified based on information obtained from a database, such as DMOZ, or any database which may include and/or indicate resources which may be included in the database. A database of information associated with a category may be created and/or modified based on information indicated in a search session log. A guide and/or a user may be able to associate information with a category. For example, a 'wiki' of any sort may be associated with a category. A guide and/or user may have various rights to add, remove, and/or review information which may be associated with a category or node defined within a database, which may be based on information associated with a guide and/or user such as rating or ranking information.

A search facility may be associated with a category. For example, a custom search engine may be associated with a category, which may be customized by a person who may be a guide, which may be used to locate information related to the category. A search facility may be dynamically updated in order to search any or all information associated with any or all categories indicated in a database. A database may be created and/or modified which may be used to modify the performance of a custom search tool.

A user request is received and may be compared to a database of queries. If an exact match and/or an indexed exact match is identified, a result associated with a matching query may be returned to a user. If a suitable match is not identified, a guide may be selected. Any or all information associated with a query may be compared to information associated with an index or taxonomy. For example, keywords of a request may be compared to keywords or 'interests' associated with an index of categories. Likewise, geographic information associated with a request, such as an area code, zip code, street address, or GPS coordinates, etc., may be compared to a database of locations which may include names of places which are ranked according to proximity to the geographic information. If there is not a suitable match to information associated with a query with information in a selection index, and in at least one embodiment universally, a search may be conducted of resources in order to obtain information of a keyword, such as a rating or ranking and/or other information which may be associated with the index.

A "user" is any person or entity which may submit a request or search request. A "request", "search request" or "query" is any request for information which may be originated by a person and/or a device or system. A user may be referred to as a "requester", information seeker, or InfoSeeker™.

A "guide" is any person who may be compensated and/or may be a volunteer who may respond to and/or assist with a request. An "ambassador", or expediter, is a guide who may perform processing of a request and/or a search result. A "searcher" is a guide who may perform an information search responsive to a request. A "transcriber", who may also be a guide, may convert a spoken portion of a request into text, and/or may otherwise convert information of a request from one form to another. For example, a transcriber may translate, correct, and/or analyze any or all of a request. A guide may be referred to as a "human assistant", "human searcher" or "searcher". A guide may perform any type of task. Any guide may act in any guide role. However, a human assistant who performs a task associated with a request and a guide who conducts a search responsive to the request may not necessarily be the same person. For example, a human assistant may perform a task to facilitate a search which is conducted by another person who is registered as a guide.

An "identifier", or ID, may include character, number and/or other types of information, which may be used to identify an item including items of a database. Items may include, but are not limited to, a guide, a user, a resource, an advertisement, a keyword, a category, a search result, a search request, a query, a rating, a ranking, a message and/or a profile.

A "guided request" is a request which uses the assistance of one or more guides.

A "result", "search result", or "answer", is any information which may be provided responsive to a request. A result includes, but is not limited to, any of an advertisement, a link to a web page, a message of any sort, images, audio, text, games, interactive media and/or software of any sort.

A "search resource", or "resource", is any source of information which may be used to obtain a search result. A search resource includes automated and/or human-assisted systems, any repository of information, and any type of media and/or systems which may provide information. A resource may be a provider or source of an item and/or service. For example, a resource might provide an item such as a ringtone, a media file (e.g., audio, video, images, games, etc.), information such as news, lyrics, song titles, translations or any other type of information. A resource may be automated, and/or may utilize the assistance of a person.

A "profile" is one or more characteristics which may be associated with a person. Profile characteristics include, but are not limited to, demographic, geographic, personality, affiliations, areas of interest, historical actions, preferences, memberships, associations, etc.

An "advertisement" is any information which may be delivered to a user including to promote a provider, a product, a service, etc. An advertisement may include text, links, audio, video, images, printed materials, interactive media such as a game, or other forms of media which may be provided to a user device.

A "category", "taxonomy branch", or "categorization", is a unique node within an index which may be associated with any number of items. If a request is associated with a category, items associated with the category may be more likely to be selected responsive to the request.

The terms voice and speech are used interchangeably herein. A user, a resource, and/or a guide may establish a communication session using a voice service, a messaging service such as Short Messaging Service (SMS), Enhanced Messaging Service (EMS), Multi-media Messaging Service (MMS), Instant Messaging (IM), email, an internet portal or web page, regular mail or any other type of communication. A connection or communication session may be established using any device which is capable of utilizing a communication service. For example, a wireless device such as a cell phone, PDA, smart phone, etc., might be used to establish a communication session using voice, SMS, IM, email and/or internet protocols. A desktop, laptop or server system might be used to establish a communication session. A landline phone, a specialized communication terminal, or any other communication device might be used to establish a communication session.

Communication between a guide, a user, a resource and/or a search system may include conversion of text to speech and speech to text. Any type of conversion and/or other processing of information which may facilitate communication between a user, a guide, a resource and/or a search system may be performed by any element of the system 100 (FIG. 1). Any type of media which can be sent and/or received using a communication system may be part of a communication session. A communication session may be conducted using any or all communication service associated with a user, a resource and/or a guide. Any communication session may include communication via multiple services and/or devices. For example, a request may be submitted as a voice query, which might indicate an image located on a resource accessible to a user and/or a guide. A voice query might be converted to a text message, and/or an associated image might be processed in order to associate a tag and/or other images with the image. A response might be provided as a spoken reply to a mobile phone associated with a user, and a video presentation, which is accessible via a high-speed connection, which might be delivered to a browser functionality of a different user device.

An advertisement may be transmitted including during any or all communication sessions between a user, a guide and/or a search system. A resource, a guide, and/or an advertisement may be rated. Rating information may be obtained from a user, a guide, a resource and/or a search system. Rating information may be used to select and/or rank a resource, a guide, an advertisement, and/or any item based on information associated with an item indicated in a database. A search service may be compensated by advertising revenue. Advertising or content may be delivered to a user, and/or guide using any service associated with a user and/or a guide.

As illustrated in FIG. 1, a system 100 includes guide systems 105, 110, a network 115 such as the Internet, a search system 130, user systems 135, 140, a database 120 which may comprise various records, resources 155, 160, resource systems 145, 150, and expediter systems 165, 170.

While only a limited number of systems associated with a guide, resource, user, expediter, and search system are depicted in FIG. 1, it is within the scope of the disclosure for multiple systems for guide, resource, user, expediter and search systems to be utilized.

Any user system (e.g., the user systems 135, 140) can be operated by an information seeker or requester, who may be any person, to submit a search request to the search system 130 and/or receive a search result and/or other information. Any guide system (e.g., the guide systems 105, 110) can be operated by a human searcher to obtain a search result responsive to a request which may have been submitted by an information seeker located at a user system (e.g., the user systems 135, 140). Any resource system (e.g., the resource systems 145, 150) may be operated by a human provider of information and/or may be an automated system which may provide a search result and/or other information to a guide and/or a user, such as a search engine, a database, a local information source of a guide system such as a disk or removable memory, etc. A resource may not be accessible using the network 115. For example, a resource, such as the 'Resource 2' resource 155, may be accessible to a guide operating a guide system such as the guide system 105, or a resource such as the 'Resource 3' resource 160, may be accessible to a user operating the user system 135. A resource might include printed materials, images, video, and/or audio information, a software application, any information accessible to a guide, a user, a database, a system and/or any combination thereof. Any expediter system (e.g. the expediter systems 165, 170) may be operated by an expediter to process a search request.

The network 115 (FIG. 1) may be a global public network of networks (the Internet) and/or consist in whole or in part of one or more private networks and communicatively couples the guide systems 105, 110, the resource systems 145, 150, the expediter systems 165, 170, and the user systems 135, 140, with the other components of the system such as the search system 130, and the database 120. The network 115 may include one or more wireless networks which may enable wireless communication between the various elements of the system 100. For example, a mobile phone carrier network might be used to connect a user device to the search system 130.

The search system 130 allows interaction to occur among the guide systems 105, 110, the resource systems 145, 150, the expediter systems 165, 170, and the user systems 135, 140. For example, an information search query can be transmitted from the user systems 135, 140, to the search system 130, where a search query can be accessed by the guide systems 105, 110, the expediter systems 165, 170, and/or the resource systems 145, 150. Similarly, a search result or response produced from the resource systems 145, 150, using the guide systems 105, 110, and/or the expediter systems 165, 170, in response to a search query submitted by the user systems 135, 140, may be transmitted to the search system 130, where it may be stored by the search system 130 and/or may be transmitted to the user systems 135, 140. Any type of communication between a user, a guide, an expediter, and a resource may be mediated and/or facilitated by the search system 130, and/or other elements of the system 100.

The search system 130 is communicatively coupled with the database 120. As will be described herein in further detail below, the database 120 includes data that is processed in association with operation of the embodiments. Although FIG. 1 illustrates the database 120 as a separate component of the system, the database 120 may be integrated with the search system 130. Further, the records maintained in the database 120 may be stored in any typical manner, including in a Network Attached Storage (NAS), a Storage Area Network (SAN), etc., using any typical or proprietary database software such as DB2®, Informix®, Microsoft® SQLServer™, MySQL®, Oracle®, etc., and may also be a distributed database on more than one server. Elements of the database 120 may reside in any suitable elements of the system 100. Any or all elements of the system 100 may include any or the entirety of database 120.

The user systems 135,140, the guide systems 105,110, the expediter systems 165, 170, the search system 130, and the resource systems 145, 150, may include equipment, software, systems and personnel required to send and/or receive messages between a user system, a guide system, an expediter system, a resource system and/or the search system using the network 115. The database 120 includes information which may allow the search system 130 to establish communication between any or all of the elements of the system 100.

A user system, a guide system, an expediter system, and/or a resource may be a desktop or mobile PC or Mac®, a mobile phone, a smart phone, a PDA, a server system, a landline phone, a specialized communication terminal, a terminal connected to a mainframe, or any other communication device and/or system. The search system 130 may include one or more servers, computers, etc. For example, servers such as the PowerEdge® 2900 by Dell, or the BladeCenterJS22 by IBM, or equivalent systems might be used to implement elements of the search system 130. The search system 130 may utilize an operating system (OS) such as Microsoft Windows XP, or Linux, etc. Voice routing and packet switching may be accomplished using well established technologies such as those provided by Cisco®, or other networking companies. After being presented with the disclosure herein, one of ordinary skill in the relevant art will immediately realize that any viable computer systems and/or communication devices known in the art may be used as user systems, guide systems, expediter systems, resources, and/or to implement the search system 130.

A guide may be required to register with the search system 130. As part of a registration process, at least one communication method is associated with a guide. In at least one embodiment, a guide may register with the search system 130 and establish a username and password which are associated with the guide. A guide may login to the search system 130 using a web browser functionality of the guide system 105 in order to communicate with the search system 130. Multiple communication services may be associated with a guide and may allow a communication session to be established between a guide system such as the guide system 105 and a user system, a resource system, and/or the search system 130. Multiple identifiers of a guide may be associated with each other. Information such as an IM credential, an email address, a phone number, a URL, a username, etc., of a guide may be identified, which may allow the search system 130 to establish a communication session between a guide system and a user system, a resource system, and/or the search system 130.

When a guide registers with the search system 130, the guide may be associated with one or more keywords, categories, and/or other information. For example a keyword or category may be selected by a guide, or may be associated with a guide based on a test administered to a guide and/or other information provided during and/or after a registration process. Information associated with a guide may be stored in the database 120 and may be used for purposes such as matching a guide to a user request, determining and/or providing compensation for a guide, communicating with a guide, etc., as will be described further herein below. In at least one embodiment, a guide may register to perform the expediter role, which may be mutually exclusive with the searcher role. In at least one embodiment, a guide may register to perform a transcriber role. In at least one embodiment, a transcriber may be provided with tools which are also provided to an expediter guide.

A user may be identified by the search system 130. When a user system, such as the user system 135, establishes a communication session with the search system 130, an identifier of a user system is determined. An identifier of a user system may be associated with other information regarding a user. A user system may be identified using an email address, a telephone number, an IM credential, a username, a persistent cookie, an IP address, or any other identifier which may be used to associate information with a user. Multiple identifiers of a user may be associated with each other. Using information of communication services associated with a user, a communication session may be established between a user system such as the user system 135 and a guide system, a resource system and/or the search system 130. Information such as a keyword, a category, a profile, a previous search request, a search result, etc., may be associated with a user. Information of a user may be stored in the database 120.

A resource, which may be a person, an entity, a search engine, a database, a software application, a corpus of one or more types of media such as text or printed information, images, audio, video, etc., or a combination thereof, may be identified by the search system 130. Any source of information may be a resource within the context of the disclosure herein. Information of at least one method of communication is associated with a resource system which allows a communication session to be established between the search system 130, a user system and/or a guide system and a resource system such as the resource systems 145, 150. An identifier of a resource system may be associated with other information regarding a resource. A resource system may be identified using an email address, a telephone number, an IM credential, a resource username, a URL, or other persistent identifier which may be used to associate information with a resource. Multiple identifiers of a resource may be associated with each other. Using the information of communication services associated with a resource, a communication session may be established between a resource system such as the resource system 145, and a user system, a guide system, and/or the search system 130. Information such as a keyword, a category, a profile, or other information may be associated with a resource. Information of a resource may be stored in the database 120.

A resource such as the resources 155, 160, and/or resources accessible via the resource systems 145, 150, may include any system, software, hardware, personnel and/or other facility which may provide information to a guide, a user, and/or the search system 130. In at least one embodiment, a resource may be a search engine, a database system, a website, a library, a personal hard drive and/or other local storage, printed materials, recordings of any sort, a software program, a person, an organization, etc. A resource may be freely accessible to any user and/or guide and/or may be available on a restricted basis. The resource system 145, 150, may include resources which are available on an unrestricted and/or restricted basis. A resource may not be accessible using the network 115, but may be accessible to a selected guide and/or user. In at least one embodiment, a resource such as the resource 155 may be accessible to one or more guides operating a guide system (such as the guide system 105) using any type of communication. For example, a guide may obtain information of an event to provide a search result. Information in any form, such as printed media, audio and/or visual information, software, hardware, etc., which may be accessible to a guide, a user and/or an operator of a resource system may be a resource. Similarly, a resource may be accessible to a user such as the resource 160.

The search system 130 may establish a communication session between any user system, guide system, or resource system using information indicated in the database 120. For example, the user system 135 may establish a voice communication session with the search system 130, the search system 130 may establish a voice communication session between the user system 135 and the guide system 105, and the search system 130 may establish a voice communication session between the user system 135 and the resource system 145. While a voice communication session is used in this example, any type of communication session using one or more services such as SMS, EMS, MMS, email, IM, chat, web based communication, etc., may be established between any user system, guide system, and/or resource system and/or the search system 130.

Information associated with a user, a guide and/or a resource may be obtained in various ways. For example, a registration process may be performed using a web form provided by the search system 130, and/or information may be obtained from an external database, and/or information may be obtained based on analysis of information indicated by a user, a guide, and/or a resource.

If a request is submitted to the search system 130 (FIG. 1), a record of the request may be created, and may be stored in the database 120. A request record table 202 (FIG. 2) may be composed of a number of request records 200. A request record 200 may be associated with or resident in the database 120. The request record 200 may include a request ID field 205, a request content field 210, a request user ID field 215, a request vetted query ID field 220, a request category ID field 225, a request profile ID field 230, a request expediter ID field 235, a request searcher ID field 240, a request result ID field 245, a request result rank field 250, a request advertisement ID field 255, and a request advertisement rank field 260.

The request ID field 205 contains an identifier of a request, which is preferably unique and preferably used consistently. For example, in at least one embodiment, the request ID field 205 can include a randomly generated numerical code and/or a character string indicating a request. A request ID serves to distinguish a request record associated with a request from a request record associated with other requests. Although particular examples of identifiers are described herein, other types of identifiers uniquely indicating a request may be utilized without departing from the spirit and scope of the embodiments herein. Using the example in FIG. 2, 'Request1' is the request ID associated with the request record 200a. 'Request2' is the request ID associated with the request record 200b. 'Request3' is the request ID associated with the request record 200c.

The request content field 210 may include information regarding content of a request. For example, text associated with a query submitted by a user may be indicated in the request content field 210. Content of the request content field 210 may be processed in order to associate a keyword and/or category and/or other information with a request. Information such as audio recordings, images, etc., which are associated with a request may be indicated in the request content field 210. Using the example illustrated in FIG. 2, the query 'What team won the 1960 series?' is the content associated with the request record 200a. This may indicate that the query 'What team won the 1960 series?' may be processed in order to respond to 'Request1'. Information indicated in the request content field 210 may be used to determine which information associated with an index may be provided responsive to a request. For example, keywords associated with the request 'What team won the 1960 series?' may be compared to interests or keywords associated with an index to determine and/or rank a number of categories associated with the request 'Request1'. Content of the request content field 210 may be compared to a database of queries, and/or may be processed as further described herein.

The request user ID field 215 may include information of a user that submitted a query. The request user ID field 215 may be used to associate any number of users with a query. In at least one embodiment, each request is uniquely associated with a single user. In at least one embodiment, if a request submitted by a user is equivalent to a previous request, multiple users may be associated with a request. In at least one embodiment, an individual user may submit a request which is associated with a group of one or more users. A result and/or other item associated with a request may be presented responsive to a request in an order based at least in part on a ranking of the item associated with the request. Information indicated in the request user ID field 215 may be used to obtain information of a user using a record such as the user record 400 illustrated in FIG. 4. Using the example illustrated in FIG. 2 'User1' is associated with 'Request1' and 'Request2', and 'User2' is associated with 'Request3'.

The request vetted query ID field 220 may include information of a vetted or succinct query associated with a request. For example, a comparison of content of the request content field 210 with a database of vetted queries may be used to rank a vetted query to be associated with a request. Content of the request vetted query ID field 220 may be provided to a guide selected to respond to a request. Content of the request vetted query ID field 220 may be used to look up a search result associated with a vetted query. Any number of vetted queries may be associated with a request. Using the example in FIG. 2, the vetted queries 'What is the phone number for Bill's Grill?', 'What do they call bill's grill?', and 'What is the bill for a new grill?' are associated with 'Request2', which may indicate a best match of those queries to the content of the request content field 210 of the request record 200b.

The request category ID field 225 may include information of a number of categorizations and/or keywords associated with a request. Content of the request category ID field 225 may be modified by an automated classification of a request. A human may select a category and/or keyword associated with a request. A categorization may be associated with a resource, a guide, an advertisement, training information, etc. An item associated with a category may be presented to a guide and/or a user if a request associated with a category is submitted. An item associated with a category and/or other information may be presented for review by a person. Association of a category with a request may be used to select items such as an advertisement associated with the category to be presented responsive to a request. Association of a category with a request may be used to select a guide associated with the category to vote regarding an item associated with the request. A category may be associated with a request based on any type of information associated with the request. In at least one embodiment, only one category may be associated with a request. Using the example illustrated in FIG. 2, the category 'Conversation>Social' is associated with 'Request3'. Association with 'Conversation>Social' may cause a query to be provided to an expediter.

The request profile ID field 230 may include information of a number of profiles associated with a request. For example, a profile may be associated with a request based at least in part on a profile associated with a user associated with a request. In at least one embodiment, a geographic profile which is common to a number of users associated with a request may be associated with a request, or a guide may determine that a profile is to be associated with a request based on content and/or subject matter of a request associated with a user, etc. A guide selected to respond to a request may be selected based at least in part on a profile associated with the request. A reviewer may be selected to review an item associated with a request based at least in part on a profile associated with a request. Using the example illustrated in FIG. 2, 'Profile1' is associated with 'Request1' and 'Request2'.

The request expediter ID field 235 may include a number of identifiers associated with an expediter. The request expediter ID field 235 may include one or more identifiers of an expediter which may be used to obtain further information of an expediter using a record such as the guide record 300b (FIG. 3). Using the example in FIG. 2, the expediter ID 'Expediter1' is associated with the request record 200a and the request record 200b. While only one expediter identifier has been associated with the request records 200a and 200b illustrated in FIG. 2, any number of expediter identifiers may be associated with a request. Association of an expediter ID with a request may indicate that an expediter has registered to respond to requests associated with a category, and/or that an expediter may associate, review, edit and/or otherwise associate information with a request.

The request searcher ID field 240 may include a number of identifiers associated with a searcher. The request searcher ID field 240 may include one or more identifiers of a searcher which may be used to obtain further information of a searcher using a record such as the guide record 300b (FIG. 3). Using the example in FIG. 2, the searcher ID 'answer reuse Specialist1' is associated with the request record 200a, which may indicate that a search result associated with a request is a previous search result provided by 'Specialist1'. For example, the highest ranked result 'Result1.1' may have been produced by 'Specialist1'.

The request result ID field 245 may include information of a result which is associated with a request. For example, a search result may be associated with a request when a guide obtains the search result responsive to the request. In at least one embodiment, if a request is submitted to the search system 130 (FIG. 1), a guide may be selected, and the guide may provide a result responsive to the request. Alternately, a result may be associated with a request if the request is submitted to a resource such as a search engine, database or other resource system. Any number of search results may be associated with a request. A result may be associated with a request based on a selection of an expediter and/or automatically. Using the example illustrated in FIG. 2, 'Result1.1', 'Result1.3', and 'Result1.4' have been associated with 'Request1'.

The request result rank field 250 may include information regarding a ranking of a result associated with a request. In at least one embodiment, the request result ID field 245 and the request result rank field 250 are linked by, for example, a pointer. Using the example illustrated in FIG. 2, 'Result1.1' has a ranking of '1', 'Result1.3' has a ranking of '3', and 'Result1.4' has a ranking of '4'. Content of the request result ID field 245 and the request result rank field 250 may be used at least in part to determine an order in which a search result is presented to a user responsive to a request. Using the example illustrated in FIG. 2, 'Result1.1' might be preferentially presented to a user responsive to 'Request1'. A ranking of a result may be determined based on criteria such as keyword ranking, guide ratings, etc., which may include automated and/or human assisted rating and/or ranking.

The request advertisement ID field 255 may include information of a number of advertisements associated with a request. An advertisement may be associated with a request when a guide selects the advertisement to be presented to a user responsive to the request. For example, if a request is submitted to the search system 130 (FIG. 1), a guide may be selected, and the guide may provide an advertisement responsive to the request. Alternately, an advertisement may be associated with a request automatically. For example, if a category and/or a keyword is associated with a request, a highest ranked advertisement for the category might be associated with the request. Any number of advertisements may be associated with a request. Using the example illustrated in FIG. 2, 'Advert1', 'Advert4', and 'Advert2' have been associated with 'Request1'.

The request advertisement rank field 260 may include information regarding a ranking of an advertisement associated with a request. In at least one embodiment, the request advertisement ID field 255 and the request advertisement rank field 260 are linked by, for example, a pointer. Using the example illustrated in FIG. 2, 'Advert1' has a ranking of '3', 'Advert4' has a ranking of '1', and 'Advert2' has a ranking of '5'. Content of the request advertisement ID field 255 and the request advertisement rank field 260 may be used at least in part to determine an order in which an advertisement is presented responsive to a request. Using the example illustrated in FIG. 2, 'Advert4' might be preferentially presented to a user responsive to 'Request1'.

While a few request records 200*a*, 200*b* and 200*c* have been illustrated in FIG. 2, any number of request records 200 may be provided as required to operate the embodiments.

If a guide is registered with the search system 130 (FIG. 1), a record of the guide may be created, and may be stored in the database 120. A guide record table 302 (FIG. 3) is illustrated in FIG. 3. The guide record table 302 may be composed of a number of guide records 300. The guide records 300 may include a guide ID field 305, a guide activity ID field 310, a guide category ID field 315, a guide keyword ID field 320, a guide profile ID field 325, a guide communication info field 330, a guide request ID field 335, and a guide result ID field 340.

The guide ID field 305 preferably contains a unique identifier of a guide, which is preferably used consistently. For example, in at least one embodiment, the guide ID field 305 can include a randomly generated numerical code, and/or a text string indicating a name associated with a guide. A guide ID serves to distinguish the guide record associated with a guide from a guide record associated with other guides. Other unique identifiers of a guide may be utilized without departing from the spirit and scope of the embodiments. Using the example illustrated in FIG. 3, 'Specialist1' is the guide ID associated with the guide record 300*a*.

The guide activity ID field 310 may include information of a type of activity associated with a guide. For example, if a guide elects to respond to requests associated with a category of information, the guide may be indicated as a specialist searcher. Similarly if a guide elects to act as a transcriber who converts a spoken query to a text query, the guide may be indicated as a transcriber. Guide roles may include tasks such as expediter, translator, trainer, concierge, sales agent, etc. Any role which may be assigned to a guide may be reflected in the guide activity ID field 310. A guide may participate in testing, training, and/or other forms of activity which may be used to associate a guide activity ID with a guide. Any number of activities may be associated with a guide. A guide may have a rating and/or ranking associated with a guide activity which may affect the probability that a guide will be selected to respond to a request. For example, guides available for a particular request might be ranked based on a rating of the guides associated with a task required for the request. The guide 'Expediter2' is associated with the roles 'Expediter' and 'Transcriber' as indicated in the guide activity ID field 310 of the guide record 300*c*.

The guide category ID field 315 may include information of a number of categories associated with a guide. Content of the guide category ID field 315 may be modified based on an action of a guide. A category may be associated with a guide based on one or more types of information processing. For example, the category 'translate English to Spanish', or 'transcribe spoken queries' or 'Sports' might be associated with a guide to indicate a skill or expertise associated with the guide. Such an association may be used in part to rate or rank a guide and/or to select a guide. A person may select a category and/or keyword associated with a guide. A category may be associated with a guide based on testing of a guide. A category may be associated with a guide based on an affiliate group associated with the guide. For example, if a guide has chosen to be affiliated with affiliate groups associated with a type of food, a category associated with the type of food might be associated with the guide. A category may signify any type of skill or expertise which may be used to match a guide to a task. A category associated with a guide may be used to select an item which is to be presented to a guide. A guide may be selected to review an item based on the association of a guide with a category. For example, a guide may be selected to review and/or provide information such as resources, media, results, etc., based on a category associated with the guide. A category associated with a guide may be used to determine whether a guide will receive a type of request. Using the example illustrated in FIG. 3, 'Sports>Baseball', 'Music>Hip-hop' and 'Shopping>Music' are associated with 'Specialist1'. The guide record 300*b* indicates that 'Expediter1' is associated with 'Humor>Jokes'. The guide record 300c indicates that 'Expediter2' is associated with 'Conversation'.

The guide keyword ID field 320 may include information of a number of keywords associated with a guide. Content of the guide keyword ID field 320 may be modified based on an action of a guide. A person may select a keyword which is associated with a guide. For example, a guide may select a keyword to be associated with the guide during a registration process. A keyword may be associated with a guide based on testing of a guide. For example, a guide may be required to demonstrate knowledge of a category and/or keyword in order to be associated with the keyword. Content of the guide keyword ID field 320 may be compared to content of a request in order to determine a ranking of a guide for responding to a request. For example, if a keyword indicated in the guide keyword ID field 320 is associated with content of a request, a guide associated with the keyword may be more likely to be selected to respond to the request. Using the example illustrated in FIG. 3, keywords which may be associated with a category associated with 'Specialist1' are indicated in the guide record 300a as 'World Series', 'Yankees', 'Slick Ray', 'Jamie', 'RingTones', and 'MP3'. The blank entries in the guide record for 300b and 300c may indicate that there are no keywords associated with 'Expediter1' and 'Expediter2', respectively.

The guide profile ID field 325 may include information of a number of profiles associated with a guide. Content of the guide profile ID field 325 may be modified based on an action of a guide. A person may select a profile which is associated with a guide. For example, a guide may select a profile to be associated with the guide during a registration process. A profile may be associated with a guide based on testing of a guide. For example, a guide may be required to demonstrate knowledge relevant to a profile in order to be associated with the profile, or a guide may take a test which is used to generate a profile, or a guide may provide information such as demographic, geographic, personality, or other information which may be indicated in a profile associated with the guide. Information indicated in a guide profile may be obtained from an external database. Information indicated in the content of the guide profile ID field 325 may be compared to information indicated in the content of a profile associated with a request in order to determine a ranking of a guide for responding to a request. Likewise, a profile associated with a guide may be used to select and/or rank a guide. Using the example illustrated in FIG. 3, 'DemoprofileS1', 'GeoprofileS1' and 'PersprofileS1' are associated with 'Specialist1'. This may indicate that 'Specialist1' has indicated and/or generated 'DemoprofileS1' which may be a demographic profile, 'GeoprofileS1' which may be a geographic profile and 'PersprofileS1' which might indicate personality information regarding 'Specialist1'. Any or all information indicated in a profile associated with a guide may be used to determine a rating and/or ranking of a guide.

The guide communication info field 330 may include information of a device and/or service associated with a guide. Content of the guide communication info field 330 may be modified based on an action of a guide. If a guide establishes communications using a device and/or service, information regarding the device and/or service may be included in the guide communication info field 330. Any type of communication service and/or system may be indicated in the guide communication info field 330. For example, a username and/or password associated with a guide may be indicated in the guide communication info field 330. Communication services such as IM, e-mail, SMS, MMS, EMS, telephone, wireless or wired communication, etc., may be indicated in the guide communication info field 330. A telephone number, an email address, an IM provider and login ID, a keyword associated with a service, etc., may be indicated in the guide communication info field 330. Using the example illustrated in FIG. 3, the login 'exp1', the email 'exp1@chacha.com', the Twitter™ service account 'twitter:exp1' and the phone number '555.924.2242' are associated with 'Expediter1'. This may indicate that 'Expediter1' may be contacted using the login ID 'exp1', via email at 'exp1@chacha.com', via Twitter™ as 'twitter:exp1' and/or via voice, text, and/or other service associated with the phone number '555.924.2242'.

The guide request ID field 335 may include information of a number of requests associated with a guide. Content of the guide request ID field 335 may be modified based on an action of a guide. If a guide produces a search result responsive to a request, an identifier of the request may be included in the guide request ID field 335. A rating and/or ranking associated with a request associated with a guide may affect compensation for a guide. Likewise a usage indicator associated with a request and a guide may affect a rating and/or ranking associated with the guide. For example, if a search result produced by a specialist guide is reused the specialist guide may be compensated. A request may be associated with a guide based on a vote cast by a guide regarding items associated with the request. For example, if an expediter guide selects a search result associated with a request, the request may be associated with the expediter. Using the example illustrated in FIG. 3, 'Request3' and 'Request5' are associated with 'Expediter2'. This may indicate that 'Expediter2' has responded to, been selected to respond to, and/or has reviewed one or more items associated with 'Request3' and 'Request5'.

The guide result ID field 340 may include information of a number of results associated with a guide. Content of the guide result ID field 340 may be modified based on an action of a guide. If a guide produces a search result responsive to a request, an identifier of the search result may be included in the guide result ID field 340. A rating and/or ranking associated with a search result associated with a guide may affect compensation for a guide. Likewise a usage indicator associated with a search result provided by a guide may affect a rating and/or ranking associated with a guide. Using the example illustrated in FIG. 3, 'Result1.1', 'Result5.2' and 'Result7.3' are associated with 'Specialist1'. This may indicate that 'Specialist1' has provided and/or reviewed 'Result1.1', 'Result5.2' and 'Result7.3'.

Figure 4:
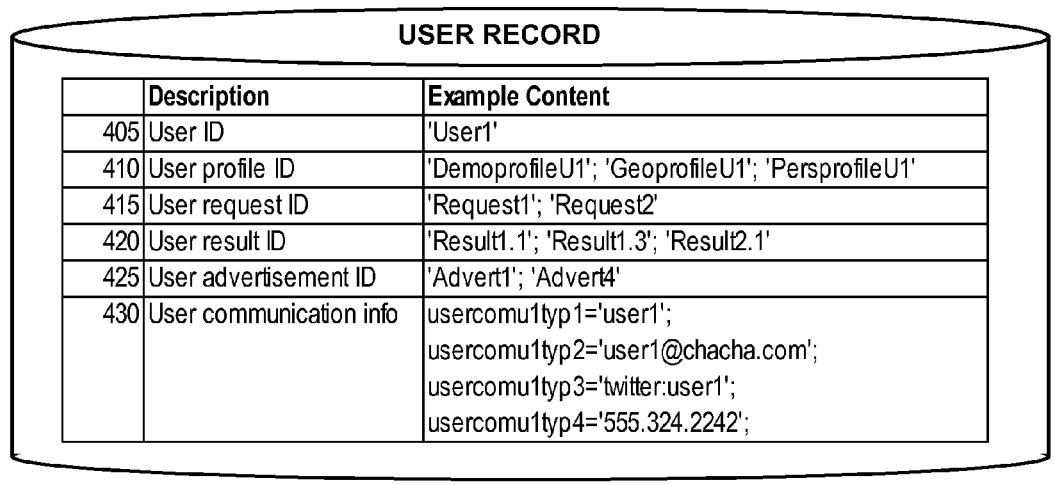
FIG. 4 is a database record for a user.

As illustrated in FIG. 4, an exemplary a user record 400 is provided, of which one or more may be associated with or resident in the search database 120 (FIG. 1). The user record 400 may include a user ID field 405, a user profile ID field 410, a user request ID field 415, a user result ID field 420, a user advertisement ID field 425, and a user communication info field 430.

The user ID field 405 preferably contains a unique identifier of a user, which is preferably used consistently. For example, in at least one embodiment, the user ID field 405 can include a randomly generated numerical code, and/or a text string indicating a name associated with a user. A user ID serves to distinguish a user record associated with a user from a user record associated with other users. Other unique identifiers of a user may be utilized without departing from the spirit and scope of the embodiments. In at least one embodiment, a user ID may include a phone number associated with a user. Using the example illustrated in FIG. 4, 'User1' is the user ID associated with the user record 400.

The user profile ID field 410 may include information of a number of profiles associated with a user. Content of the user profile ID field 410 may be modified based on an action of a user. A person may select a profile which is associated with a user. For example, a user may select a profile to be associated with the user during a registration process. A profile may be associated with a user based on testing of a user and/or information from users. For example, a user may be required to demonstrate knowledge relevant to a profile in order to be associated with the profile, or a user may take a test which is used to generate a profile, or a user may also provide information such as demographic, geographic, personality or other information which may be indicated in a profile associated with the user. Historical information such as a request and/or result associated with a user may be used to determine profile information. Information indicated in a user profile may be obtained from an external database. A profile associated with a user may be used to select and/or rank a user for voting. Using the example illustrated in FIG. 4, 'DemoprofileU1', 'GeoprofileU1' and 'PersprofileU1' are associated with the user 'User1'. This may indicate that 'User1' has indicated and/or generated 'DemoprofileU1' which may be a demographic profile, 'GeoprofileU1' which may be a geographic profile and 'PersprofileU1' which might indicate personality information regarding 'User1'.

The user request ID field 415 may include information of a number of requests associated with a user. Content of the user request ID field 415 may be modified based on an action of a user. If a user submits a request, an identifier of the request may be included in the user request ID field 415. Using the example illustrated in FIG. 4, 'Request1' and 'Request2' are associated with 'User1' which may indicate that 'User1' has submitted 'Request1' and 'Request2'.

The user result ID field 420 may include information of a number of results associated with a user. Content of the user result ID field 420 may be modified based on an action of a user and/or a guide. If a user receives a result responsive to a request, an identifier of the result may be included in the user result ID field 420. A usage indicator associated with a result provided to a user may affect a rating and/or ranking associated with a guide and/or a result. Using the example illustrated in FIG. 4, 'Result1.1', 'Result1.3' and 'Result2.1' are associated with the user 'User1'. This may indicate that 'User1' has been presented with the results 'Result1.1', 'Result1.3', and 'Result2.1'.

The user advertisement ID field 425 may include information of a number of advertisements associated with a user. Content of the user advertisement ID field 425 may be modified based on an action of a user. If a user receives an advertisement, an identifier of the advertisement may be included in the user advertisement ID field 425. A usage indicator associated with an advertisement provided to a user may affect a rating and/or ranking associated with a guide, compensation for the search system 130 (FIG. 1), and/or rating and/or ranking of an advertisement. Using the example illustrated in FIG. 4, 'Advert1' and 'Advert4' are associated with 'User1'. This may indicate that 'User1' has been presented with 'Advert1', and 'Advert4'.

The user communication info field 430 may include information of a device and/or service associated with a user. Content of the user communication info field 430 may be modified based on an action of a user. If a user establishes communications using a device and/or service, information regarding the device and/or service may be included in the user communication info field 430. Any type of communication service and/or system may be indicated in the user communication info field 430. For example, a username and/or password associated with a user may be indicated in the user communication info field 430. Communication services such as IM, e-mail, SMS, MMS, EMS, telephone, wireless or wired communication, etc., may be indicated in the user communication info field 430. A telephone number, an email address, an IM provider and login ID, a keyword associated with a service, etc., may be indicated in the user communication info field 430. Using the example illustrated in FIG. 4, the login 'user1', the email 'user1@chacha.com', the Twitter™ service account 'twitter:user1' and the phone number '555.324.2242' are associated with 'User1'. This may indicate that 'User1' may be contacted using the login ID 'user1', via email at 'user1@chacha.com', via Twitter as 'user1' and/or via voice, text, and/or other service associated with the phone number '555.324.2242'.

Figure 5:
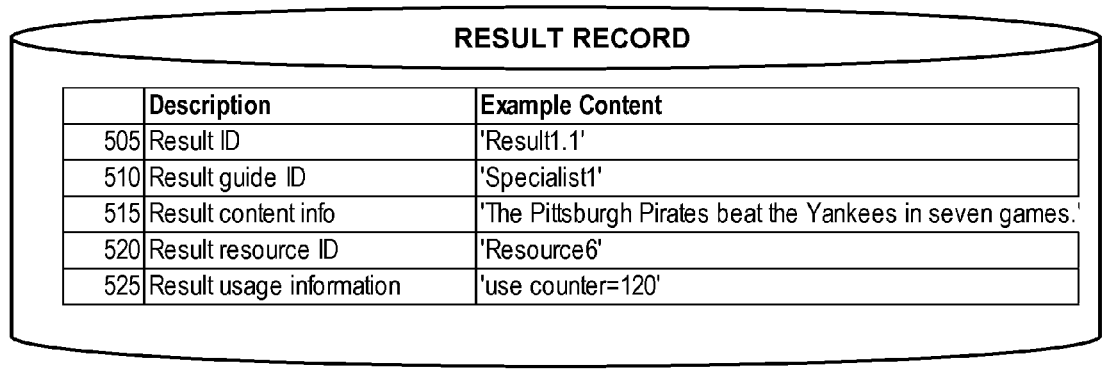
FIG. 5 is a database record for a result.

As illustrated in FIG. 5, an exemplary result record 500 is provided, of which one or more may be associated with or resident in the search database 120 (FIG. 1). The result record 500 may include a result ID field 505, a result guide ID field 510, a result content info field 515, a result resource ID field 520 and a result usage information field 525.

The result ID field 505 preferably contains a unique identifier of a result, which is preferably used consistently. For example, in at least one embodiment, the result ID field 505 can include a randomly generated numerical code, and/or a text string indicating a name associated with a result. A result ID serves to distinguish the result record associated with a result from a result record associated with other results. Other unique identifiers of a result may be utilized without departing from the spirit and scope of the embodiments. In at least one embodiment, a result ID may include a description associated with a result. Using the example illustrated in FIG. 5, 'Result1.1' is the result ID associated with the result record 500.

The result guide ID field 510 may include information of a guide associated with a result. For example, a guide who obtained a search result may be indicated in the result guide ID field 510. In at least one embodiment a guide ID associated with a guide who has voted on a result may be indicated in the result guide ID field 510. Information contained in the result guide ID field 510 may be used to obtain information regarding a guide associated with a search result based on records such as the guide record 300 (FIG. 3). Using the example illustrated in FIG. 5, 'Specialist1' is associated with 'Result1.1' which may indicate that 'Specialist1' has provided 'Result1.1'.

The result content info field 515 may include information of content of a search result. For example, a text snippet associated with a search result may be indicated in the result content info field 515. A URL and/or other information associated with a search result may be indicated in the result content info field 515. Information contained in the result content info field 515 may be used to provide information of a search result to a user and/or a guide. Any type of information which may be used to provide a result may be indicated in the result content info field 515. Using the example illustrated in FIG. 5, the text snippet 'The Pittsburgh Pirates beat the Yankees in seven games' is associated with 'Result 1.1'. This may indicate that the text snippet 'The Pittsburgh Pirates beat the Yankees in seven games' may be provided to a user if 'Result1.1' is selected to be presented to a user.

The result resource ID field 520 may include information of a resource associated with a result. For example, a URL associated with a web page from which a text snippet was obtained may be indicated in the result resource ID field 520. A URL and/or other information such as a search query and/or a macro instruction associated with a search resource may be indicated in the result resource ID field 520. Information contained in the result resource ID field 520 may be used to provide access to a search resource for a guide and/or the search system 130 (FIG. 1). Using the example illustrated in FIG. 5, 'Resource6' is the resource ID associated with 'Result1.1'. This may indicate that 'Resource6' which might be associated with 'Sports>Baseball' was used to obtain 'Result1.1'.

The result usage information field 525 may include information regarding use of a search result. For example, a number of times that a search result has been presented to a user may be indicated in the result usage information field 525. Using the example illustrated in FIG. 5, the indicator 'use counter=120' is associated with 'Result1.1'. This may indicate that 'Result1.1' has been presented to a user one hundred and twenty times. Information in the result usage information field 525 may be utilized to determine whether a search result is to be reviewed, may be used to determine compensation, etc. The result usage information field 525 may include information regarding whether a result has been associated with a sponsor or advertiser and/or provided based on sponsorship. For example, if a result has been obtained using a resource provided by an advertiser, a guide and/or the search system 130 (FIG. 1) may be compensated by the advertiser based on information indicated in the result usage information field 525. For example if the 'Resource2' resource 155 (FIG. 1) included listings by restaurants which were provided by a listing service, the listing service might compensate a guide and/or a provider of the search system 130 (FIG. 1) based on delivery of a listing provided by 'Resource2' to a user. Similarly, if 'Result1.1' is provided by a resource (e.g., 'Resource6') which is compensated on a usage basis such as a database or data feed which may provide private data, information indicated in the result usage information field 525 may be used to determine compensation for a provider of the resource.

Figure 6:
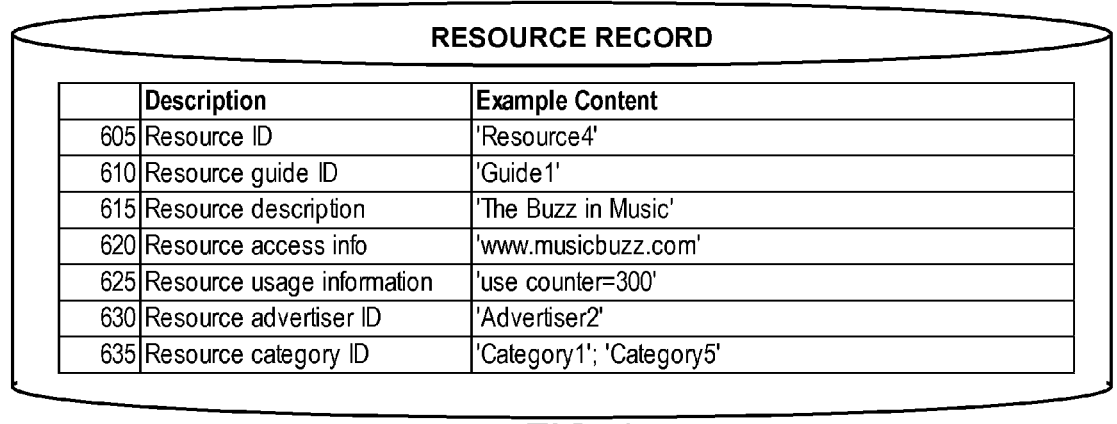
FIG. 6 is a database record for a resource.

As illustrated in FIG. 6, an exemplary resource record 600 is provided, of which one or more may be associated with or resident in the database 120 (FIG. 1). The resource record 600 may include a resource ID field 605, a resource guide ID field 610, a resource description field 615, a resource access info field 620, a resource usage information field 625, a resource advertiser ID field 630, and a resource category ID field 635.

The resource ID field 605 preferably contains a unique identifier of a resource, which is preferably used consistently. In at least one embodiment, the resource ID field 605 can include a randomly generated numerical code, and/or a string indicating a name associated with a resource. A resource ID serves to distinguish the resource record associated with a resource from a resource record associated with other resources. Other unique identifiers of a resource may be utilized without departing from the spirit and scope of the embodiments. In at least one embodiment, a resource ID may include a description associated with a resource. Using the example illustrated in FIG. 6, 'Resource4' is the resource ID associated with the resource record 600.

The resource guide ID field 610 may include information of a number of guides associated with a resource. For example, a guide who utilized a search resource may be indicated in the resource guide ID field 610. In at least one embodiment a guide ID associated with a guide who has voted on a resource may be indicated in the resource guide ID field 610. Information contained in the resource guide ID field 610 may be used to obtain information regarding a guide associated with a search resource. Any number of guides may be associated with a resource. Using the example illustrated in FIG. 6, 'Guide1' is associated with the resource 'Resource4' which may indicate that 'Guide1' has access to the resource 'Resource4'.

The resource description field 615 may include information of a description of a search resource. In at least one embodiment, a text snippet associated with a search resource may be indicated in the resource description field 615. A URL and/or other information associated with a search resource may be indicated in the resource description field 615. Information contained in the resource description field 615 may be used to provide a description of search resource to a user and/or a guide. Using the example illustrated in FIG. 6, the text snippet 'The Buzz in Music' is associated with the resource 'Resource4'.

The resource access info field 620 may include access information associated with a resource. For example, a URL associated with a web page may be indicated in the resource access info field 620. A password, a login ID, a template for submitting a search query, an Application Program Interface (API) for submitting and/or receiving information and/or any other information which may be utilized to access a resource may be indicated in the resource access info field 620. Information contained in the resource access info field 620 may be used to provide access to a resource for a guide, a user and/or the search system 130 (FIG. 1). Using the example illustrated in FIG. 6, the URL <'www.musicbuzz.com'> is the access information associated with the resource 'Resource4'. This may indicate that a result associated with 'Resource4' may be obtained using the resources found at <'www.musicbuzz.com'>.

The resource usage information field 625 may include information regarding use of a resource. For example, a number of times that a search resource has been utilized by a guide, an automated search, an API, etc., may be indicated in the resource usage information field 625. Using the example illustrated in FIG. 6, the indicator 'use counter=300' is associated with 'Resource4'. This may indicate that 'Resource4' has been utilized three hundred times. Information in the resource usage information field 625 may be utilized to determine whether a search resource is to be reviewed, a ranking and/or rating associated with a resource, compensation, etc.

The resource advertiser ID field 630 may include information regarding an advertiser associated with a resource. For example, an advertiser who may provide a resource and/or may designate a resource for use for any purpose may be indicated in the resource advertiser ID field 630. Using the example illustrated in FIG. 6, 'Advertiser2' is associated with 'Resource4'. This may indicate that 'Resource4' has been designated as a resource which may be utilized to obtain a search result associated with 'Advertiser2'. Information in the resource advertiser ID field 630 may be utilized at least in part to determine whether a search resource is to be provided to a guide and/or a ranking and/or rating associated with a resource, etc. In at least one embodiment, if a sponsored result is to be obtained for a request, resources associated with the sponsor 'Advertiser2' may be ranked higher than resources which are not associated with a sponsor or advertiser.

The resource category ID field 635 may include information regarding a category associated with a resource. In at least one embodiment, a category which may be used to rank a resource may be indicated in the resource category ID field 635. Using the example illustrated in FIG. 6, 'Category1' and 'Category5' are associated with 'Resource4'. This may indicate that 'Resource4' has been designated as a resource which may be utilized to obtain a search result associated with 'Category1' and 'Category5'. Information in the resource category ID field 635 may be utilized at least in part to determine whether a search resource is to be provided to a guide and/or a ranking and/or rating associated with a resource, etc. For example, if a category is associated with a request, a resource may be presented to a guide responding to the request in an order based on a ranking of a resource associated with the category.

As illustrated in FIG. 7, an exemplary profile record 700 is provided, of which one or more may be associated with or resident in the database 120 (FIG. 1). The profile record 700 may include a profile ID field 705, a profile geographic info field 710, a profile demographic info field 715, a profile personality info field 720, a profile resource ID field 725, and a profile resource rating field 730.

The profile ID field 705 preferably contains a unique identifier of a profile, which is used consistently. In at least one embodiment, the profile ID field 705 can include a randomly generated numerical code, and/or a text string indicating a name associated with a profile. A profile ID serves to distinguish a profile record associated with a profile from a profile record associated with other profiles. Other unique identifiers of a profile may be utilized without departing from the spirit and scope of the embodiments. In at least one embodiment, a profile ID may include a description associated with a profile. Using the example illustrated in FIG. 7, 'Profile1' is the profile ID associated with the profile record 700.

The profile geographic info field 710 may include geographic information associated with a profile. Any type of geographic information may be indicated in the profile geographic info field 710. For example, GPS coordinates, a street address, a neighborhood name, a postal code, a city name, a state name, etc., could be indicated in the profile geographic info field 710. Using the example illustrated in FIG. 7, the geographic information 'Indiana' is associated with 'Profile1'. This may indicate that a person with a home address in, and/or other profile information associated with geographic information of, the state of 'Indiana' may match 'Profile1', or may receive a higher rating and/or ranking associated with 'Profile1'.

The profile demographic info field 715 may include demographic information associated with a profile. Any type of demographic information may be indicated in the profile demographic info field 715. For example, date of birth, sex, race, political affiliation, income, number of children, marital status, membership in organizations, etc., could be indicated in the profile demographic info field 715. Using the example illustrated in FIG. 7, the demographic information 'under30' AND 'over20' is associated with 'Profile1'. This may indicate that a person aged greater than 20 years and less than 30 years may receive a higher rating and/or ranking associated with 'Profile1'.

The profile personality info field 720 may include personality information associated with a profile. Any type of personality information may be indicated in the profile personality info field 720. For example, information of personality traits such as aggressiveness, curiosity, friendliness, intelligence, honesty, food preference, music preference, political affiliation, etc., could be indicated in the profile personality info field 720. Using the example illustrated in FIG. 7, the characteristic 'Hip-hop' is associated with 'Profile1'. This may indicate that persons with an interest in the hip-hop music genre may receive a higher rating and/or ranking associated with 'Profile1'.

The profile resource ID field 725 may include information of a resource associated with a profile. In at least one embodiment, if a resource is used to respond to queries associated with a profile, an indicator of the resource may be indicated in the profile resource ID field 725. Information indicated in the profile resource ID field 725 may be used to obtain information associated with a resource using a record such as the resource record 600 (FIG. 6). Using the example illustrated in FIG. 7, 'Resource2', 'Resource5', and 'Resource6' have been associated with 'Profile1'.

The profile resource rating field 730 may include information regarding a rating of a resource associated with a profile. In at least one embodiment, the profile resource ID field 725 and the profile resource rating field 730 are linked by, for example, a pointer. Using the example illustrated in FIG. 7, 'Resource2' has a rating of '9', 'Resource5' has a rating of '1', and 'Resource6' has a rating of '3'. Content of the profile resource ID field 725 and the profile resource rating field 730 may be used at least in part to determine an order in which a resource is presented and/or utilized responsive to a request, a voting activity, a review activity, or other types of tasks and/or activities associated with a profile. Using the example illustrated in FIG. 7, 'Resource2' might be preferentially utilized for a request associated with 'Profile1' as 'Resource2' has a higher rating associated with 'Profile1'. Any number of resources may be associated with a profile.

While a resource ranking associated with a profile has been used for the purposes of illustration, any type of item may be rated and/or ranked when associated with a profile. For example, a result, an advertisement, a category, a guide, a user, etc., may be ranked and/or rated associated with a profile. Any sort of rating information may be associated with an item. For example, a rating from 1 to 10 wherein 10 is the highest rating might be utilized, which might produce a normalized ranking of items as proximity of a ranked item to a 'best' score may be determined.

As illustrated in FIG. 8, an exemplary categorization record 800 is provided, of which one or more may be associated with or resident in the database 120 (FIG. 1). The categorization record 800 may include a categorization record ID field 805, a categorization guide ID field 810, a categorization guide rating field 815, a categorization keyword ID field 820, a categorization advertisement ID field 825, a categorization advertisement rating field 830, a categorization resource ID field 835, and a categorization resource rating field 840.

The categorization record ID field 805 contains an identifier of a categorization, which is preferably unique and used consistently. In at least one embodiment, the categorization record ID field 805 can include a randomly generated numerical code and/or a character string indicating a categorization. A categorization record ID serves to distinguish a categorization record associated with a categorization from a categorization record associated with other categorization. Although particular examples of identifiers are described herein, other types of identifiers uniquely indicating a categorization may be utilized without departing from the spirit and scope of the embodiments herein. In at least one embodiment, a description of a proper path may be included in the content of the categorization record ID field 805. A categorization record ID may include a categorization description, a random numeric code, and/or any other information uniquely identifying an element within a data structure. Using the example in FIG. 8, 'Category1' is the categorization record ID associated with the categorization record 800.

The categorization guide ID field 810 may include one or more identifiers associated with a guide. The categorization guide ID field 810 may include one or more identifiers of a guide which may be used to obtain further information of a guide using a record such as the guide record 300 (FIG. 3). Using the example in FIG. 8, 'Guide1', 'Guide2' and 'Guide3' have been associated with 'Category1'. While only a few guide identifiers have been illustrated in FIG. 8, any number of guide identifiers may be associated with a categorization. Association of a guide with a categorization may indicate that a guide has registered to respond to requests associated with the categorization, and/or that a guide may recommend, review, edit and/or otherwise associate information with the categorization.

The categorization guide rating field 815 may include information of a number of ratings associated with a guide. In at least one embodiment, the categorization guide rating field 815 may include a rating of a guide based on a result produced by a guide responsive to request associated with the categorization identified in the categorization record ID field 805. In at least one embodiment, the categorization guide ID field 810 and the categorization guide rating field 815 may be linked by, for example, a pointer. Using the example illustrated in FIG. 8, 'Guide1' has the rating '3', 'Guide2' has the rating '5' and 'Guide3' has the rating '7' associated with 'Category1'. This may indicate that the guide 'Guide3' has the highest rating and might be selected first to respond to a request associated with 'Category1'. For example, if it is determined that searcher is to perform a search responsive to a request associated with 'Category1' 'Guide3' might be notified of the request before other searchers. A rating of a guide may be determined based on any information indicated in the database 120 (FIG. 1). In at least one embodiment, a rating of a guide associated with a categorization is based on a quality rating of search results provided by the guide responsive to requests associated with the category.

The categorization keyword ID field 820 may include information of one or more keywords associated with the categorization indicated in the categorization record ID field 805. The information indicated in the categorization keyword ID field 820 may be compared to information indicated in a search request in order to associate a request with a category. In at least one embodiment, if a keyword is associated with a content of a request, a ranking of a category associated with the keyword may be increased, which may make the category more likely to be associated with the request. If a keyword indicated in a query is a match to a keyword indicated in the categorization keyword ID field 820, the category may be presented to a guide or an expediter responding to a request. Any number of keywords may be associated with a categorization. Content of the categorization keyword ID field 820 may be determined based on activities of guides, users, system administrators, etc. Using the example in FIG. 8, the keywords 'Little John', 'Polly', 'LJ n Polly', 'BadDog', and 'SlickRay' are associated with 'Category1', which may cause 'Category1' to be more likely to be associated with a request, including those keywords.

The categorization advertisement ID field 825 may include one or more identifiers associated with an advertisement. The categorization advertisement ID field 825 may include one or more identifiers of an advertisement which may be associated with a categorization. Using the example in FIG. 8, 'Advert1' and 'Advert2' have been associated with the categorization record 800, which may indicate that the advertisements 'Advert1' and 'Advert2' may be presented to a guide and/or a user responsive to a request associated with 'Category1'. While only a few advertisement identifiers have been illustrated in FIG. 8, any number of advertisement identifiers may be associated with a categorization.

The categorization advertisement rating field 830 may include information of one or more ratings associated with an advertisement. For example, the categorization advertisement rating field 830 may include a rating of an advertisement based at least in part on the frequency of selection of an advertisement by a guide responsive to search request associated with the categorization identified in the categorization record ID field 805. In at least one embodiment, the categorization advertisement ID field 825 and the categorization advertisement rating field 830 may be linked by, for example, a pointer. Using the example illustrated in FIG. 8, the rating '7' has been associated with 'Advert1' and the rating '7.3' has been associated with 'Advert2'. This may indicate that 'Advert2' has the highest rating and might be more likely to be selected responsive to a request associated with 'Category1'.

The categorization resource ID field 835 may include one or more identifiers of a resource which may be associated with a categorization. Using the example in FIG. 8, the resources 'Resource1', 'Resource2', and 'Resource5' have been associated with 'Category1'. While only a few resource identifiers have been illustrated in FIG. 8, any number of resource identifiers may be associated with a categorization. In at least one embodiment, a resource associated with a categorization may be related to an advertiser and/or may be distributed to a guide associated with a categorization and an advertiser.

The categorization resource rating field 840 may include information of one or more ratings associated with a resource. In at least one embodiment, the categorization resource rating field 840 may include a rating of a resource based at least in part on frequency of use of a resource by a guide responsive to request associated with the categorization identified in the categorization record ID field 805. A rating of a resource may be based on any information indicated in the database 120 (FIG. 1). In at least one embodiment, the categorization resource ID field 835 and the categorization resource rating field 840 may be linked by, for example, a pointer. Using the example illustrated in FIG. 8, the rating '2' has been associated with 'Resource1', the rating '10' has been associated with 'Resource2' and the rating '4' has been associated with 'Resource5'. This may indicate that 'Resource2' is more likely to be provided to a searcher responding to a query associated with 'Category1'. Any type of rating information may be included in a rating field such as the categorization resource rating field 840.

Figure 9:
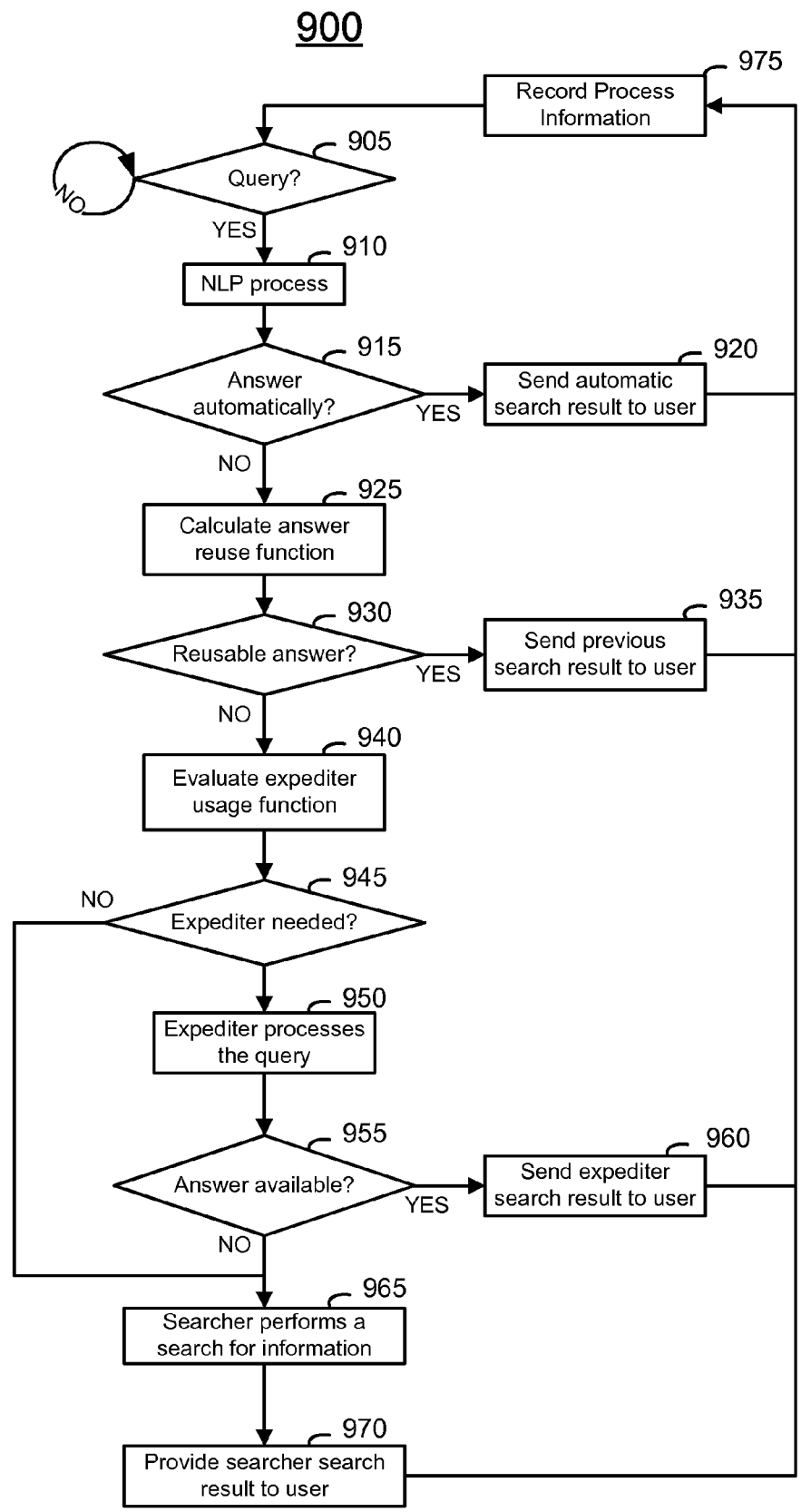
FIG. 9 is a flowchart of a process of processing a request.

A process 900 for responding to a user request is illustrated in FIG. 9. The process 900 may be operative on any suitable elements of the system 100 (FIG. 1). In at least one embodiment, the process 900 is operative on a server associated with the search system 130 (FIG. 1).

In operation 905 (FIG. 9), a determination is made as to whether a query is received. If in operation 905 it is determined that a query is not received, control remains at operation 905 and process 900 continues. If in operation 905 it is determined that a query is received, control is passed to operation 910 and process 900 continues.

In operation 910 Natural Language Processing (NLP) is applied to a raw query. A raw query may have been converted from speech to text in order that NLP may be applied. An algorithm for NLP is further described with respect to FIG. 10 herein below. Any suitable form of NLP may be applied to a query. However, while NLP is used to illustrate processing of a raw query, the present invention is not limited to any particular type of processing and may include may processing of the raw query based on analysis of same. Control is passed to operation 915 and process 900 continues.

In operation 915, a determination is made as to whether a request may be answered automatically. If in operation 915 it is determined that a query or request may be answered automatically, control is passed to operation 920 and process 900 continues. If in operation 915 it is determined that a request may not be answered automatically, control is passed to operation 925 and process 900 continues. In at least one embodiment, it may be determined that a search result such as an advertisement, etc., may be provided automatically while a search result which might include an answer to a user query, a search resource, etc., might require further processing.

The determination in operation 915 may be made based on various criteria. For example, if a query processed by NLP is determined to match an existing query, to conform to a standardized query, to include a keyword, etc., it may be determined that a query may be answered automatically.

In operation 920, an automated search result is provided to a user. A search result may be provided to a user using any communication service associated with a user. Information of a user request and a search result may be recorded in the database 120 (FIG. 1). Control is passed to operation 975 (FIG. 9) and process 900 continues.

In operation 925, an answer reuse function is calculated. A process and functionality for determining a probability that a reusable answer responsive to a user request is available is further described herein with respect to FIG. 11. Control is passed to operation 930 and process 900 continues.

In operation 930, a determination is made as to whether a reusable answer is available. If in operation 930 it is determined that a reusable answer is available, control is passed to operation 935 and process 900 continues. If in operation 930 it is determined that a reusable answer is not available, control is passed to operation 940 and process 900 continues.

In operation 935, a previously obtained search result is provided to a user. A search result may be provided to a user using any communication service associated with a user. Information of a user request and a search result may be recorded in the database 120 (FIG. 1). Control is passed to operation 975 (FIG. 9) and process 900 continues.

In operation 940, an expediter usage function is calculated. A process and functionality for determining a probability that an expediter is to be used to respond to a search request is further described herein with respect to FIG. 12. Control is passed to operation 945 and process 900 continues.

In operation 945, a determination is made as to whether an expediter is required to process a request. If in operation 945 it is determined that an expediter is required to process a request, control is passed to operation 950 and process 900 continues. If in operation 945 it is determined that an expediter is not required to process a request, control is passed to operation 965 and process 900 continues. Determination of whether an expediter is required in operation 945 may be made based on various factors including but not limited to subject matter of a query, complexity of the query, form of the query, etc.

In operation 950, an expediter processes a query (a request). Processing of a request by an expediter is further described herein. An expediter may categorize a request, may form a structured query responsive to a request, may identify a type of automated processing which may respond to a request, may select an answer to a user request, may designate location or other information associated with a request, etc. Control is passed to operation 955 and process 900 continues.

In operation 955, a determination is made as to whether an answer is available to a request. If in operation 955 it is determined that an answer is available to a request, control is passed to operation 960 and process 900 continues. If in operation 955 it is determined that an answer is not available to a request, control is passed to operation 965 and process 900 continues.

In operation 960, an expediter search result is provided to a user. A search result may be provided to a user using any communication service associated with a user. An expediter search result may include any search result which is obtained based on an action of an expediter. Information of the user request and the search result may be recorded in the database 120 (FIG. 1). Control is passed to operation 975 (FIG. 9) and process 900 continues.

In operation 965, a searcher performs a search for information. A searcher may be selected based on any suitable criteria. In at least one embodiment, a highest ranking searcher associated with a category associated with a request is selected and provided with search resources associated with information of the request such as a category, keyword, location, profile, etc. In at least one embodiment, resources may be provided to a guide using a system and method such as those described in U.S. Provisional Application Ser. No. 61/223,642, titled 'METHOD AND SYSTEM OF PROVIDING SEARCH TOOLS', inventor Jeff Jockish, attorney docket 1918.1075P filed Jul. 7, 2002 in the US Patent and Trademark Office. Control is passed to operation 970 and process 900 continues.

In operation 970, a search result is provided to a user. A search result may be provided to a user using any communication service associated with a user. Information of the user request and the search result may be recorded in the database 120 (FIG. 1). Control is passed to operation 975 (FIG. 9) and process 900 continues.

In operation 975, process information is recorded. In at least one embodiment, information of a type of answer provided, content of a query and a revised query, a category, a revised category, a process used to produce a search result, and a guide who has processed a result may be recorded in the database 120 (FIG. 1). Control is passed to operation 905 and process 900 continues. Determination of whether an answer is available with respect to a query at least in operations 915 and 955 may be made based on various factor(s) including a determination by a human guide, an automated system determination that stored content matches content of the query, etc.

Figure 10:
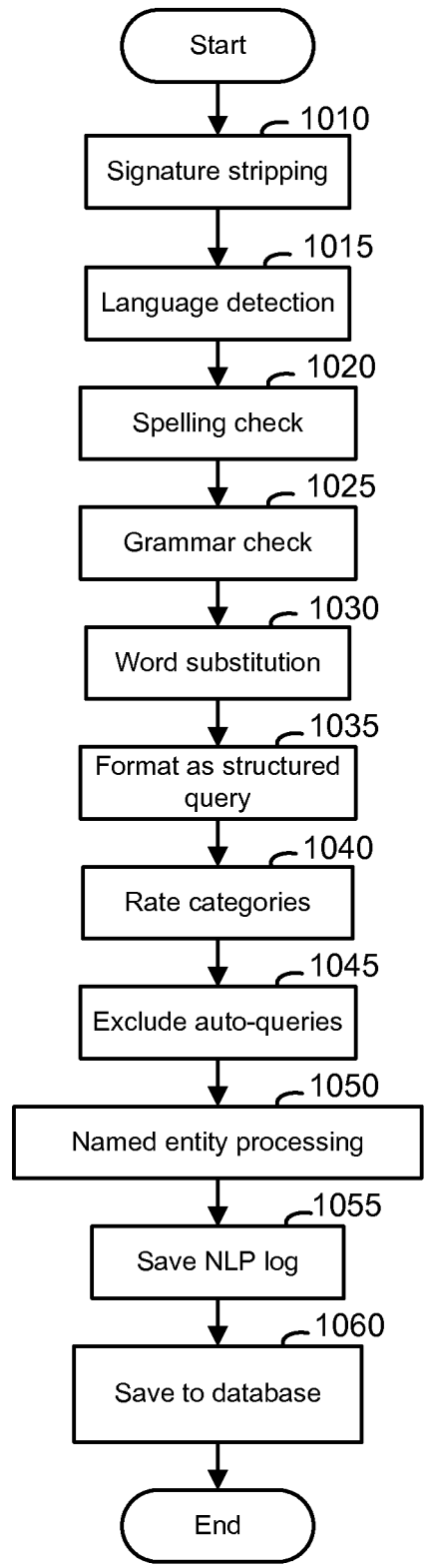
FIG. 10 is a flowchart of a process of natural language processing of a request.

As illustrated in FIG. 10, a process 1000 for natural language based query formation and improvement is provided. The process 1000 may be operative on any elements of the system 100 (FIG. 1). For example, the process 1000 may be operative on the user system 135. In at least one embodiment, the process 1000 is operative on a server associated with the search system 130 (FIG. 1). An NLP process or other similar process may also be referred to as an analyzer.

In operation 1010, signature stripping is performed. Some queries such as SMS, MMS, email, or IM based queries may include template information which must be removed in order to effectively determine user intent. For example, a user may have a signature message which is added to an email or SMS message. As this is easily detected by a person, if an expediter identifies this content in a first message, subsequent messages may have the identified content removed without the use of an expediter. Likewise, standard email signatures which contain elements such as phone numbers, etc., might be detected and removed from a request message. Signature removal may be based on statistical analysis of known signatures. For example, if a high percentage of known signatures begin with a particular character, presence of that character in multiple user messages may be used to determine a probability that a character string is a signature. Control is passed to operation 1015 and process 1000 continues.

In operation 1015, language detection is performed. Various types of language detection algorithms may be applied. For example, International Conference on Computational Linguistics, Proceedings of the 18th conference on Computational linguistics—Volume 2, Saarbrücken, Germany, SESSION: Project notes and demos Pages: 1021-1025, Year of Publication: 2000, or "A composite approach to language/encoding detection", S. Li, K. Momoi—Proc. 19th International Unicode Conference, 2001—sfr-fresh.com, describes a typical algorithm for language detection. As the search system 130 (FIG. 1) may recognize an individual user, and individual queries may typically have a length of seven to nine words, a language recognition process might be applied over a query history, and/or may be influenced by factors such as profile information, area code, country code, etc., which may be associated with a user. Control is passed to operation 1020 and process 1000 continues.

In operation 1020, a spelling check is performed. Spelling check is performed including using well known techniques such as word comparison and phrase comparison based on the language detected in operation 1015. If language detection results were ambiguous, a spelling check, versus more than one dictionary, may be performed and the language detection may be repeated based on results of the probable spelling corrections. In at least one embodiment, a dictionary may be selected based on a profile of a user. Control is passed to operation 1025 and process 1000 continues.

In operation 1025, a grammar check is performed. Grammar check is performed using well known techniques, (e.g. an annotation graph). For example, ATLAS: A flexible and extensible architecture for linguistic annotation, Steven Bird, David Day, John Garofolo, John Henderson, Christophe Laprun, Mark Liberman, submitted on 13 Jul. 2000, describes a software tool for producing and using annotation graphs. An annotation graph may be constructed using a grammar specialized to queries, rather than a generalized sentence analysis optimized for text processing. Control is passed to operation 1030 and process 1000 continues.

In operation 1030, a word substitution is performed. Word substitution is a process of replacing common abbreviations and/or slang forms of speech with an alternate form of the word or words. For example 'b4' might be replaced with 'before', or 'u' might be replaced with 'you', etc. Such a process may include factors which may be tailored to a user based on factors such as profile information (e.g. regional information, demographic, etc.) and/or query history information, etc. Control is passed to operation 1035 and process 1000 continues.

In operation 1035, a query is formatted as a structured query. Such a process may be performed by semantic processing of a query. In at least one embodiment, a query may be created by converting a statement into a question such as rewriting the query 'will it rain today.' as 'what is the chance of rain today?'. Likewise, a raw query might be compared to a database of raw queries which have been associated with a succinct query by a guide. Control is passed to operation 1040 and process 1000 continues.

In operation 1040, categories associated with a query are rated. An exemplary algorithm for selecting and rating a categorization associated with a query is: The Ferrety algorithm for the KDD Cup 2005 problem, Zsolt T. Kardkov and Domonkos Tikk and Zolt, SIGKDD Explorer Newsletter, volume 7, number 2, 2005, issn: 1931-0145, pages 111-116, ACM, New York, N.Y., USA and Technical Report LU-CSE-07-013, Dept. of Computer Science and Engineering, Lehigh University, Bethlehem, Pa., 18015. entitled "Leveraging Search Engine Results for Query Classification" by Bhandari and Daivson published 1 Nov. 2008. The search system 130 (FIG. 1) may have a taxonomy for categorization, which is customized in order to index the guide community. Training of a classification algorithm based on query classification information provided by guides may be used. For example, keywords which are most frequently associated with a particular category may be determined based on content of queries categorized by guides. Control is passed to operation 1045 (FIG. 10) and process 1000 continues.

In operation 1045, automated and/or keyword based queries may be excluded from processing. In at least one embodiment, if a keyword is associated with a particular system response, a query which begins with that keyword may be excluded from processing. Excluded queries might include advertising keywords. Likewise, a query which conforms to a query template after NLP may be selected for an automated response. For example, if a user submitted the query 'wether 46038', a corrected version 'weather 46038' would be automatically processed. Likewise, a query such as 'stok nfs', which might be corrected to 'stock nfs', could be automatically processed. Control is passed to operation 1050 and process 1000 continues.

In operation 1050, named entity processing is performed. Named entity processing techniques are well known in the art. For example, Memory-Based Named Entity Recognition, by Erik P Tjong Kim Sang, from the $6^{th}$ Conference on Natural Language, 2002, describes an exemplary process and method for performing named entity processing. In particular the search system 130 (FIG. 1) may access a database of named entities which may be included in the database 120 and/or may be an external search resource. Control is passed to operation 1055 (FIG. 10) and process 1000 continues.

In operation 1055, information associated with the NLP operations performed in conjunction with the process 1000 is recorded. For example, a record of NLP processing may be stored in the database 120 (FIG. 1). This information may include results of the processes, the confidence and/or probability factors associated with various versions of a query, etc., which may be shared with other processes and/or may be used to evaluate training and efficacy of a particular parametric tuning, etc. Control is passed to operation 1060 and process 1000 continues.

In operation 1060, information associated with a query is updated and process 1000 completes. A request record such as the request record 200a may be updated to reflect categorizations, a structured query, keywords, and/or ratings information determined based on the process 1000. Control is passed back to a parent process such as the process 900 (FIG. 9).

As previously discussed, answer reuse is important to the success of a human-assisted search system as it directly impacts cost and economic viability of the system. In order that a previous search result may be provided responsive to a request, it is necessary to meet a combination of conditions. A request must be sufficiently close to a request for which a search result is available, and the available search result must be of sufficient quality. Criteria for matching and the criteria for quality of a search result may change based on the nature of a request and a type of search result.

For example, a search resource, an advertisement, a game, an answer, contact information for a supplier of items or services, etc., may have different quality criteria. Quality rating of a resource might be based on the reliability of a resource providing information. Quality rating of an advertisement might be based on fit with a category and/or payment by an advertiser. Quality rating of a game might be based on a match to keyword and/or profile information associated with previous purchases.

Similarly to the quality rating, matching to a query may have different criteria for different types of search results. For example a search result such as an advertisement might be provided if matching is less exact, while a search result such as an answer to a question might be provided if matching is more exact. To determine whether an answer is to be reused, a function which describes the level of matching between a query and a reference query with which a search result is associated is needed. In at least one embodiment, software which implements the evaluation is referred to as the "Answer Reuse Process" (ARP) and an ARP evaluation function is used to determine whether an answer is to be reused.

In at least one embodiment, a process which provides a set of queries which match a vetted query and answers associated with the queries is implemented. The "Query Vetting Process" (QVP) compares any query to a database of queries and returns any queries which match the reference query to a given threshold. For example, the QVP might return all queries which matched any word in a query or any queries that match 80% of the words in a query, etc. Techniques such as stemming, etc., may be utilized by the QVP and the algorithm may be adjusted to provide a manageable set of queries and associated answers to the ARP. It should be noted that queries may be returned based on a ranking of the queries versus a reference query. This a set of returned queries is a best available match to a reference query, but is not rated as regards the absolute or normalized matching of the set of returned queries to the reference query. A normalization process may be used to determine whether stored query is a sufficiently close match to a reference query.

In at least one embodiment, the ARP evaluator function which determines the probability that a search result will be reused is defined as:

$$\eta_{arp}(a_x, q) = \eta_{qual}(a_x) * \eta_{match}(q, q_{ax}) \quad \text{Eq. 1}$$

Wherein: $\eta_{arp}(a_x, q)$ is the ARP answer rating for a potential answer ($a_x$) with respect to the query (q). The answer rating function $\eta_{arp}$ is normalized such that it is a value between zero and one inclusive. In other words $0 \le \eta_{arp}(a_x, q) \le 1$ $\eta_{qual}(a_x)$ is a quality rating associated with the answer $a_x$ with respect to the query, $q_{ax}$ that is associated with the answer $a_x$. The quality function $f_{qual}$ is normalized such that it has a value between zero and one inclusive. In other words $0 \le \eta_{qual}(a_x) \le 1$ $\eta_{match}(q, q_{ans})$ is the Query Match Function (defined below) which rates the similarity between the reference query q and the query associated with the answer $q_{ans}$. The match function $f_{match}$ is normalized such that it has a value between zero and one inclusive. In other words $0 \le \eta_{match}(q, q_{ans}) \le 1$.

An answer $a_{max}$ is selected which has the highest value of $f_{arp}$ for the set of answers which are associated with queries which are provided to the ARP by the QVP. If the value of $f_{arp}$ associated with the selected answer $a_{max}$ is below a threshold, the answer will not be reused. Thus the probability that an answer will be reused is a function of both the match between a query (e.g. a vetted query, a raw query, etc.) and the query associated with the answer, and the quality rating associated with the answer and its related query.

The Answer Quality Function (AQF), $f_{qual}$, may be determined in various ways. For example, an answer which has been selected by a highly rated searcher may have a high value of $f_{qual}$. An answer which has received a high percentage of positive ratings by users and/or guides may have a high value of $f_{qual}$. An answer which has been provided by an automated search may have a low value of $f_{qual}$. In at least one embodiment, a discrete value function may be used to assign $f_{qual}=1$ for a reviewed, superior, answer provided by a guide, $f_{qual}=0.7$ for an answer which has received at least 80% positive ratings by users, and $f_{qual}=0.5$ for an answer which has been selected by at least one expediter. The AQF may include other variables such as how often a result has been provided to users, time based modification, sponsorship factors, adjustment for characteristics of a searcher, etc. In at least one embodiment, selection of an answer by an expediter may increase a value of $f_{qual}$ associated with an answer. A Query Matching Function (QMF) is used to determine how closely related a test query is to a reference query. The QMF may be based on any information associated with a query such as a category, a structured query, a raw query, a profile, a location, a language, etc. In at least one embodiment, the QMF is defined as:

$$f_{match}(q, q_{a_x}) = w_{wb} f_{wb}(q, q_{a_x}) + w_{pb} f_{pb}(q, q_{a_x}) + w_{ac} f_{ac}(C_q, C_{q_{a_x}}) \quad \text{Eq. 2}$$

The reference query, q, is the query which is to be matched from Eq. 1. In at least one embodiment, q is a succinct query which has been produced by the NLP process 1000 (FIG. 10). The category set $C_q$ is the set of categories that have been selected to be associated with the reference query q. In at least one embodiment, $C_q$ is the set of categories which have been determined by the process 1100. The candidate answer $a_x$ is an answer which is associated with a set of vetted queries which has been selected for evaluation. In at least one embodiment, the queries and answers are provided by the QVP. The candidate category set $$C_{q_{a_x}}$$

is the set of categories associated with the query associated with the candidate answer $a_x$.

The QMF includes the weighting factors $w_{wb}$, $w_{pb}$, and $w_{ac}$. In order to preserve normalization it will be readily appreciated that the values of $f_{wb}$, $f_{pb}$ and $f_{ac}$ must be between zero and one inclusive, and that $w_{wb}+w_{pb}+w_{ac}=1$. The components of the match function $f_{match}$ are the Wordbag Function (WBF), the Phrasebag Function (PBF) and the Autocat Function (ACF). The WBF is used to compare words and their grammatical functions between two queries. The PBF is used to compare phrases and their grammatical functions between two queries. The ACF is used to compare categories between two queries.

In at least one embodiment, the ACF compares the tagged word content of the reference query q and the query associated with the answer $a_x$, $q_a$ using the following formula:

$$f_{wb}(q, q_{a_x}) = \frac{|Q_q \cap Q_{q_{a_x}}|}{|Q_q \cup Q_{q_{a_x}}|} \quad \text{Eq. 3}$$

$Q_q$ is the set of tagged tokens in the reference query q. A "tagged token" is a word along with a tag which identifies the part of speech which has been determined from semantic analysis of context of the query. Tagged tokens are considered identical only if both the word content and the part of speech tag are identical.

$$Q_{q_{a_x}}$$

is the set of tagged tokens in the query associated with the answer $a_x$.

The Phrasebag Function (PBF) is similar to the Wordbag Function (WBF) but the PBF utilizes word phrases instead of words. $W_q$ is the set of tagged phrases in the reference query q. A "tagged phrase" is a group of words along with a tag which identifies the part of speech associated with the group which has been determined from semantic analysis of context of the query (e.g. noun phrase, prepositional phrase, etc.). Tagged phrases are considered to be identical if both the phrase content and the associated tag are identical.

$$W_{q_{a_x}}$$

is the set of tagged phrases in the query associated with the answer $a_x$. The PBF is defined as:

$$f_{pb}(q_{a_x}, q) = \frac{|W_q \cap W_{q_{a_x}}|}{|W_q \cup W_{q_{a_x}}|} \quad \text{Eq. 4}$$

The WBF and the PBF may include consideration for synonyms and other word relations as well as the frequency of various tagged phrases.

The Autocategorization Function (ACF) may be defined as:

$$f_{ac}(C_{q_{a_x}}, C_q) = \quad \text{Eq. 5}$$

$$\text{if } \begin{cases} C_q \cap C_{q_{a_x}} = \varnothing \to 0.0 \\ C_q \cap C_{q_{a_x}} \neq \varnothing \to \begin{array}{l} f_{smooth}(\max(\text{likelihood }(c))), \\ c \in \{C_q \cap C_{q_{a_x}}\} \end{array} \end{cases}$$

$$f_{smooth}(x) = \frac{\sin(x\pi) + 1}{2}$$

That is to say, if the intersection of the set of categories associated with queries returned by the QVP with the set of categories returned by the RWP is null, the value of the ACF is zero. If there are categories in the intersection, the highest rating value of any category in the intersection is selected. The rating value associated with the selected category is modified by the smoothing function $f_{smooth}$.

Actions of guides and/or users responsive to results produced by an NLP process may be used to tune various elements of the performance of the NLP algorithms. For example, data of acceptance of a structured query by expediters may be used to determine a weighting given to words and/or phrases when constructing a structured query. Similarly, language detection, named entity processing, spelling correction, etc., may be modified based on actions of guides. Such activities may, for example, allow NLP, speech recognition, and/or other forms of automated conversion of requests to be personalized to a user without the need for a user to make such corrections.

Figure 11:
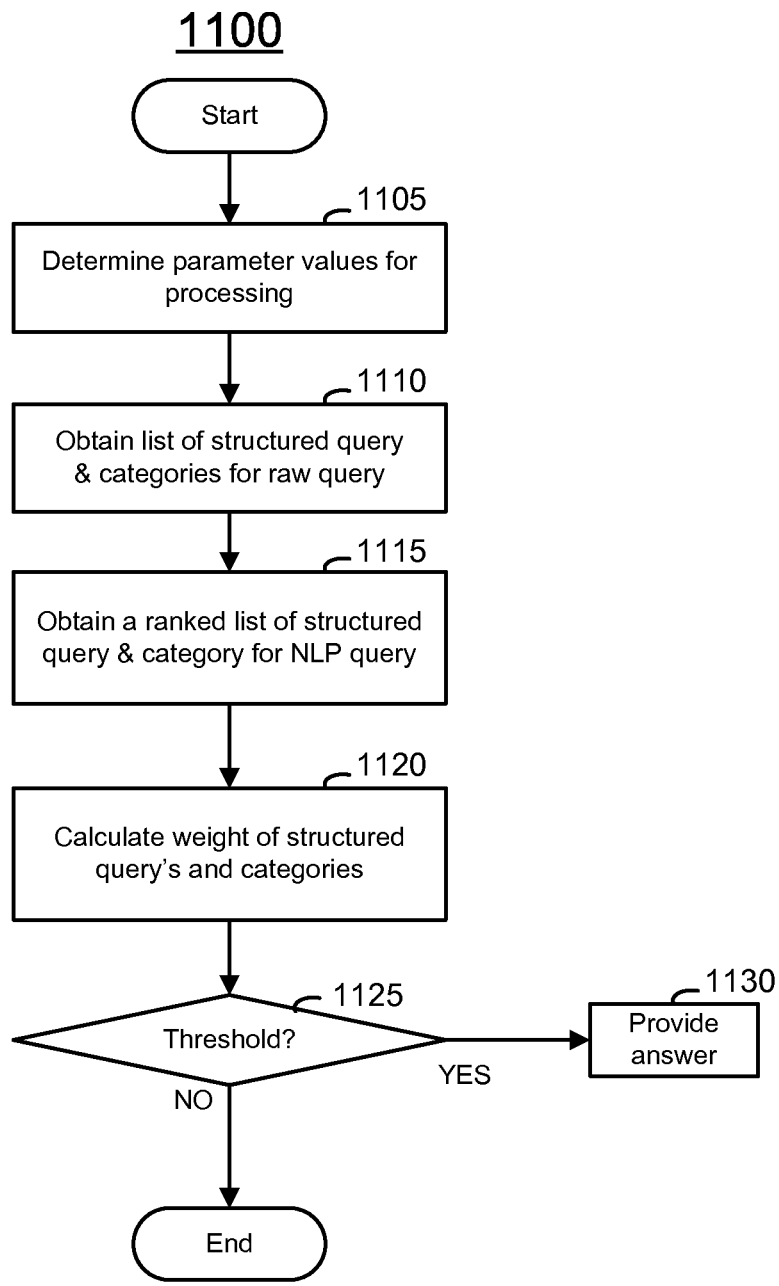
FIG. 11 is a flowchart of a process of selecting a categorization of a request.

As illustrated in FIG. 11, a process 1100 for determining whether a reusable search result responsive to a request is available is provided. The process 1100 may be operative on any suitable elements of the system 100 (FIG. 1). In at least one embodiment, the process 1100 is operative on a server associated with the search system 130.

In operation 1105 (FIG. 11), a parameter for the reuse evaluation function, such as those described herein above, are determined. For example, if the answer reuse function is to be evaluated in operation 925 (FIG. 9) the parameters and/or the decision thresholds may be adjusted due to the lack of human intervention in the processing of the query. Likewise if a guide such as an expediter, searcher, and/or transcriber has processed a query, the parameters and/or thresholds may be modified. Control is passed to operation 1110 and process 1100 continues.

In operation 1110, a number of succinct queries and categories which are associated with a raw query are obtained. In at least one embodiment, the QVP may provide such information to the ARP. Succinct queries may be selected based at least in part on content of search results associated with the succinct queries. For example, a ranking of succinct queries may be based on a reverse index of the queries associated with keywords of the succinct queries. Control is passed to operation 1115 and process 1100 continues.

In operation 1115, a number of succinct queries and categories which are associated with a query produced by NLP operations, such as those performed in the process 1000, are obtained. In at least one embodiment, the QVP may provide such information to the ARP. Succinct queries may be selected based at least in part on content of search results associated with the succinct queries. Control is passed to operation 1120 and process 1100 continues.

In operation 1120, the ARP evaluation function is evaluated for the set of answers associated with the structured queries and categories obtained associated with a raw query and a vetted query. In at least one embodiment, the queries from obtained based on a raw query are weighted differently than the queries obtained using a vetted query. In particular, if a structured query and a category have been determined by a guide and/or a user, results associated with a raw query may be more or less likely to be selected. Control is passed to operation 1125 and process 1100 continues.

In operation 1125, a determination is made as to whether a search result which may be reused is available. If in operation 1125, it is determined that a search result which may be reused is available, control is passed to operation 1130 and process 1100 continues. If in operation 1125, it is determined that a search result which may be reused is not available, process 1100 ends and control is passed back to a parent process. As previously noted, if a category associated with a search result associated with a test query is not related to a category associated with a reference query, the reuse function of the search result may be decreased.

In at least one embodiment, the determination in operation 1125 is made based on a threshold determined in operation 1105. If more than one search result exceeds a given value of the ARF evaluation function, various actions may be taken. These various actions may include: selecting an answer with a highest value, providing all the answers, providing a randomly selected member of the qualifying answers, etc.

In operation 1130, an available answer is provided. Control is passed back to a parent process and process 1100 ends.

Figure 12:
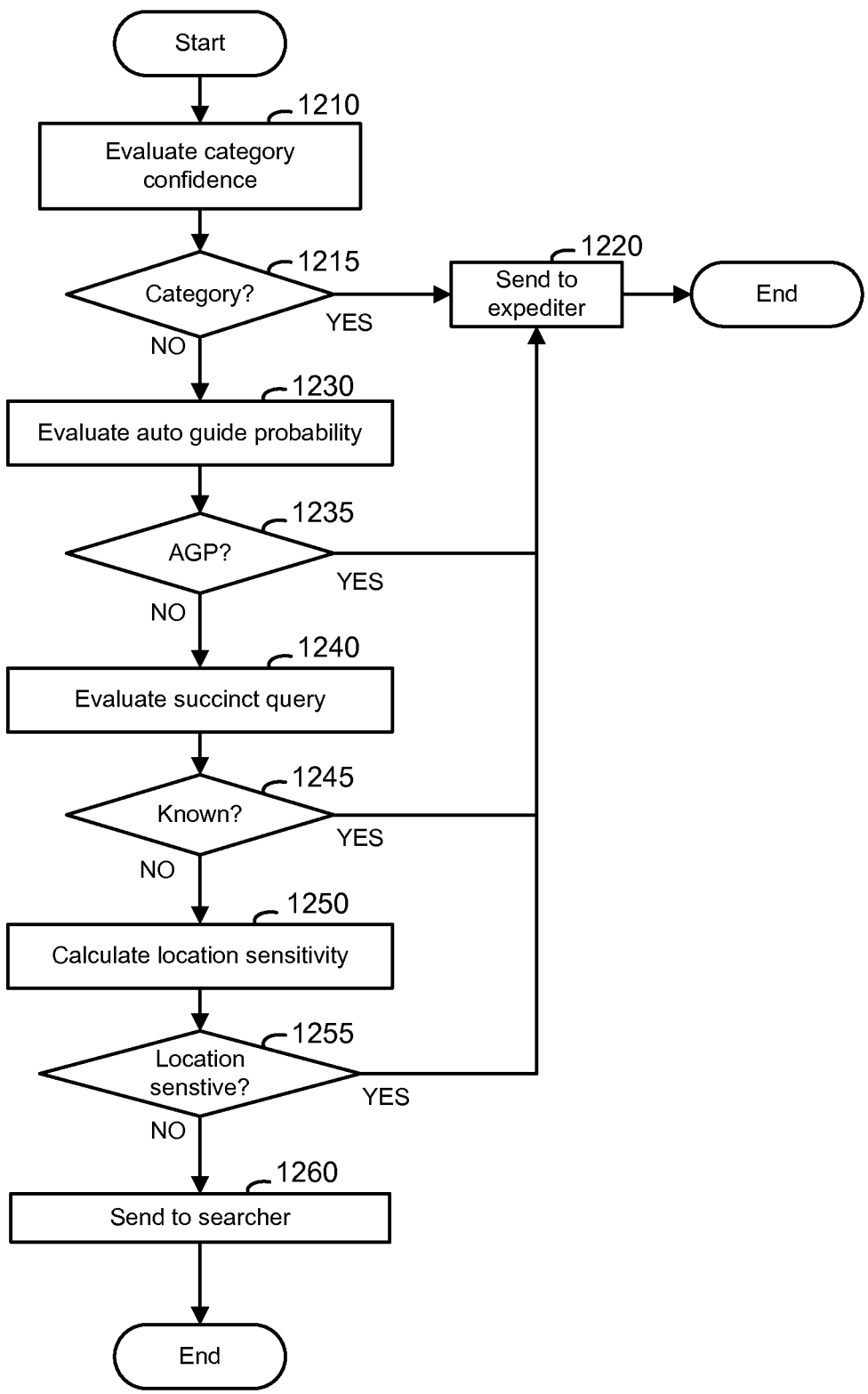
FIG. 12 is a flowchart of a process of routing of a request.

As illustrated in FIG. 12, a process 1200 for determining whether a request is to be directed to an expediter or ambassador is provided. The process 1200 may be operative on any suitable elements of the system 100 (FIG. 1). In at least one embodiment, the process 1200 is operative on a server associated with the search system 130.

In operation 1210 (FIG. 12), a function is evaluated which measures the probability that a category selected to be associated with a request. A function such as the ACF described herein above may be utilized. A category confidence value may include factor(s) such as user history, user profile, guides associated with a user, subject matter of category, etc. In at least one embodiment, the ACF is applied to a raw query and a succinct query created using the process 1000 (FIG. 10). Control is passed to operation 1215 (FIG. 12) and process 1200 continues.

In operation 1215, a determination is made as to whether an expediter is required to select a category to be associated with a request. If in operation 1215 it is determined that an expediter is required to select a category to be associated with a request, control is passed to operation 1220 and process 1200 continues. If in operation 1215 it is determined that an expediter is not required to select a category to be associated with a request, control is passed to operation 1230 and process 1200 continues. For example, a value of the ACF associated with a query may be compared to a pre-determined threshold value to determine whether an expediter is needed to select a category associated with a request.

In operation 1230, a function which measures the probability that a programmatic response from a search resource may be used to respond to a request is evaluated. For example, a query may be analyzed to determine if it may be mapped to an API available to provide information such as weather, sports scores, etc. Likewise, keywords of a request may be examined in order to determine the probability that a response from an expediter can be used. In at least one embodiment, a function, such as the ARF evaluation function, may be applied to a query structure associated with a resource and a query. In at least one embodiment, a query may be processed by a plurality of processes associated with automated resources. A parallel processing of queries associated with multiple resources may reduce an amount of time required to determine a probability that a query may be processed by an automated process. Control is passed to operation 1235 and process 1200 continues.

In operation 1235, a determination is made as to whether an expediter may provide a response to a request using a resource (i.e, determine whether there is an acceptable auto guide probability). If it is determined that an expediter may provide a response to a request using a resource, control is passed to operation 1220 and process 1200 continues. If it is determined that an expediter may not provide a response to a request using a resource, control is passed to operation 1240 and process 1200 continues.

In operation 1240, a function which measures the matching between a succinct query and a request is evaluated. In at least one embodiment, a function such as the Query Match Function (equation 2) may be evaluated to determine if a succinct query indicated in the database 120 (FIG. 1) matches a user request, which may include a succinct query. Control is passed to operation 1245 (FIG. 12) and process 1200 continues.

In operation 1245, a determination is made as to whether a matching succinct query is known (available). If in operation 1245 it is determined that a matching succinct query is available, control is passed to operation 1220 and process 1200 continues. If in operation 1245 it is determined that a matching succinct query is not available control is passed to operation 1250 and process 1200 continues. For example, if a query in the database 120 (FIG. 1) is a match to a query, but an answer associated with the query is of low quality, it may be determined that the query may be sent to a searcher without processing by an expediter.

In operation 1250, a function which measures the sensitivity of a request to location is evaluated. For example, a user request may include words which imply location such as 'here', 'there', etc., or might include named entities such as street names, city names, etc., a location sensitivity function may be affected by such content. Likewise, queries including named entities associated with sports teams, restaurants, etc., might have a high location sensitivity function. Control is passed to operation 1255 and process 1200 continues.

In operation 1255, a determination is made as to whether a query is location sensitive. If in operation 1255 it is determined that a query is location sensitive, control is passed to operation 1220 and process 1200 continues. If in operation 1245 it is determined that a query is not location sensitive, control is passed to operation 1260 and process 1200 continues.

In operation 1260, information of a request is provided to a searcher. As a query has been appropriately prepared by the preprocessing, it is not necessary for an expediter to respond to the request. A searcher may be selected based on a categorization, succinct query, and/or other information associated with a request. It should be noted that the cost of processing a query may be reduced as a searcher may be responding to well formed queries in the searcher's area of interest, while an expediter is not utilized if it is not needed. Control is passed back to the parent process and process 1200 terminates.

In operation 1220, information of a request is provided to an expediter. As a query has been evaluated to determine the nature of the request, an expediter may be selected more effectively. An expediter may further be provided with a toolset which is adapted to the most likely response to a query. As such, an expediter may be able to process a request more rapidly and/or with fewer errors. In at least one embodiment, an expediter is automatically provided with a GUI based on pre-processing of a query. In at least one embodiment, a keyword, location, category, profile, etc., with a query may affect a GUI initially provided to an expediter. Control is passed back to the parent process and process 1200 terminates.

Figure 13:
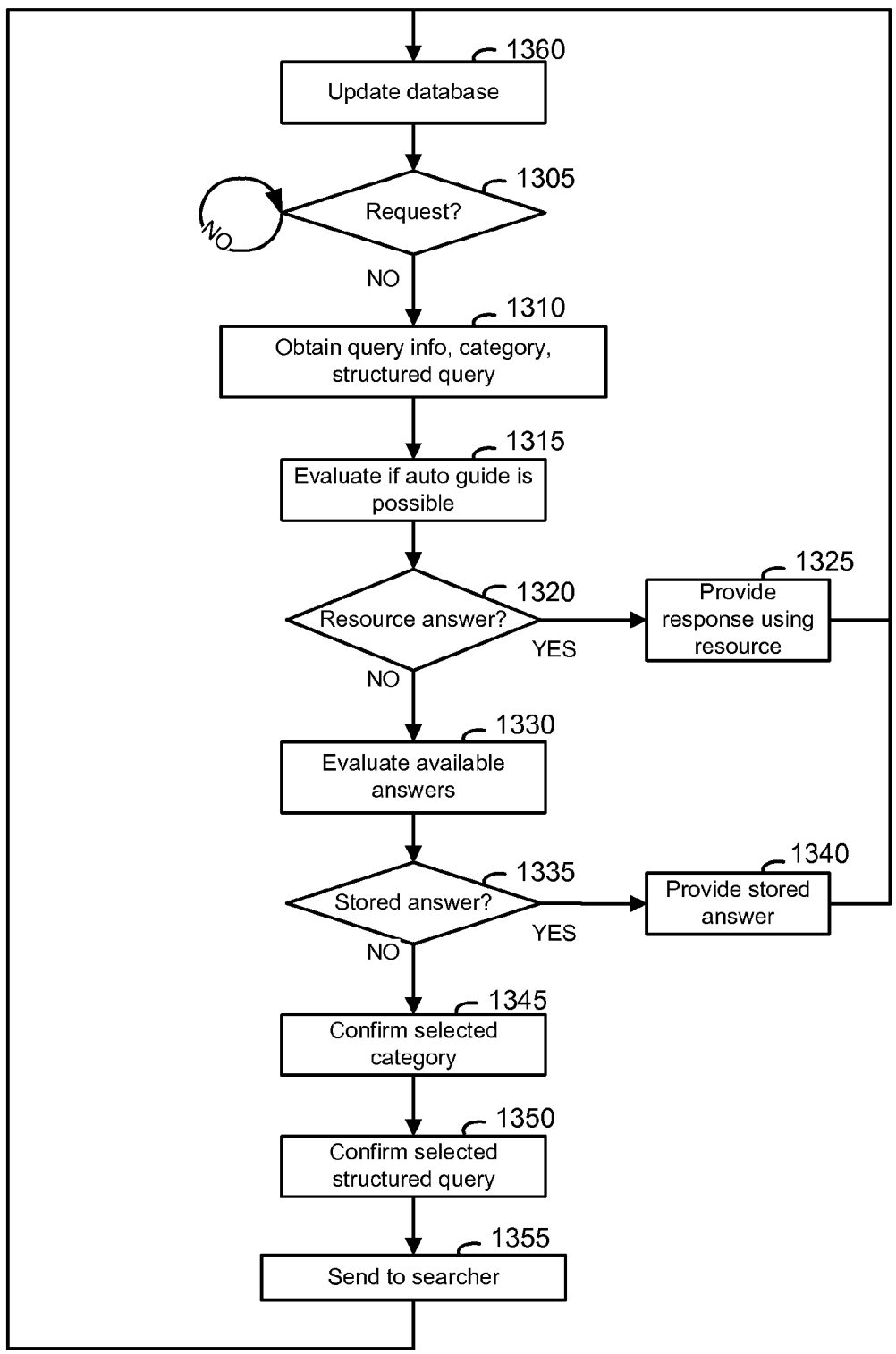
FIG. 13 is a flowchart of a process of expediting a request.

As illustrated in FIG. 13, a process 1300 for qualifying a query by an expediter is provided. The process 1300 may be performed automatically, or may be performed using the assistance of a guide in any or all operations. Any or all of the process 1300 may be operative on a guide system such as the guide system 105 (FIG. 1). In at least one embodiment, the process 1300 is implemented as a client-server process between the search system 130 and the expediter system 165.

In operation 1305, a determination is made as to whether a request is received. If in operation 1305 it is determined that a request is not received, control remains at operation 1305 and process 1300 continues. If in operation 1305 it is determined that a request is received, control is passed to operation 1310 and process 1300 continues.

In operation 1310, information of a query including a category and a structured query is obtained. Any information associated with a query may be obtained. In at least one embodiment, information of a request is provided to an expediter. In at least one embodiment, a group of highest ranking categories and queries is presented to an expediter. Control is passed to operation 1315 and process 1300 continues.

In operation 1315, information of a query is analyzed for compatibility with available resources which may provide a response (evaluate whether auto guide is possible). A function may be evaluated to determine if a query may be answered by an automated process. For example, if a query includes words, named entities, keywords, etc., such information may be evaluated. In at least one embodiment, information of a query is provided to an expediter who may evaluate the ability to respond using a resource. Control is passed to operation 1320 and process 1300 continues.

In operation 1320, a determination is made as to whether a resource may respond to a request. If in operation 1320 it is determined that a resource may respond to a request, control is passed to operation 1325 and process 1300 continues. If in operation 1320 it is determined that a resource may not respond to a request control is passed to operation 1330 and process 1300 continues. In at least one embodiment, judgment of a guide may be used to make the determination in operation 1320.

In operation 1325, a response to a request is provided by a resource. For example, a database, news feed, RSS feed, a translation service, a music recognition service, and/or other system which may provide a response or answer to a user request may provide information to a user. In at least one embodiment rating information of a result provided may be obtained. Control is passed to operation 1360 and process 1300 continues.

In operation 1330, information of a query is analyzed to determine suitability of an existing answer to be used to respond to a request. For example, a function such as the ARP function may be evaluated to determine if a query may be answered by a stored result. In at least one embodiment, information of a query is provided to an expediter who may evaluate the ability to respond using an existing answer. In at least one embodiment, a number of queries associated with a user query and information of results associated with the queries is provided to an expediter. Control is passed to operation 1335 and process 1300 continues.

In operation 1335, a determination is made as to whether a stored answer may be used to respond to a request. If in operation 1335 it is determined that a stored answer may be used to respond to a request, control is passed to operation 1340 and process 1300 continues. If in operation 1335 it is determined that a stored answer may not be used to respond to a request, control is passed to operation 1345 and process 1300 continues.

In operation 1340, a stored response to a request is provided. For example, an answer stored in the database 120 (FIG. 1) may be provided to a user. Rating information may be obtained based on actions of a user and/or a guide. If an expediter has selected an answer to be provided to a user, a ranking and/or rating of the answer may be increased. Control is passed to operation 1360 (FIG. 13) and process 1300 continues.

In operation 1345, information of a category associated with a request is confirmed. In at least one embodiment, an expediter may confirm a category associated with a request. Control is passed to operation 1350 and process 1300 continues.

In operation 1350, information of a succinct query associated with a request is confirmed. In at least one embodiment, an expediter may confirm a succinct query associated with a request. Control is passed to operation 1355 and process 1300 continues.

In operation 1355, a request and information associated with the request is provided to a searcher. For example, a succinct query, a category, user information, search resources, etc., which may be associated with a request may be provided to a searcher at a searcher system (e.g. the searcher system 105 (FIG. 1)) using a web server functionality of the search system 130 and a web browser functionality of the searcher system 130. Control is passed to operation 1360 (FIG. 13) and process 1300 continues.

In operation 1360, information associated with the query vetting process 1300 is recorded. In at least one embodiment, the database 120 (FIG. 1) may be updated with information of a category, a succinct query, a response provided by a resource, a stored response provided, an expediter, a guide, a query, etc., which has been modified by the process 1300 and may be recorded. Usage information of a resource may be recorded to determine compensation for the resource. Use of a stored result may also cause a rating of the stored result to be reduced. Further, the amount of time required by an expediter may be recorded in order to evaluate efficiency of the expediter. Control is passed to operation 1305 and process 1300 continues.

Figure 14:
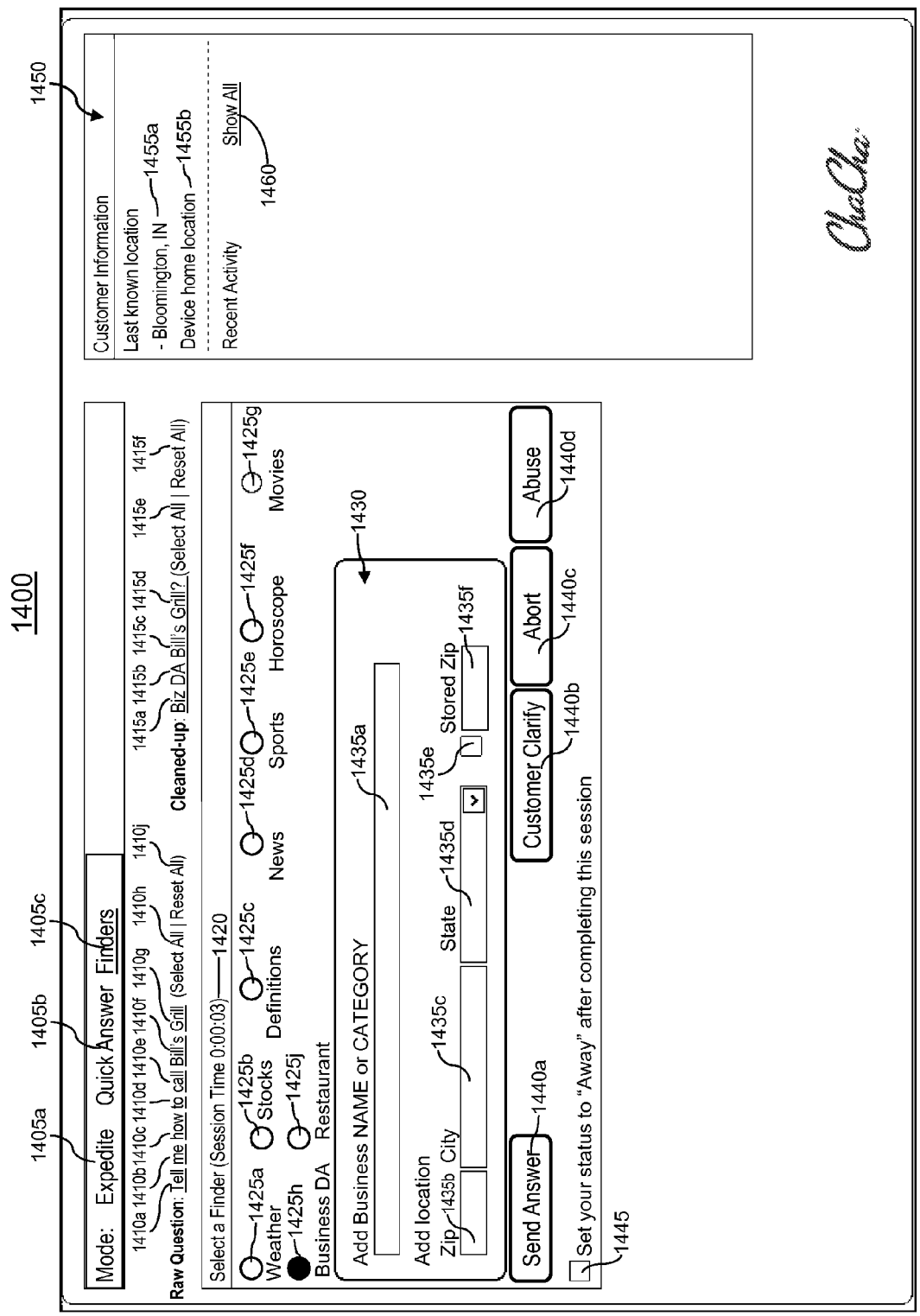
FIG. 14 illustrates a graphical user interface (GUI) for selecting an automated response.

A GUI 1400 for processing a request for submission to a resource is illustrated in FIG. 14. The GUI 1400 may be provided to a guide if a request is accepted. For example, the GUI 1400 may be provided to an expediter or ambassador in order to process a user request which has been determined to require expediting. The GUI 1400 may include activity indicators 1405, raw query indicators 1410, succinct query indicators 1415, a session time indicator 1420, finder indicators 1425, a parameter window 1430, parameter indicators 1435, action controls 1440, an away control 1445, a user information window 1450, location indicators 1455, and an activity selector 1460.

The activity indicators 1405 may be used to indicate a current activity. For example, the 'Finders' activity indicator 1405c is active as indicated by the underline. Activation of the 'Finders' activity indicator 1405c may cause a GUI such the GUI 1400 (FIG. 14) to be provided. Activation of the 'Quick Answer' activity indicator 1405b may cause a GUI such the GUI 1500 (FIG. 15A) to be provided. Activation of the 'Expedite' activity indicator 1405a may cause a GUI such the GUI 1700 (FIG. 17) to be provided.

The raw query indicators 1410 may be used to indicate elements of a raw query. The raw query indicators 1410 may be used to add and remove information from the parameter indicators 1435. For example the raw query indicator 1410a may transfer the word 'Tell' to an active parameter indicator 1435 when activated, and/or may be used to remove the word 'Tell' if it is present in the active parameter indicator 1435. Similarly, the raw query indicators 1410b-1410g may transfer and/or remove a word associated with the respective raw query indicators. The 'Select All' raw query indicator 1410h may be used to transfer all words associated with a raw query to an active parameter indicator 1435. The 'Reset All' raw query indicator 1410j may be used to remove all words associated with a raw query from an active parameter indicator 1435.

The succinct query indicators 1415 may be used to indicate elements of a succinct query. The succinct query indicators may be used to add and remove information from the parameter indicators 1435. For example, the succinct query indicator 1415a may transfer the word 'Biz' to an active parameter indicator 1435 when activated, and/or may be used to remove the word 'Biz' if it is present in the active parameter indicator 1435. Similarly, the succinct query indicators 1415b-1415d may transfer and/or remove a word associated with the respective succinct query indicators. The 'Select All' succinct query indicator 1415e may be used to transfer all words associated with a succinct query to an active parameter indicator 1435. The 'Reset All' succinct query indicator 1415f may be used to remove all words associated with a succinct query from an active parameter indicator 1435.

The session time indicator 1420 may be used to indicate time associated with an activity performed using the GUI 1400. The finder indicators 1425 may be used to indicate a type of finder which is to be used to provide a response to a request. A finder is any resource which may provide a response to a query based on standard input parameters. For example, a weather database which may provide a weather forecast based on a location and a date may be a finder resource. Using the example in FIG. 14 the finder indicator 1425a may provide an interface for supplying information required to obtain 'Weather' information when selected. The 'Stocks' finder indicator 1425b provides an interface for stock quotes. The finder indicators 1425c-1425j provide interfaces for 'Definitions', 'News', 'Sports', 'Horoscope', 'Movies', 'Business DA' and 'Restaurants' are provided. As indicated by the dark spot in the 'radio button' feature of the finder indicator 1425h, an interface for business directory assistance is provided in the parameter window 1430.

The parameter indicators 1435 may be used to indicate information associated with parameters needed by a resource in order to provide a response to a request. The parameter indicator 1435a may be used to provide a business name and/or category. For example, an expediter might transfer 'Bill's Grill' to the parameter indicator by 'cutting and pasting' or by activating the respective raw query indicators 1410. The zip code parameter indicator 1435b may be used to indicate a zip code associated with a request. For example, activation of the location indicator 1455a may cause a zip code associated with 'Bloomington, Ind.' to be transferred to the zip code parameter indicator 1435b when the 'attention' pointer is located there. The city parameter indicator 1435c may be used to indicate a city associated with a request. For example, activation of the location indicator 1455b may cause a city associated with a device home location, which may not be revealed to an expediter, to be transferred to the city parameter indicator 1435c when the 'attention' pointer is located there. The state parameter indicator 1435d may be used to indicate a state associated with a request. For example, activation of the location indicator 1455b may cause a state associated with a device home location, which may not be revealed to an expediter, to be transferred to the state parameter indicator 1435d when the 'attention' pointer is located there. The parameter indicator 1435e may be used to indicate if a zip code should be stored. For example, if there is no location associated with a user, or if a number of requests have been associated with businesses in a given location, an expediter may determine that a zip code is to be stored in relation to a user and/or a request. The parameter indicator 1435f may be used to indicate a zip code which may be a stored zip code.

The 'Send Answer' action button 1440a may be used to indicate that information indicated in the GUI 1400 is to be submitted in order to provide a response to a request. The 'Customer Clarify' action button 1440b may be used to indicate that a request is unclear or ambiguous, which may cause a request for clarification to be provided responsive to a request. The 'Abort' action button 1440c may be used to indicate that a request is to be provided to another guide. The 'Abuse' action button 1440d may be used to indicate that a request is inappropriate. In at least one embodiment, activation of the 'Abuse' button 1440d may cause a warning message to be sent to a user submitting a request. In at least one embodiment, activation of the 'Send Answer' action button 1440a may cause a GUI such as the GUI 1600 for confirmation of a result to be provided.

The away control 1445 may be used to indicate that a guide has elected to become inactive after completion of a current task. The customer information window 1450 may be used to provide information associated with a user such as location, preferences, profile information, previous queries, and/or other information which may assist in responding to a request. The 'show all' user information control 1460 may be used to show and/or hide expanded user information such as user history, etc.

A GUI associated with a finder such as the GUI 1400 may be provided to a guide as a first GUI based on an automated analysis of a request which may indicate a most probable activity and resource type which is associated with the request.

Figure 15:
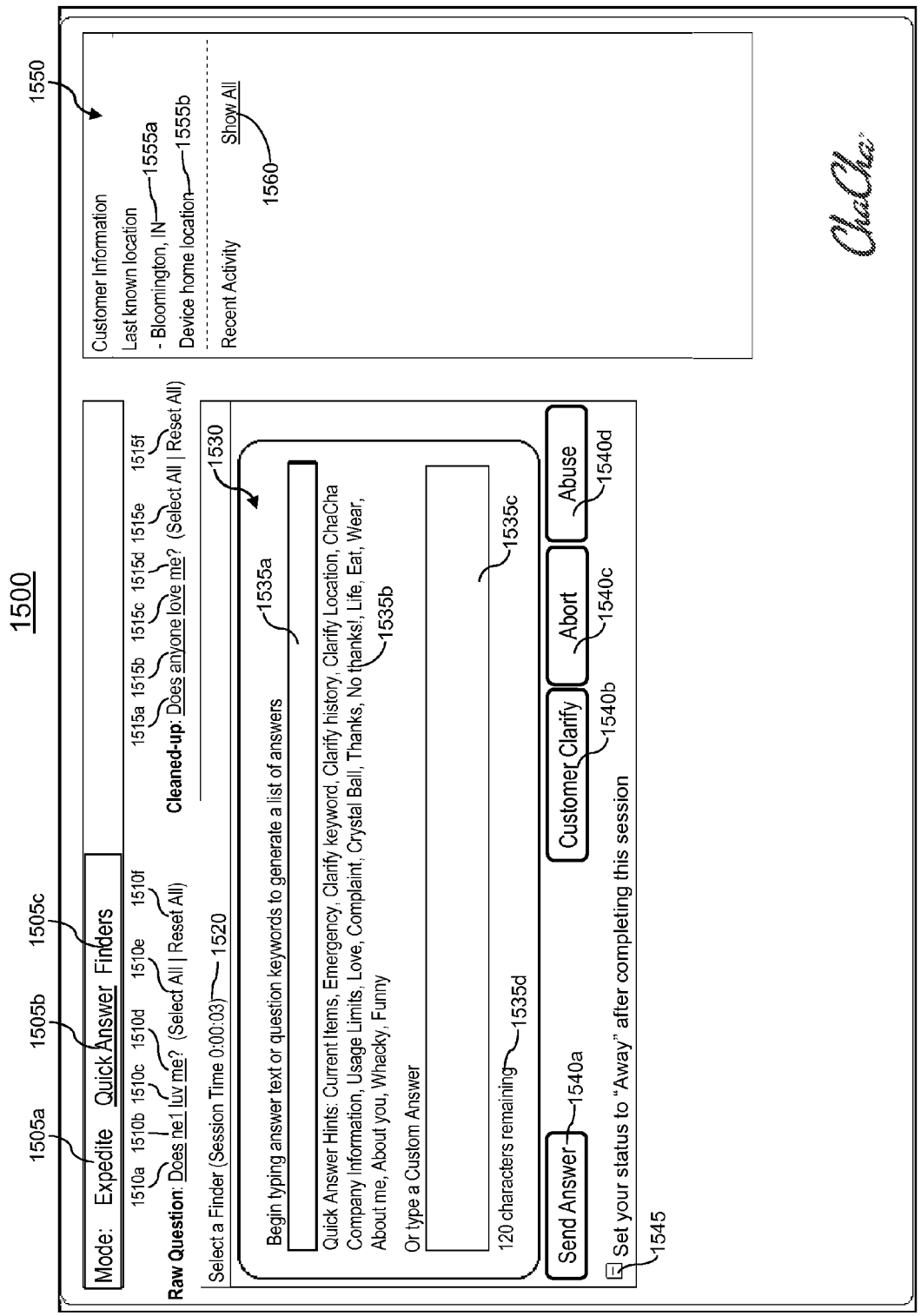
FIG. 15 illustrates a GUI for responding to a conversational query.

A GUI 1500 for responding to a request for generalized information is illustrated in FIG. 15. The GUI 1500 may be provided to a guide if a request is accepted. For example, the GUI 1500 may be provided to an expediter or ambassador in order to process a user request which has been determined to require expediting. The GUI 1500 may include activity indicators 1505, raw query indicators 1510, succinct query indicators 1515, a session time indicator 1520, a parameter window 1530, parameter indicators 1535, action controls 1540, an away control 1545, a user information window 1550, location indicators 1555, and an activity selector 1560.

The activity indicators 1505 may be used to indicate a current activity. For example, the 'Quick Answer' activity indicator 1505b is active as indicated by the underline. Activation of the 'Finders' activity indicator 1505c may cause a GUI such the GUI 1400 (FIG. 14) to be provided. Activation of the 'Quick Answer' activity indicator 1505b may cause a GUI such the GUI 1500 (FIG. 15) to be provided. Activation of the 'Expedite' activity indicator 1505a may cause a GUI such the GUI 1700 (FIG. 17) to be provided.

The raw query indicators 1510 may be used to indicate elements of a raw query. The raw query indicators 1510 may be used to add and remove information from the parameter indicators 1535. For example, the raw query indicator 1510a may transfer the word 'Does' to an active parameter indicator 1535 when activated, or may be used to remove the word 'Does' if it is present in the active parameter indicator 1535. Similarly, the raw query indicators 1510b-1510d may transfer and/or remove a word associated with the respective raw query indicators. The 'Select All' raw query indicator 1510e may be used to transfer all words associated with a raw query to an active parameter indicator 1535. The 'Reset All' raw query indicator 1510f may be used to remove all words associated with a raw query from an active parameter indicator 1535.

The succinct query indicators 1515 may be used to indicate elements of a succinct query. The succinct query indicators may be used to add and remove information from the parameter indicators 1535. For example, the succinct query indicator 1515a may transfer the word 'Does' to an active parameter indicator 1535 when activated, or may be used to remove the word 'Does' if it is present in the active parameter indicator 1535. Similarly, the succinct query indicators 1515b-1515d may transfer and/or remove a word associated with the respective succinct query indicators. The 'Select All' succinct query indicator 1515e may be used to transfer all words associated with a succinct query to an active parameter indicator 1535. The 'Reset All' succinct query indicator 1515f may be used to remove all words associated with a succinct query from an active parameter indicator 1535.

The session time indicator 1520 may be used to indicate time associated with an activity performed using the GUI 1500. The parameter indicators 1535 may be used to indicate information which may be used to provide a response to a request. The parameter indicator 1535a may be used to index various types of available responses. As further described with respect to FIG. 15A, content of the parameter indicator 1535a may cause various types of information to be provided. The 'Quick Answer' parameter indicator 1535b may be used to select responses associated with a particular topic. For example, if a query is of a conversational nature, selection of the 'Crystal Ball' element of the parameter indicator 1535b may cause information of a random group of responses to be provided in the parameter indicator 1535a. The 'Custom Answer' parameter indicator 1535c may be used to provide a response which may be customized by an expediter. An expediter may be permitted to provide and adlib, impromptu, spontaneous or improvisational response or answer using any type of information in the parameter indicator 1535c. Likewise, a response which has been generated from any source may be edited or modified using the parameter indicator 1535c. The parameter indicator 1535d may be used to provide information of formatting of an answer. For example, the parameter indicator 1535d indicates a number of remaining characters in a response to a request.

The 'Send Answer' action button 1540a may be used to indicate that information indicated in the GUI 1500 is to be submitted in order to provide a response to a request. The 'Customer Clarify' action button 1540b may be used to indicate that a request is unclear or ambiguous, which may cause a request for clarification to be provided responsive to a request. The 'Abort' action button 1540c may be used to indicate that a request is to be provided to another guide. The 'Abuse' action button 1540d may be used to indicate that a request is inappropriate. In at least one embodiment, activation of the 'Abuse' button 1540d may cause a warning message to be sent to a user submitting a request. In at least one embodiment, activation of the 'Send Answer' action button 1540a may cause a GUI such as the GUI 1600 (FIG. 16) for confirmation of a result to be provided.

The away control 1545 may be used to indicate that a guide has elected to become inactive after completion of a current task. The customer information window 1550 may be used to provide information associated with a user such as location, preferences, profile information, previous queries, and/or other information which may assist in responding to a request. The last location indicator 1555a may indicate a location most recently associated with a user device. The device home location indicator 1555b may indicate a location associated with a device which is not a current location associated with the device. The 'show all' user information control 1560 may be used to show and/or hide expanded user information such as user history, etc.

Figure 15A:
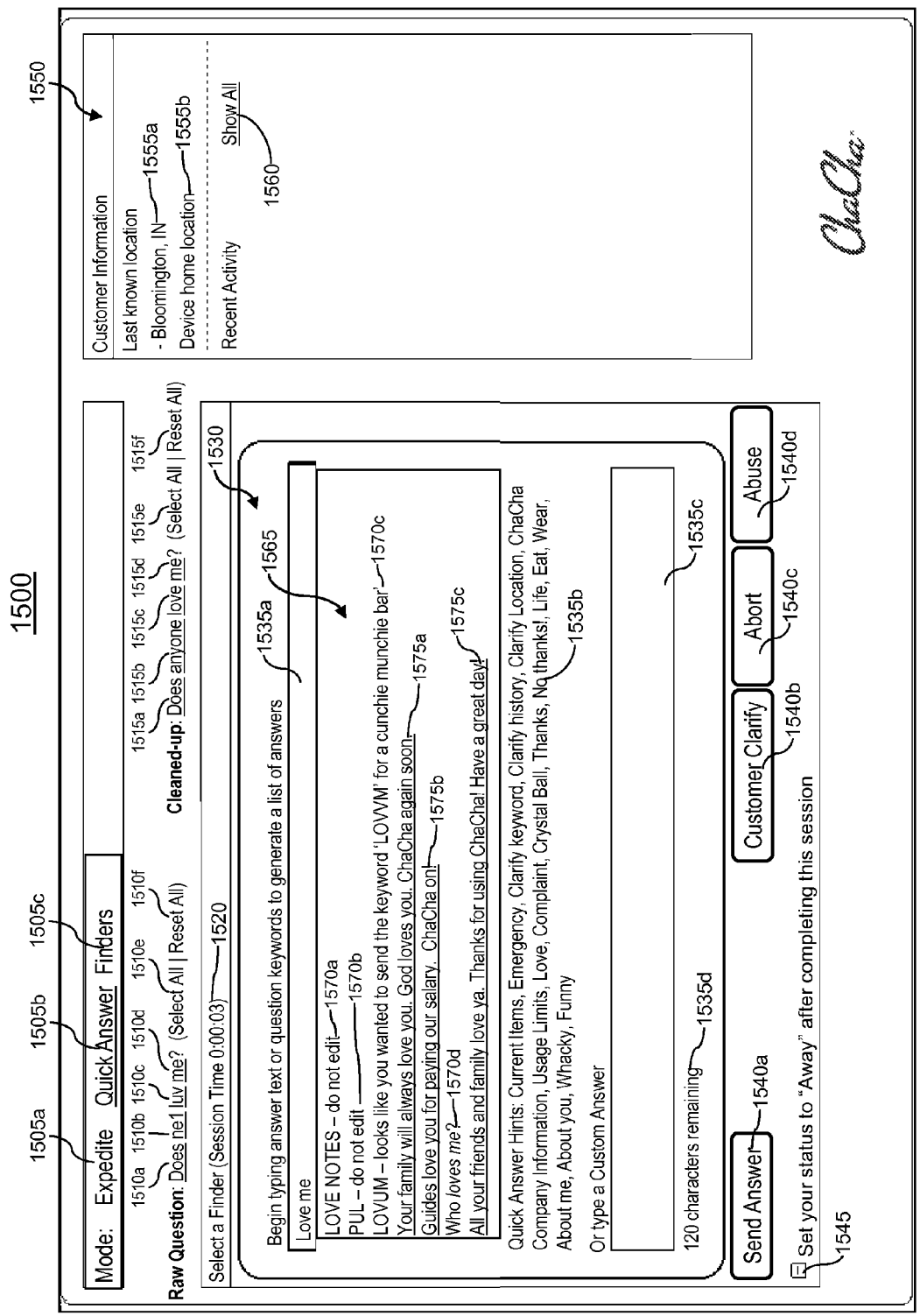
FIG. 15A illustrates a GUI for selecting a conversational response.

Referring to FIG. 15A, if information is indicated in the parameter indicator 1535a, the quick answer selection menu 1565 may be provided. Various types of response options may be provided responsive to the information indicated in the parameter indicator 1535a. The 'LOVE NOTES' response indicator 1570a indicates a random response with a 'Love Note' message which will be delivered without intervention by a guide. The 'PUL' response indicator 1570b indicates a humorous response which may be delivered automatically. The 'LOVUM' response indicator 1570c indicates a response associated with a typographic error for items such as keywords which are associated with automated responses, which may be a fixed response. The 'your family' free form response indicator 1575a may indicate a query and/or associated response. Activation of the response indicator 1575a may cause text associated with the response indicator 1575a to be transferred to the parameter indicator 1535c. Activation of the free form response indicators 1575b, 1575c, may cause the associated text to be transferred to the parameter indicator 1535c. The response indicator 1570d may indicate an alternate succinct query associated with a result. Information in the parameter indicator 1535c may be edited by an expediter prior to activating the 'Send Answer' action button 1540a. In at least one embodiment, queries and answers indexed using information indicated in the parameter indicator 1535a may be edited content which is controlled by an operator of the search system 130 (FIG. 1).

In at least one embodiment, the free form responses may be edited responses which originated from a searcher responsive to a query. For example, a number of guide or user responses to conversational queries may be edited, rated, and/or otherwise selected to be presented to an expediter as a response. In at least one embodiment, information indicated in the parameter indicator 1535a (FIG. 15) may be compared to a database which is indexed and maintained for the purpose of providing a response to a conversational query. For example, keywords, queries, etc., may be compared to a corpus of queries and answers which utilize different parameters based on a functionality selected by an expediter and/or the search system 130 (FIG. 1).

It is important to note that this feature provides a highly advantageous functionality. Because a user query is compared to a database which is relevant to current activities, a query from a user may be managed rather than being compared to a large database of previous queries. For example, if the search system is expecting a keyword response from a user, it might be very difficult for a spelling check to recognize a typographic error in a keyword which is itself a typo. A sponsored response keyword might be 'ROBT' for promotion of a robot movie. However, the user might send 'ROAT' a common telephone keypad error. Machine checking might not easily resolve the intent of a keyword. However, an expediter who sees the query (a single word) and a user history as a movie buff, and is prompted with ROBT as a possible response, may correct the keyword and send the requested offer to the user. Similarly a database of responses to common queries ensures a high quality response to the most common types of queries, avoiding the opportunity for errors by inexperienced or inattentive guides seeking information which is well known.

Figure 16:
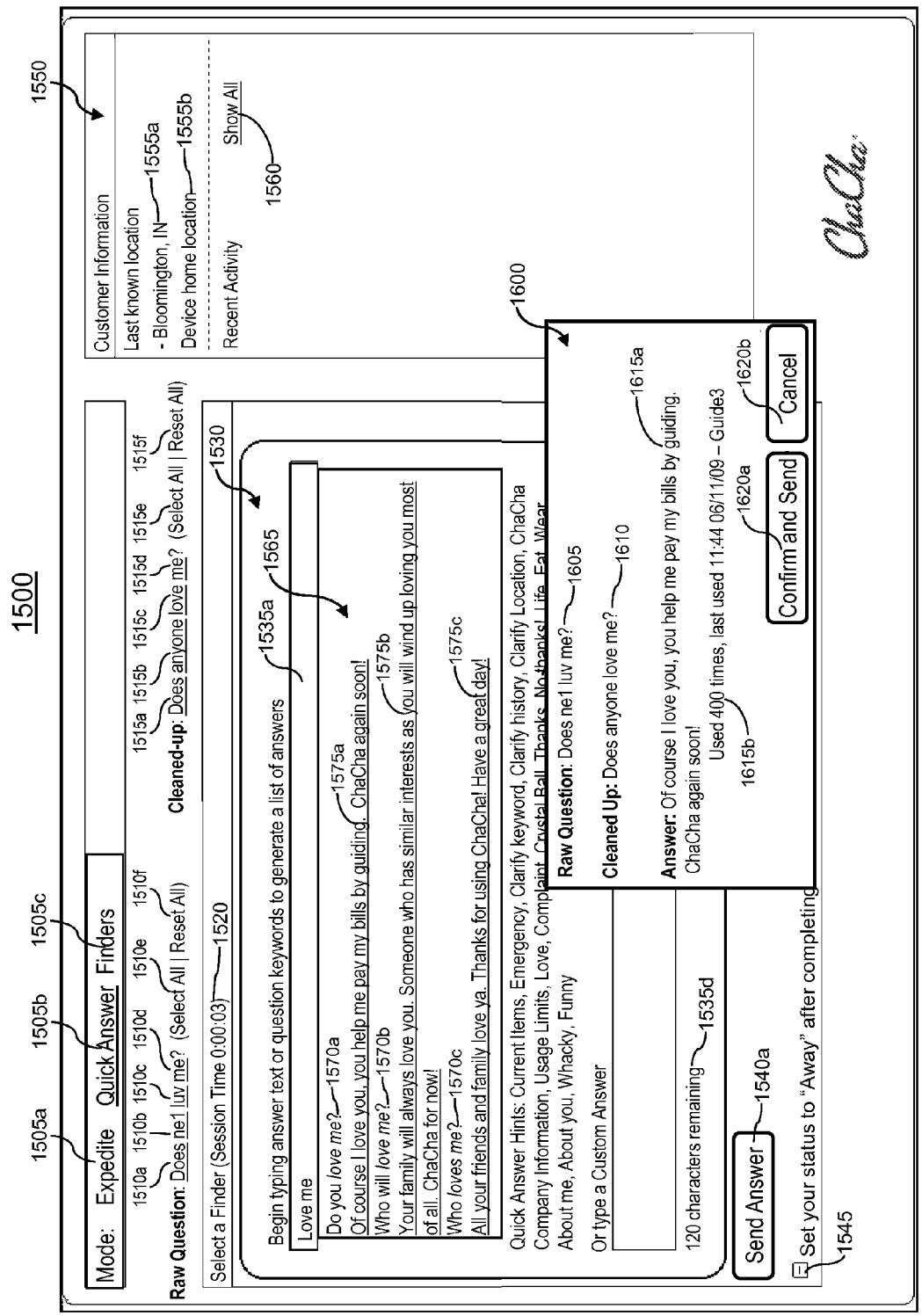
FIG. 16 illustrates a GUI for confirmation of a response.

A GUI 1600 which may be used to confirm a result or response is illustrated in FIG. 16. The GUI 1600 may be provided as a 'pop-up' responsive to activation of the 'Send Answer' action button 1540a (FIG. 15). The GUI 1600 may include a raw query indicator 1605, a succinct query indicator 1610, response indicators 1615, and action buttons 1620.

The raw query indicator 1605 may be used to indicate information of an original query submitted by a user. The succinct query indicator 1610 may be used to indicate information of a succinct query constructed by an expediter. The answer response indicator 1615a may indicate content of a response which is to be provided to a request. The auxiliary response indicator 1615b may include information regarding a response such as date of creation, usage, etc., which may be used to judge relevance of a result. The 'Confirm and Send' action button 1620a may be used to indicate that a result is confirmed. The 'Cancel' action button 1620b may be used to cancel submission of a result and return to a previous GUI. In at least one embodiment, the GUI 1600 includes the action buttons 1620a, 1620b, and any or all other features may be suppressed. The GUI 1600 may serve as a final check by an expediter to avoid accidental selection of a response.

Figure 17:
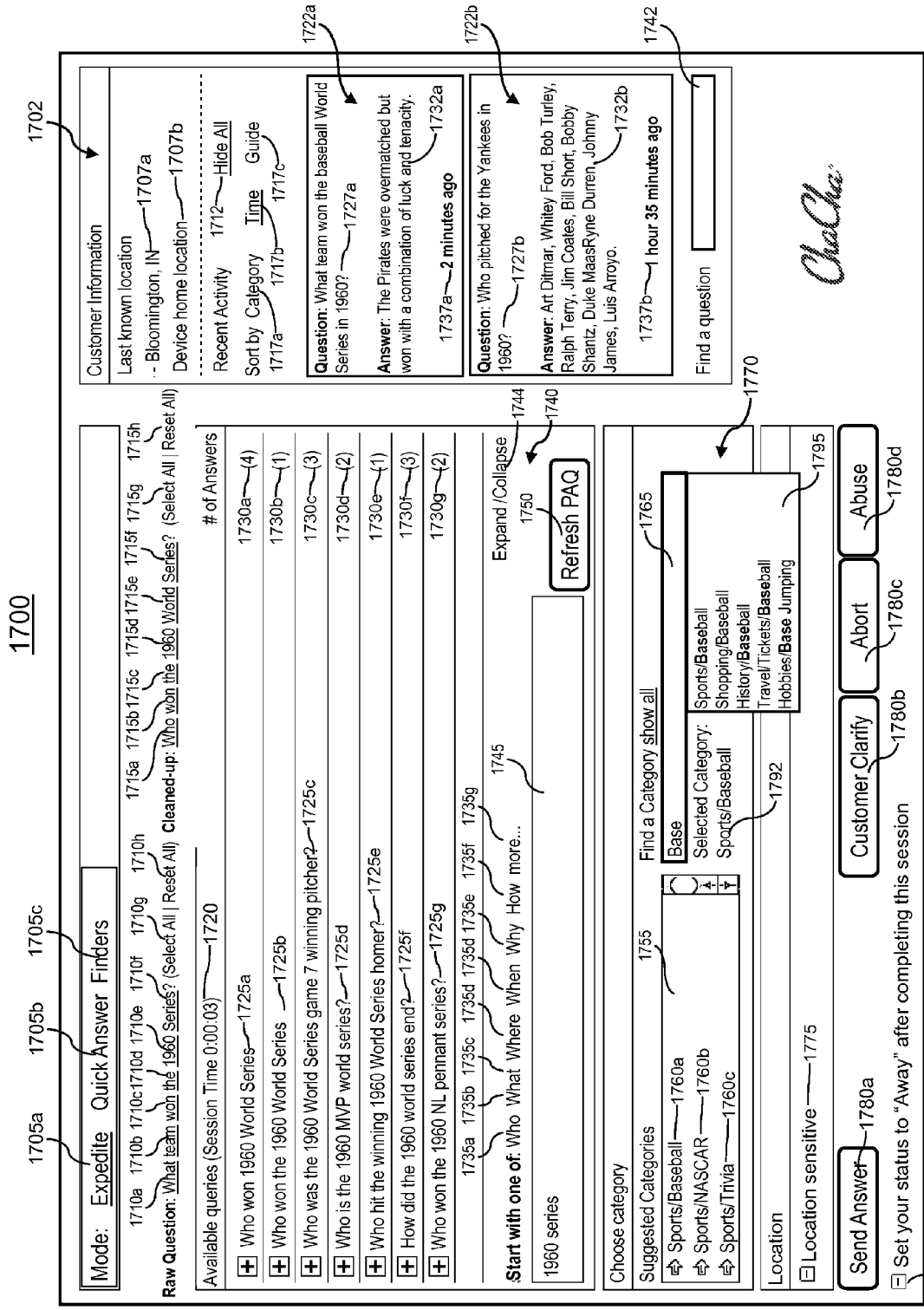
FIG. 17 illustrates a GUI for reviewing historical queries.

A GUI 1700 for responding to a request is illustrated in FIG. 17. The GUI 1700 may be provided to a guide if a request is accepted. For example, the GUI 1700 may be provided to an expediter or ambassador in order to process a user request which has been determined to require expediting. The GUI 1700 may include activity indicators 1705, raw query indicators 1710, succinct query indicators 1715, a session time indicator 1720, previous query indicators 1725, answer count indicators 1730, query initial word indicators 1735, a query formation window 1740, a query box 1745, a refresh control 1750, a categorization window 1770, action buttons 1780, and a user information window 1702.

The activity indicators 1705 may be used to indicate a current activity. For example, the 'Expedite' activity indicator 1705a is active as indicated by the underline. Activation of the 'Finders' activity indicator 1705c may cause a GUI such the GUI 1400 (FIG. 14) to be provided. Activation of the 'Quick Answers' activity indicator 1705b may cause a GUI such the GUI 1500 (FIG. 15A) to be provided. Activation of the 'Expedite' activity indicator 1705a may cause a GUI such the GUI 1700 (FIG. 17) to be provided. The raw query indicators 1710 may be used to indicate elements of a raw query. The raw query indicators 1710 may be use to add and remove information from the query box 1745. For example, the raw query indicator 1710a may transfer the word 'What' to the query box 1745 when activated, or may be used to remove the word 'What' if it is present in the query box 1745. Similarly, the raw query indicators 1710b-1710f may transfer and/or remove a word associated with the respective raw query indicators. The 'Select All' raw query indicator 1710g may be used to transfer all words associated with a raw query to the query box 1745. The 'Reset All' raw query indicator 1710h may be used to remove all words associated with a raw query from the query box 1745.

The succinct query indicators 1715 may be used to indicate elements of a succinct query. The succinct query indicators may be use to add and remove information from the query box 1745. For example, the succinct query indicator 1715a may transfer the word 'Who' to the query box 1745 when activated, or may be used to remove the word 'Who' if it is present in the query box 1745. Similarly, the succinct query indicators 1715b-1715f may transfer and/or remove a word associated with the respective succinct query indicators. The 'Select All' succinct query indicator 1715g may be used to transfer all words associated with a succinct query to the query box 1745. The 'Reset All' succinct query indicator 1715h may be used to remove all words associated with a succinct query from the query box 1745.

The session time indicator 1720 may be used to indicate time associated with an activity performed using the GUI 1700. The previous query indicators 1725 may indicate information of previous queries determined to match a query indicated in the query box 1745. In at least one embodiment, the query indicated in the succinct query indicators 1715 is transferred to the query box 1745 as an initial default state of the GUI 1700 when presented. The answer count indicators 1730 may be used to indicate a number of answers associated with a previous query indicated in the previous query indicators 1725. For example, the answer count indicator 1730a indicates that there are '4' answers associated with the query 'Who won the 1960 World Series?' indicated in the previous query indicator 1725a. Activation of the previous query indicators 1725 may cause details of results associated with the query to be provided as further described with respect to FIG. 18. The query initial word selectors 1735 may be used to select a question word which may be used to start a succinct query. For example, activation of the query initial word selection 1735a may cause the word 'Who' to be transferred to the query box 1745. The query initial word selectors 1735b-1735f may transfer the respective words indicated to the query box 1745. Activation of the query initial word indicator 1735g may cause a menu (not shown) of additional initial query words to be provided. The 'expand/collapse' detail control 1744 may be used to toggle between revealing and hiding information of answers associated with queries indicated in the previous query indicators 1725. The refresh control 1750 may be used to cause content of the query formation window 1740 to be updated based on content of the query box 1745 when activated.

The categorization window 1770 includes controls which may be used to categorize a query. A suggested categories window 1755 includes information of categories which have been determined to match a query. In at least one embodiment, suggested category indicators 1760 are presented in an order based on ranking of the categories based on content of a raw query. The suggested category indicator 1760a indicates the category 'Sports/Baseball'. The suggested category indicator 1760b indicates the category 'Sports/NASCAR'. The suggested category indicator 1760c indicates the category 'Sports/Trivia'. Activation of the suggested category indicators 1760 transfers the category indicated to a selected category indicator 1792. A category search control 1765 may be used to search for a category based on matching of text indicated in the category search control 1765 with text associated with an index. As illustrated, a category selection menu 1795 may be provided as text is entered in the category search control 1765. A location sensitivity indicator 1775 may be used to indicate if a request is sensitive to a location associated with the request. Activation of the location sensitivity indicator 1775 may toggle the status of the location sensitivity indicator 1775. The away control 1790 may be used to indicate that a guide has elected to become inactive after completion of a current task.

The 'Send Answer' action button 1780a may be used to indicate that information indicated in the GUI 1700 is to be submitted in order to provide a response to a request. The 'Customer Clarify' action button 1780b may be used to indicate that a request is unclear or ambiguous, which may cause a request for clarification to be provided responsive to a request. The 'Abort' action button 1780c may be used to indicate that a request is to be provided to another guide. The 'Abuse' action button 1780d may be used to indicate that a request is inappropriate. In at least one embodiment, activation of the 'Abuse' button 1780d may cause a warning message to be sent to a user submitting a request. In at least one embodiment, activation of the 'Send Answer' action button 1780a may cause a GUI such as the GUI 1900 (FIG. 19) for confirmation of a result to be provided.

The user information window 1702 (FIG. 17) may include information associated with a person submitting a request. A location indicator 1707a may indicate a last location associated with a user, and may be used to transfer such information to features of the GUI 1700. A location indicator 1707b may indicate a primary location associated with a user which may be associated with a user device. If a query is determined to be location sensitive, an option to select a location indicated in the location indicators 1707 may be provided.

A 'hide all' control 1712 may toggle between an expanded and a collapsed view of user activities. Sort indicators 1717 may be used to indicate sorting criteria applied to information of previous activities of a user. The 'Category' sort indicator 1717a may cause previous questions to be sorted by category. The 'Time' sort indicator 1717b may cause previous questions to be sorted chronologically. The 'Guide' sort indicator 1717c may cause previous questions to be sorted by a guide associated with an activity. Any number and/or type of sort controls may be provided.

Recent activity indicators 1722 may provide information of previous requests and responses. Previous request indicators 1727 may indicate content of a request. Previous answer indicators 1732 may indicate information of a response provided to a request. Previous request auxiliary information indicators 1737 may indicate time, guide, quality, location, etc., which may be associated with a previous request. A previous request search control 1742 may be used to locate a previous request by a user which matches a query entered in the previous request search control 1742.

Figure 18:
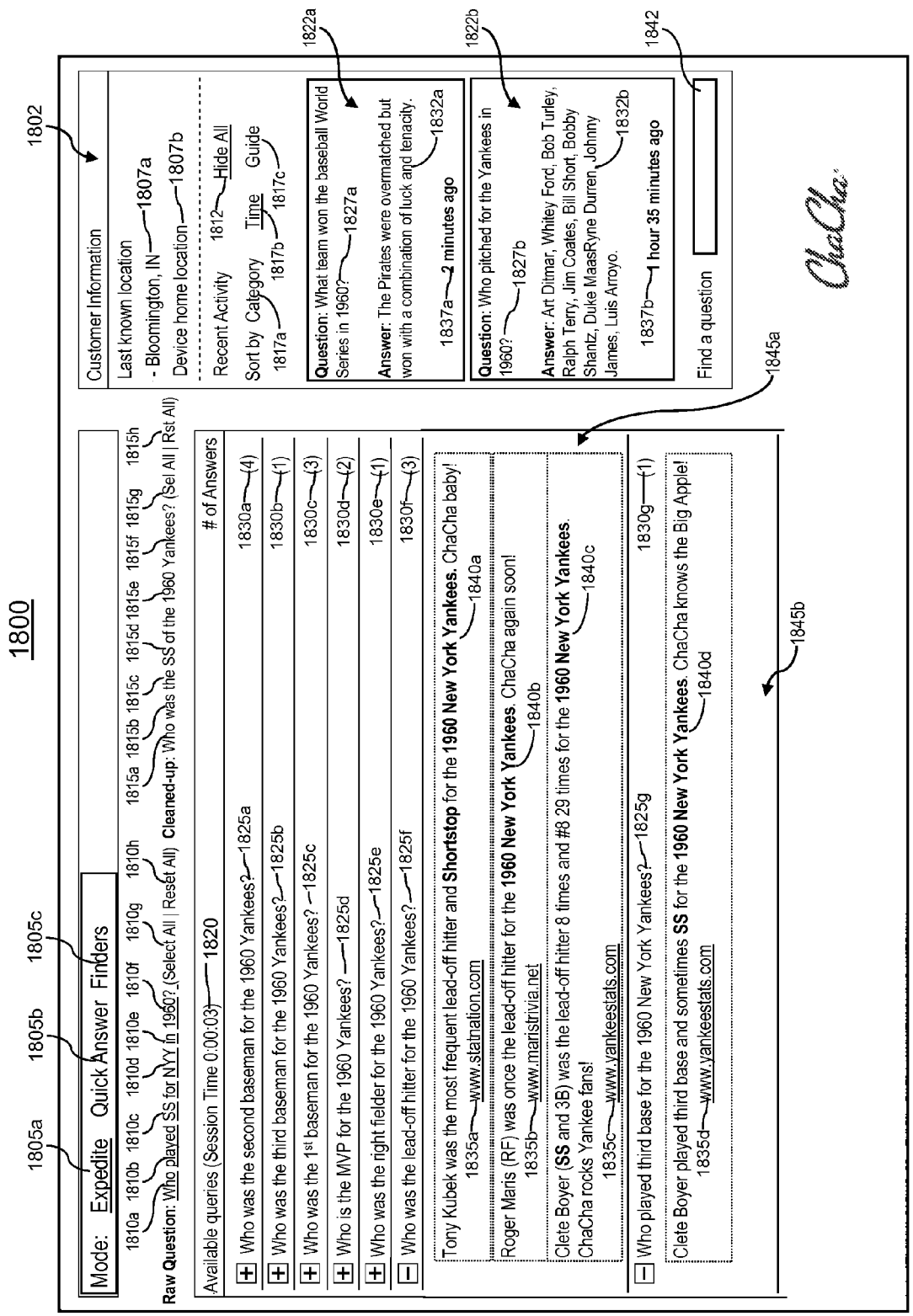
FIG. 18 illustrates a GUI for reviewing historical queries and responses.

A GUI 1800 for responding to a request is illustrated in FIG. 18. The GUI 1800 may be provided to a guide if a request is accepted. For example, the GUI 1800 may be provided to an expediter or ambassador in order to process a user request which has been determined to require expediting. The GUI

1800 may include activity indicators 1805, raw query indicators 1810, succinct query indicators 1815, a session time indicator 1820, query indicators 1825, answer count indicators 1830, resource indicators 1835, answer indicators 1840, result detail windows 1845, and a user information window 1802.

The activity indicators 1805 may be used to indicate a current activity. For example, the 'Expedite' activity indicator 1805*a* is active as indicated by the underline. Activation of the 'Finders' activity indicator 1805*c* may cause a GUI such the GUI 1400 (FIG. 14) to be provided. Activation of the 'Quick Answer' activity indicator 1805*b* may cause a GUI such the GUI 1500 (FIG. 15A) to be provided. Activation of the 'Expedite' activity indicator 1805*a* may cause a GUI such the GUI 1800 (FIG. 18) to be provided.

The raw query indicators 1810 may be used to indicate elements of a raw query. The raw query indicators may be used to add and remove information from the query box 1845. For example the raw query indicator 1810*a* may transfer the word 'Who' to the query box 1845 when activated, or may be used to remove the word 'Who' if it is present in the query box 1845. Similarly, the raw query indicators 1810*b*-1810*f* may transfer and/or remove a word associated with the respective raw query indicators. The 'Select All' raw query indicator 1810*g* may be used to transfer all words associated with a raw query to the query box 1745 (FIG. 17). The 'Reset All' raw query indicator 1810*h* may be used to remove all words associated with a raw query from the query box 1745 (FIG. 17).

The succinct query indicators 1815 may be used to indicate elements of a succinct query. The succinct query indicators may be used to add and remove information from the query box 1845. For example the succinct query indicator 1815*a* may transfer the word 'Who' to the query box 1845 when activated, or may be used to remove the word 'Who' if it is present in the query box 1845. Similarly, the succinct query indicators 1815*b*-1815*f* may transfer and/or remove a word associated with the respective succinct query indicators. The 'Select All' succinct query indicator 1815*g* may be used to transfer all words associated with a succinct query to the query box 1745 (FIG. 17). The 'Reset All' succinct query indicator 1815*h* may be used to remove all words associated with a succinct query from the query box 1745 (FIG. 17).

The session time indicator 1820 may be used to indicate time associated with an activity performed using the GUI 1800. The previous query indicators 1825 may indicate information of previous queries determined to match a query indicated in the query box 1845. In at least one embodiment, the query indicated in the succinct query indicators 1815 is transferred to the query box 1845 as an initial default state of the GUI 1800 when presented. The answer count indicators 1830 may be used to indicate a number of answers associated with a previous query indicated in the previous query indicators 1825. For example, the answer count indicator 1830*a* indicates that there are '4' answers associated with the query 'Who was the second baseman for the 1960 Yankees?' indicated in the previous query indicator 1825*a*. Activation of the previous query indicators 1825 may cause details of results associated with the query to be provided using the result detail windows 1845. Activation of a previous query indicator 1825 may toggle between display and hiding of a result detail window 1845 associated with the previous query indicator 1825. The result detail window 1845*a* includes result resource indicators 1835 and result content indicators 1840 associated with the previous query 'Who was the lead-off hitter for the 1960 Yankees?' indicated in the previous query indicator 1825*f*. The result content indicator 1840*a* indicates the answer 'Tony Kubek was the most frequent lead-off hitter and Shortstop for the 1960 New York Yankees', which may be the top ranked result, was obtained from the resource <'www-.statnation.com'> as indicated in the result resource indicator 1835*a*. Similarly the result content indicators 1840*b* and 1840*c* provide information of alternate responses to the query indicated in the previous query indicator 1825*f*. Elements of an answer which may match a query indicated in the query box 1745 (FIG. 17) may be indicated in a result content indicator 1840 using, for example, bold type as illustrated in the result content indicators 1840*a*-1840*d*. Activation of a result content indicator may cause a result to be selected and may cause a GUI such as the GUI 1600 (FIG. 16) or the GUI 1900 (FIG. 19) to be provided.

Figure 19:
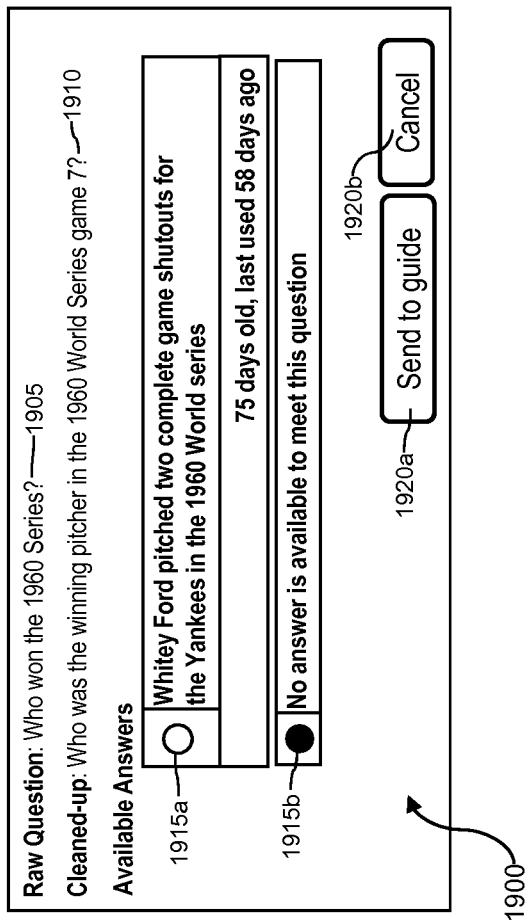
FIG. 19 illustrates a GUI for confirmation of a query by an expediter.

In at least one embodiment, opinion indicators may be provided in the GUI 1700 (FIG. 17), 1800 (FIG. 18), and the GUI 1900 (FIG. 19). An opinion indicator such as a 'radio button' or other controls well known in the art may be provided for expressing an opinion regarding an answer. For example, an expediter may indicate a preference for a particular previous result even if it is not the highest ranking result for a given query. Similarly, an expediter may be able to identify an obviously wrong or outdated answer, which may improve the overall quality of service provided by a search service.

The user information window 1802 may include information associated with a person submitting a request. A location indicator 1807*a* may indicate a last location associated with a user, and may be used to transfer such information to features of the GUI 1800. A location indicator 1807*b* may indicate a primary location associated with a user which may for example be associated with a user device. If a query is determined to be location sensitive, an option to select a location indicated in the location indicators 1807 may be provided.

A 'hide all' control 1812 may toggle between an expanded and a collapsed view of user activities. Sort controls 1817 may be used to indicate sorting criteria applied to information of previous activities of a user. The 'Category' sort indicator 1817*a* may cause previous questions to be sorted by category. The 'Time' sort indicator 1817*b* may cause previous questions to be sorted chronologically. The 'Guide' sort indicator 1817*a* may cause previous questions to be sorted by a guide associated with an activity. Any number and/or type of sort controls may be provided.

Recent activity indicators 1822 may provide information of previous requests and responses. Previous request indicators 1827 may indicate content of a request. Previous answer indicators 1832 may indicate information of a response provided to a request. Previous request auxiliary information indicators 1837 may indicate time, guide, quality, location, etc., which may be associated with a previous request. A previous request search control 1842 may be used to locate a previous request by a user which matches a query entered in the previous request search control 1842.

In an embodiment, a search tool provided to a guide may be selectively adjusted to correspond to information of a request, a user, the guide, etc. For example, a GUI having items that pertain to a specific user submitting a request may be displayed to a guide while another GUI may be displayed to the guide upon receipt of a substantially similar request from another user. A guide may also customize the GUI based on preferences.

A GUI 1900 for confirming a response to a request is illustrated in FIG. 19. The GUI 1900 may include a raw query indicator 1905, a succinct query indicator 1910, answer option indicators 1915, and action buttons 1920.

The raw query indicator 1905 may be used to indicate content of a request. Any type of information may be indicated in the raw query indicator, such as text, audio, images, video, etc., which may be provided to the search system 130 (FIG. 1). The succinct query indicator 1910 may be used to indicate content of a processed query which has been modified to improve indexing of a raw query. The answer option indicators 1915 may be used to indicate information of answer options which may be selected. An answer option indicator 1915 may be provided for any or all answers which may be determined to match a request. For example, if a raw query matches a succinct query which is associated with a number of search results, an answer option indicator 1915 may be provided which corresponds to any or all search results associated with the succinct query. Referring to FIG. 19, the answer option control 1915*a* corresponds to the result 'Whitey Ford pitched two complete game shutouts for the Yankees in the 1960 World series' which is associated with the succinct query 'Who was the winning pitcher in the 1960 World Series game 7?' which has been associated with the raw query ' Who won the 1960 Series?' the answer option control 1915*b* is associated with the option 'No answer is available to meet this question' which may be used to indicate that available results are not suitable for any reason. The answer option control 1915*b* is selected as indicated by the black spot in the 'radio button' control of the answer option control 1915*b*. In at least one embodiment, the answer option controls 1915 are mutually exclusive. Activation of the answer option control 1915*b* may change the information provided in the action button 1920*a*. If an existing answer is selected the action button 1920*a* may indicate that a result is to be provided to a user. This may occur if a result content indicator 1840 (FIG. 18) is activated. If the answer option control 1915*b* is active the action button 1920*a* may indicate that a request is to be directed to a guide who may perform a search responsive to the request. If an expediter indicates that there is not an existing result which may be used to respond to a request associated with a succinct query, a ranking of the succinct query with respect to a raw query may be modified. Similarly, a rating of a search result associated with a succinct query which is determined not to be a suitable response may be reduced. In at least one embodiment, an expediter may indicate that a response is relevant to a query, but is not a suitable response. This indication may cause a searcher receiving the request to be directed to a resource associated with a result identified by an expediter.

In an embodiment, an available answer may be determined to be suitable for a query based on automated comparison of at least one keyword of the query to content of a database of previously answered queries. Such a determination may also be based on a match within a given threshold, for example, a number of keywords of a query matching keywords in a query having a previous answer. According to an embodiment, a guide may review previously generated answers and determine that one or more of the answers to be an available answer for a current request.

A method and system are disclosed to improve the response rate of a user to advertising using a message delivered to the user. If a user submits a query to a search service, the search service may select a message requesting a user response or 'ping' message. A user response to a ping message is used to determine a next action. If a user does not respond to a ping, no further message is provided to the user associated with the ping. If a user responds to a ping, the user is rewarded. A user response to a ping is used to determine a subsequent advertising message which is sent to the user. Pings sent to a user are controlled in order that a user does not receive excessively frequent or irrelevant or 'spam' pings, while maintaining a sufficient level of opportunities to monetize for advertisers, and providing interesting information to a user.

A system is provided whereby a user or information seeker may submit a request for information or search request or query, or "request", to a search system which determines whether a human assistant, or "guide", is required to provide a response to the search request. If a guide is required to respond to a user request, the guide is selected by the search system based on keywords and/or categories associated with the request and the guide. Information resources or search resources or "resources" which may assist a guide in obtaining a search result may be matched to a search request and may be provided to the guide to facilitate a search. A search result, or "result", which may include any type of media, information, software, etc., may be delivered to a user is provided to the user responsive to a search request. A search result may include an advertisement. An advertiser may provide advertising media to a search system and may provide payments to the search system responsive to delivery of advertisements to users.

A database is provided which includes records associated with the various items which may be internal information of the search system, such as keywords, categories, user profiles, etc., and/or external objects or entities such as users, guides, advertisers, resources, and/or systems and/or devices of any type associated with them. Information indicated in the database may be used to track, record, and optimize usage of any of the items reflected in the database. In at least one embodiment, ratings of guides associated with a category may be used to rank the guides to select the highest ranking available guide to respond to a query associated with the category. Likewise, ratings associated with advertisements might be used to select an advertisement to be presented to a user responsive to a query in order to optimize user response rate and revenue for the search system.

A "ping" is a message from a search service which requests a response. A "pong" is a response by a user to a ping. A pong may include any type of information. In at least one embodiment, a pong may include a keyword indicating a selection of a user responsive to a ping.

A ping may be created in various ways. In at least one embodiment, a ping is a message created by a search system which requests an opinion of a user which is not associated with a specific advertiser. For example, a search system may have received multiple requests including a name of a person, place or thing or "named entity". In such an instance a poll question including the named entity may be created and delivered to users with a profile similar to a profile of users associated with queries including the named entity. For example, if a number of queries are received including "Red Sox", a poll question such as "who is the best team Red Sox or Yankees—reply RDSX or YNKS to vote" might be created. If a user replied with a pong to the Red Sox ping, information of responses by users of a search service might be provided to the user. This type of ping may be an information gathering exercise, and may have entertainment value for a user. For example, a user who has submitted a number of requests associated with a category of a ping may be interested to respond to the ping.

In at least one embodiment, a ping may be used to generally target a message. A ping might ask a user for a preference of a type of product, which might be followed by information of preferences expressed by users and an advertisement relevant to an opinion expressed by the user. In at least one embodiment, a ping might be a message such as 'Do you plan to eat at home or go out for dinner this evening? Reply ATHM or GOUT'. If a user pongs 'ATHM' the user might receive an advertisement related to specials at a local grocery or delivery food. If a user pongs 'GOUT' the user might receive an advertisement related to a local restaurant. A user may receive information of opinions and/or other information relating to a pong in addition to advertisements. For example, a number of persons who eat at home on a particular day, facts about nutrition at restaurants, and/or any type of information which might be of interest and/or value to a user might be provided responsive to a pong.

In at least one embodiment, a ping may be used to specifically target a message. A ping might ask a user for an opinion regarding brands of products or services, which may include a selection of a sponsored product. If a user pongs with an opinion which is favorable to a sponsored product, an advertisement for the sponsored product may be provided. For example, a user who submits a request regarding automobile dealers might receive a ping such as: 'Who gives the best deals? Reply JOE for Joe's Cars, BLL for Bill's Cars or MKE for Mike's Cars'. If Bills Car's is the sponsor, a pong of 'JOE' or 'MKE' may receive a response regarding user opinions, while a pong of 'BLL' might receive a response including an advertisement for a current offer from Bill's Cars.

Multiple pings and pongs may be used to target an advertising message. A user may pong responsive to a first ping, which may cause a second ping to be provided, etc. In such an embodiment, an interactive experience may be provided which provides an advertising message based on a combination of pongs responsive to pings. In at least one embodiment, historical information of pings and pongs associated with a user may be used to target advertisements to the user. For example a first ping might ask a user to choose a door based on a label, if the user pongs 'door 1', the user may be given a choice of cars by a second ping. If the user pongs 'car 1', the user may be given a choice of directions by a third ping. If the user pongs 'left', the user might be presented with a choice of food. If the user pongs 'pizza', the user might receive an advertisement associated with a restaurant. Any arbitrary sequence of pings and pongs may be used within the scope and spirit of the embodiments herein.

A system embodiment, methods, data structures and interfaces for operating the embodiments are described below in detail.

A "user" may be any person or entity which may submit a request or search request. A "request", search request, or query is information which may be submitted using any communication service which may be able to access a search system as further described herein below. A user may also be referred to as a requester, or information seeker.

A "guide" may be any person who may be compensated and/or may be a volunteer who may respond to a request. An "expediter" is a guide who may perform processing of a request and/or a search result. A "searcher" is a guide who may perform an information search responsive to a request. A guide may be referred to as a searcher or human assistant or human searcher.

A "raw query" is a request submitted by a user, which may include any type of information provided by a user and/or associated with a user.

A "vetted query" includes a request which is associated with a category, a structured query, or otherwise qualified query.

A "structured query" is a question formulated according to a structured grammar. In at least one embodiment, a grammar construction required for a structured query is a question. A structured query may also be referred to as a "succinct query".

An "identifier" or ID is a group of characters, numbers and/or other types of information which may be used to identify an item. A "guided request" is a request which uses the assistance of one or more guides.

A "result" or "search result" is any information which may be provided responsive to a request. A search result includes but is not limited to any of an advertisement, a link to a web page, a message of any sort, image, audio, text, games, interactive media and/or software of any sort.

A "search resource" or resource is any source of information which may be used to obtain a search result. A search resource includes automated and/or human-assisted systems, and any type of media and/or systems which may provide information. An "advertiser" or sponsor is any person and/or entity which may provide materials for publication for any purpose, which may include promotion of a product and/or service. An advertiser may be compensated and/or may provide compensation for publication of materials. Advertising materials may include any media which may be published.

A "profile" is a group of one or more characteristics which may be associated with a person. Profile characteristics include but are not limited to demographic, geographic, personality, affiliations, areas of interest, historical actions, preferences, memberships, associations, etc.

A "category" or "categorization" is a specification of a node within an index. A category may be an element of any sort of index, which may be hierarchical, flat, or a combination thereof. A categorization may be associated with various items which may be ranked based on association with the category. Likewise, an item associated with a category such as a keyword may be used to associate the category with an item.

The terms voice and speech are used interchangeably herein. A user, a resource, an advertiser and/or a guide may establish a communication session using a voice service, a messaging service such as Short Messaging Service (SMS), Enhanced Messaging Service (EMS), Multi-media Messaging Service (MMS), Instant Messaging (IM), email, an internet portal or web page, regular mail or any other type of communication. A connection or communication session may be established using any device which is capable of utilizing a communication service. For example, a wireless device such as a cell phone, PDA, smart phone, etc., might be used to establish a communication session using voice, SMS, IM, email and/or internet protocols. A desktop, laptop or server system might be used to establish a communication session. A landline phone, a specialized communication terminal, or any other communication device might be used to establish a communication session.

Figure 20:
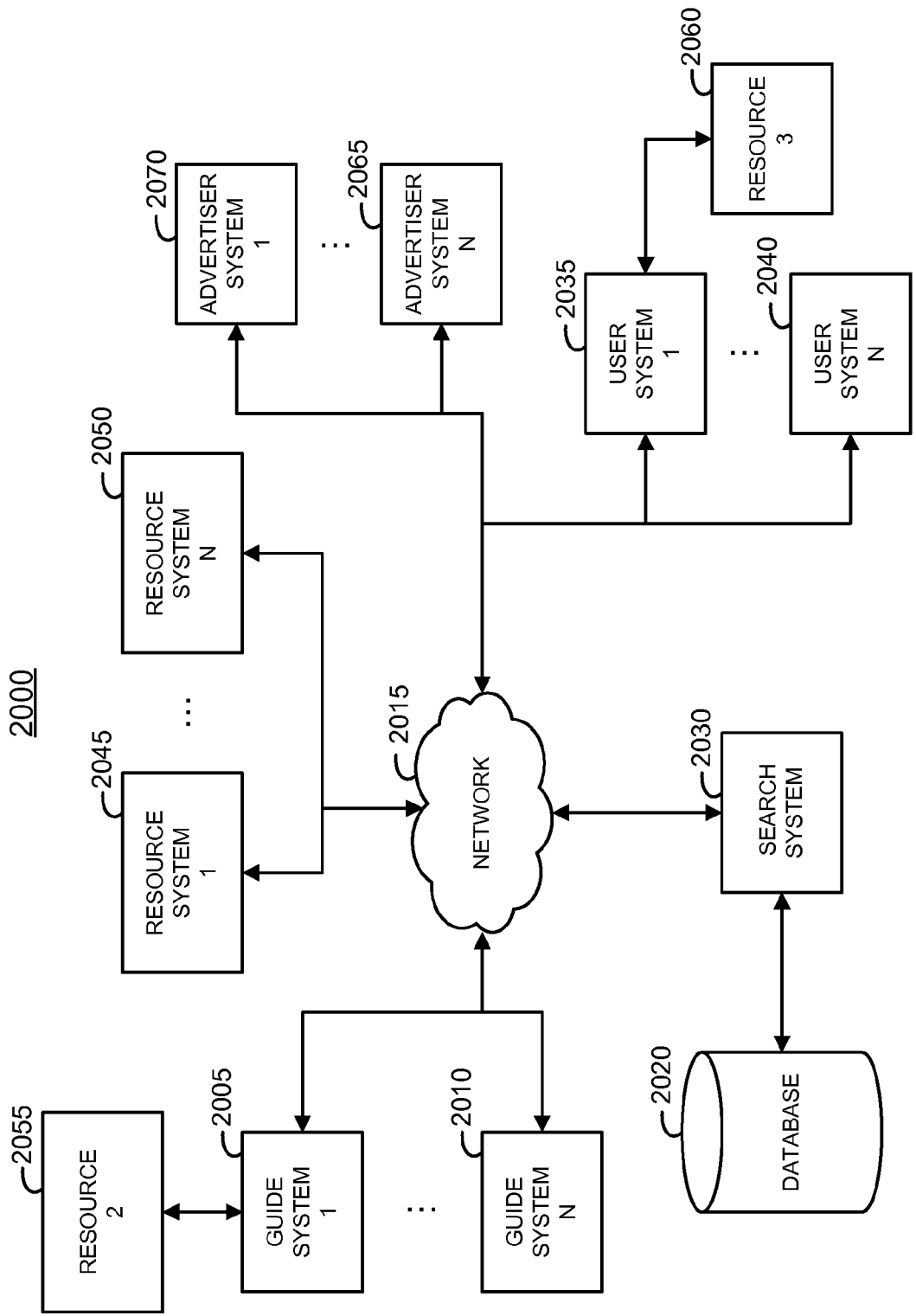
FIG. 20 is a block diagram of an exemplary system embodiment.

Communication between a guide, a user, an advertiser, a resource and/or a search system may include conversion of text to speech and speech to text. Any type of conversion and/or other processing of information which may facilitate communication between a user, a guide, an advertiser, a resource and/or a search system may be performed by an element of the system 2000 (FIG. 20). Any type of media which can be sent and/or received using a communication system may be part of a communication session. A communication session may be conducted using any or all communication service associated with a user, an advertiser, a resource and/or a guide. Any communication session may include communication via multiple service and/or device. For example, a request may be submitted as a voice query which might indicate an image located on a resource accessible to a user and/or a guide. A voice query indicating an image might be converted to a text message, and the image might be processed in order to associate a tag and/or other images with the image. A response to a voice query indicating an image might be provided as a spoken reply to a mobile phone associated with a user, and a video presentation. A search result which is accessible via a high-speed connection might be delivered to a browser functionality of a different user device than the device originating the request.

An advertisement may be transmitted including during any or all communication sessions between a user, a guide and/or a search system. A resource, a guide, a user and/or an advertisement may be rated. Rating information may be obtained from a user, a guide, an advertiser, a resource and/or a search system. Rating information may be used to select a resource, a guide, an advertisement and/or any item based on information associated with an item indicated in a database. A search service may be compensated by advertising revenue. Advertising or content may be delivered to a user, an advertiser and/or guide using any service associated with a user, an advertiser and/or guide.

As illustrated in FIG. 20, system 2000 includes guide systems 2005, 2010, a network 2015 such as the Internet, a search system 2030, user system systems 2035, 2040, a database 2020 which may comprise various records, a guide resource 2055, resource systems 2045, 2050, a user resource 2060, and advertiser systems 2065, 2070.

While only a limited number of systems associated with a guide, resource, user, advertiser, and a search system are depicted in FIG. 20, it is within the scope of the disclosure for multiple systems for guides, resources, users, advertisers and search systems to be utilized.

Any user system (e.g., the user systems 2035, 2040) can be operated by an information seeker, who may be any person, to submit a search request to the search system 2030 and/or receive a search result and/or other information. Any guide system (e.g., the guide systems 2005, 2010) can be operated by a human searcher to obtain a search result responsive to a request which may have been submitted by an information seeker located at a user system (e.g., the user systems 2035, 2040). Any resource system (e.g., the resource systems 2045, 2050) may be operated by a human provider of information and/or may be an automated system which may provide a search result and/or other information to a guide and/or a user, such as a search engine, a database, a local information source of a guide system such as a disk or removable memory, etc. A resource may not be accessible using the network 2015. For example, a resource such as the resource 'Resource 2' 2055 may be accessible to a guide operating a guide system such as the guide system 2005, or a resource such as the resource 2060 'Resource 3' may be accessible to a user operating the user system 2035. A resource might include printed materials, images, video, and/or audio information, a software application, any information accessible to a guide, a user, a database, a system and/or any combination thereof.

The network 2015 may be a global public network of networks (the Internet) and/or may consist in whole or in part of one or more private networks and communicatively couples the guide systems 2005, 2010, the resource systems 2045, 2050, the advertiser systems 2065, 2070 and the user systems 2035, 2040 with the other components of the system such as the search system 2030 and the database 2020.

The search system 2030 allows interaction to occur among the guide systems 2005, 2010, the resource systems 2045, 2050, the advertiser systems 2065, 2070, and the user systems 2035, 2040. For example, an information search query can be transmitted from the user systems 2035, 2040, to the search system 2030, where a search query can be accessed by the guide systems 2005, 2010, and/or the resource systems 2045, 2050. Similarly, a search result or response produced from the resource systems 2045, 2050, using the guide systems 2005, 2010, in response to a search query submitted by the user systems 2035, 2040, may be transmitted to the search system 2030, where it may be stored by the search system 2030 and/or may be transmitted to the user systems 2035, 2040. Any type of communication between a user, a guide, and a resource may be mediated and/or facilitated by the search system 2030 and/or other elements of the system 2000.

The search system 2030 is communicatively coupled with the database 2020. As will be described herein in further detail below, the database 2020 includes data that is processed in association with operation of the embodiments. Although FIG. 20 illustrates the database 2020 as a separate component of the system, the database 2020 may be integrated with the search system 2030. Further, the records maintained in the database 2020 may be stored in any typical manner, including in a Network Attached Storage (NAS), a Storage Area Network (SAN), etc., using any typical or proprietary database software such as DB2®, Informix®, Microsoft® SQLServer™, MySQL®, Oracle®, etc., and may also be a distributed database on more than one server. Elements of the database 2020 may reside in any suitable elements of the system 2000. As such, any or all elements of the system 2000 may include any part of, or all of, the database 2020.

The user systems 2035, 2040, the guide systems 2005, 2010, the search system 2030, the resource systems 2045, 2050, and the advertiser systems 2065, 2070, may include equipment, software, systems and personnel required to send and/or receive messages between a user system, a guide system, an advertiser system, a resource system and/or the search system using the network 2015. The database 2020 includes information which may allow the search system 2030 to establish communication between any or all of the elements of the system 2000.

A user system, a guide system, an advertiser system, a resource system, and/or a resource may be a desktop or portable PC or Mac®, a mobile phone, a smart phone, a PDA, a server system, a landline phone, a specialized communication terminal, a terminal connected to a mainframe, or any other communication device and/or system. The search system 2030 may include one or more servers, computers, etc. For example, servers such as the PowerEdge® 2900 by Dell, or the BladeCenterJS22 by IBM, or equivalent systems might be used to implement elements of the search system 2030. The search system 2030 may utilize an operating system (OS) such as Microsoft Windows XP, or Linux, etc. Voice routing and packet switching may be accomplished using well established technologies such as those provided by Cisco, or other networking companies. After being presented with the disclosure herein, one of ordinary skill in the relevant art will immediately realize that any viable computer systems or communication devices known in the art may be used as user systems, guide systems, advertiser systems, resource systems, resources, voice routing systems, message routing systems, and/or to implement the search system 2030.

A guide may be required to register with the search system 2030. As part of a registration process, at least one communication method is associated with a guide. In at least one embodiment, a guide may register with the search system 2030 and establish a username and password which are associated with the guide. A guide may login to the search system 2030 using a web browser functionality of the guide system 2005, in order to communicate with the search system 2030. Multiple communication services may be associated with a guide and may allow a communication session to be established between a guide system such as the guide system 2005 and a user system, a resource system, an advertiser system, and/or the search system 2030. Multiple identifiers of a guide may be associated with each other. Information such as an IM credential, an email address, a phone number, a URL, a username, etc., of a guide may be identified which may allow the search system 2030 to establish a communication session between a guide system and a user system, a resource system, an advertiser system and/or the search system 2030. Information of a guide may be stored in the database 2020.

When a guide registers with the search system 2030 the guide may be associated with one or more keywords, categories, and/or other information. For example a keyword or category may be selected by a guide, or may be associated with a guide based on a test administered to a guide and/or other information provided during and/or after a registration process. Information associated with a guide may be stored in the database 2020 and may be used for purposes such as matching a guide to a user request, determining and/or providing compensation for a guide, communicating with a guide, etc., as will be described further herein below. A guide may be associated with one or more advertisers. Registration and/or other information of a guide may be provided by an advertiser.

A user may be identified by the search system 2030. When a user system such as the user system 2035 establishes a communication session with the search system 2030, an identifier of a user system is determined. An identifier of a user system may be associated with other information regarding a user. A user system may be identified using an email address, a telephone number, an IM credential, a username, or any other identifier which may be used to associate information with a user. Multiple identifiers of a user may be associated with each other. Using information of communication services associated with a user, a communication session may be established between a user system such as the user system 2035 and a guide system, a resource system, and advertiser system, and/or the search system 2030. Information such as a keyword, a category, a user profile, a previous search request, a search result, etc., may be associated with a user. Information of a user may be stored in the database 2020.

A resource, which may be a person, an entity, a search engine, a database, a software application, a corpus of one or more types of media such as text or printed information, images, audio, video, etc., or a combination thereof, may be identified by the search system 2030. Any source of information may be a resource within the context of the disclosure herein. Information of at least one method of communication is associated with a resource system which allows a communication session to be established between the search system 2030, a user system and/or a guide system and a resource system such as the resource systems 2045, 2050. An identifier of a resource system may be associated with other information regarding a resource. A resource system may be identified using an email address, a telephone number, an IM credential, a resource username, a URL, an IP address, a short code, and/or other persistent identifier which may be used to associate information with a resource. Multiple identifiers of a resource may be associated with each other. Using the information of communication services associated with a resource, a communication session may be established between a resource system such as the resource system 2045 and a user system, a guide system, an advertiser system and/or the search system 2030. Information such as a keyword, a category, a profile, or other information may be associated with a resource. Information of a resource may be stored in the database 2020.

A resource such as the resources 2055, 2060, and/or resources accessible via the resource systems 2045, 2050, may include any system, software, hardware, personnel and/or other facility which may provide information to a guide, a user, and/or the search system 2030. For example, a resource may be a search engine, a database system, a library, a personal hard drive and/or other local storage, printed materials, recordings of any sort, a software program, a person, an organization, etc. A resource may be freely accessible to any user, advertiser, and/or guide and/or may be available on a restricted basis. The resource systems 2045, 2050 may include resources which are available on an unrestricted and/or restricted basis. A resource may not be accessible using the network 2015, but may be accessible to a selected guide. For example, a resource such as the resource 2055 may be accessible to one or more guides operating a guide system, such as the guide system 2005, using any type of communication. For example, a guide may obtain information of an event from the resource 2055 to provide a search result. Information in any form, such as printed media, audio and/or visual information, software, hardware, etc., which may be accessible to a guide, a user and/or an operator of a resource system may be a resource.

An advertiser may be required to register with the search system 2030. As part of a registration process, at least one communication method is associated with an advertiser. In at least one embodiment, an advertiser may register with the search system 2030 and establish a username and password which are associated with the advertiser. An advertiser may login to the search system 2030 using a web browser functionality of the advertiser system 2070, in order to communicate with the search system 2030. Multiple communication services may be associated with an advertiser and may allow a communication session to be established between an advertiser system, such as the advertiser system 2065, and a user system, a guide system, a resource system and/or the search system 2030. Multiple identifiers of an advertiser may be associated with each other. Information such as an IM credential, an email address, a phone number, a URL, a username, etc., of an advertiser may be identified which may allow the search system 2030 to establish a communication session between an advertiser system and a user system, a guide system, a resource system, and/or the search system 2030.

When an advertiser registers with the search system 2030 the advertiser may be associated with one or more keywords, categories, and/or other information. In at least one embodiment, a keyword or category may be selected by an advertiser, or may be associated with an advertiser based on activities of an advertiser and/or persons associated with an advertiser and/or other information provided during and/or after a registration process. Information associated with an advertiser may be stored in the database 2020 and may be used for purposes such as matching an advertiser to a request, a user, a guide, etc., determining and/or providing compensation for an advertiser, communicating with an advertiser, etc., as will be described further herein below. An advertiser may be associated with one or more guides. Registration and/or other information of an advertiser may be provided by a guide and/or other person. An advertiser may provide information of a resource which may be associated with the advertiser, and may provide access and/or other information of a resource.

An advertiser system may provide information of any type of content and/or other information which may be associated with sponsorship information. For example, audio, video, web pages, interactive games, software, etc., which might be sponsored by an advertiser, may be provided by an advertiser system such as the advertiser systems 2065, 2070.

The search system 2030 may establish a communication session between any user system, guide system, advertiser system or resource system using information indicated in the database 2020. For example, the user system 2035 may establish a voice communication session with the search system 2030, the search system 2030 may establish a voice communication session between the user system 2035 and the guide system 2005, and the search system 2030 may establish a voice communication session between the user system 2035 and the resource system 2045. While a voice communication session is used in this example, any type of communication session using one or more services such as SMS, EMS, MMS, email, IM, chat, web based communication, etc., may be established between any user system, guide system, resource system and/or the search system 2030.

Information associated with a user, a guide and/or a resource may be obtained in various ways. For example, a registration process may be performed using a web form provided by the search system 2030, and/or information may be obtained from an external database, and/or information may be obtained based on analysis of information indicated by a user, a guide, an advertiser, and/or a resource. A 'profile' is one or more characteristics which may be associated with one or more individuals. A profile may include geographic data such as a street address, latitude and longitude, etc., may include demographic information such as age, gender, race, income, family size, political affiliations, etc., may include personality information such as results of psychometric testing, subjective evaluations of an individual, etc., may include affiliation information such as employment, club, activity, societal membership information, information of a device, service, transaction and/or any information which might be associated with a user, a guide and/or an advertiser.

As illustrated in FIG. 21, an exemplary request record 2100 is provided, of which one or more may be associated with or resident in the database 2020 (FIG. 20). The request record 2100 (FIG. 21) may include a request ID field 2105, a request content field 2110, a request user ID field 2115, a request guide ID field 2120, a request category ID field 2125, a request profile ID field 2130, a request result ID field 2135, a request result rank field 2140, a request advertisement ID field 2145, a request advertisement rank field 2150, a request ping ID field 2155, and a request ping rank field 2160.

A request record may be created responsive to various activities. For example, a guided search session, an interactive training session, a non-interactive training session, submission of a request by a user, and/or other types of activity may cause a request record to be created and/or modified. A request record may be imported from an external resource, a database, and/or any media accessible to the search system 2030 (FIG. 20).

The request ID field 2105 (FIG. 21) preferably contains a unique identifier of a request, which is preferably used consistently. In at least one embodiment, the request ID field 2105 can include a randomly generated numerical code, and/or a text string indicating the content of a request. A request ID serves to distinguish the request record associated with a request from a request record associated with other requests. Other unique identifiers of a request may be utilized without departing from the spirit and scope of the embodiments. A unique identifier may be assigned to a request when it is received. A request may include information that is not explicitly provided by a user. For example, location information, profile information, etc., may be associated with a request. As illustrated in FIG. 21, 'Request1' is the request ID associated with the request record 2100 (FIG. 21).

The request content field 2110 may include information regarding content of a request. For example, text associated with a query submitted by a user may be indicated in the request content field 2110. Content of the request content field 2110 may be processed in order to associate a keyword and/or category and/or other information with a request. In at least one embodiment, a structured query which conforms to a specific context may be indicated in the request content field 2110. User requests which are associated with a structured query which may have been submitted by a number of users may be indicated in the request content field 2110. Information such as audio recordings, images, etc., which are associated with a request may be indicated in the request content field 2110. Using the example illustrated in FIG. 21, the query 'What is the name of Polly's new song?' is the content associated with the request record 2100. This may indicate that the query 'What is the name of Polly's new song?' may be processed in order to respond to 'Request1'. Information indicated in the request content field 2110 may be used to determine which information associated with an index may be provided responsive to a request. For example, keywords associated with processing of the request 'What is the name of Polly's new song?' may be compared to interests or keywords associated with an index to determine a number of categories associated with the request 'Request1'.

The request user ID field 2115 may include information of a user that submitted a query. The request user ID field 2115 may be used to associate any number of users with a query. In at least one embodiment, each request is uniquely associated with a single user. In at least one embodiment, if a request submitted by a user is equivalent to a previous request, multiple users may be associated with a request. In at least one embodiment, an individual user may submit a request which is associated with a group of one or more users. A result and/or other item associated with a request may be presented responsive to a request in an order based at least in part on a ranking of the item associated with the request. Information indicated in the request user ID field 2115 may be used to obtain information of a user using a record such as the user record 2300 illustrated in FIG. 23. Using the example illustrated in FIG. 21 'User1' is associated with 'Request1'.

The request guide ID field 2120 may include information of a number of guides associated with a request. For example, if a guide obtains a search result responsive to 'Request1', an identifier of the guide may be indicated in the request guide ID field 2120. Likewise, if a guide was selected to respond to a request, an identifier of the guide may be indicated in the request guide ID field 2120. Information indicated in the request guide ID field 2120 may be used to obtain information associated with a guide using a record such as the guide record 2200 illustrated in FIG. 22. A guide may be associated with a request if the guide has reviewed information associated with a request. Using the example illustrated in FIG. 21, the guide ID 'Automatic response' has been associated with 'Request1'. This may indicate that a result associated with a previous request, or a result produced by an automated resource has been provided responsive to 'Request1'.

The request category ID field 2125 may include information of a number of categorizations and/or keywords associated with a request. Content of the request category ID field 2125 may be modified by an automated classification of a request. A human may select a category and/or keyword associated with a request. An item associated with a category may be presented to a guide and/or a user if a request associated with the category is submitted. An item associated with a category and/or other information may be presented for review by a person. Association of a category with a request may be used to select items such as an advertisement, a result, a resource, etc., associated with the category to be provided responsive to the request. Association of a category with a request may be used to select a guide associated with the category to vote regarding an item associated with the request. A category may be associated with a request based on any type of information associated with the request. In at least one embodiment, only one category may be associated with a request. Using the example illustrated in FIG. 21, the category 'Category1' is associated with 'Request1'.

The request profile ID field 2130 may include information of a number of profiles associated with a request. For example, a profile may be associated with a request based at least in part on a profile associated with a user associated with a request. For example, a geographic profile which is common to a number of users associated with a request may be associated with a request, or a guide may determine that a profile is to be associated with a request based on content and/or subject matter of a request associated with a user, etc. A guide selected to respond to a request may be selected based at least in part on a profile associated with the request. A reviewer may be selected to review an item associated with a request based at least in part on a profile associated with a request. In at least one embodiment, a profile may be associated with a request by a guide. Using the example illustrated in FIG. 21, 'Profile1' is associated with 'Request1'.

The request result ID field 2135 may include information of a result which is associated with a request. A search result may be associated with a request if a guide obtains the search result responsive to the request. For example, if a request is submitted to the search system 2030 (FIG. 20), a guide may be selected, and the guide may provide a result responsive to the request. Alternately, a result may be associated with a request if the request is submitted to a resource such as a search engine, database or other resource system. Any number of search results may be associated with a request. In at least one embodiment, a search result may be associated with a request based on a match between a search request and a stored search request associated with the result. Using the example illustrated in FIG. 21, 'Result1.1', 'Result1.3', and 'Result1.4' have been associated with 'Request1'.

The request result rank field 2140 may include information regarding a ranking of a result associated with a request. In at least one embodiment, the request result ID field 2135 and the request result rank field 2140 are linked by, for example, a pointer. Using the example illustrated in FIG. 21, 'Result1.1' has a ranking of '1', 'Result1.3' has a ranking of '3', and 'Result1.4' has a ranking of '4'. Content of the request result ID field 2135 and the request result rank field 2140 may be used at least in part to determine an order in which a search result is presented to a user responsive to a request. Using the example illustrated in FIG. 21, 'Result1.1' might be preferentially presented to a user responsive to 'Request1'. A ranking of a result may be determined based on criteria such as keyword ranking, frequency of use, guide ratings, etc., which may include automated and/or human assisted rating and/or ranking.

The request advertisement ID field 2145 may include information of an advertisement which is associated with a request. For example, an advertisement may be associated with a request when a guide selects the advertisement to be presented to a user responsive to the request. For example, if a request is submitted to the search system 2030 (FIG. 20), a guide may be selected, and the guide may provide an advertisement responsive to the request. Alternately, an advertisement may be associated with a request automatically, when a category, keyword, profile, etc., are associated with the request. Any number of advertisements may be associated with a request. Using the example illustrated in FIG. 21, 'Advert1', 'Advert4', and 'Advert2' have been associated with 'Request1'.

The request advertisement rank field 2150 may include information regarding a ranking of an advertisement associated with a request. In at least one embodiment, the request advertisement ID field 2145 and the request advertisement rank field 2150 are linked by, for example, a pointer. Using the example illustrated in FIG. 21, 'Advert1' has a ranking of '3', 'Advert4' has a ranking of '1', and 'Advert2' has a ranking of '5'. Content of the request advertisement ID field 2145 and the request advertisement rank field 2150 may be used at least in part to determine an order in which an advertisement is presented responsive to a request. Using the example illustrated in FIG. 21, 'Advert4' might be preferentially presented to a user responsive to 'Request1'.

The request ping ID field 2155 may include information of a ping which is associated with a request. In at least one embodiment, a ping may be associated with a request when a guide selects the ping to be presented to a user responsive to the request. For example, if a request is submitted to the search system 2030 (FIG. 20), a guide may be selected, and the guide may provide a ping responsive to the request. Alternately, a ping may be associated with a request automatically when a category, a keyword, profile, location, etc., are associated with the request. Any number of pings may be associated with a request. Using the example illustrated in FIG. 21, 'Ping1', 'Ping2', and 'Ping3' have been associated with 'Request1'.

The request ping rank field 2160 may include information regarding a ranking of a ping associated with a request. In at least one embodiment, the request ping ID field 2155 and the request ping rank field 2160 are linked by, for example, a pointer. Using the example illustrated in FIG. 21, 'Ping1' has a ranking of '1', 'Ping2' has a ranking of '2', and 'Ping3' has a ranking of '5'. Content of the request Ping ID field 2155 and the request Ping rank field 2160 may be used at least in part to determine an order in which a ping is presented responsive to a request. Using the example illustrated in FIG. 21, 'Ping1' might be preferentially presented to a user responsive to 'Request1' based on the request ping rank field 2160.

As illustrated in FIG. 22, an exemplary guide record 2200 is provided, of which one or more may be associated with or resident in the database 2020 (FIG. 20). The guide record 2200 (FIG. 22) may include a guide ID field 2205, a guide category ID field 2210, a guide keyword ID field 2215, a guide profile ID field 2220, a guide result ID field 2225, a guide communication info field 2230, a guide request ID field 2235, and a guide advertiser ID field 2240.

The guide ID field 2205 preferably contains a unique identifier of a guide, which is preferably used consistently. For example, in at least one embodiment, the guide ID field 2205 can include a randomly generated numerical code, and/or a text string indicating a name associated with a guide. A guide ID serves to distinguish the guide record associated with a guide from a guide record associated with other guides. Other unique identifiers of a guide may be utilized without departing from the spirit and scope of the embodiments. Using the example illustrated in FIG. 22, 'Guide1' is the guide ID associated with the guide record 2200.

The guide category ID field 2210 may include information of a number of categories associated with a guide. Content of the guide category ID field 2210 may be modified based on an action of a guide. A category may be associated with a guide based on one or more types of information processing. For example, the category 'translate English to Spanish', or 'transcribe spoken queries' or 'Sports' might be associated with a guide to indicate a skill or expertise associated with the guide. Such an association may be used in part to rate or rank a guide and/or to select a guide. A person may select a category and/or a keyword which is associated with a guide. A category may be associated with a guide based on testing of a guide. A category may be associated with a guide based on an affiliate group associated with the guide. For example, if a guide has chosen to be affiliated with affiliate groups associated with a type of food, a category associated with the type of food might be associated with the guide. A category may signify any type of skill or expertise which may be used to match a guide to a task. A category associated with a guide may be used to select an item which is to be presented to a guide. A guide may be selected to review an item based on the association of a guide with a category. For example, a guide may be selected to review and/or provide information regarding items such as a resource, an advertisement, a search result, etc., based on a category associated with the guide. Using the example illustrated in FIG. 22, 'Category1' and 'Category3' are associated with 'Guide1'.

The guide keyword ID field 2215 may include information of a number of keywords associated with a guide. Content of the guide keyword ID field 2215 may be modified based on an action of a guide. A person may select a keyword which is associated with a guide. For example, a guide may select a keyword to be associated with the guide during a registration process. A keyword may be associated with a guide based on testing of a guide. For example, a guide may be required to demonstrate knowledge of a category and/or keyword in order to be associated with the keyword. Content of the guide keyword ID field 2215 may be compared to content of a request in order to determine a ranking of a guide for responding to a request. For example, if a keyword indicated in the guide keyword ID field 2215 is associated with content of a request, the guide may be more likely to be selected to respond to the request. Using the example illustrated in FIG. 22, the keywords 'reggie miller', 'rap music', and 'fishing' are associated with 'Guide1'. This may indicate that 'Guide1' has indicated an interest in 'reggie miller', 'rap music' and 'fishing'.

The guide profile ID field 2220 may include information of a number of profiles associated with a guide. Content of the guide profile ID field 2220 may be modified based on action of a guide. A person may select a profile which is associated with a guide. For example, a guide may select a profile to be associated with the guide during a registration process. A profile may be associated with a guide based on testing of a guide. For example, a guide may be required to demonstrate knowledge relevant to a profile in order to be associated with the profile, or a guide may take a test which is used to generate a profile, or a guide may provide information such as demographic, geographic, personality or other information which may be indicated in a profile associated with the guide. Information indicated in a guide profile may be obtained from an external database. Information indicated in the content of the guide profile ID field 2220 may be compared to information indicated in the content of a profile associated with a request in order to determine a ranking of a guide for responding to a request. Likewise, a profile associated with a guide may be used to select and/or rank a guide. Using the example illustrated in FIG. 22, 'Demoprofileg1', 'Geoprofileg1' and 'Persprofileg1' are associated with 'Guide1'. This may indicate that 'Guide1' has indicated and/or generated 'Demoprofileg1' which may be a demographic profile, 'Geoprofileg1' which may be a geographic profile and 'Persprofileg1' which might indicate personality information regarding 'Guide1'. Any or all information indicated in a profile associated with a guide may be used to determine a rating and/or ranking of a guide.

The guide result ID field 2225 may include information of a result associated with a guide. Content of the guide result ID field 2225 may be modified based on an action of a guide. If a guide produces a search result responsive to a request, an identifier of the search result may be included in the guide result ID field 2225. A rating and/or ranking associated with a search result associated with a guide may affect compensation for a guide. Likewise a usage indicator associated with a search result provided by a guide may affect a rating and/or ranking associated with a guide. Using the example illustrated in FIG. 22, 'Result1.1', 'Result3.1' and 'Result3.2' are associated with 'Guide1'. This may indicate that 'Guide1' has provided and/or reviewed 'Result1.1', 'Result3.1', and 'Result3.2'.

The guide communication info field 2230 may include information of a device and/or service associated with a guide. Content of the guide communication info field 2230 may be modified based on an action of a guide. If a guide establishes communications using a device and/or service, information regarding the device and/or service may be included in the guide communication info field 2230. Any type of communication service and/or system may be indicated in the guide communication info field 2230. For example, a username and/or password associated with a guide may be indicated in the guide communication info field 2230. Communication services such as IM, e-mail, SMS, MMS, EMS, telephone, wireless or wired communication, etc., may be indicated in the guide communication info field 2230. A telephone number, an email address, an IM provider and login ID, a keyword associated with a service, etc., may be indicated in the guide communication info field 2230. Using the example illustrated in FIG. 22, the login 'guide1', the email 'guide1@chacha.com', the IM credential 'guide1@AIM' and the phone number '317.224.2242' are associated with 'Guide1'. This may indicate that 'Guide1' may be contacted using the login ID 'guide1', via email at 'guide1@chacha.com', via IM as 'guide1@AIM' and/or via voice, text, and/or other service associated with the phone number '317.224.2242'.

The guide request ID field 2235 may include information of a request associated with a guide. Content of the guide request ID field 2235 may be modified based on an action of a guide. If a guide produces a search result responsive to a request, an identifier of the request may be included in the guide request ID field 2235. A rating and/or ranking associated with a request associated with a guide may affect compensation for a guide. Likewise a usage indicator associated with a request and a guide may affect a rating and/or ranking associated with the guide. A request may be associated with a guide based on a vote cast by a guide regarding items associated with the request. Using the example illustrated in FIG. 22, 'Request1' and 'Request3' are associated with 'Guide1'. This may indicate that 'Guide1' has responded to, been selected to respond to, and/or has reviewed one or more items associated with 'Request1' and 'Request3'.

The guide advertiser ID field 2240 may include information of an advertiser associated with a guide. Content of the guide advertiser ID field 2240 may be modified based on an action of a guide. If a guide selects an advertisement responsive to a request, an identifier of an advertiser associated with the advertisement may be included in the guide advertiser ID field 2240. An advertiser may provide registration information of a guide, which may cause the advertiser to be indicated in the guide advertiser ID field 2240. An advertiser may select a guide to be associated with the advertiser, and/or a guide may elect to be associated with an advertiser, which may affect content of the guide advertiser ID field 2240. Using the example illustrated in FIG. 22, 'Advertiser1' and 'Advertiser3' are associated with 'Guide1'. This may indicate that 'Guide1' has selected an advertisement associated with, been selected by, and/or has selected to be associated with 'Advertiser1' and 'Advertiser3'. In at least one embodiment, association with an advertiser may permit a guide to access a resource associated with the advertiser.

As illustrated in FIG. 23, an exemplary a user record 2300 is provided, of which one or more may be associated with or resident in the database 2020 (FIG. 20). The user record 2300 (FIG. 23) may include a user ID field 2305, a user profile ID field 2310, a user request ID field 2315, a user result ID field 2320, a user advertisement ID field 2325, a user communication info field 2330, a user ping ID field 2335, and a user pong ID field 2340.

The user ID field 2305 preferably contains a unique identifier of a user, which is preferably used consistently. For example, in at least one embodiment, the user ID field 2305 can include a randomly generated numerical code, and/or a text string indicating a name associated with a user. A user ID serves to distinguish a user record associated with a user from a user record associated with other users. Other unique identifiers of a user may be utilized without departing from the spirit and scope of the embodiments. In at least one embodiment, a user ID may include a phone number associated with a user. Using the example illustrated in FIG. 23, 'User1' is the user ID associated with the user record 2300.

The user profile ID field 2310 may include information of a profile associated with a user. Content of the user profile ID field 2310 may be modified based on an action of a user. A person may select a profile which is associated with a user. For example, a user may select a profile to be associated with the user during a registration process. A profile may be associated with a user based on testing of a user and/or information from users. For example, a user may be required to demonstrate knowledge relevant to a profile in order to be associated with the profile, or a user may take a test which is used to generate a profile, or a user may provide information such as demographic, geographic, personality or other information which may be indicated in a profile associated with the user. Historical information such as a request and/or result associated with a user may be used to determine profile information. Information indicated in a user profile may be obtained from an external database. A profile associated with a user may be used to select and/or rank a user for voting. A profile of a user may be modified based on responses of a user to pings. For example, a user might be offered pings targeted to a particular demographic such as age, gender, etc., and if the user responds, or fails to respond, characteristics of a profile may be assigned and/or modified based on the pongs of a user. Using the example illustrated in FIG. 23, 'DemoprofileU1', 'GeoprofileU1' and 'PersprofileU1' are associated with the user 'User1'. This may indicate that 'User1' has indicated and/or generated 'DemoprofileU1' which may be a demographic profile, 'GeoprofileU1' which may be a geographic profile and 'PersprofileU1' which might indicate personality information regarding 'User1'.

The user request ID field 2315 may include information of a request associated with a user. Content of the user request ID field 2315 may be modified based on an action of a user. If a user submits a request an identifier of the request may be included in the user request ID field 2315. Using the example illustrated in FIG. 23, 'Request1' and 'Request2' are associated with 'User1' which may indicate that 'User1' has submitted 'Request1' and 'Request2'.

The user result ID field 2320 may include information of a result associated with a user. Content of the user result ID field 2320 may be modified based on an action of a user and/or a guide. If a user receives a result responsive to a request, an identifier of the result may be included in the user result ID field 2320. A usage indicator associated with a result provided to a user may affect a rating and/or ranking associated with a guide. Using the example illustrated in FIG. 23, 'Result1.1', 'Result1.2' and 'Result2.1' are associated with the user 'User1'. This may indicate that 'User1' has been presented with the results 'Result1.1', 'Result1.2', and 'Result2.1'.

The user advertisement ID field 2325 may include information of an advertisement associated with a user. Content of the user advertisement ID field 2325 may be modified based on an action of a user. If a user receives an advertisement, an identifier of the advertisement may be included in the user advertisement ID field 2325. A usage indicator associated with an advertisement provided to a user may affect a rating and/or ranking associated with a guide, compensation for the search system, and/or rating and/or ranking of an advertisement. Using the example illustrated in FIG. 23, 'Advert1', 'Advert2', 'Advert4' and 'Advert8' are associated with 'User1'. This may indicate that 'User1' has been presented with 'Advert1', 'Advert2', 'Advert4' and 'Advert8'.

The user communication info field 2330 may include information of a device and/or service associated with a user. Content of the user communication info field 2330 may be modified based on an action of a user. If a user establishes communications using a device and/or service, information regarding the device and/or service may be included in the user communication info field 2330. Any type of communication service and/or system may be indicated in the user communication info field 2330. For example, a username and/or password associated with a user may be indicated in the user communication info field 2330. Communication services such as IM, e-mail, SMS, MMS, EMS, telephone, wireless or wired communication, etc., may be indicated in the user communication info field 2330. A telephone number, an email address, an IM provider and login ID, a keyword associated with a service, etc., may be indicated in the user communication info field 2330. Using the example illustrated in FIG. 23, the login 'user1', the email 'user1@chacha.com', the Twitter™ service account 'twitter:user1' and the phone number '317.924.2242' are associated with 'User1'. This may indicate that 'User1' may be contacted using the login ID 'user1', via email at 'user1@chacha.com', via Twitter as 'user1' and/or via voice, text, and/or other service associated with the phone number '317.924.2242'.

The user ping ID field 2335 may include information of a ping associated with a user. Content of the user ping ID field 2335 may be modified based on an action of a user. If a user receives a ping, an identifier of the ping may be included in the user ping ID field 2335. A usage indicator associated with a ping provided to a user may affect a rating and/or ranking associated with a guide and/or a user, compensation for the search system 2030 (FIG. 20), and/or rating and/or ranking of a ping. In at least one embodiment, if a pong associated with a ping is associated with a user, the ping may be inactivated. Using the example illustrated in FIG. 23, 'Ping1', 'Ping5', and 'Ping8' are associated with 'User1'. This may indicate that 'User1' has been presented with 'Ping1', 'Ping5', and 'Ping8'.

The user pong ID field 2340 may include information of a pong associated with a user. Content of the user pong ID field 2340 may be modified based on an action of a user. If a user receives a pong, an identifier of the pong may be included in the user pong ID field 2340. A usage indicator associated with a pong provided to a user may affect a rating and/or ranking associated with a guide and/or a user, compensation for the search system 2030 (FIG. 20), and/or rating and/or ranking of a pong. For example, a pong may represent a response to a poll question, and/or other messages associated with a ping. Using the example illustrated in FIG. 23, 'Pong1.1' and 'Pong5.1' are associated with 'User1'. This may indicate that 'User1' has responded to 'Ping1' with 'Pong1.1', and to 'Ping5' with 'Pong5.1', but has not responded to 'Ping8'.

Figure 24:
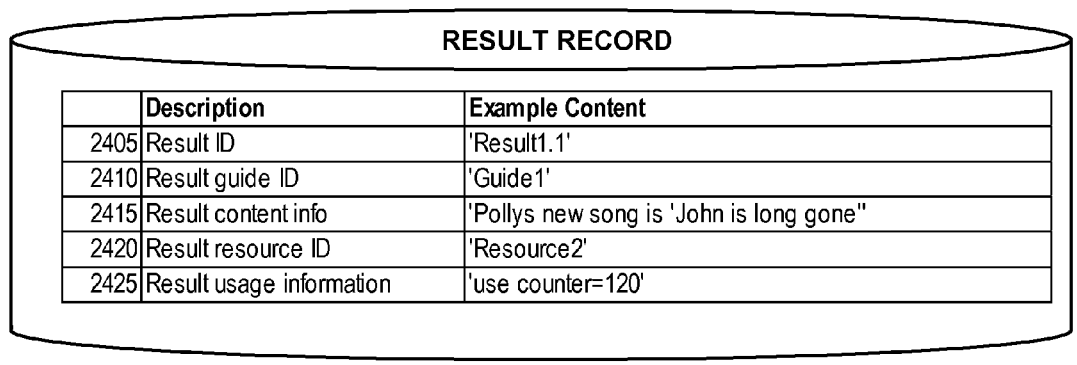
FIG. 24 illustrates a database for a result.

As illustrated in FIG. 24, an exemplary result record 2400 is provided, of which one or more may be associated with or resident in the database 2020 (FIG. 20). The result record 2400 (FIG. 24) may include a result ID field 2405, a result guide ID field 2410, a result content info field 2415, a result resource ID field 2420 and a result usage information field 2425.

The result ID field 2405 preferably contains a unique identifier of a result, which is preferably used consistently. For example, in at least one embodiment, the result ID field 2405 can include a randomly generated numerical code, and/or a text string indicating a name associated with a result. A result ID serves to distinguish the result record associated with a result from a result record associated with other results. Other unique identifiers of a result may be utilized without departing from the spirit and scope of the embodiments. In at least one embodiment, a result ID may include a description associated with a result. Using the example illustrated in FIG. 24, 'Result1.1' is the result ID associated with the result record 2400.

The result guide ID field 2410 may include information of a guide associated with a result. For example, a guide who obtained a search result may be indicated in the result guide ID field 2410. In at least one embodiment a guide ID associated with a guide who has voted on a result may be indicated in the result guide ID field 2410. Information contained in the result guide ID field 2410 may be used to obtain information regarding a guide associated with a search result based on records such as the guide record 2200 (FIG. 22). Using the example illustrated in FIG. 24, 'Guide1' is associated with 'Result1.1', which may indicate that 'Guide1' has provided 'Result1.1'.

The result content info field 2415 may include information of content of a search result. For example, a text snippet associated with a search result may be indicated in the result content info field 2415. A URL and/or other information associated with a search result may be indicated in the result content info field 2415. Information contained in the result content info field 2415 may be used to provide a search result to a user and/or a guide. Any type of information which may be used to provide a result may be indicated in the result content info field 2415. Using the example illustrated in FIG. 24, the text snippet 'Pollys new song is 'John is long gone'' is associated with 'Result1.1'. This may indicate that the text snippet 'Pollys new song is 'John is long gone'' may be provided to a user if 'Result1.1' is selected to be presented to a user.

The result resource ID field 2420 may include information of a resource associated with a result. For example, a URL associated with a web page from which a text snippet was obtained may be indicated in the result resource ID field 2420. A URL and/or other information such as a search query and/or a macro instruction associated with a search resource may be indicated in the result resource ID field 2420. Information contained in the result resource ID field 2420 may be used to provide access to a search resource for a guide and/or the search system 2030 (FIG. 20). Using the example illustrated in FIG. 24, 'Resource2' is the resource ID associated with 'Result1.1'. This may indicate that 'Resource2' was used to obtain 'Result1.1'.

The result usage information field 2425 may include information regarding use of a search result. In at least one embodiment, a number of times that a search result has been presented to a user may be indicated in the result usage information field 2425. Using the example illustrated in FIG. 24, the indicator 'use counter=120' is associated with 'Result1.1'. This may indicate that 'Result1.1' has been presented to a user one hundred and twenty times. Information in the result usage information field 2425 may be utilized to determine whether a search result is to be reviewed, may be used to determine compensation, etc. The result usage information field 2425 may include information regarding whether a result has been associated with a sponsor or advertiser and/or provided based on sponsorship. For example, if a result has been obtained using a resource provided by an advertiser, a guide and/or the search system 2030 (FIG. 20) may be compensated by the advertiser based on information indicated in the result usage information field 2425 (FIG. 24). For example if 'Resource2' included listings by restaurants which were provided by a listing service, the listing service might compensate a guide and/or a provider of the search system 2030 (FIG. 20) based on delivery of a listing to a user.

Figure 25:
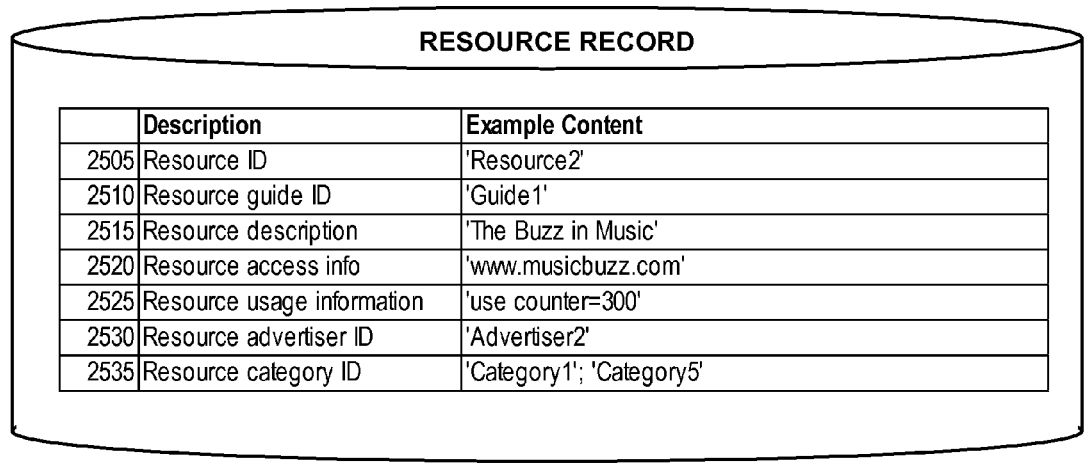
FIG. 25 illustrates a database for a resource.

As illustrated in FIG. 25, an exemplary resource record 2500 is provided, of which one or more may be associated with or resident in the database 2020 (FIG. 20). The resource record 2500 may include a resource ID field 2505, a resource guide ID field 2510, a resource description field 2515, a resource access info field 2520, a resource usage information field 2525, a resource advertiser ID field 2530 and a resource category ID field 2535.

The resource ID field 2505 preferably contains a unique identifier of a resource, which is preferably used consistently. For example, in at least one embodiment, the resource ID field 2505 can include a randomly generated numerical code, and/or a string indicating a name associated with a resource. A resource ID serves to distinguish the resource record associated with a resource from a resource record associated with other resources. Other unique identifiers of a resource may be utilized without departing from the spirit and scope of the embodiments. In at least one embodiment, a resource ID may include a description associated with a resource. Using the example illustrated in FIG. 25, 'Resource2' is the resource ID associated with the resource record 2500.

The resource guide ID field 2510 may include information of a guide associated with a resource. For example, a guide who utilized a search resource may be indicated in the resource guide ID field 2510. In at least one embodiment, a guide ID associated with a guide who has voted on a resource may be indicated in the resource guide ID field 2510. Information contained in the resource guide ID field 2510 may be used to obtain information regarding a guide associated with a search resource based on records such as the guide record 2200 (FIG. 22). Any number of guides may be associated with a resource. Using the example illustrated in FIG. 25, 'Guide1' is associated with the resource 'Resource2', which may indicate that 'Guide1' has access to the resource 'Resource2'.

The resource description field 2515 may include information of a description of a search resource. For example, a text snippet associated with a search resource may be indicated in the resource description field 2515. A URL and/or other information associated with a search resource may be indicated in the resource description field 2515. Information contained in the resource description field 2515 may be used to provide a description of search resource to a user and/or a guide. Using the example illustrated in FIG. 25, the text snippet 'The Buzz in Music' is associated with the resource 'Resource2'.

The resource access info field 2520 may include access information associated with a resource. For example, a URL associated with a web page may be indicated in the resource access info field 2520. A password, a login ID, a template for submitting a search query, an API for submitting and/or receiving information and/or any other information which may be utilized to access a resource may be indicated in the resource access info field 2520. Information contained in the resource access info field 2520 may be used to provide access to a resource for a guide, a user and/or the search system 2030 (FIG. 20). Using the example illustrated in FIG. 25, the URL <'www.musicbuzz.com'> is the access information associated with the resource 'Resource2'. This may indicate that a result associated with 'Resource2' may be obtained using the resources found at <'www.musicbuzz.com'>.

The resource usage information field 2525 may include information regarding use of a resource. For example, a number of times that a search resource has been utilized by a guide, an automated search, an API, etc., may be indicated in the resource usage information field 2525. Using the example illustrated in FIG. 25, the indicator 'use counter=300' is associated with 'Resource2'. This may indicate that 'Resource2' has been utilized three hundred times. Information in the resource usage information field 2525 may be utilized to determine whether a search resource is to be reviewed, a ranking and/or rating associated with a resource, compensation associated with the resource, etc. For example, a provider of a resource may be compensated by a publisher based on usage, or a guide may be compensated based on usage, or a search service may be compensated based on usage.

The resource advertiser ID field 2530 may include information regarding an advertiser associated with a resource. For example, an advertiser who may provide a resource and/or may designate a resource for use for any purpose may be indicated in the resource advertiser ID field 2530. Using the example illustrated in FIG. 25, 'Advertiser2' is associated with 'Resource2'. This may indicate that 'Resource2' has been designated as a resource which may be utilized by a guide and/or the search system 2030 (FIG. 20) to obtain a search result associated with 'Advertiser2'. Information in the resource advertiser ID field 2530 (FIG. 25) may be utilized at least in part to determine whether a search resource is to be provided to a guide and/or a ranking and/or rating associated with a resource, etc. For example if a sponsored result is to be obtained for a request, resources associated with the sponsor 'Advertiser2' may be ranked higher than resources which are not associated with a sponsor.

The resource category ID field 2535 may include information regarding a category associated with a resource. For example, a category which may be used to rank a resource may be indicated in the resource category ID field 2535. Using the example illustrated in FIG. 25, 'Category1' and 'Category5' are associated with 'Resource2'. This may indicate that 'Resource2' has been designated as a resource which may be utilized by a guide and/or the search system 2030 (FIG. 20) to obtain a search result associated with 'Category1' and 'Category5'. Information in the resource category ID field 2535 may be utilized at least in part to determine whether a search resource is to be provided to a guide and/or a ranking and/or rating associated with a resource, etc. For example, if a category is associated with a request, a resource may be presented to a guide responding to the request in an order based on a ranking of a resource associated with the category.

As illustrated in FIG. 26, an exemplary profile record 2600 is provided, of which one or more may be associated with or resident in the database 2020 (FIG. 20). The profile record 2600 (FIG. 26) may include a profile ID field 2605, a profile geographic info field 2610, a profile demographic info field 2615, a profile personality info field 2620, a profile resource ID field 2625, and a profile resource rating field 2630.

The profile ID field 2605 preferably contains a unique identifier of a profile, which is preferably used consistently. For example, in at least one embodiment, the profile ID field 2605 can include a randomly generated numerical code, and/or a text string indicating a name associated with a profile. A profile ID serves to distinguish a profile record associated with a profile from a profile record associated with other profiles. Other unique identifiers of a profile may be utilized without departing from the spirit and scope of the embodiments. In at least one embodiment, a profile ID may include a description associated with a profile. Using the example illustrated in FIG. 26, 'Profile1' is the profile ID associated with the profile record 2600.

The profile geographic info field 2610 may include geographic information associated with a profile. Any type of geographic information may be indicated in the profile geographic info field 2610. For example, GPS coordinates, a street address, a neighborhood name, a postal code, a city name, a state name, etc., could be indicated in the profile geographic info field 2610. Using the example illustrated in FIG. 26, the geographic information 'Indiana' is associated with 'Profile1'. This may indicate for example that a person with a home address in and/or other profile information associated with geographic information of the state of 'Indiana' may match 'Profile1', or may receive a higher rating and/or ranking associated with 'Profile1'.

The profile demographic info field 2615 may include demographic information associated with a profile. Any type of demographic information may be indicated in the profile demographic info field 2615. For example, date of birth, sex, race, political affiliation, income, number of children, marital status, membership in organizations, etc., could be indicated in the profile demographic info field 2615. Using the example illustrated in FIG. 26, the demographic information 'under30' AND 'over20' is associated with 'Profile1'. This may indicate that a person aged greater than 20 years and less than 30 years may receive a higher rating and/or ranking associated with 'Profile1'.

The profile personality info field 2620 may include personality information associated with a profile. Any type of personality information may be indicated in the profile personality info field 2620. For example, information of personality traits such as aggressiveness, curiosity, friendliness, intelligence, honesty, food preference, music preference, political affiliation, etc., could be indicated in the profile personality info field 2620. Using the example illustrated in FIG. 26, the characteristic 'Hip hop' is associated with 'Profile1'. This may indicate that persons with an interest in the hip hop music genre may receive a higher rating and/or ranking associated with 'Profile1'.

The profile resource ID field 2625 may include information of a resource associated with a profile. For example, if a resource is used to respond to queries associated with a profile, an indicator of the resource may be indicated in the profile resource ID field 2625. Information indicated in the profile resource ID field 2625 may be used to obtain information associated with a resource using a record such as the resource record 2500 (FIG. 25). Using the example illustrated in FIG. 26, 'Resource2', 'Resource5', and 'Resource6' have been associated with 'Profile1'.

The profile resource rating field 2630 may include information regarding a rating of a resource associated with a profile. In at least one embodiment, the profile resource ID field 2625 and the profile resource rating field 2630 are linked by, for example, a pointer. Using the example illustrated in FIG. 26, 'Resource2' has a rating of '5', 'Resource5' has a rating of '1', and 'Resource6' has a rating of '3'. Content of the profile resource ID field 2625 and the profile resource rating field 2630 may be used at least in part to determine an order in which a resource is presented and/or utilized responsive to a request, a voting activity, a review activity, or other types of tasks and/or activities associated with a profile. Using the example illustrated in FIG. 26, 'Resource2' might be preferentially utilized for a request associated with 'Profile1'. Any number of resources may be associated with a profile.

As illustrated in FIG. 27, an exemplary categorization record 2700 is provided of which one or more may be associated with or resident in the database 2020 (FIG. 20). The categorization record 2700 may include a categorization record ID field 2705, a categorization guide ID field 2710, a categorization guide rating field 2715, a categorization keyword ID field 2720, a categorization advertisement ID field 2725, a categorization advertisement rating field 2730, a categorization resource ID field 2735, a categorization resource rating field 2740, a categorization ping ID field 2745, and a categorization ping ranking field 2750.

The categorization record ID field 2705 contains an identifier of a categorization, which is preferably unique and preferably used consistently. For example, in at least one embodiment, the categorization record ID field 2705 can include a randomly generated numerical code and/or a character string indicating a categorization. A categorization record ID serves to distinguish a categorization record associated with a categorization from a categorization record associated with other categorization. Although particular examples of identifiers are described herein, other types of identifiers uniquely indicating a categorization may be utilized without departing from the spirit and scope of the embodiments herein. In at least one embodiment, a description of a proper path may be included in the content of the categorization record ID field 2705. A categorization record ID may include a categorization description, a random numeric code, and/or any other information uniquely identifying an element within a data structure. Using the example in FIG. 27, 'Category1' is the categorization record ID associated with the categorization record 2700.

The categorization guide ID field 2710 may include one or more identifiers associated with a guide. The categorization guide ID 2710 may include one or more identifiers of a guide which may be used to obtain further information of a guide using a record such as the guide record 2200 (FIG. 22). Using the example in FIG. 27, 'Guide1', 'Guide2' and 'Guide3' have been associated with 'Category1'. While only a few guide identifiers have been illustrated in FIG. 27, any number of guide identifiers may be associated with a categorization. Association of a guide with a categorization may indicate that a guide has registered to respond to requests associated with the categorization, or that a guide may recommend, review, edit and/or otherwise associate information with the categorization.

The categorization guide rating field 2715 may include information of a number of ratings associated with a guide. For example, the categorization guide rating field 2715 may include a rating of a guide based on result produced by a guide responsive to request associated with the categorization identified in the categorization record ID field 2705. In at least one embodiment, the categorization guide ID field 2710 and the categorization guide rating field 2715 may be linked by, for example, a pointer. Using the example illustrated in FIG. 27, 'Guide1' has the rating '3', 'Guide2' has the rating '5' and 'Guide3' has the rating '7' associated with 'Category1'. This may indicate that the guide 'Guide1' has the highest rating and might be selected first to respond to a request associated with 'Category1'. A rating of a guide may be determined based on any information indicated in the database 2020 (FIG. 20).

The categorization keyword ID field 2720 may include information of a number of keywords associated with the categorization indicated in the categorization record ID field 2705. The information indicated in the categorization keyword ID field 2720 may be compared to information indicated in a search request in order to associate a request with a category. For example, if a keyword is associated with content of a request, a ranking of a category associated with the keyword may be increased, which may make the category more likely to be associated with the request. For example, if a keyword indicated in a query is a match to a keyword indicated in the categorization keyword ID field 2720, an indicator of the category may be presented to a guide such as an expediter responding to a request associated with the query. Any number of keywords may be associated with a categorization. Content of the categorization keyword ID field 2720 may be determined based on activities of guides, users, system administrators, etc. Using the example in FIG. 27, the keywords 'Little John', 'Polly', 'LJ n Polly', 'BadDog', and 'SlickRay' are associated with 'Category1', which may cause 'Category1' to be more likely to be associated with a request including those keywords. For example, the presence of the keyword 'Polly' in the request content field 2110 of the request record 2100 (FIG. 21) may increase the probability that 'Category1' will be associated with 'Request1'.

The categorization advertisement ID field 2725 may include information of a number of advertisements which may be associated with a categorization. Using the example in FIG. 27, the advertisement IDs 'Advert1' and 'Advert2' have been associated with the categorization record 2700, which may indicate that the advertisements 'Advert1' and 'Advert2' may be presented to a guide and/or a user responsive to a request associated with 'Category1'. While only a few advertisement identifiers have been illustrated in FIG. 27, any number of advertisement identifiers may be associated with a categorization.

The categorization advertisement rating field 2730 may include information of one or more ratings associated with an advertisement. For example, the categorization advertisement rating field 2730 may include a rating of an advertisement based at least in part on frequency of selection of an advertisement by a guide responsive to search request associated with the categorization identified in the categorization record ID field 2705. In at least one embodiment, the categorization advertisement ID field 2725 and the categorization advertisement rating field 2730 may be linked by, for example, a pointer. Using the example illustrated in FIG. 27, the rating '7' has been associated with 'Advert1' and the rating '7.3' has been associated with 'Advert2'. This may indicate that 'Advert1' has the highest rating and might be more likely to be selected responsive to a request associated with 'Category1'.

The categorization resource ID field 2735 may include information of a number of resources which may be associated with a categorization. Using the example in FIG. 27, the resources 'Resource1', 'Resource2', and 'Resource5' have been associated with 'Category1'. While only a few resource identifiers have been illustrated in FIG. 27, any number of resource identifiers may be associated with a categorization. In at least one embodiment, a resource associated with a categorization may be related to an advertiser and/or may be distributed or provided to a guide associated with a categorization and an advertiser.

The categorization resource rating field 2740 may include information of one or more ratings associated with a resource. In at least one embodiment, the categorization resource rating field 2740 may include a rating of a resource based at least in part on frequency of use of a resource by a guide responsive to request associated with the categorization identified in the categorization record ID field 2705. A rating of a resource may be based on any information indicated in the database 2020 (FIG. 20). In at least one embodiment, the categorization resource ID field 2735 and the categorization resource rating field 2740 may be linked by, for example, a pointer. Using the example illustrated in FIG. 27, the rating '2' has been associated with 'Resource1', the rating '10' has been associated with 'Resource2' and the rating '4' has been associated with 'Resource5'. This may indicate that 'Resource2' is a highest rated resource associated with 'Category2'. Any type of rating information may be included in a rating field such as the categorization resource rating field 2740.

The categorization ping ID field 2745 may include information of a number of pings which may be associated with a categorization. Using the example in FIG. 27, the pings 'Ping1', 'Ping2', and 'Ping4' have been associated with 'Category1'. While only a few ping identifiers have been illustrated in FIG. 27, any number of ping identifiers may be associated with a categorization. In at least one embodiment, a ping associated with a categorization may be related to an advertiser. For example, if a ping may provide an advertisement associated with an advertiser, or if a ping is provided by an advertiser and the advertiser is associated with a category, the ping may be associated with the category.

The categorization ping ranking field 2750 may include information of one or more rankings associated with a ping. For example, the categorization ping ranking field 2750 may include a ranking of a ping based at least in part on a number of responses or pongs by users to a ping when presented responsive to a request associated with a category indicated in the category record ID field 2705. A ranking of a ping may be based on any information indicated in the database 2020 (FIG. 20). In at least one embodiment, the categorization ping ID field 2745 and the categorization ping ranking field 2750 may be linked by, for example, a pointer. Using the example illustrated in FIG. 27, the ranking '1' has been associated with 'Ping1', the ranking '3' has been associated with 'Ping2' and the ranking '4' has been associated with 'Ping4'. This may indicate that 'Ping1' is more likely to be presented a user responsive to a request associated with 'Category1'. Any type of ranking information may be included in a ranking field such as the categorization ping ranking field 2750.

While ranking and rating of a few items and types of items associated with a profile and a category have been illustrated, no limitation is implied thereby. Any item may be rated and/or ranked when associated with a category, a profile, a keyword, a guide, a user, a vetted query, a request, etc. A ranking of an item may be based on ratings and/or rankings associated with any number of items. For example, a ranking of a ping for a request may be based on ratings of pings associated with a user, a profile, and a category associated with the request.

As illustrated in FIG. 28, an exemplary advertisement record 2800 is provided of which one or more may be associated with or resident in the database 2020 (FIG. 20). The advertisement record 2800 (FIG. 28) may include an advertisement ID field 2805, an advertisement description field 2810, an advertisement access info field 2815, an advertisement usage information field 2820, an advertisement keyword ID field 2825, an advertisement category ID field 2830, and an advertisement advertiser ID field 2835. An advertisement may include any type of content, which may be sponsored in any way.

The advertisement ID field 2805 preferably contains a unique identifier of an advertisement, which is preferably used consistently. For example, in at least one embodiment, the advertisement ID field 2805 can include a randomly generated numerical code, and/or a text string indicating a name associated with an advertisement. An advertisement ID serves to distinguish the advertisement record associated with an advertisement from an advertisement record associated with other advertisements. Other unique identifiers of an advertisement may be utilized without departing from the spirit and scope of the embodiments. In at least one embodiment, an advertisement ID may include a description associated with an advertisement. Using the example illustrated in FIG. 28, 'Advert1' is the advertisement ID associated with the advertisement record 2800.

The advertisement description field 2810 may include information of a description associated with an advertisement. For example, a description of an advertisement may be presented to a guide in order that a guide may select an advertisement to be associated with a search request. Using the example illustrated in FIG. 28, 'Ticket offer for Polly concerts' is the advertisement description associated with the advertisement 'Advert1'. Any type of information such as text, audio, video, images, etc., may be indicated in the advertisement description field 2810.

The advertisement access info field 2815 may include access information associated with an advertisement. For example, a URL may be indicated in the advertisement access info field 2815. Information contained in the advertisement access info field 2815 may be used to provide access to an advertisement. Using the example illustrated in FIG. 28, the URL <'https://adserverchacha.com/pollyconcert1'> is the access information associated with the advertisement 'Advert1'. This may, for example, indicate that the advertisement 'Advert1' may be delivered using content accessed at <'https://adserverchacha.com/pollyconcert1'>. Advertisement access information may indicate a resource associated with an advertisement.

The advertisement usage information field 2820 may include information regarding the use of an advertisement. In at least one embodiment, a number of times that an advertisement has been delivered to a user may be indicated in the advertisement usage information field 2820. Using the example illustrated in FIG. 28, the indicators '210', '114', '46', '150' and '10' are associated with 'Advert1'. The advertisement usage information field 2820 may indicate usage of 'Advert1' for any purpose. Information in the advertisement usage information field 2820 may be utilized to determine whether an advertisement is to be reviewed, and may be utilized to determine compensation.

The advertisement keyword ID field 2825 may include information of a number of keywords which may be associated with an advertisement. In at least one embodiment, the advertisement keyword ID field 2825 and the advertisement usage information field 2820 may be linked by, for example, a pointer. Using the example illustrated in FIG. 28, the keywords 'Little John', 'Polly', and 'LJ n Polly' are associated with the advertisement 'Advert1'. This may indicate that the advertisement 'Advert1' has been selected and/or presented '210', '114', and '46' times responsive to requests associated with the keywords 'Little John', 'Polly', and 'LJ n Polly', respectively. Any item may be indicated in the advertisement interest ID field 2825, including but not limited to any or all of a word, named entity, phrase, sentence, image, audio, video, etc.

The advertisement category ID field 2830 may include information of a number of categories associated with an advertisement. In at least one embodiment, the advertisement category ID field 2830 and the advertisement usage information field 2820 may be linked by a pointer. Using the example illustrated in FIG. 28, the categories 'Category1' and 'Category7' are associated with the advertisement 'Advert1'. This may indicate that the advertisement 'Advert1' has been selected and/or presented '150', and '10' times in association with the categories 'Category1' and 'Category7', respectively, when not associated with the keywords 'Little John', 'Polly', and 'LJ n Polly', The advertisement advertiser ID field 2835 may include information of a number of advertisers associated with an advertisement. In at least one embodiment, information indicated in the advertisement advertiser ID field 2835 may be used to 'look up' information of an advertiser using a record such as the advertiser record 2900 (FIG. 29). Using the example illustrated in FIG. 28, the advertiser 'Advertiser2' is associated with the advertisement 'Advert1'. This may indicate that 'Advertiser2' has provided information associated with the advertisement 'Advert1'. For example, 'Advertiser2' may have provided a bid, a URL, a keyword, a category, etc., associated with an advertisement.

As illustrated in FIG. 29, an exemplary advertiser record 2900 is provided, of which one or more may be associated with or resident in the database 2020 (FIG. 20). The advertiser record 2900 may include an advertiser ID field 2905, an advertiser category ID field 2910, an advertiser keyword ID field 2915, an advertiser profile ID field 2920, an advertiser advertisement ID field 2925, and an advertiser communication info field 2930.

The advertiser ID field 2905 preferably contains a unique identifier of an advertiser, which is preferably used consistently. For example, in at least one embodiment, the advertiser ID field 2905 can include a randomly generated numerical code, and/or a text string indicating a name associated with an advertiser. An advertiser ID serves to distinguish the advertiser record associated with an advertiser from an advertiser record associated with other advertisers. Other unique identifiers of an advertiser may be utilized without departing from the spirit and scope of the embodiments. Using the example illustrated in FIG. 29, 'Advertiser2' is the advertiser ID associated with the advertiser record 2900.

The advertiser category ID field 2910 includes information of a category associated with an advertiser. Content of the advertiser category ID field 2910 may be modified based on actions of an advertiser. A person may select a category and/or keyword associated with an advertiser. A category may be associated with an advertiser based on testing. A category may also be associated with an advertiser based on an affiliate group associated with an advertiser. For example, if an advertiser has chosen to target advertisements to affiliate groups associated with professional sports (e.g. Pacer fans, Packer fans, etc.), a category associated with sports (e.g. sports>professional) might be associated with the advertiser. A category associated with an advertiser may be used to select items which are to be presented to an advertiser. For example, information of guides, users, affiliate groups, keywords and advertisements associated with 'Category1' might be provided to advertisers associated with 'Category1'. An advertiser may select a category associated with the advertiser. For example, an advertiser may select a category which may be associated with a request in order to associate an advertisement with the related request. Using the example illustrated in FIG. 29, the categories 'Category1', 'Category3', 'Category7, and 'Category8' are associated with the advertiser 'Advertiser2'.

The advertiser keyword ID field 2915 includes information of a topic or keyword associated with an advertiser. Content of the advertiser keyword ID field 2915 may be modified based on actions of an advertiser. A person may select a topic or interest which is associated with an advertiser. For example, an advertiser may select a topic or keyword to be associated with the advertiser during a registration process. Likewise, if an advertisement is supplied by an advertiser, a keyword of the advertisement may be associated with the advertiser. A keyword may be associated with an advertiser based on voting by a guide. For example, an advertiser may be required to be accepted based on voting of a guide associated with a category and/or topic in order to be associated with the category and/or keyword. Content of the advertiser keyword ID field 2915 may be compared to the content of a search request in order to determine a ranking of an advertiser for responding to a search request. Using the example illustrated in FIG. 29, the keywords 'Little John', 'Polly', 'LJ n Polly', 'Billy and the Beat', and 'Sixties revival' are associated with the advertiser 'Advertiser2'. This may indicate that 'Advertiser2' has selected, bid on, submitted advertisements indicating, or otherwise indicated interest in the keywords 'Little John', 'Polly', 'LJ n Polly', 'Billy and the Beat', and 'Sixties revival'.

The advertiser profile ID field 2920 includes information of a profile associated with an advertiser. Content of the advertiser profile ID field 2920 may be modified based on actions of an advertiser. A person may select a profile which is associated with an advertiser. For example, an advertiser may select a profile to be associated with the advertiser during a registration process. A profile may be associated with an advertiser based on actions of a user and/or guide. For example, an advertiser may be associated with a profile based on selection of advertisements associated with the advertiser by a person associated with a profile. In order to be associated with a profile an advertiser may take a survey which is used to generate a profile, or an advertiser may provide information such as demographic, geographic, personality or other information which may be indicated in a profile associated with the advertiser. Information indicated in the content of the advertiser profile ID field 2920 may be compared to information indicated in content of a profile associated with a request in order to determine a ranking of an advertiser for responding to a search request. Using the example illustrated in FIG. 29, the profiles 'Demoprofilea2', 'Geoprofilea2' and 'Persprofilea2' are associated with the advertiser 'Advertiser2'. This may indicate that 'Advertiser2' has indicated and/or generated the profiles 'Demoprofilea2' which may be a demographic profile, 'Geoprofilea2' which may be a geographic profile and 'Persprofilea2' which might indicate personality information regarding the advertiser 'Advertiser2'.

The advertiser advertisement ID field 2925 includes information of a result or sponsored result or advertisement associated with an advertiser. The content of the advertiser advertisement ID field 2925 may be modified based on actions of an advertiser. If an advertiser provides an advertisement for delivery, an indicator of the advertisement may be added to the advertiser advertisement ID field 2925. A rating and/or ranking associated an advertisement may affect compensation for providing the advertisement. For example, an advertiser with consistently low rankings may be required to submit a higher bid in order that the advertisements will be served to users. Likewise a usage indicator associated with an advertisement provided by an advertiser may affect a rating or ranking associated with an advertiser. Using the example illustrated in FIG. 29, the advertisements 'Advert1', 'Advert3' and 'Advert5' are associated with the advertiser 'Advertiser2'. This may indicate that 'Advertiser2' has provided the advertisements 'Advert1', 'Advert3' and 'Advert5'.

The advertiser communication info field 2930 includes information of a device and/or service associated with an advertiser. Content of the advertiser communication info field 2930 may be modified based on actions of an advertiser. If an advertiser establishes communications with the search system 2030 using a device and/or service, information regarding the device and/or service may be included in the advertiser communication info field 2930. Any type of communication service and/or system may be indicated in the advertiser communication info field 2930. In at least one embodiment, a username and/or password associated with an advertiser may be indicated in the advertiser communication info field 2930. Communication services such as IM, e-mail, SMS, MMS, EMS, telephone, wireless or wired communication, etc., may be indicated in the advertiser communication info field 2930. A telephone number, an email address, an IM provider and login ID, a keyword associated with a service, an IP address, a MAC address, a URL, etc., may be indicated in the advertiser communication info field 2930. Using the example illustrated in FIG. 29, the login 'Advertiser2', the email 'Advertiser2@chacha.com', the IM credential 'Advertiser2@AIM' and the phone number '555.924.2242' are associated with the advertiser 'Advertiser2'. This may indicate that 'Advertiser2' may be contacted using the login ID 'Advertiser2', via email at 'Advertiser2@chacha.com', via IM as 'Advertiser2@AIM' and via voice, text, or other service associated with the phone number '555.924.2242'.

An interactive activity or ping which may provide an incentive, reward, compensation, etc., and/or may be used to target information such as advertisements may be described, tracked and otherwise utilized based on information indicated in the database 2020 (FIG. 20). In at least one embodiment, a ping may be represented using a record such as a ping record 3000 as depicted in FIG. 30.

As illustrated in FIG. 30, an exemplary ping record 3000a is provided, of which one or more may be associated with or resident in the database 2020 (FIG. 20). The ping record 3000a may include a ping ID field 3005, a ping content field 3010, a pong action info field 3015, a pong ID field 3020, a pong response field 3025, a ping user ID field 3030, a ping category ID field 3035 and a ping profile ID field 3040. A ping may include any type of content, which may be sponsored in any way.

The ping ID field 3005 preferably contains a unique identifier of a ping, which is preferably used consistently. For example, in at least one embodiment, the ping ID field 3005 can include a randomly generated numerical code, and/or a text string indicating a name associated with a ping. A ping ID serves to distinguish the ping record associated with a ping from a ping record associated with other pings. Other unique identifiers of a ping may be utilized without departing from the spirit and scope of the embodiments. In at least one embodiment, a ping ID may include a description associated with a ping. Using the example illustrated in FIG. 30, 'Ping1' is the ping ID associated with the ping record 3000a.

The ping content field 3010 may include information of content to be provided associated with a ping. In at least one embodiment, a message, which is to be delivered to a user when a ping is selected to be provided to the user, may be indicated in the ping content field 3010. Any type of indicator of content may be included in the ping content field 3010 such as a URL, a pointer, etc. Using the example illustrated in FIG. 30, 'Should Polly get back with Little John? YLTL=YES NTLT=NO WLTL=WHO?' is the content associated with 'Ping1'. Any type of information such as text, audio, video, images, etc., may be indicated in the ping content field 3010.

The pong actions field 3015 may include information of actions which may be associated with a user associated with a ping. For example, a keyword, a message, a code, and/or combination thereof may be indicated in the pong actions field 3015. Actions indicated in the pong actions field 3015 may define user actions which may be taken responsive to content provided based on information indicated in the ping content field 3010. Content of the pong actions field 3015 may be compared to content of a message received from a user if the user is associated with the ping ID indicated in the ping record ID field 3005. In this way, an action associated with a ping may be associated with a user instead of being a global action as further described in US Published Application Serial Number 2010/0082652, inventor Scott A. Jones, et. al., entitled 'METHOD AND SYSTEM FOR MANAGING USER INTERACTION' filed Sep. 28, 2009, attorney docket number 1918.1060, the disclosure of which is included herein by reference in its entirety. Using the example in FIG. 30, the actions 'YLTL', 'NLTL', 'WLTL' and 'timeout' are associated with 'Ping1', which may indicate a keyword which may be included in an SMS message transmitted by a user responsive to a ping, or expiration of a time interval defined for a response.

The pong ID field 3020 may include an identifier of a number of actions associated with a response. Content of the pong ID field may be used to indicate a response to a ping. For example if a user responds to a ping with an action indicated in the pong actions field 3015, a pong ID associated with the action may be added to the user pong ID field 2305 of a user record associated with the user such as the user record 2300 (FIG. 23). Using the example in FIG. 30, 'Pong1.1', 'Pong1.2' and 'Pong1.3' are associated with 'Ping1'. If 'Ping1' is associated with a user, and the user sends a message including the keyword 'YLTL', 'Pong1.1' may be associated with the user.

The pong response field 3025 may include information of a number of actions which may be associated with a ping. In at least one embodiment, the pong response field 3025 and the pong ID field 3020 may be linked by for example a pointer. Using the example illustrated in FIG. 30, the actions 'record yes vote' and 'send Ping1 poll results' are associated with 'Pong1.1', the actions 'record no vote' and 'send Ping1 poll results' are associated with 'Pong1.2' and the actions 'record who vote' and 'send Ping1 poll results' are associated with 'Pong1.3'. This may indicate that poll results are to be recorded in the database 2020 (FIG. 1) and provided to a user associated with 'Ping1' and/or 'Pong1.1', 'Pong1.2' or 'Pong1.3'. It should be noted that a response action may be a response to a sequence of actions. For example, delivery of any ping may be an action associated with a pong. This feature may allow targeting of sponsored content based on a sequence of responses.

The ping user ID field 3030 may include information of a number of users associated with a ping. In at least one embodiment, the ping user ID field 3030 may indicate a user who has responded to a ping. In at least one embodiment, the ping user ID field 3030 may indicate a user who has been presented with a ping. Information of a user who responds with a particular pong action may be recorded in the ping user ID field 3030. Information indicated in the ping user ID field 3030 may be used for various purposes. For example, content of the ping user ID field 3030 may be used to determine a profile associated with a ping, a rating of a ping associated with a profile, etc. Using the example illustrated in FIG. 30, 'User1, 'User4' and 'User5' are associated with 'Ping1'. This may for example indicate that the ping 'Ping1' received a response from 'User1', 'User4' and User5', The ping category ID field 3035 may include information of a category associated with a ping. A category may be associated with a ping in various ways. For example, an administrator of the search system 2030 (FIG. 20) may associate a category with a ping. A ping may be associated with a category based on keywords mutually associated with the category and the ping. For example, if text of a ping such as 'Ping1' includes the keywords 'Polly' and 'Little John' which are associated with 'Category1', 'Ping1' may be associated with 'Category1'. In at least one embodiment, a ping may be created automatically based on a request and/or results. For example, a poll might be created based on a frequently asked question which might be modified for presentation as content of a ping. As illustrated in FIG. 30, 'Category1' and Category3' are associated with 'Ping1', which may indicate that 'Ping1' may be presented to users responsive to a request associated with 'Category1' and/or 'Category3'. This may allow users who are interested in 'Category1' to receive a targeted poll or ping which may be of interest although the query submitted did not include the keywords associated with the ping.

The ping profile ID field 3040 may include information of a number of profiles associated with a ping. A profile may be associated with a ping in various ways. For example, an administrator of the search system 2030 (FIG. 20) may associate a profile with a ping. A ping may be associated with a profile based on keywords associated with a profile and the ping. For example, if users with a particular profile characteristic have submitted queries associated with a keyword or category, and a ping includes the keyword and/or is associated with the category the ping may be associated with the profile characteristic. In at least one embodiment, a profile associated with a ping may be determined based on responses by users. For example, if more than a predetermined number of users responds to a ping, profile characteristics associated with responding users may be analyzed to determine a profile characteristic of a group which has responded most frequently, which may be associated with the ping to improve targeting. As illustrated in FIG. 30, 'Profile1', 'Profile3' and 'Profile8' are associated with 'Ping1' which may indicate that 'Ping1' may be presented to users responsive to a request associated with 'Profile1', 'Profile3' and/or 'Profile8'.

The ping record 3000b associated with 'Ping2' illustrates the delivery of a differentiated, targeted advertisement responsive to a user action responsive to a pong action. The pong response field 3025 of the ping record 3000b indicates that 'Advert3' is to be delivered responsive to the action 'TPCY' (i.e. the keyword TPCY'), while 'Advert6' is to be delivered responsive to the action 'TPCN' as indicated in the pong actions field 3015 of the ping record 3000b.

As illustrated, 'Ping2' may be targeted using some of the same targeting information as 'Ping1'. For example, if a request is associated with 'Category1' and 'Profile1' as indicated in the ping category ID field 3035 and the ping profile ID field 3040, both 'Ping1' and 'Ping2' might be presented responsive to the request. In at least one embodiment, a ranking of 'Ping1' and 'Ping2' associated with targeting information such as 'Profile1', 'Category1', and a bid associated with an advertisement associated with the pings is used to determine which ping will be presented. If 'Ping1' and/or 'Ping2' have been previously presented to a user, a ranking of the ping may be reduced compared to pings which have not been provided to the user.

In an embodiment, a ping may be targeted to a request based on one or more conditions related to information of a device using which the request is sent, information of a user submitting the request, etc., or may be based on information independent of information of the request and/or user such as time, date, season, event, etc. Further, while a ping is used to illustrate determination of availability (reachability) with respect to a user, the present invention is not limited to any particular process, utility or command of making such a determination.

Figure 31:
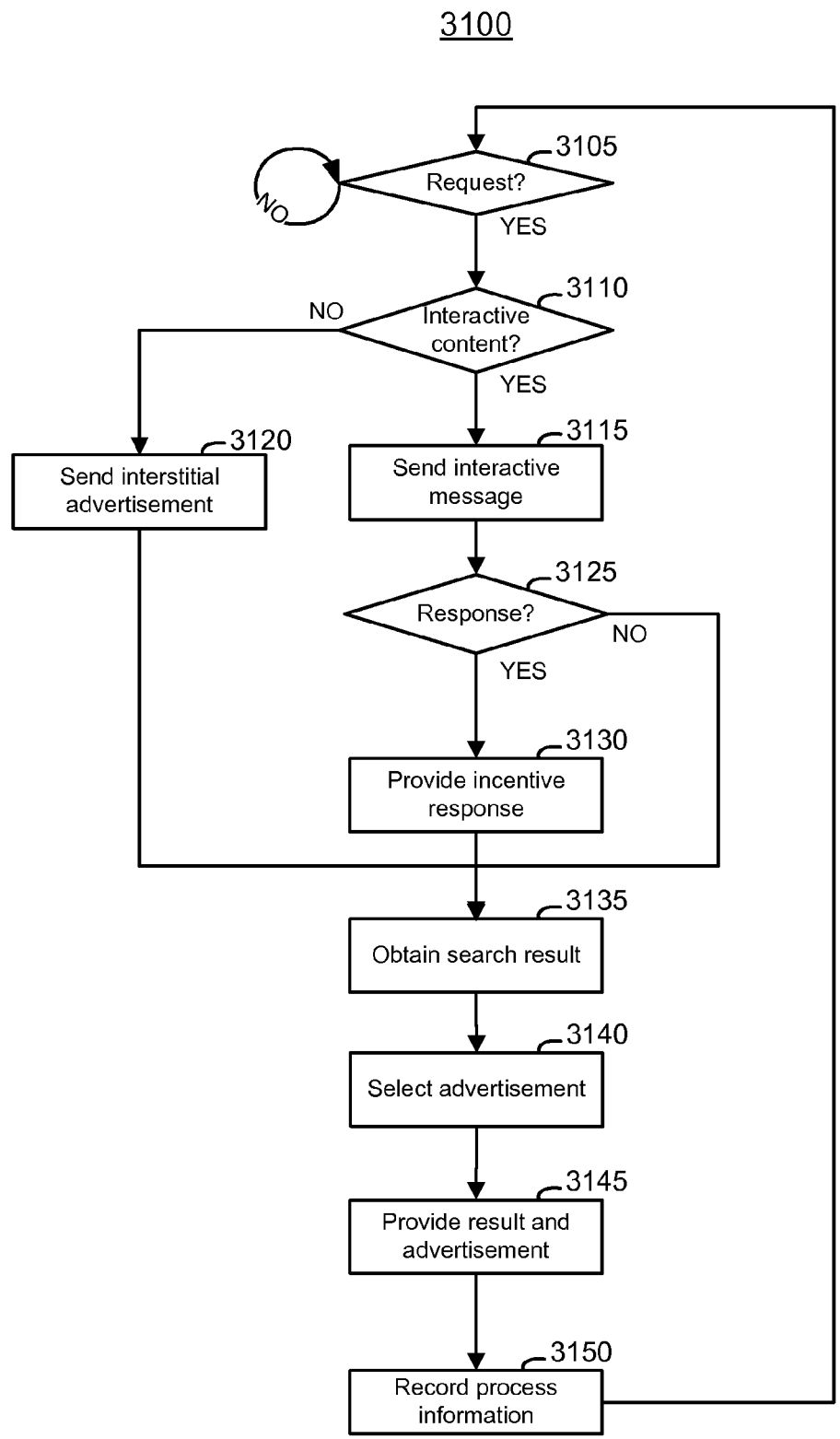
FIG. 31 is flowchart of responding to a request.

As illustrated in FIG. 31, a process 3100 for performing an information search is provided. The process 3100 may be operative on any or all elements of the system 2000 (FIG. 20).

In operation 3105, a determination is made as to whether a request is received. In at least one embodiment, if a search query is submitted via voice, or SMS to a server, or an email is received at an email address, or if an Instant Message (IM) is received at a IM service account associated with the search system 2030 (FIG. 20), or if a request is found to require one or more search result, or based on other suitable criteria, it may be determined that a search query or search request or request has been received. If it is determined in operation 3105 that a request is not received, control remains at operation 3105 and process 3100 continues to wait. If it is determined in operation 3105 that a request is received, control is passed to operation 3110 and process 3100 continues.

In operation 3110, a determination is made as to whether interactive content is to be provided. If it is determined in operation 3110 that interactive content is to be provided, control is passed to operation 3115 and process 3100 continues. If it is determined in operation 3110 that an interactive activity is not to be provided, control is passed to operation 3120 and process 3100 continues.

The determination in operation 3110 may be made based on any suitable criteria. For example, if a user has responded to previous interactive activity requests, a user may be more likely to be offered an interactive activity. If there is a high inventory of polling questions or other activities which are relevant to a query, or which meet selection criteria based on a user profile such as a query history, purchase history, advertising history, activity history, demographics, interests, location, time, etc., it may be determined that interactive content is to be provided. Likewise, if there is greater inventory of suitable interstitial advertisements which may be provided it may be determined that an interactive activity or interactive content is not to be provided.

In operation 3115, an interactive message is sent to a user. An interactive message may be a question and answer, but may also include other forms of activity wherein a user is able to respond. An interactive message or activity may for example include a poll, a joke, a riddle, a quiz, a competition with other users, etc. An interactive activity or ping may be selected as described herein above. Control is passed to operation 3125 and process 3100 continues.

In operation 3120, an interstitial advertisement is sent to a user. An interstitial advertisement may be selected based on content of a request and/or information of a user as described herein. An interstitial ad may be selected at least in part based on a search result. Control is passed to operation 3135 and process 3100 continues.

In operation 3125, a determination is made as to whether a response is provided by a user. If it is determined in operation 3125 that a response is provided by a user, control is passed to operation 3130 and process 3100 continues. If it is determined in operation 3125 that a response is not provided by a user, control is passed to operation 3135 and process 3100 continues.

The determination in operation 3125 may be made based on various criteria. In at least one embodiment, a message received from a user device is used to determine if a response has been provided by a user. In at least one embodiment, if a search result is provided prior to a user response it may be determined that a response has not been provided by the user. Any user action and/or inaction may be used at least in part to determine whether a user has provided a response.

In operation 3130, an incentive response is provided to a user. For example, a punch line of a joke, results of a poll, an answer to a riddle, the next step in a game, etc., may be provided to a user as an incentive for responding to an interactive activity. An incentive response may be weighted based on previous responses. In at least one embodiment, an incentive response may include an advertisement which is directly selected based on a response to an interactive activity by a user. For example, if a user expresses an interest in a particular product, service, supplier, etc., an advertisement associated with that interest may be provided. Control is passed to operation 3135 and process 3100 continues.

In operation 3135, a search result is obtained. A search result may be an automated response, and/or may utilize the assistance of a human assistant or guide. A process for obtaining a search result responsive to a request is further described herein with respect to FIG. 32. Any suitable automated and/or human assisted search process may be used to obtain a search result within the spirit and scope of the embodiments herein. Control is passed to operation 3140 and process 3100 continues.

In operation 3140, an advertisement is selected. Selection of an advertisement may be based on various criteria. An advertisement may be selected at least in part based on content of a request, a result, a user profile, a category, a user history, a guide, an advertiser, a resource, and/or other information associated with a request. In at least one embodiment, an interactive activity response may be used at least in part to select an advertisement. A process for selecting an advertisement is further described herein with respect to FIG. 33. Control is passed to operation 3145 (FIG. 31) and process 3100 continues.

In operation 3145, a search result is provided. A result which is provided may include an advertisement. A result may be provided to any devices and/or using any communication service associated with a user. An advertisement may be targeted to the user based on a user response to a previous presentation of a search result. For example, if a user views a result from a mobile device as an SMS, or MMS message and does not respond to an advertisement associated with the result, a subsequent access to the result using a web browser may include a different advertisement. Control is passed to operation 3150 and process 3100 continues.

In operation 3150, information of the process 3100 is recorded. In at least one embodiment, the database 2020 (FIG. 20) is updated. Information of any number of users, guides, search results, requests, resources, advertisements, interactive activities, pongs, user responses, profiles, advertisements, categories, keywords and/or other items may be recorded and/or modified. In at least one embodiment, responses of a user to a ping are recorded and may affect a rating and/or ranking of a ping associated with other targeting information such as a category, keyword, profile, location, etc. Control is passed to operation 3105 and process 3100 continues.

Figure 32:
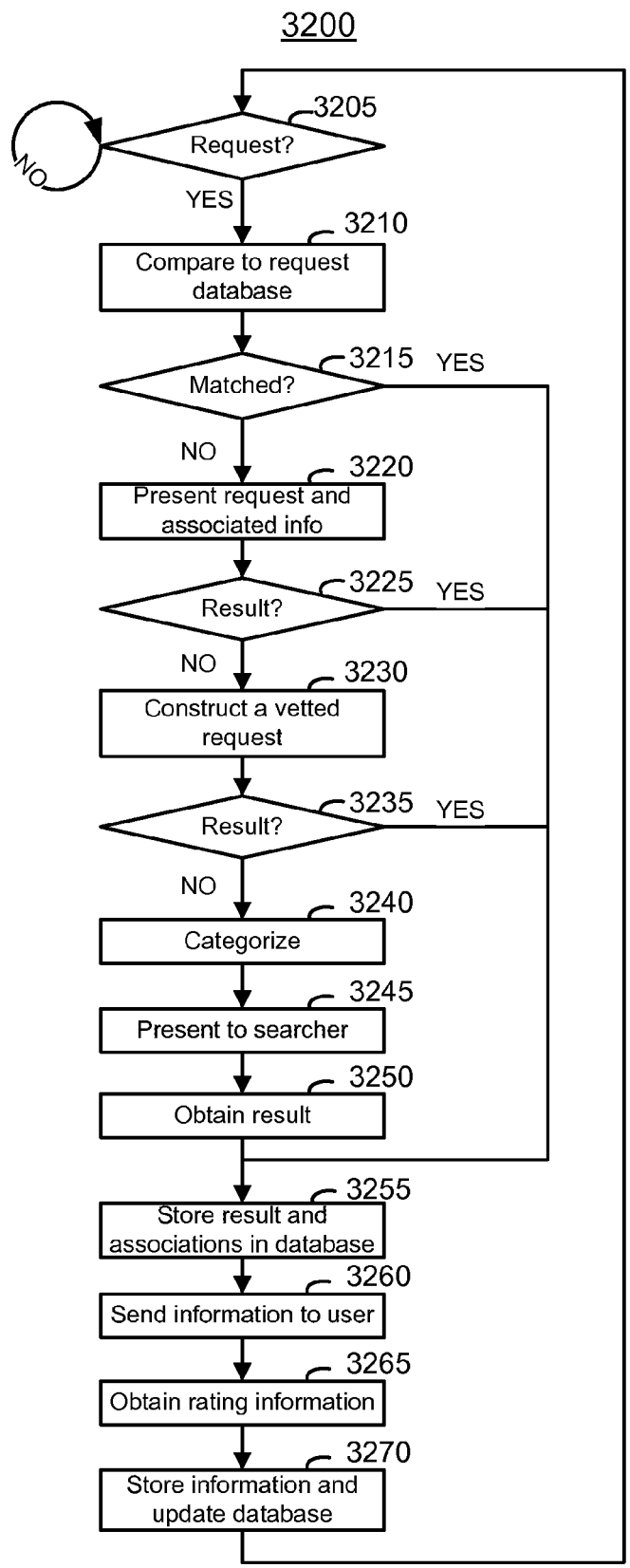
FIG. 32 is flowchart of obtaining a search result responsive to a request.

As illustrated in FIG. 32, a process 3200 for obtaining a search result is provided. The process 3200 may be operative on any elements of the system 2000 (FIG. 20). In at least one embodiment, the process 3200 is operative on a server associated with the search system 2030.

In operation 3205 (FIG. 32) a determination is made as to whether a request is received. For example, if a search query is submitted via voice, or SMS to a server, or an email is received at an email address, or if an IM is received at a IM service account associated with the search system 2030 (FIG. 20), or if an internet message such as a GET request is received at a server, it may be determined that a search query or request is received. If it is determined in operation 3205 that a request is not received, control remains at operation 3205 and process 3200 continues. If it is determined in operation 3205 that a request is received, control is passed to operation 3210 and process 3200 continues.

In operation 3210 a request is compared to a database. The database may include information of requests. A database may include a previous request and/or result, advertisement, resource and/or any data processed in association with operation of the system 2000 (FIG. 20), any or all of which may be compared with a request. A request may be processed in order to generate alternate forms of the request which may be compared to a database including other requests. In at least one embodiment, a request may be automatically analyzed and/or parsed, and a set of equivalence rules may be applied, in order to compare a request to a database of requests. Control is passed to operation 3215 and process 3200 continues.

In operation 3215 a determination is made as to whether a match to a request is found. If in operation 3215 it is determined that a match to a request is not found, control is passed to operation 3220 and process 3200 continues. If in operation 3215 it is determined that a match to a request is found, control is passed to operation 3255 and process 3200 continues.

In at least one embodiment, an exact match of a request to a request or search query indicated in the database is used to determine whether a match to a request is found. An exact match may be determined to be found based on a modified version of a request. In at least one embodiment, an original search query might be deconstructed and elements of the deconstructed query might be combined with other information in order to produce a search query which matches a search query indicated in the search system database 2020 (FIG. 20). An exact match may be determined to be found based on equivalence tables of any elements of a search query. In at least one embodiment, a calculated probability of a match between a request and a request indicated in the database exceeding a value may be used to determine that a match to a request is found. In at least one embodiment, the determination in operation 3215 (FIG. 32) may be made based on user acceptance of a result and/or a search query provided to a user by the search system 2030 (FIG. 20) responsive to a request. In at least one embodiment, a result or answer may be provided responsive to a user request using an automated resource based on automatic processing of a request. For example, if a user request conforms to a grammar construct such as 'quote xxxx' wherein 'xxxx' is a ticker symbol for a security, or if a user response matches a template in the database 2020 (FIG. 20), an automated system may deliver a response without the assistance of a guide.

In operation 3220 (FIG. 32), a request and information associated with the request are presented to a guide or searcher. Information associated with a request may include information which may have been obtained regarding a request, such as geographic, demographic, and/or other information which is associated with a user and/or system submitting a request. Information associated with a request may include a number of items which may have been associated with a request based on processing of a request, such as keywords, categories, advertisements, structured queries, searchers, results, historical information, etc. Information may be associated with a request based on content of a raw query and/or other information indicated in a request. For example, content of a raw query may be compared to a database of categories and/or structured queries or "succinct queries", which may allow items associated with a database of queries and/or categories to be ranked based at least in part on content of the raw query. Control is passed to operation 3225 and process 3200 continues.

In operation 3225, a determination is made as to whether a result is found. If in operation 3225 it is determined that a result is not found, control is passed to operation 3230 and process 3200 continues. If in operation 3225 it is determined that a result is found, control is passed to operation 3255 and process 3200 continues.

The determination in operation 3225 may be made based on various criteria. In at least one embodiment, a searcher may select one or more suggested queries, and if a result is associated with the suggested query, it may be determined that a result is found. In at least one embodiment, a structured query may be associated with a resource. A resource may produce a result based on submitting a request, which is based at least in part on the selected suggested query to the resource. A result may then be associated with a structured query associated with a request. Alternately, a searcher may select other information which may determine that a result is found. For example, a searcher may associate a category, keyword, resource, advertisement and/or other item with a request which may cause a result to be associated with a request, which may determine that a result is found. In at least one embodiment, the determination in operation 3225 may be made based on user acceptance of a result previously provided to a user.

In operation 3230, a vetted request is constructed. A vetted request or query may be constructed in any way. In at least one embodiment, an expediter guide may construct a query based on a raw query, and may associated the query with a category to create a vetted request. A vetted request may have corrections to grammar and/or spelling compared to a raw query. Control is passed to operation 3235 and process 3200 continues.

In operation 3235, a determination is made as to whether a result is found. If in operation 3235 it is determined that a result is not found, control is passed to operation 3240 and process 3200 continues. If in operation 3235 it is determined that a result is found, control is passed to operation 3255 and process 3200 continues.

The determination in operation 3235 may be made based on various criteria. In at least one embodiment, a result may be automatically selected and/or created based on a vetted query constructed by a guide. For example, a query structure may be associated with a resource, which may produce a result for a request based at least in part on the query structure and content of the request, which may associate a result with the structured query. Alternately, a structured query may be associated with one or more results which have been produced by a guide. In at least one embodiment, a guide may have performed a search and obtained a result responsive to an unstructured or 'raw' query which has been associated with a vetted query constructed by a guide in operation 3230. In at least one embodiment, the determination in operation 3235 may be made based on user acceptance of a result provided to a user. If a response to a request is not available, other information selected based at least in part on information of a request may be provided to a user, such as an advertisement, a game, audio and/or video information, etc.

In operation 3240, a request is categorized. A guide may categorize a request, or a category may be automatically associated with a request. A category may be associated with a request based on a keyword included in a request and/or a structured query associated with a request. A category and/or keyword may be used to select a number of items to be associated with a request, such as guides, results, advertisements, resources, etc. Control is passed to operation 3245 and process 3200 continues.

In operation 3245, a vetted query or vetted request is provided to a searcher. A vetted query or vetted request is a request which has been associated with a structured query and a category. An ambassador guide may continue processing a request and/or the request may be transmitted to a number of other guides who may perform an information search responsive to the request. A guide constructing a structured query at operation 3230 and a guide presented with the query at operation 3245 may or may not be the same person. A searcher may be selected automatically and/or may be selected by a guide. In at least one embodiment, a guide is notified of a request in an order determined by a ranking of guides associated with a category, keyword, profile, geographic information, and/or other information associated with a request. A guide may be allowed to decline a request. A guide receiving a vetted query may construct a different vetted query. Control is passed to operation 3250 and process 3200 continues.

In operation 3250, a result is obtained responsive to a request associated with a structured query. A result may be obtained by any number of guides. A result is associated with a request and/or a structured query, which may be associated with other information such as a category, keyword, advertisement, a user, a searcher, a resource, etc. Control is passed to operation 3255 and process 3200 continues.

In operation 3255, information of the process 3200 is recorded. In at least one embodiment, information of a request, a structured query, a vetted query, a result, and/or other items and their associations are recorded and/or updated. Information of a raw query and/or a request which has been associated with a structured query, information of an advertisement which has been associated with a request and/or a structured query, information of usage and/or ratings of items such as a result, a resource, a guide, an advertisement, etc., may be recorded. Control is passed to operation 3260 and process 3200 continues.

In operation 3260, a user is provided with information. A result may be provided using any or all devices and/or services which may be associated with a user. Information such as an advertisement, a result, etc., may be provided to a user in any sequence. Control is passed to operation 3265 and process 3200 continues.

In operation 3265, a rating and/or information which may be used to compute a rating of information presented to a user is obtained. For example, a user may rate a result, information of usage of a coupon included with a result might be obtained, a review by a guide and/or administrator might be performed, and/or other information which may be used to determine a rating may be obtained. Control is passed to operation 3270 and process 3200 continues.

In operation 3270, information of the process 3200 is recorded. Information associated with a user, such as results, advertisements, guides, profiles, etc., may be recorded. A rating of a result, a guide, an advertisement and/or other items such as a resource, a structured query, etc., may be recorded and/or updated. In at least one embodiment, information is recorded in the database 2020 (FIG. 20). Control is passed to operation 3205 and process 3200 continues.

Figure 33:
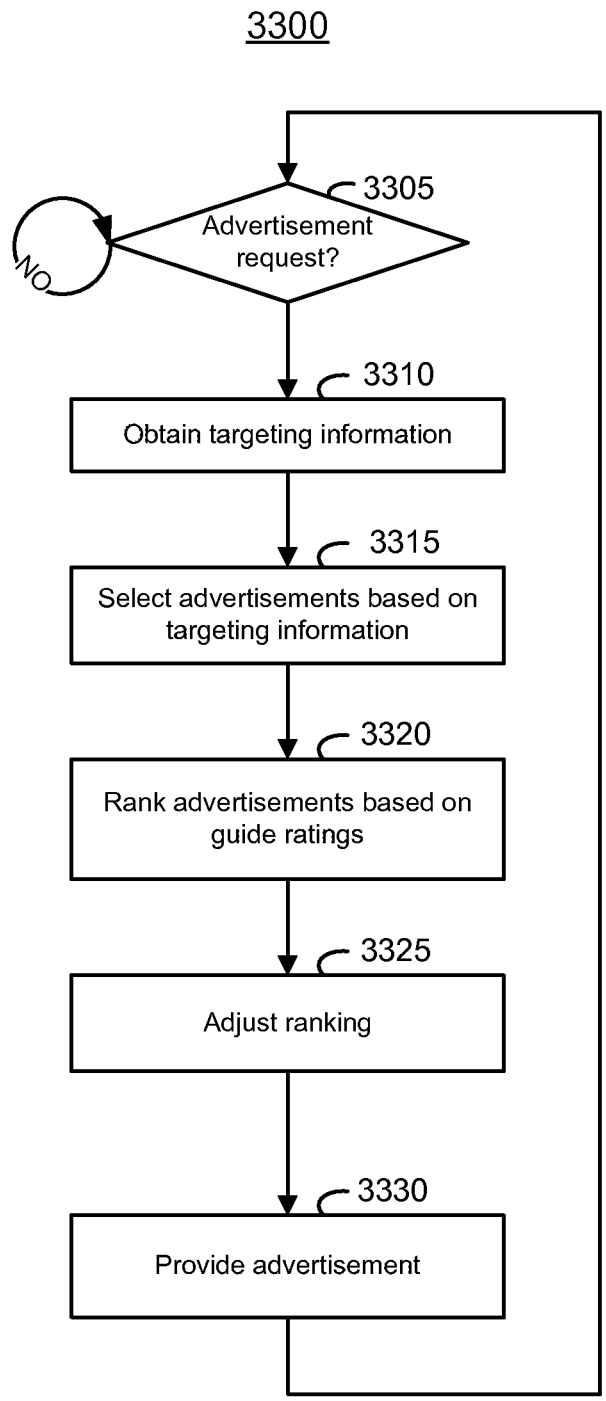
FIG. 33 is flowchart of selecting an advertisement responsive to a request.

As illustrated in FIG. 33, a process 3300 for processing a request for an advertisement is provided. In at least one embodiment, the process 3300 may be used to select a ping. The process 3300 may be performed in whole or in part by any suitable element of the system 2000 (FIG. 20). In at least one embodiment, the process 3300 (FIG. 33) is operative on a server associated with the search system 2030 (FIG. 20).

In operation 3305 (FIG. 33), a determination is made as to whether a request for an advertisement is received. If in operation 3305 it is determined that a request for an advertisement is not received, control remains at operation 3305 and process 3300 continues. If in operation 3305 it is determined that a request for an advertisement is received, control is passed to operation 3310 and process 3300 continues.

The determination in operation 3305 may be made based on various criteria. In at least one embodiment, receipt of a request at a server associated with the search system 2030 (FIG. 20) may be used to determine if a request for an advertisement is received. Content of an email message delivered according to SMTP or other email protocol, an IM, an SMS, MMS, EMS, voice, or other message may be examined to determine if a request for an advertisement is received.

In operation 3310 (FIG. 33), targeting information is obtained. In at least one embodiment, a message received in operation 3305 may be examined to determine targeting information associated with the request. In at least one embodiment, a knowledge taxonomy category, a keyword and/or a profile associated with a request are obtained. Any type of information may be used to target an advertisement, including inventory, history, etc. Control is passed to operation 3315 and process 3300 continues.

In operation 3315, advertisements are selected based on information obtained in operation 3310. In at least one embodiment, advertisements associated with an advertising taxonomy category, which are linked to the knowledge taxonomy category, and/or keywords identified in operation 3310, are selected. Control is passed to operation 3320 and process 3300 continues.

In operation 3320, advertisements selected in operation 3315 are ranked based on a rating obtained from a guide. In at least one embodiment, advertisements selected in operation 3315 are ranked based on ratings obtained from a guide associated with a category, keyword and/or profile obtained in operation 3310. A weighting factor may be applied to a rating in order to determine a ranking of an advertisement. In at least one embodiment, guide ratings are not utilized. Control is passed to operation 3325 and process 3300 continues.

In operation 3325, a ranking of an advertisement is adjusted. A ranking may be adjusted based on inventory information indicated in a record such as the advertiser record 2900 (FIG. 29). For example, if an advertisement has a high ranking from operation 3320, but the revenue (e.g., CPM) associated with the advertisement is low, the advertisement ranking may be lowered, or if a number of advertisements have the same CPA, an advertisement which has a higher ranking from operation 3320 may be ranked higher. Any suitable relationship may be used to adjust a ranking of an advertisement. In at least one embodiment, no adjustment is performed. Control is passed to operation 3330 and process 3300 continues.

In operation 3330, an advertisement is provided responsive to a request. An advertisement may be provided using any suitable communication service associated with a request received in operation 3305. In at least one embodiment, information of an advertisement may be provided responsive to a GET request received in operation 3305. Any number and/or type of advertisements may be provided. For example, a highest ranked advertisement, or the 3 highest ranked advertisements might be provided. Information of advertisement usage and rankings may be recorded in the database 2020 (FIG. 20). Control is passed to operation 3305 (FIG. 33) and process 3300 continues.

Figure 34:
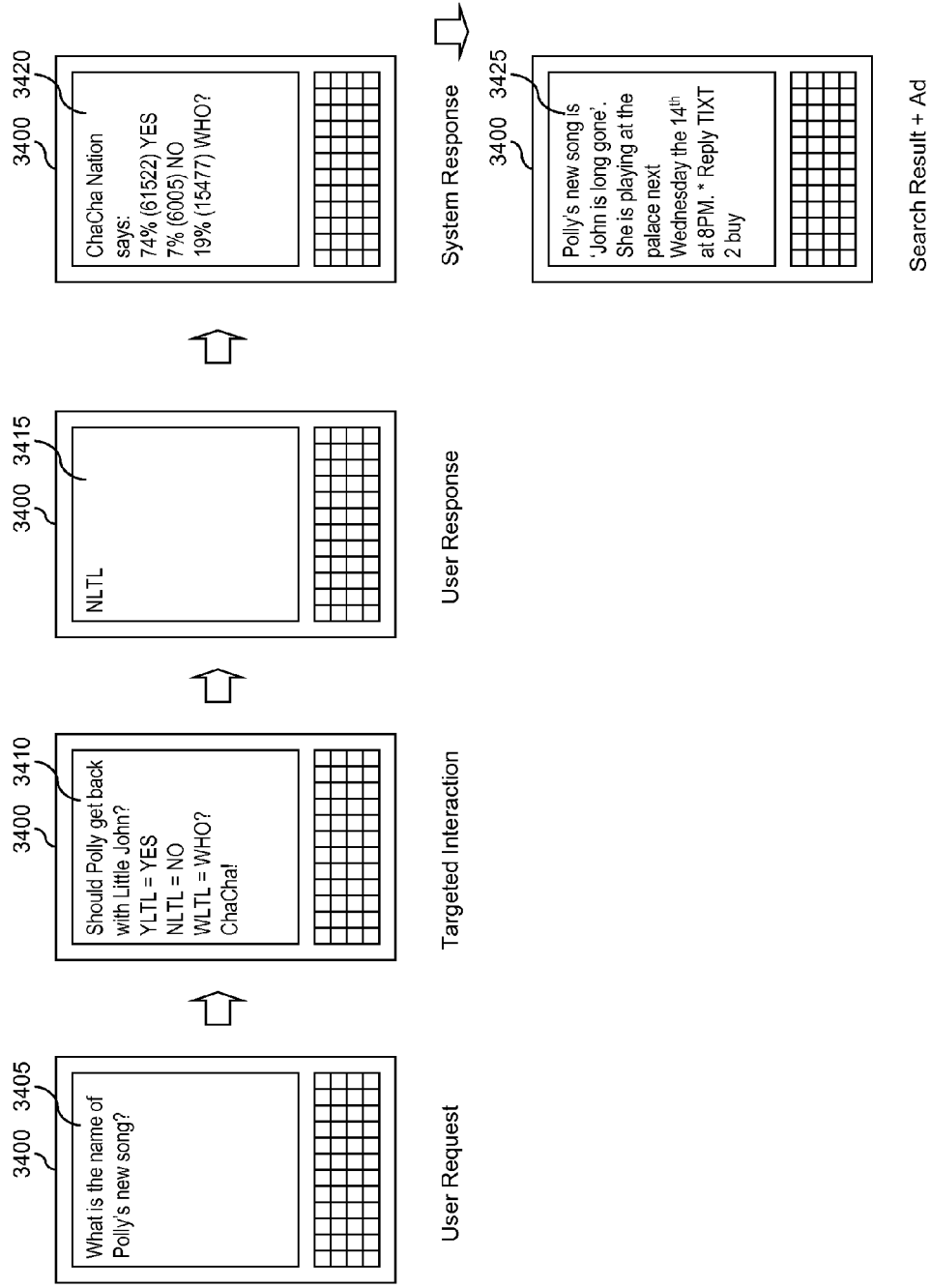
FIG. 34 is an exemplary sequence of messages for a basic user interaction.

As illustrated in FIG. 34, an exemplary sequence of messages in an interactive activity wherein an advertisement is not directly targeted is provided. A user device 3400 may send a query message 3405 to the search system 2030 (FIG. 20). Responsive to the query message 3405 (FIG. 34), an interactive activity message 3410 is selected and provided to the user device 3400. If a user elects to respond, the user may send a response message 3415 from the user device 3400. If the response message 3415 is received by the search system 2030 (FIG. 20), the search system 2030 may respond with an incentive message 3420 (FIG. 34). Subsequent to the incentive message 3420, the user device 3400 may receive a search result message 3425. In this instance, an interactive activity is used for entertainment and/or information gathering purposes. However, such information may also allow the search system 2030 to establish a rapport with a user and may be used at least in part to make inferences regarding a user. For example, if a user does not respond to an activity, it may indicate one element of a user's preferences, whereas a type of response may also indicate user preferences.

Figure 35:
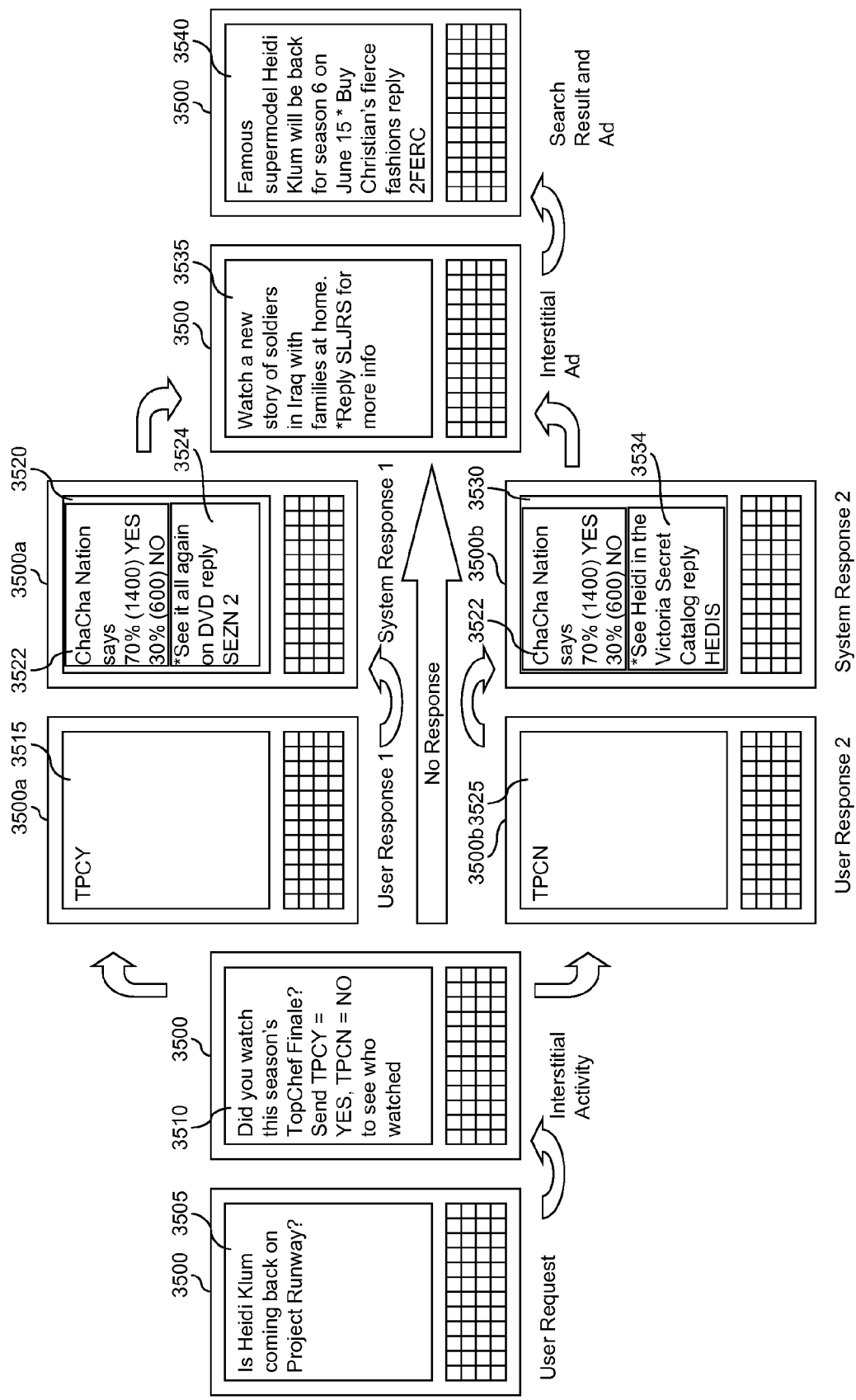
FIG. 35 is an exemplary sequence of messages for a complex user interaction.

As illustrated in FIG. 35, an exemplary sequence of message(s) associated with an interactive activity wherein an advertisement is directly targeted is provided. A user device 3500 may send a query message 3505 to the search system 2030 (FIG. 20). Responsive to the query message 3505 (FIG. 35), an interactive activity message 3510 is selected and provided to the user device 3500. If a user elects to respond, the user may send an affirmative response message 3515 from a user device 3500*a*. If the affirmative response message 3515 is received by the search system 2030 (FIG. 20), the search system 2030 may respond with an affirmative incentive message 3520 (FIG. 35). If a user elects to respond, a user may send a negative response message 3525 from a user device 3500*b*. If the negative response message 3525 is received by the search system 2030 (FIG. 20), the search system 2030 may respond with a negative incentive message 3530 (FIG. 35). The affirmative incentive message 3520 and the negative incentive message 3530 may include an incentive content 3522 (i.e. the poll results), but an affirmative advertising content 3524 may be different from a negative advertising content 3534.

If a user elects not to respond to the interactive activity message 3510, the user may receive an interstitial advertising message 3535. The users of the user device 3500*a* and the user device 3500*b* may receive the interstitial advertising message 3535, may receive a different interstitial advertisement, and/or may not receive an interstitial advertisement. The search system 2030 (FIG. 20) may provide a search result message 3540 (FIG. 35) responsive to the query message 3505.

The messaging sequences described in FIG. 34 and FIG. 35 are used for the purposes of illustration. Additional types, sequences, and combinations of messages and/or communication services which may be utilized to implement the messaging will immediately occur to one of ordinary skill in the relevant art and are included within the scope of the disclosure herein.

Using the methods and system described herein a user is presented with an interactive activity responsive to a search request. If a user elects to respond to an interactive activity, the user is rewarded with an incentive. A user response may be used to improve targeting of information to the user, which may improve performance of advertisements delivered to a user. At least some of interactive activities provided to a user may include a specific commercial targeting. If a user responds affirmatively to the targeted interactive activity, the user may receive an incentive, and may receive an advertisement targeted to the response of the user. As a user has expressed a specific interest in a merchant in question, a probability of a user response to the advertising may be greatly increased.

A user may receive interactive messages relating to topics which are determined to be of interest to the user based on various criteria including a profile of a user, user historical queries, queries from other users, etc. A user profile may be determined based on responses and/or lack of responses to an interactive activity which is offered to a user. Information of responses to an interactive activity may be provided to advertisers for purposes such as improving targeting of advertisements, bidding on placement of advertisements, understanding preferences by parameters such as geographic, demographic, affiliation, personality and/or other traits and characteristics.

A search system maintains a database of users, advertisers, search queries, search results, search resources, guides and other information which allows the search system to index and rank interactive activities or pings in order that targeting of the pings may be achieved. A search system may collect and aggregate user responses which may be used to provide incentives to users such as polling information, comparative scoring of users, etc., relating to a topic of a ping. User responses may be parsed according to location, demographics, etc., in order to provide incentives which may be of more specific interest to any user. A sequence of pings may be used to provide an interactive experience which may present advertising and/or other messaging responsive to a sequence of actions. In this way, a user preference may be elicited within a context which may be more palatable to the user. For example, advertisements might be presented in a gaming context whereby an advertisement is associated with a particular event within the game.

Using the methods and systems described herein, efficacy of advertising delivered to users by a search system is enhanced. An interactive activity is used to determine user interests, which allows for better assessment of user intent and advertising opportunities while reducing unwanted noise.

In a human assisted search system, it is important to maintain a 'human touch' for responses to users. However, if a human searcher is required to respond to each query, the cost of a personalized response may be high. Further, a human responder may add an unpredictable personalization message. For example, if a user requests a sports score and the responder is a fan of the opposing team, the personalized response may not be aligned with the expectations of the user, or may simply be neutral based on the selection of a guide or human responder, which may be unrelated to the characteristics of the user. The most cost-effective means to respond to a user request is an automated response which may be based on recognition of a user query and matching to a database of previously answered queries or a data feed which may provide an answer. However such a methodology produces a formulaic response which may be easily perceived as an automated reply, which defeats the 'human touch' objective.

In some instances, a programmatic response is appended to any computer generated result. Such responses are naturally limited and lack variation and personalization as the content of a query and/or a response to the query does not affect the message which is provided to the user responsive to the query. Likewise, if a blended response wherein a person interprets a query and passes the query to an automated resource is produced, the automated result provided to the user lacks the personality of the guide who responded to the query.

In light of the above and other problems a system and method for providing a personalized search result to a user which is based on characteristics of the user, the search result and a guide associated with the search result would be greatly appreciated.

If a request is received by a search system, a determination may be made regarding whether a search result may be provided using any form of automatic response. For example, if it is determined that query matches a previous query, it may be determined that a search result may be supplied automatically. If it is determined that an automated result may be provided, a personalization process may be applied to the result based on a resource associated with the result. A profile which may include previous search requests, search results, etc., which are associated with a user submitting a query may be analyzed in combination with content of the query and a search result in order to personalize the search result. Personalization of a search result may include appending a short comment which is selected based on processing of content of the search result, information of a user, and information of a query. If a search result is produced from an automated resource such as a data feed or RSS feed, content of the search result provided to a user may be based on the resource associated with the search result and information of a query. If a search result is produced by a human assistant or guide, content of the search result provided to a user may be based on information of the guide and information of a query.

A neural network or other form of learning algorithm may be used to define any or all content of a search result provided to a user responsive to a query or search request. Inputs to a neural network may be determined based on comments provided by guides associated with a category, keyword, resource, profile, advertiser, or other information which may be associated with a query. A learning algorithm may be trained using information derived from interactions between guides and users.

A method and system of improving user experience in a human assisted search system is described. The disclosed method and system allows a search system to provide a personalized response to a user by utilizing interconnecting characteristics determined by the search system to be used. A search request or "query" may be processed automatically and/or utilizing the assistance of a human assistant.

A query is compared to a database of queries to determine whether a search result which may satisfy the query is available. If it is determined that a search result is available, a personalization process is applied to the search result which may be based on information of the search result, a query, and/or a user associated with the query. In at least one embodiment, a fixed length message is reserved for a personalized comment which is derived from neural network based processing of a category and/or keywords of a search result and a query, and profile information associated with a user submitting the query. In at least one embodiment, keyword based queries which are formatted to trigger an automated response may be modified using personalization processing. For example, if a user requests a horoscope using a keyword, a response may be selected based on gender of the user, time of day, and a location associated with the user.

A first responder, or "expediter" guide, may perform operations which may include formulating and/or selecting a query which conforms to a specified grammar or "structured query" based on information associated with a search request, categorizing a search request, interacting with a user to obtain information relating to a search request, reviewing available search results and/or searchers, determining the scope of a request, determining the time-frame for a response, providing individual personalization to a request and/or other additional information associated with a request.

If an expediter determines that an automated search result may be provided to a user, the search result determined by the expediter may be modified using personalization processing. For example, if an expediter determines that a user is seeking weather information, a search result including the weather information may be produced automatically, and subsequently modified using a neural network output which is based on information of a user and content of the search result. Information of an expediter may be used to personalize a search result. For example, if an expediter is female, a search result may be different than if the expediter is male. Alternately, a user may indicate a preference which may override characteristics of an expediter. This feature may be used in various ways. For example, if a user designates a preference for a young male guide to respond to a request, automated and/or expedited responses might be personalized to fit that profile. Similarly, in order to avoid redundant use of identical personalized responses, characteristics of guides may be used as inputs to a statistical processor which chooses a personalization response. As the guide may be selected in a pseudo random manner, characteristics of guides may allow the system to maintain a diversified response without the need to necessarily track previous responses provided to a user.

Subsequent to processing by an expediter, it may be determined that a search is to be performed by a guide responsive to query. If a guide provides a search result, the search result may be modified using personalization processing. For example, a comment which was not provided by the guide may be added to a result, or content of a result may be modified, etc. Thus a specialist guide may produce a search result, but is not required to provide a friendly comment to the user, as the system may provide the needed personalized commentary.

A personalization processor may be associated with any type of search result. In at least one embodiment, a personalization processor may be associated with a search resource which produces a search result. Personalization processing may be customized based on reference training sets. In at least one embodiment, profile information associated with guides, queries associated with guides, users, guide comments, and auxiliary data based on historical searches is provided in order to determine an algorithm used by a personalization to process a search result provide to a user.

In at least one embodiment, guide comments generated by a personalization process may be provided in place of an original comment by a guide. In at least one embodiment, user preferences may be used to determine a profile which may be used to personalize a search result. In at least one embodiment, advertisements may be modified by a personalization processor. A profile of an ambassador guide who has produced a search result may be used as an input to a personalization processor. A random number generator, which may be associated with a user, may also be applied to a profile associated with a personalization processor.

Use of a personalization processor may be optional or mandatory. A personalization processor may assist a guide in selecting a comment and/or response, which may reduce time required for a guide to respond to a request or query.

A system embodiment, method, data structure and interface for operating the embodiments are described below in detail.

A "user" may be any person or entity which may submit a request or search request. A "request", search request or query is information which may be submitted using any communication service which may be able to access a search service as further described herein below.

A "guide" may be any person who may be compensated and/or may be a volunteer who may respond to a request. An "expediter" is a guide who may perform processing of a request and/or a search result. A "searcher" is a guide who may perform an information search responsive to a request.

A "raw query" is a request submitted by a user, which may include any type of information provided by a user and/or associated with a user. A "vetted query" includes a request which is associated with a category, a structured query, or otherwise qualified query. A "structured query" is a question formulated according to a structured grammar. In at least one embodiment, a grammar construction required for a structured query is a question. A structured query may also be referred to as a "succinct query".

An "identifier", or ID, is a group of characters, numbers and/or other types of information which may be used to identify an item. A "guided request" is a request which uses the assistance of one or more guides.

A "result", or "search result", is any information which may be provided responsive to a request. A search result includes but is not limited to any of an advertisement, a link to a web page, a message of any sort, image, audio, text, games, interactive media and/or software of any sort.

A "search resource", or resource, is any source of information which may be used to obtain a search result. A search resource includes automated and/or human-assisted systems, and any type of media and/or systems which may provide information.

A "profile" is a group of one or more characteristics which may be associated with a person. Profile characteristics include but are not limited to demographic, geographic, personality, affiliations, areas of interest, historical actions, preferences, memberships, associations, etc.

Figure 36:
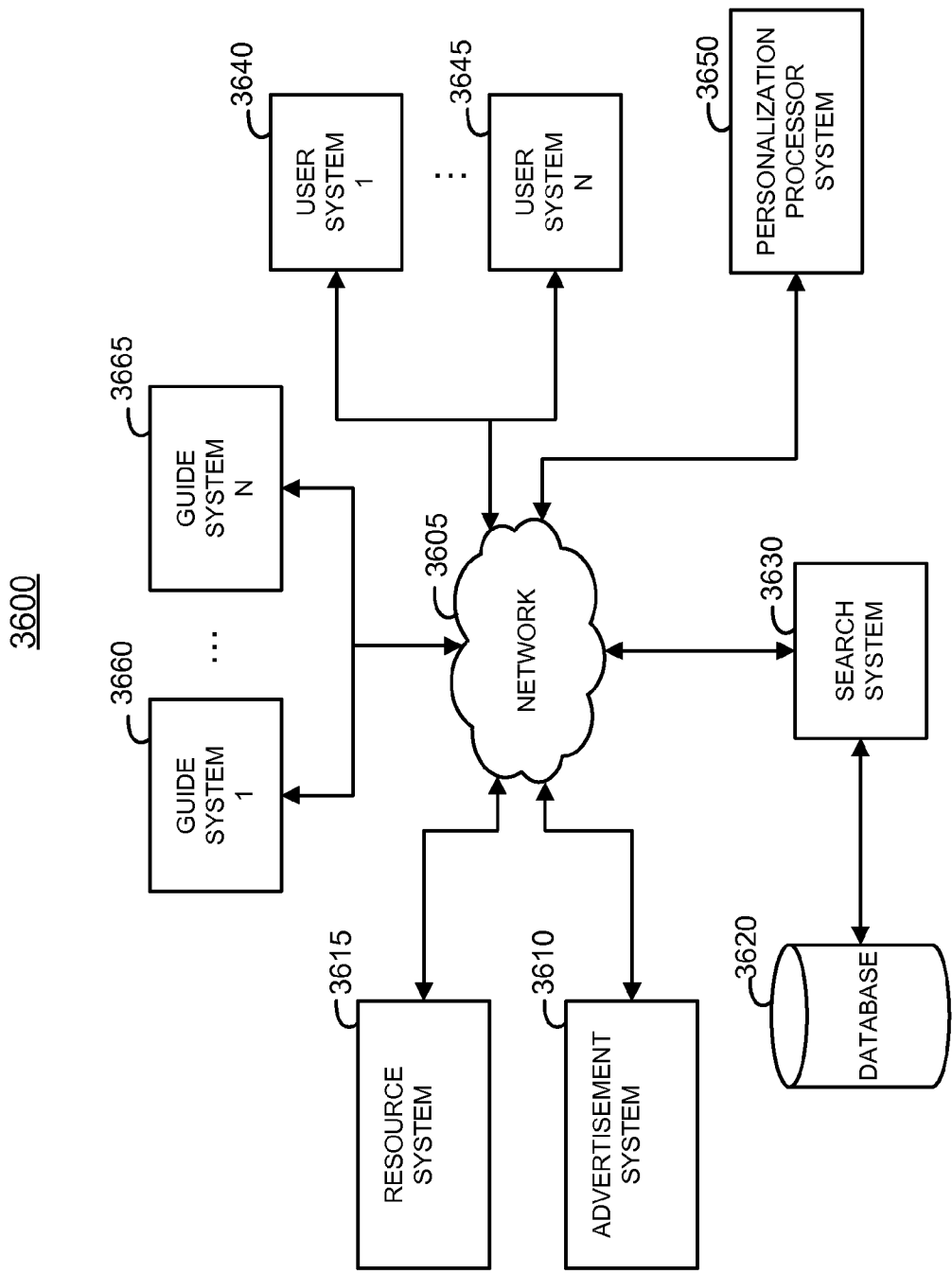
FIG. 36 is a block diagram of a system embodiment.

An exemplary system embodiment is illustrated in FIG. 36. A system 3600 includes a network 3605, advertisement system 3610, resource system 3615, a database 3620, a search system 3630, user systems 3640, 3645, a personalization processor system 3650, and guide systems 3660, 3665.

Each of the guide systems 3660, 3665, can be operated by a guide to obtain a search result on behalf of a user located at a user system (e.g., the user systems 3640, 3645). While only a limited number of guide systems, user systems, resource systems, advertisement systems, and personalization processor systems are depicted in FIG. 36, it is envisioned that many user, guide, resource, advertisement, and personalization processor systems may be utilized.

The network 3605 (FIG. 36) may be a global public network of networks (e.g. the Internet) and/or consist in whole or in part of one or more private networks and communicatively couples the guide systems, the resource system, the advertisement system and user systems with the other components of the system 3600 such as the search system 3630, the personalization processor system 3650 and the database 3620. The network 3605 may include any or all of a wireless network such as a cellular phone network, a WiMax network, a WiFi network, etc., a network such as the Public Switched Telephone Network (PSTN), or any other type of communication network.

The search system 3630 allows interaction to occur between the guide systems 3660, 3665, the advertisement system 3610, the resource system 3615, the user systems 3640, 3645, and the personalization processor system 3650. For example, a request can be transmitted from the user system 3640 to the search system 3630, where a request can be accessed by the guide systems 3660, 3665, and/or the personalization processor system 3650. Similarly, a search result produced using the guide systems 3665, in response to a request produced by the user systems 3645, may be transmitted to the search system 3630 where it may be stored and/or transmitted to the user systems 3645, and/or the personalization processor system 3650.

It is within the scope of the disclosure that the user systems 3640, 3645, may include any device through which an information seeker can submit a request to and/or receive information or a search result from the search system 3630. In at least one embodiment, the user system 3640 may be a device configured for connection to a network and may run web browser software. Thus, the user systems 3640, 3645, may be a portable or laptop computer, a personal data assistant (PDA), a desktop computer such as a PC or Mac®, a workstation or a terminal connected to a mainframe, a specialized search apparatus, or a smart phone, etc. Any device which can communicate using Internet Protocol (IP) may be a user system, a guide system, an advertisement and/or a resource system within the scope of the disclosure. A user and/or guide system may be a device configured to communicate via mobile data network such as a mobile telephone carrier service, thus any device which may communicate via wireless network using GSM, GPRS, CDMA, or other technologies well known in the relevant art. In at least one embodiment, a Short Messaging Service (SMS) enabled mobile phone may be a user system.

The search system 3630 may include a gateway for voice communication and a speech-to-text system or other transcription device and/or personnel to facilitate access to the search system via voice communications such as through a land line phone, cellular phone, Voice over Internet Protocol and/or other telephonic device. Any device which may be used to communicate using voice (or speech) may be a user system, and/or a guide system.

The search system 3630 may include hardware and/or software interface to a system which provide communication services such as Instant Messaging (IM), email, Short Messaging Service (SMS), Enhanced Messaging Service (EMS), Multimedia Messaging Service (MMS), and/or other forms of messaging services. Any device which may communicate using such services may be a user system and/or a guide system within the scope of the disclosure herein. A request may be submitted to the search system 3630 using any or all communication services which are able to communicate with the search system 3630.

Although the search system 3630 is illustrated as a single system, the search system 3630 may include any number of hardware systems, such as the personalization processor system 3650, which may function as servers or other elements. For example, a server functionality associated with any of the communication services identified herein may be implemented to allow messages to be transmitted between the elements of the system 3600. Servers such as the PowerEdge® 2900 by Dell, or the BladeCenterJS22 by IBM, or equivalent systems might be used to implement elements of the search system 130. The search system may utilize an operating system (OS) such as Microsoft Windows XP, or Linux, etc. Voice routing and packet switching may be accomplished using well established technologies such as those provided by Cisco, or other networking companies. Any suitable computer hardware and/or software well known in the art may be used to implement the search system 3630.

The search system 3630 is communicatively coupled with the personalization processor system 3650. As will be described herein below, the personalization processor system 3650 includes processes that are performed during operation of the embodiments. Although FIG. 36 illustrates the personalization processor system 3650 as a separate component of the system 3600, the personalization processor system 3650 may be integrated with the search system 3630. Further, the processes performed by the personalization processor system 3650 may be applied in any typical manner, including utilization of any neural network software applications including research simulators and data analysis simulators and/or any development environments which may include capabilities for advanced preprocessing and analysis.

The search system 3630 is communicatively coupled with the database 3620. As will be described herein in further detail below, the database includes data that is processed during operation of the embodiments. Although FIG. 36 illustrates the database 3620 as a separate component of the system, the database 3620 may be integrated with the alternate search system 3630. The records maintained in the database 3620 may also be stored in any typical manner, including in a Network Attached Storage (NAS), a Storage Area Network (SAN), etc., using any typical or proprietary database software such as DB2®, Informix®, Microsoft® SQLServer™, MySQL®, Oracle®, etc., and may also be a distributed database on more than one server. Elements of the database 3620 may reside in any suitable elements of the system 3600. For example, elements of the database 3620 may be stored in any storage media accessible to a user system, a guide system, a resource system and/or an advertisement system. After being presented with the disclosure herein, one of ordinary skill in the art will readily appreciate that the computer systems of the embodiments can be any type of viable systems known in the art.

In the disclosed system and method, guides (or searchers) may be required to register with the search system 3630, and in certain embodiments undergo training prior to being permitted to provide responses to requests submitted by a user utilizing the search system 3630. In at least one embodiment, a prospective guide may also be invited to register as a guide with the search system 3630. In such a system, a previously registered guide or an affiliate group may initiate the invitation process and thereby be designated as a sponsor for the invited guide. In one embodiment of the disclosed system and method, a prospective guide is sent an email invitation to register as a guide with the search system 3630. The email invitation may contain a link to a guide registration page and/or some indicia recognizable by the search system 3630 as to the person or entity that invited a prospective guide to register so that upon registration, the person or entity may be accredited with sponsorship of the invited guide.

Should a prospective guide elect to register as a guide with the search system 3630, the prospective guide may initiate a registration process by selecting a link that directs the guide's web browser to a URL of a guide registration page generated by a web server function of the search system 3630 (FIG. 36). While registration of a prospective guide is described with respect to the search system 3630 providing pages to a browser, the present invention is not limited to any particular configuration for registering guides. For example, a system dedicated to registration of guide may be provided which is separate from the search system 3630.

A prospective guide may elect to be a searcher and/or an expediter and/or to perform other activities. A prospective guide may undergo training and/or testing which may be used to determine whether a guide is competent to perform a task. After completion of testing and/or training, a guide may be allowed to perform a task. A guide may act as an expediter and/or as a searcher based on completion of training and/or testing. An expediter processes a user search request and/or a search result. A searcher may receive a processed request and may perform a search responsive to the processed request. Various criteria may be considered for determining whether a guide may act as an expediter and/or a searcher including, but not limited to, time spent as a guide, level of knowledge in particular area, etc. In at least one embodiment, the guide roles of expediter and searcher may be mutually exclusive.

The performance of an expediter may be monitored. Multiple feedback mechanisms may be utilized including ratings by one or more users, guides, or other persons, time required to complete a task, complexity rating of a query, and/or other speed and/or quality metrics. In at least one embodiment, a rating of an expediter may be based on the number of queries which are answered without requiring a searcher to perform a search for the query.

As illustrated in FIG. 37, an exemplary user record is provided, of which one or more may be associated with or resident in the database 3620 (FIG. 36). The user record 3700 may contain a user ID field 3705, a user profile ID field 3710, a user request ID field 3715, a user result ID field 3720, a user advertisement ID field 3725, a user communication info field 3730 and a user settings ID field 3735.

The user ID field 3705 contains an identifier of a user, which is preferably unique and used consistently. For example, in at least one embodiment, the user ID field 3705 can include a randomly generated numerical code, and/or a string indicating a user. A user record ID serves to distinguish a user record associated with a user from a user record associated with other users. Although particular examples of identifiers are described herein, other types of identifiers uniquely indicating a user may be utilized without departing from the spirit and scope of the embodiments. In at least one embodiment, the user ID is a text string. A user ID may include a telephone number, an IP address, a MAC address, an email address, a username, an IM credential, etc. In at least one embodiment a phone number associated with a user device is the user ID. Using the example illustrated in FIG. 37, 'User1' is the user ID associated with the user record 3700.

The user profile ID field 3710 may include information of a profile associated with a user. For example, demographic, geographic, personality, affiliation, and/or other information which may be used to characterize a user may be indicated in the user profile ID field 3710 by the profiles 'DemoprofileU1', 'GeoprofileU1', and 'PersprofileU1' associated with 'User1'. In at least one embodiment, information indicated in the user profile ID field 3710 is obtained from a user in a registration process. In at least one embodiment, profile information of a user profile is determined from previous queries, search results, advertisements, purchase and/or other historical information of a user. User profile information may be obtained based on testing, game playing and/or other user activities. Profile information of a user may be used to personalize a result.

The user request ID field 3715 may include an identifier of requests associated with a user. Any indicator of a user request may be indicated in the user request ID field 3715. An identifier of a request associated with a user may be added to the user request ID field 3715 when a request is received by the search system 3630 (FIG. 36) from a device associated with the user. In at least one embodiment, an identifier of a user may be indicated in an identifier of a request associated with the user. As illustrated in FIG. 37 'User request1' and 'User request2' are associated with 'User1'.

The user result ID field 3720 may include information of a result associated with a user. Content of the user result ID field 3720 may be modified based on an action of a user and/or a guide. If a user receives a result responsive to a request, an identifier of the result may be included in the user result ID field 3720. A usage indicator associated with a result provided to a user may affect a rating and/or ranking associated with a guide. Using the example illustrated in FIG. 37, 'Result1.1', 'Result1.2' and 'Result2.1' are associated with the user 'User1'. This may indicate that 'User1' has been presented with the results 'Result1.1', 'Result1.2', and 'Result2.1'.

The user advertisement ID field 3725 may include information of an advertisement associated with a user. Content of the user advertisement ID field 3725 may be modified based on an action of a user. If a user receives an advertisement, an identifier of the advertisement may be included in the user advertisement ID field 3725. A usage indicator associated with an advertisement provided to a user may affect a rating and/or ranking associated with a guide, compensation for the search system 3630 (FIG. 36), and/or rating and/or ranking of an advertisement. Using the example illustrated in FIG. 37, 'Advert1' and 'Advert2' are associated with 'User1'. This may indicate that 'User1' has been presented with 'Advert1', and 'Advert2'. In at least one embodiment, an advertisement may be provided as an interstitial response as described with respect to FIG. 38, and may be personalized using a personalization process.

The user communication info field 3730 may include information of a device and/or service associated with a user. Content of the user communication info field 3730 may be modified based on an action of a user. If a user establishes communications using a device and/or service, information regarding the device and/or service may be included in the user communication info field 3730. Any type of communication service and/or system may be indicated in the user communication info field 3730. For example, a username and/or password associated with a user may be indicated in the user communication info field 3730. Communication services such as IM, e-mail, SMS, MMS, EMS, telephone, wireless or wired communication, etc., may be indicated in the user communication info field 3730. A telephone number, an email address, an IM provider and login ID, a keyword associated with a service, etc., may be indicated in the user communication info field 3730. Using the example illustrated in FIG. 37, the login 'user1', the email 'user1@chacha.com', the Twitter™ service account 'twitter:user1' and the phone number '317.924.2242' are associated with 'User1'. This may indicate that 'User1' may be contacted using the login ID 'user1', via email at 'user1@chacha.com', via Twitter as 'user1' and/or via voice, text, and/or other service associated with the phone number '317.924.2242'. A result may be personalized based on a service which is to be used to deliver a result to a user. For example, a constrained messaging system may allow a reduced solution space which may be amenable to personalization where a less constrained solution space may not use personalization processing.

The user settings ID field 3735 may include information of a preference associated with a user. For example, a user may indicate a type of personality which the user wishes to be associated with a response. A user may directly indicate a preference, by for example selection of an item in a user interface, or other communication with a search service. A user preference may be inferred based on analysis of a query history associated with the user. For example, a guide might determine that a user is youthful and male and prefers responses suitable for that demographic, or an automated analysis of a user history might determine a preference for formatting of responses of various types. In at least one embodiment, different preferences may be associated with different types of responses. Using the example illustrated in FIG. 37, 'Preference1' might be a personalization associated with responses to sporting events, while 'Preference2' might be a personalization associated with responses based on previous search results.

As illustrated in FIG. 38, an exemplary guide record 3800 is provided, of which one or more may be associated with or resident in the database 3620 (FIG. 36). The guide record 3800 may include a guide ID field 3805, a guide category ID field 3810, a guide keyword ID field 3815, a guide profile ID field 3820, a guide result ID field 3825, a guide communication info field 3830, a guide request ID field 3835, a guide advertisement ID field 3840, a guide system training rank field 3845, and a guide vote weighting field 3850.

The guide ID field 3805 preferably contains a unique identifier of a guide which is used consistently. For example, in at least one embodiment, the guide ID field 3805 can include a randomly generated numerical code, and/or a text string indicating a name associated with a guide. A guide ID serves to distinguish the guide record associated with a guide from a guide record associated with other guides. Other unique identifiers of a guide may be utilized without departing from the spirit and scope of the embodiments. Using the example illustrated in FIG. 38, 'Guide1' is the guide ID associated with the guide record 3800.

The guide category ID field 3810 may include information of a number of categories associated with a guide. Content of the guide category ID field 3810 may be modified based on an action of a guide. A category may be associated with a guide based on one or more types of information processing. For example, the category 'translate English to Spanish', or 'transcribe spoken queries' or 'Sports' might be associated with a guide to indicate a skill or expertise associated with the guide. A category associated with a guide may be used to rank a guide and may be used to select a guide. For example, if a request is associated with a category, a ranking of a guide associated with the category may affect the probability that a guide will be selected to respond to the query. A person may select a category and/or a keyword which is associated with a guide. A category may be associated with a guide based on testing of a guide. A category may be associated with a guide based on an affiliate group associated with the guide. For example, if a guide has chosen to be affiliated with affiliate groups associated with a type of food, a category associated with the type of food might be associated with the guide. A category may signify any type of skill or expertise which may be used to match a guide to a task, such as transcription, expediting, searching, etc. A category associated with a guide may be used to select an item which is to be presented to a guide. A guide may be selected to review an item based on the association of a guide with a category. For example, a guide may be selected to review and/or provide information such as resources, media, results, etc., based on a category associated with the guide. Using the example illustrated in FIG. 38, 'GuideCategory1' and 'GuideCategory3' are associated with 'Guide1'.

The guide keyword ID field 3815 may include information of a number of keywords associated with a guide. Content of the guide keyword ID field 3815 may be modified based on an action of a guide. A person may select a keyword which is associated with a guide. For example, a guide may select a keyword to be associated with the guide during a registration process. A keyword may be associated with a guide based on testing of a guide. For example, a guide may be required to demonstrate knowledge of a category and/or keyword in order to be associated with the keyword. Content of the guide keyword ID field 3815 may be compared to content of a request in order to determine a ranking of a guide for responding to a request. For example, if a keyword indicated in the guide keyword ID field 3815 is associated with content of a request, the guide may be more likely to be selected to respond to the request. Using the example illustrated in FIG. 38, the keywords 'Purdue', 'basketball' and 'fishing' are associated with 'Guide1'. This may indicate that 'Guide1' has indicated an interest in 'Purdue', 'basketball' and 'fishing'.

The guide profile ID field 3820 may include information of a number of profiles associated with a guide. Content of the guide profile ID field 3820 may be modified based on action of a guide. A person may select a profile which is associated with a guide. For example, a guide may select a profile to be associated with the guide during a registration process. A profile may be associated with a guide based on testing of a guide. For example, a guide may be required to demonstrate knowledge relevant to a profile in order to be associated with the profile, or a guide may take a test which is used to generate a profile, or a guide may provide information such as demographic, geographic, personality or other information which may be indicated in a profile associated with the guide. Information indicated in a guide profile may be obtained from an external database. Information indicated in the content of the guide profile ID field 3820 may be compared to information indicated in content of a profile associated with a request in order to determine a ranking of a guide for responding to a request. Likewise, a profile associated with a guide may be used to select and/or rank a guide. Using the example illustrated in FIG. 38, 'Demoprofileg1', 'Geoprofileg1' and 'Persprofileg1' are associated with 'Guide1'. This may indicate that 'Guide1' has indicated and/or generated 'Demoprofileg1' which may be a demographic profile, 'Geoprofileg1' which may be a geographic profile and 'Persprofileg1' which might indicate personality information regarding 'Guide1'. Any or all information indicated in a profile associated with a guide may be used to determine a rating and/or ranking of a guide.

The guide result ID field 3825 may include information of a result associated with a guide. Content of the guide result ID field 3825 may be modified based on an action of a guide. If a guide produces a search result responsive to a request, an identifier of the search result may be included in the guide result ID field 3825. A rating and/or ranking associated with a search result associated with a guide may affect compensation for a guide. Likewise a usage indicator associated with a search result provided by a guide may affect a rating and/or ranking associated with a guide. Using the example illustrated in FIG. 38, 'Result1.1', 'Result3.1' and 'Result3.2' are associated with 'Guide1'. This may indicate that 'Guide1' has provided and/or reviewed 'Result1.1', 'Result3.1', and 'Result3.2'. Personality snippets associated with 'Result1.1', 'Result3.1' and 'Result3.2' might be associated with a profile, category, or keywords associated with 'Guide1'.

The guide communication info field 3830 may include information of a device and/or service associated with a guide. Content of the guide communication info field 3830 may be modified based on an action of a guide. If a guide establishes communications using a device and/or service, information regarding the device and/or service may be included in the guide communication info field 3830. Any type of communication service and/or system may be indicated in the guide communication info field 3830. For example, a username and/or password associated with a guide may be indicated in the guide communication info field 3830. Communication services such as IM, e-mail, SMS, MMS, EMS, telephone, wireless or wired communication, etc., may be indicated in the guide communication info field 3830. A telephone number, an email address, an IM provider and login ID, a keyword associated with a service, etc., may be indicated in the guide communication info field 3830. Using the example illustrated in FIG. 38, the login 'guide1', the email 'guide1@chacha.com', the IM credential 'guide1@AIM' and the phone number '317.224.2242' are associated with 'Guide1'. This may indicate that 'Guide1' may be contacted using the login ID 'guide1', via email at 'guide1@chacha.com', via IM as 'guide1@AIM' and/or via voice, text, and/or other service associated with the phone number '317.224.2242'.

The guide request ID field 3835 may include information of a request associated with a guide. Content of the guide request ID field 3835 may be modified based on an action of a guide. If a guide produces a search result responsive to a request, an identifier of the request may be included in the guide request ID field 3835. A rating and/or ranking associated with a request, associated with a guide, may affect compensation for a guide. Likewise a usage indicator associated with a request and a guide may affect a rating and/or ranking associated with the guide. A request may be associated with a guide based on a vote cast by a guide regarding items associated with the request. Using the example illustrated in FIG. 38, 'User request1', and 'System request3.1' are associated with 'Guide1'. This may indicate that 'Guide1' has responded to, been selected to respond to, and/or has reviewed one or more item associated with 'User request1', and 'System request3.1'.

The guide advertisement ID field 3840 may include information of a number of advertisements associated with a guide. For example, if a guide selects an advertisement to be provided responsive to a request, an identifier of the advertisement may be indicated in the guide advertisement ID field 3840. If an advertisement is provided responsive to a request to which a guide responded, an identifier of the advertisement may be indicated in the guide advertisement ID field 3840. Using the example illustrated in FIG. 38, 'Advert1' is associated with 'Result1.1', 'Advert3' is associated with 'Result3.1', and 'Advert4' is associated with 'Result3.2'

The guide system training rank field 3845 may include information regarding weighting of a guide response for purposes of training a personalization processor. A weighting factor may be associated with various types of inputs to a personalization processor which may be associated with a guide. For example, if a guide has a high rating associated with a profile, a category, a keyword, etc. which might be used to determine an output from a personalization processor, a system training rank of the guide associated with the variable might be high. A rating of a guide associated with a system training variable may be determined based on any suitable criteria such as reviews by system administrators, user responses, peer rating, etc. In at least one embodiment, the guide system training rank field 3845 includes a ranking associated with a guide categories, guide keywords, and guide profiles. Using the example illustrated in FIG. 38, the rank '5' is associated with categories for 'Guide1', the rank '9' is associated with the keywords of 'Guide1' and the rank '2' is associated with the profiles of 'Guide1'

The guide vote weighting field 3850 may include information of a number of weighting factors associated with a guide. In at least one embodiment, guide opinions may be used to identify and/or weight elements of a training set. For example, if a guide selects a search result including a type of personalization, that type of personalization might be determined to be preferred by users with a similar characteristic to the guide. To better utilize an opinion expressed by a guide, a weighting may be applied to normalize the relative value of opinions or votes of different guides based on experience, etc. A weighting associated with a vote might be associated with any item. In at least one embodiment, a weighting is associated with categories, keywords, and profiles associated with a guide. Using the example in FIG. 38, the weight '2' is associated with categories, and the weight '0.5' is associated with keywords and profiles for 'Guide1' which may indicate that 'Guide1' has provided well correlated personality snippets for categories, but is poorly correlated for keywords and profiles.

A guide may perform various tasks. In at least one embodiment, a group of guides may be aggregated to provide training sets to a personalization processor. In at least one embodiment, guides may be provided with phrase inputs to a personalization process which as optional selections for adding a comment to a search result. If a guide associated with a profile selects an input, the selection may be provided to a personalization processor associated with the input. For example, if a female guide under thirty in California selects a phrase and if a future result which is to be personalized is associated with the 'female guide under thirty' profile, then the phrase may be more likely to be selected. A guide who has a more detailed profile may have greater influence on personalized responses. A ranking and/or weighting of a guide may influence how a training set is used. In an embodiment, data maintained in a personalization processor system 3650 (FIG. 36) is selectively provided to user(s) meeting a condition associated with the data. For example, first and second users submitting a request that is substantially similar may be provided with different results based on data stored in the personalization processor system 3650. In an embodiment, data in the personalization processor system 3650 is adjusted or changed based on recent input from an authorized user and/or guide.

Figure 39:
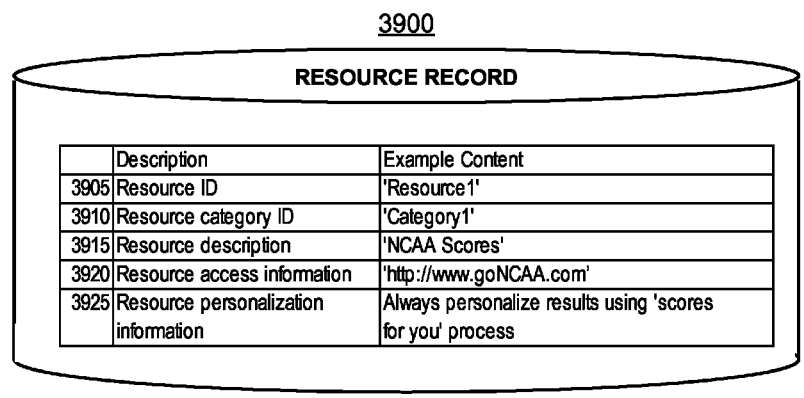
FIG. 39 illustrates a database record for a resource.

As illustrated in FIG. 39, an exemplary resource record 3900 is provided, of which one or more may be associated with or resident in the database 3620 (FIG. 36). The resource record 3900 may include a resource ID field 3905, resource category ID field 3910, a resource description field 3915, a resource access information field 3920, and a resource personalization information field 3925.

The resource ID field 3905 contains an identifier of a resource, which is preferably unique and used consistently. For example, in at least one embodiment, the resource ID field 3905 can include a randomly generated numerical code, and/or a string indicating a resource. A resource record resource ID serves to distinguish a resource record associated with a resource from a resource record associated with other resources. Although particular examples of identifiers are described herein, other types of identifiers uniquely indicating a resource may be utilized without departing from the spirit and scope of the embodiments. In at least one embodiment, the resource ID is a text string. A resource ID may include a resource description, a random number, and/or any other information which uniquely identifies a resource. Using the example in FIG. 39, 'Resource1' is the resource ID associated with the resource record 3900.

The resource category ID field 3910 may include information of a category associated with a resource. The content of the resource category field 3910 may be used to select a resource to be associated with a request. Content of the resource category field 3910 may be used to select a resource to be presented to a searcher when processing a request associated with a category. Using the example in FIG. 39, 'Category1' is the category associated with the resource record 3900. This may indicate that the resource 'Resource1' may be presented to a guide and/or a user responsive to a search request associated with the category 'Category1'. In at least one embodiment, content of the resource description field 3915 may be used to identify a resource to a person. In at least one embodiment, 'Resource1' may provide an automated response. An automated response may be based on information provided by a guide.

The resource description field 3915 may include information of a description associated with a resource. Using the example illustrated in FIG. 39, 'NCAA Scores' is the description associated with 'Resource1'. The description associated with a resource may originate from various sources. For example, the text 'NCAA Scores' in the resource access information field 3920 may be a header of a URL, a metatag associated with a URL, a title of a white paper and/or any other text associated with the resource.

The resource access information field 3920 may include information regarding accessing a resource. For example, a URL which may be included in the resource access information field 3920 may be activated when a person selects a hyperlink associated with the resource. Access information associated with a resource may, for example, include information of an API associated with the resource which may define how information is provided to a resource and/or how information is received from the resource. The URL <'http://www.goNCAA.com'> is the resource access information associated with 'Resource1'.

The resource personalization information field 3925 may include information of a personalization process which is associated with a result provided by a resource. A resource may not be associated with a personalization process, a resource may have a personalization process which is used if the resource produces an automated result, or a resource may designate that a particular type of result is to be personalized. For example, a resource such as an automated feed which provides weather or sports information may always be personalized, or a resource which does not provide automated results may be personalized only if space is available in a message, or a resource providing advertising may designate certain advertisements or sponsored results to be personalized based on a category, etc.

Figure 40:
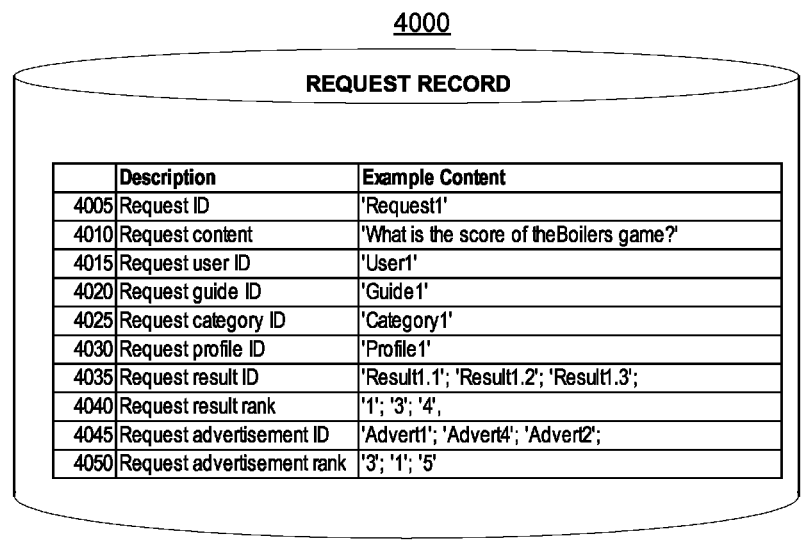
FIG. 40 illustrates a database record for a request.

As illustrated in FIG. 40, an exemplary request record 4000 is provided, of which one or more may be associated with or resident in the database 3620 (FIG. 36). The request record 4000 may include a request ID field 4005, a request content field 4010, a request user ID field 4015, a request guide ID field 4020, a request category ID field 4025, a request profile ID field 4030, a request result ID field 4035, a request result rank field 4040, a request advertisement ID field 4045, and a request advertisement rank field 4050.

A request record may be created responsive to various activities. For example, a guided search session, an interactive training session, a non-interactive training session, submission of a request by a user, and/or other types of activity may cause a request record to be created and/or modified. A request record may be imported from an external resource, a database, and/or any media accessible to the search system 3630 (FIG. 36).

The request ID field 4005 preferably contains a unique identifier of a request which is used consistently. For example, in at least one embodiment, the request ID field 4005 can include a randomly generated numerical code, and/or a text string indicating content of a request. A request ID serves to distinguish the request record associated with a request from a request record associated with other requests. Other unique identifiers of a request may be utilized without departing from the spirit and scope of the embodiments.

A unique identifier may be assigned to a request when it is received. A request may include information that is not explicitly provided by a user. For example, location information, profile information, time, etc., may be associated with a request. As illustrated in FIG. 40, 'Request1' is the request ID associated with the request record 4000.

The request content field 4010 may include information regarding content of a request. For example, text associated with a query submitted by a user may be indicated in the request content field 4010. Content of the request content field 4010 may be processed in order to associate a keyword, category and/or other information with a request. In at least one embodiment, a structured query which conforms to a specific context may be indicated in the request content field 4010. User requests which are associated with a structured query which may have been submitted by a number of users may be indicated in the request content field 4010. Information such as audio recordings, images, etc., which are associated with a request may be indicated in the request content field 4010. Using the example illustrated in FIG. 40, the query 'What is the score of the Boilers game?' is the content associated with the request record 4000. This may indicate that the query 'What is the score of the Boilers game?' may be processed in order to respond to 'Request1'. Information indicated in the request content field 4010 may be used to determine which information associated with an index may be provided responsive to a request. For example, keywords associated with a transcription of the request 'What is the score of the Boilers game?' may compared to interests, topics or keywords associated with an index to determine a number of categories associated with the request 'Request1'. Categories associated with keywords of a request may be ranked to determine a category associated with a request.

The request user ID field 4015 may include information of a user that submitted a query. The request user ID field 4015 may be used to associate any number of users with a query. In at least one embodiment, each request is uniquely associated with a single user. In at least one embodiment, if a request submitted by a user is equivalent to a previous request, multiple users may be associated with a request. In at least one embodiment, an individual user may submit a request which is associated with a group of one or more users. A result and/or other item associated with a request may be presented responsive to a request in an order based at least in part on a ranking of the item associated with the request. Information indicated in the request user ID field 4015 may be used to obtain information of a user using a record such as the user record 3700 (FIG. 37). Using the example illustrated in FIG. 40 'User1' is associated with 'Request1'.

The request guide ID field 4020 may include information of a number of guides associated with a request. If a guide obtains a search result responsive to 'Request1', an identifier of the guide may be indicated in the request guide ID field 4020. If a guide is selected to respond to a request, an identifier of the guide may be indicated in the request guide ID field 4020. Information indicated in the request guide ID field 4020 may be used to obtain information associated with a guide using a record such as the guide record 3800 (FIG. 38). A guide may be associated with a request if the guide has reviewed information associated with a request. Using the example illustrated in FIG. 40 'Guide1' is associated with 'Request1'. This may indicate, for example, that 'Guide1' has expedited 'Request1'. Any number of guides may be associated with a request.

The request category ID field 4025 may include information of a number of categorizations and/or keywords associated with a request. Content of the request category ID field 4025 may be modified by an automated classification of a request. A person may select a category and/or keyword associated with a request. A categorization may be associated with a resource, a guide, an advertisement, training information, etc. An item associated with a category may be presented to a guide and/or a user if a request associated with a category is submitted. An item associated with a category and/or other information may be presented for review by a person. Association of a category with a request may be used to select items such as an advertisement associated with the category to be presented responsive to a request. Association of a category with a request may be used to select a guide associated with the category to provide and opinion regarding an item associated with the request. A category may be associated with a request based on any type of information associated with the request. Using the example illustrated in FIG. 40, 'Category1' has been associated with 'Request1'. This may indicate that resources associated with 'Category1' may be utilized to respond to 'Request1'. In at least one embodiment, only one category may be associated with a request at any given time. Any number of categories may be associated with a request.

The request profile ID field 4030 may include information of a number of profiles associated with a request. A profile may be associated with a request based at least in part on a profile associated with a user associated with a request. A geographic profile which is common to a number of users associated with a request may be associated with a request. A guide may determine that a profile is to be associated with a request based on content and/or subject matter of a request associated with a user, etc. A guide selected to respond to a request may be selected based at least in part on a profile associated with the request. A profile associated with a request may be based at least in part on a profile of a guide associated with a category of a request. A profile associated with a request may be used by a personalization process to provide a personalized response associated with a result and a profile. Using the example illustrated in FIG. 40, 'Profile1' has been associated with 'Request1'.

The request result ID field 4035 may include information of a result which is associated with a request. A search result may be associated with a request when a guide obtains the search result responsive to the request. If a request is submitted to the search system 3630 (FIG. 36), a guide may be selected, and the guide may select a result from a list responsive to the request. A result may be associated with a request if the request is submitted to a resource such as a search engine, database or other resource system. A search result may be associated with a request based on stored information. Any number of search results may be associated with a request. Using the example illustrated in FIG. 40, 'Result1.1', 'Result1.2', and 'Result1.3' have been associated with 'Request1'.

The request result rank field 4040 may include information regarding a ranking of a result associated with a request. In at least one embodiment, the request result ID field 4035 and the request result rank field 4040 are linked by, for example, a pointer. Using the example illustrated in FIG. 40, 'Result1.1' has a ranking of '1', 'Result1.2' has a ranking of '3', and 'Result1.3' has a ranking of '4'. Content of the request result ID field 4035 and the request result rank field 4040 may be used at least in part to determine an order in which a search result are presented to a user responsive to a request. Using the example illustrated in FIG. 40, 'Result1.1' might be preferentially presented to a user responsive to 'Request1'. A ranking of a result may be determined based on criteria such as keyword ranking, guide ratings, etc., which may include automated and/or human assisted rating and/or ranking. In at least one embodiment, a single result is associated with a request. A top ranked result associated with a search request may be replaced by a result modified by a personalization process.

The request advertisement ID field 4045 may include information of an advertisement which is associated with a request. An advertisement may be associated with a request when a guide selects the advertisement to be presented to a user responsive to the request. If a request is submitted to the search system 3630 (FIG. 36), a guide may be selected, and the guide may provide an advertisement responsive to the request. An advertisement may be associated with a request automatically such as when a category and/or a keyword is associated with the request. Any number of advertisements may be associated with a request. Using the example illustrated in FIG. 40, 'Advert1', 'Advert4', and 'Advert2' have been associated with 'Request1'. An advertisement may be personalized. For example, an advertisement may include a message such as an offer and information of an advertiser, which may be modified based on a personalization process.

The request advertisement rank field 4050 may include information regarding a ranking of an advertisement associated with a request. In at least one embodiment, the request advertisement ID field 4045 and the request advertisement rank field 4050 are linked by, for example, a pointer. Using the example illustrated in FIG. 40, 'Advert1' has a ranking of '3', 'Advert4' has a ranking of '1', and 'Advert2' has a ranking of '5'. Content of the request advertisement ID field 4045 and the request advertisement rank field 4050 may be used at least in part to determine an order in which advertisements are presented responsive to a request. Using the example illustrated in FIG. 40, 'Advert4' might be preferentially presented to a user responsive to 'Request1'.

Figure 41:
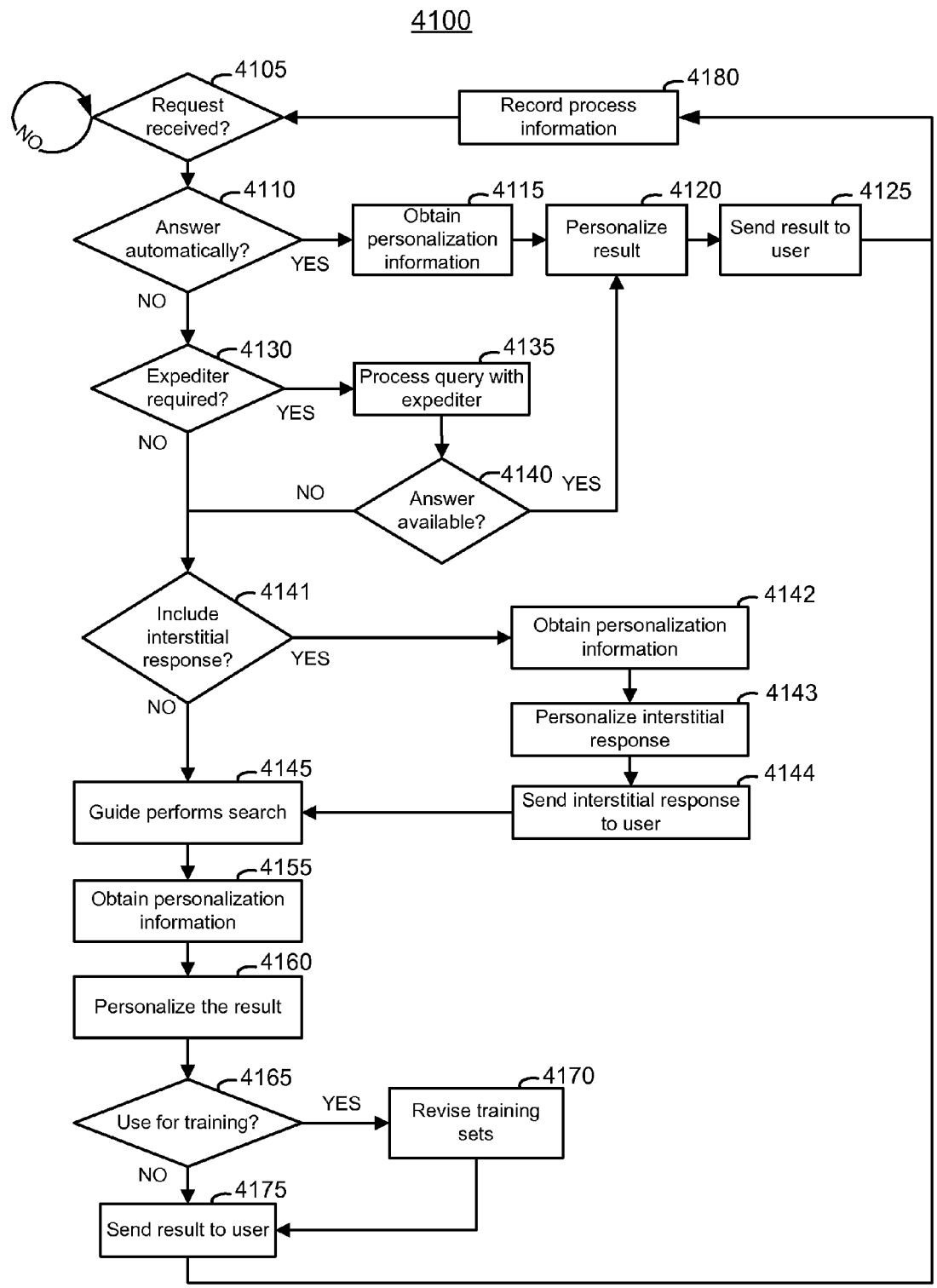
FIG. 41 illustrates a flow diagram of a process of responding to a request.

As illustrated in FIG. 41, a process 4100 for performing an information search with personalization in which one or more expediters or searchers may act as an intermediary is provided. The process 4100 may be operative in whole or in part on any suitable elements of the system 3600. In at least one embodiment, the process 4100 may be operative on a server associated with the search system 3630 (FIG. 36).

In operation 4105 (FIG. 41), a determination is made as to whether a request is received. If it is determined in operation 4105 that a request is not received, control remains at operation 4105 and process 4100 continues. If it is determined in operation 4105 that a request is received, control is passed to operation 4110 and process 4100 continues.

The determination in operation 4105 may be made using various criteria. In at least one embodiment, if a message is received at a server associated with the search system 3630 (FIG. 36), it may be determined that a request is received. For example, a message may be an email, SMS, EMS, and/or MMS message, an IM, an IP message, and/or a voice message, etc. The search system 3630 may determine whether the assistance of a guide will be used to respond to a request. A request may be received using an Application Programming Interface (API).

In operation 4110 (FIG. 41), a determination is made as to whether a request may be answered automatically. If it is determined in operation 4110 that a request may not be answered automatically, control is passed to operation 4130 and process 4100 continues. A request may be answered automatically without requiring an input from a guide or searcher. If it is determined in operation 4110 that a request may be answered automatically, control is passed to operation 4115 and process 4100 continues.

The determination in operation 4110 may be made using various criteria. In at least one embodiment, a request is processed to determined relevant information. For example, a raw query may be compared to a query indicated in the database 3620 (FIG. 36). A raw query may include text, audio, and/or other media. A raw query may be processed in order to determine one or more keywords, categories and/or vetted queries which may be associated with the raw query. A user ID and/or other information contained in a user database record, such as, for example, the user record 3700 as further described in FIG. 37, may be associated with a raw query, and a unique ID may be assigned to a raw query. A raw query may be compared to stored queries using stemming, word counts, and/or other forms of processing which are well known in the art.

In operation 4115 (FIG. 41), a user database record, such as the user record 3700 illustrated in FIG. 37, is accessed and any information that may be utilized in providing a personalized response to a user is obtained. Information that is obtained may include user history, user settings, user preferences, and any available information associated with a user profile that may be contained in the system database 3620 (FIG. 36). Control is passed to operation 4120 and process 4100 continues.

Figure 42:
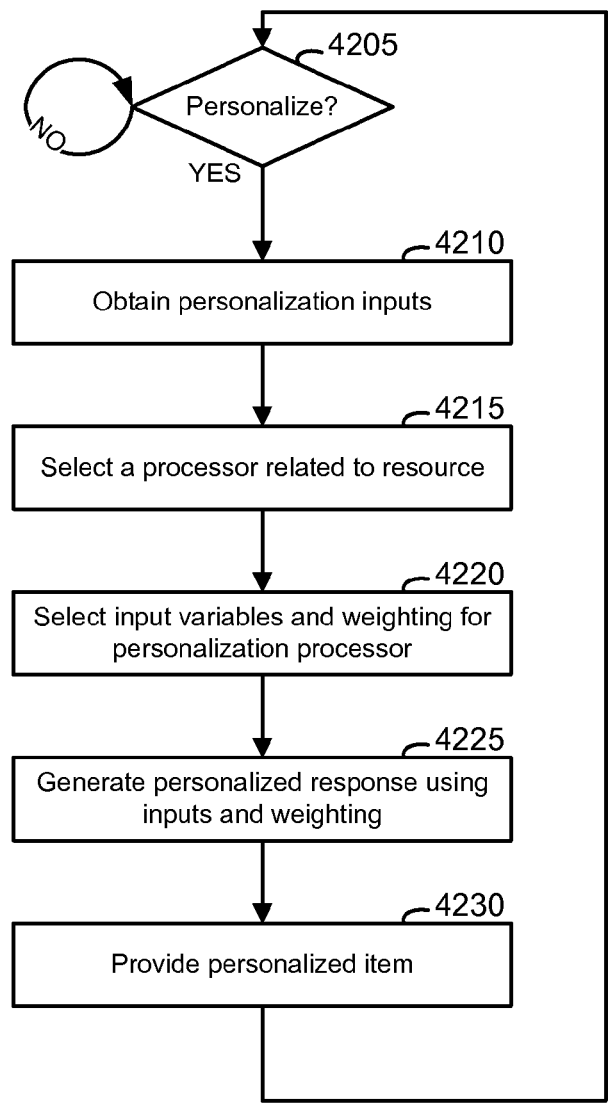
FIG. 42 illustrates a flow diagram of a process of associating a request to a result.

In operation 4120, any information obtained in operation 4115 as well as a search result may be used in association with the personalization processor system 3650 (FIG. 36) to arrive at a personalized response that may be provided to a user. A personalization process is discussed in further detail herein below with respect to the process 4200 (FIG. 42). Control is passed to operation 4125 and process 4100 continues.

In operation 4125, a result is sent responsive to a user request. A result may include any answer obtained automatically by the search system 3630 (FIG. 36) in association with information of a user as obtained in operation 4115, and/or any personalization information resulting from a personalization process in operation 4120. A result may include text, audio, video, web pages, advertisements, etc. In at least one embodiment, a result delivered to a user may be an SMS message which has been produced based on a result and information of a user associated with a request. Control is passed to operation 4180 and process 4100 continues.

In operation 4130, a determination is made as to whether an expediter is required. If in operation 4130 it is determined that an expediter is required, control is passed to operation 4135 and process 4100 continues. If in operation 4130 it is determined that an expediter is not required, control is passed to operation 4141 and process 4100 continues.

The determination in operation may be made using various criteria. An expediter may be required if information that may be utilized for personalization of a request is unavailable, needs clarification, or for any other reason determined by the search system 3630 (FIG. 36). For example, if a raw query cannot be categorized by the search system 3630, a raw query may be sent to an expediter for processing in order for expediter categorization to occur. It may be determined that an expediter is required if training sets for a neural network are required. Available expediters are notified, and a first expediter to respond may be selected. If an expediter is notified and does not respond, the expediter may be recorded as unavailable. In at least one embodiment, an expediter may be selected based on information associated with a raw query. For example, an expediter may be selected based on a type of device a requester is utilizing to submit a request, and/or to receive a search result. An expediter may be selected based on a competency, a training status, a keyword and/or category, geographic information, demographic information, personality information, interest area information, affiliate group information, a contractual relationship, a language skill, etc., which may be associated with a raw query and/or an expediter and/or associated with the requester. If an expediter is currently responding to a request, the expediter may not be available. If an expediter is not logged-in to the search system 3630 (FIG. 36), the expediter may not be available. Availability of an expediter may be determined dynamically. For example, if there is no expediter who meets a group of criteria available, one or more criteria may be modified so that an expediter who meets a different group of criteria is available. Alternately, the search system may wait until an expediter who meets a group of criteria is available. An expediter may be notified of a request via various forms of communication such as IM, a voice message, a pop-up in a browser, an email message, an SMS, EMS or MMS, etc., which may be used to communicate with a system associated with the expediter.

In operation 4135, an expediter processes a request. A process for processing a request is further described herein with respect to FIG. 46 and FIG. 47. Control is passed to operation 4140 and process 4100 continues.

In operation 4140, a determination is made as to whether a processed request results in an available answer. If a processed request does not result in an available answer, control is passed to operation 4141 and process 4100 continues. If a processed request does result in an available answer, control is passed to operation 4120 and process 4100 continues.

The determination in operation 4140 may be made using various criteria. For example, if an expediter processes a query in operation 4135 which results in categorization and/or a suggested query, the search system 3630 (FIG. 36) may automatically select a search result. An expediter may select a previous response, and/or may create a free-form response to a request. An expediter may formulate a query based on a raw query which may pass a request to an automated resource such as a news service, weather service, stock quote service, and/or other service, which may provide a response to a user request via an API or other interface which is available to the search system 3630.

In operation 4141 (FIG. 41), a determination is made as to whether an interstitial response is to be sent to a user. If in operation 4141 it is determined that an interstitial response is to be sent to a user, control is passed to operation 4142 and process 4100 continues. If in operation 4141 it is determined that an interstitial response is not to be sent to a user, control is passed to operation 4145 and process 4100 continues.

The determination in operation 4141 may be made using various criteria. For example, if an answer is not automatically available in operation 4140, the search system 3630 (FIG. 36) may send an interstitial response, such as an advertisement or other form of media to a user during a time interval when an answer or search result is being found or it may be determined that an interstitial response is to be provided responsive to any request which is not answered automatically, etc.

In operation 4142, targeting information is obtained. In at least one embodiment, information of a user, an expediter, and an interstitial message is obtained. A user query history may be obtained to determine previous interstitial messages, queries, and/or results which have been provided to a user. Guides associated with previous queries of a user may be used to create a guide profile to be used in a personalization process. For example, if a previous search result was accepted, a composite profile of guides associated with accepted responses might be used for personalization, a profile of a randomly selected guide who produced a result might be used for personalization, etc. A profile associated with an expediter may be used to create a guide profile used in a personalization process. Content of a selected interstitial message may be used as an input to a personalization process. An interstitial message, which may be an advertisement, may be selected in various ways. An interstitial message may be selected automatically, and/or using the assistance of a guide. In at least one embodiment, an interstitial message is selected based on a categorization associated with a request. Control is passed to operation 4143 and process 4100 continues.

In operation 4143, an interstitial response is personalized. For example, an advertisement template selected based on a processed request may be modified with text selected based on a profile of a user, a profile of a guide, and a location associated with a request. Control is passed to operation 4144 and process 4100 continues.

In operation 4144, a personalized interstitial response is sent to a user. In at least one embodiment, a personalization process may make no change to a selected interstitial response. An interstitial response may be any item such as an advertisement which might be modified based on a profile. An interstitial message may be a poll, which content is modified based on a personalization process. For example, a form of a polling question might be altered based on gender, location, etc. of a user submitting a query. An interstitial message may be an activity which is modified based on a personalization process. For example, a musical clip, humor, image, etc., might be selected and/or modified based on personalization. An interstitial response may be sent at any time during a search prior to delivery of an answer or result. Control is passed to operation 4145 and process 4100 continues.

In operation 4145, a guide performs a search. A guide may use any available resources to obtain a search result. In at least one embodiment, a guide may add a personal message regarding a search result obtained responsive to a user query. For example, a guide may cut an answer from a web page which may be shorter than a length allowed for a search result, and a guide may add text which fills the available space. Text which is added to a search result may be a personalized response associated with a guide or 'personality snippet'. A 'personality snippet' may be used in various ways to personalize a search result which has, for example, been produced by a resource or selected based on stored information of a previous query. Control is passed to operation 4155 and process 4100 continues.

In operation 4155, personalization information is obtained. Information of a user, a searcher, an expediter, etc., may be obtained for personalization of a result. Control is passed to operation 4160 and process 4100 continues.

In operation 4160, a result is personalized. For example, slang such as 'textisms', colloquialisms, etc., which may affect content of a response may be inserted based on a profile associated with a searcher, a user, and/or a resource which may have been used to obtain a search result. A personality snippet associated with a guide who obtained a result may be removed, and/or a personality snippet associated with a different person may be inserted. Control is passed to operation 4165 and process 4100 continues.

In operation 4165, a determination is made as to whether any information and/or response or personalization determined during a search session may be used for training the personalization system. If it is determined in operation 4165 that information is not used for training, control is passed to operation 4175 and process 4100 continues. If it is determined in operation 4165 that information is used for training, control is passed to operation 4170 and process 4100 continues.

The determination in operation 4165 may be made based on various criteria. For example, if a profile of a guide matches a profile created as a system model for personalized responses, a personality snippet produced by the guide and a search result associated with the response may be stored as a training set. Likewise, if a guide has a high rating or ranking, a personality snippet from the guide may be used and/or may be given a higher weighting in training of a personalization system. In at least one embodiment, user opinions may be used to determine if a personalization response is to be used to train a personalization system. For example, if a user indicated a positive reaction to a personality snippet, the personality snippet may be given higher weight in training a personalization system targeted to the user and/or users with a similar profile to the user. A user reaction may be judged in various ways. In at least one embodiment, if a user responds to an advertisement and/or other information associated with a result, personalization information associated with the result may be given a higher weight. Likewise, if a personalization of an interactive activity elicits a response, a user profile associated with the personalization and the personalization instance may be used as a training set.

In operation 4170, a personalization system is trained. For example, a neural net response may be modified based on a new training set. For example, if a guide has added a personality snippet to a response to a user request, the personal comment may be added to a database of personality snippets, and an association between a profile associated with the guide and the personality snippets may be increased in a neural network used to personalize a result. Control is passed to operation 4175 and process 4100 continues.

In operation 4175, a result is sent to a user. For example, a result may be provided to a user device which has submitted a request. Any number of search results may be provided to a user by any communication device and/or service associated with the user. Control is passed to operation 4180 and process 4100 continues.

In operation 4180, information of the process 4180 is recorded. In at least one embodiment, information of use of a personalization response may be recorded. Information of an expediter, a searcher, a search result, a category, a keyword, a request, and/or a user may be recorded. For example, if a user received a customized response, information of the response, a user action, a revision of a personalization algorithm, etc. relevant to the response may be recorded in the database 3620 (FIG. 36). In at least one embodiment, a user rating of a response may be recorded, which may be used to determine future behavior of a personalization process and system. Control is passed to operation 4105 and process 4100 continues.

As illustrated in FIG. 42, a process 4200 for customization or personalization of a response is provided. The process 4200 may be operative on any suitable elements of the system 3600 (FIG. 36). In at least one embodiment, the process 4200 is operative on a server associated with the personalization processor system 3650.

In operation 4205, a determination is made as to whether a personalization request is received. If it is determined in operation 4205 that a personalization request is not received, control remains at operation 4205 and process 4200 continues. If it is determined in operation 4205 that a personalization request is received, control is passed to operation 4210 and process 4200 continues.

The determination in operation 4205 may be made based on various criteria. In at least one embodiment, a message is received through an API which includes information of a search result which is to be modified and personalized. In at least one embodiment a message is passed between a system associated with the personalization processor system 3650 (FIG. 36) and the search system 3630. Items such as a search result, a poll, an advertisement, etc., may be personalized. Any type of media may be personalized.

In operation 4210 (FIG. 42), input information for a personalization process is obtained. A search result, which may be produced automatically, information of a user associated with a search request, information of a guide, who may be an expediter associated with a request and/or a user, and information of a resource used to obtain a result may be obtained. For example, a sports score might be obtained from a data supplier which might be available in a predefined format. A profile of a user based on information provided by a user, or inferred from user actions, location, queries, answers, purchases, etc., may be analyzed based on information associated with a resource which provided a result. For example, if a geographic profile of a user indicates that the user lives in Boston, a personalization system might use that factor for personalizing a response to a sports query, but might not consider such an input for a result associated with a horoscope request, yet still might consider such an input for a weather report. A profile of a guide might be used to select a male or female comment, or a geographic comment, etc. In particular, if a previous personalization was selected to have a male bias, a current personalization might be selected to have a female bias, or a personalization might be selected to weight a profile of an "ambassador" guide or expediter in personalizing a response. Further, in an embodiment, the personalization inputs are obtained in accordance with profile information of the user that is adjusted or modified in light of current data supplied by the user. Control is passed to operation 4215 and process 4200 continues.

In operation 4215, a processor related to a resource is selected. In at least one embodiment, a neural network is selected based on a resource which has produced a search result. A neural network may be developed for a type of automated resource which may provide a search result responsive to a request by a user. For example, a neural network which personalizes a response based on a stored result produced by a guide might be designed to provide a comment with a pre-determined length. A personality snippet might be selected based on a guide profile associated with a randomly selected guide, a guide type for which a user had expressed a preference, or a user. In the case of a sports score feed, a neural network might customize all of a response. For example, substitution of names of sports teams, modification of presentation of a result such as the order of team names, and/or a style of reporting a score might be determined by a personalization process as will be further described herein. A neural network may be a modular element in order that it may be updated without interrupting use of a current model while a new model is developed. Control is passed to operation 4220 and process 4200 continues.

In operation 4220, input variables to a personalization processor and weighting associated with the inputs are determined. For example, if elements of a user profile are known with high certainty, the elements may be given greater weight, or if a user has preferred responses from a type of guide, a profile of a guide may be given higher weighting. Factors such as time of day, user location, and/or other information associated with a request may be selected and weighted. Control is passed to operation 4225 and process 4200 continues.

In operation 4225, a personalized response is determined responsive to an item and personalization information provided. In at least one embodiment, a personality snippet is selected to be appended to a search result based on stored information selected in the process 4100 (FIG. 41). In at least one embodiment, a template associated with a resource is selected, elements of the template are modified based on content of a result, content of a user profile, and content of a guide profile which is randomly selected, as further illustrated herein. In at least one embodiment, a search result is modified to substitute colloquialisms associated with a guide profile and/or a user profile in the search result. Control is passed to operation 4230 (FIG. 42) and process 4200 continues.

In operation 4230, a personalized item is provided. In at least one embodiment, a personalized result is provided from the personalization processor system 3650 (FIG. 36) to the search system 3630. Information regarding selection of a personalized result may be recorded. For example, the personalization processor system 3650 may record information in the database 3620 regarding a guide profile, a resource, and a weighting applied when determining a personalized response associated with a guide and a user associated with a request for personalization. Control is passed to operation 4205 and process 4200 continues.

Figure 43:
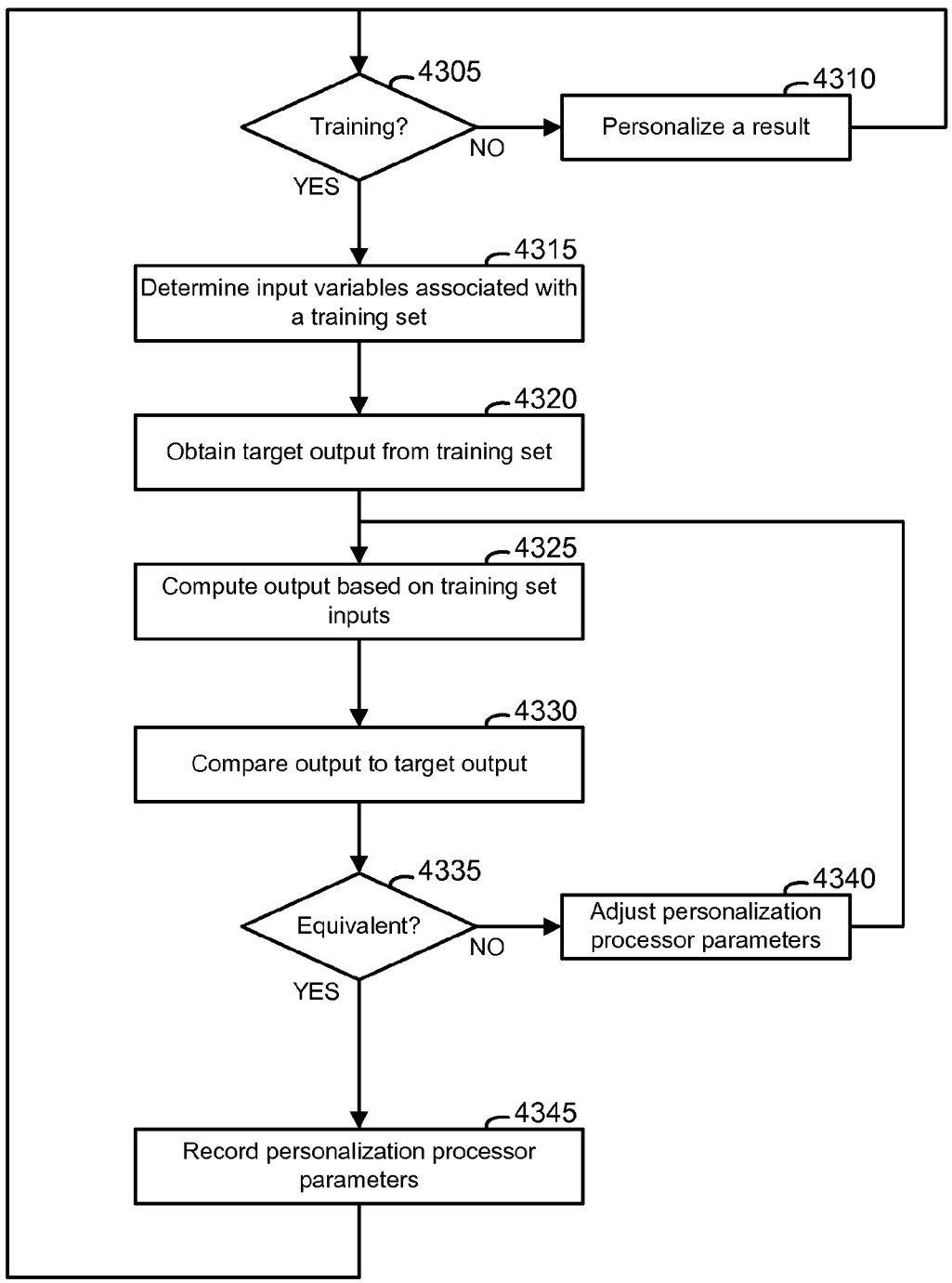
FIG. 43 illustrates a flow diagram of a process of training a neural network.

As illustrated in FIG. 43, a process 4300 of training a personalization processor, which may be a neural network, is provided. The process 4300 may be operative on any suitable elements of the system 3600 (FIG. 36). In at least one embodiment, the process 4300 is operative on a server associated with the personalization processor system 3650.

In operation 4305 (FIG. 43), a determination is made as to whether a personalization input is a training set. If in operation 4305 it is determined that a personalization input is not a training set, control is passed to operation 4310 and process 4300 continues. If in operation 4305 it is determined that a personalization input is a training set, control is passed to operation 4315 and process 4300 continues.

The determination in operation 4305 may be made based on various criteria. For example, if a guide rating associated with a guide who has produced a search result exceeds a predetermined value a personalization request may be determined to be a training set. Use of training sets associated with highly ranked guides may allow the personalization processor to be trained using guide behavior as a control. A personalization input may be selected by a system administrator, which may be indicated in a personalization request, which may allow human selected inputs to be provided to a personalization processor. If a profile associated with a personalization input matches a target profile, it may be determined that a personalization input is a training set. Using a target profile to select a training set may allow a customization of a personalization processor based on a guide and/or user type associated with the target profile.

In operation 4310, a result is personalized. In at least one embodiment, personalization is performed using a processor trained using training sets identified in operation 4305. Control is passed to operation 4305 and process 4300 continues.

In operation 4315, input variables of a personalization processor associated with a training set are obtained from a training set input received in operation 4305. In at least one embodiment, a guide profile, a user profile, a resource type, an input result, a time of day, a location, and a category associated with a training set are determined. Any parameter which may be relevant to a personalization of a response may be identified which are to be provided to a personalization processor. A personalization processor is designed using an empirical knowledge of an input space and an output space which are associated with a resource and a response. Control is passed to operation 4320 and process 4300 continues.

In operation 4320, a target output of a personalization processor is obtained from a training set. In at least one embodiment, a target output is obtained by parsing a result provided by a guide by examining a final phrase provided by the guide to determine a personality snippet. In at least one embodiment, a target output for a personalization process is explicitly indicated in a training set. Control is passed to operation 4325 and process 4300 continues.

In operation 4325, an actual output of a personalization processor is computed based on the input variables determined in operation 4315. In at least one embodiment, a neural network process is applied to an input set to determine an output of the neural network which is selected responsive to the input set. Any type of algorithm which may be modified based on feedback from training sets may be implemented as a personalization processor. Control is passed to operation 4330 and process 4300 continues.

In operation 4330, an actual output of a personalization processor is compared to a target output provided in a training set. In at least one embodiment, a comparison is a text comparison of an actual output and a training set output. Transformation rules may also be used in a comparison. For example, a reference or training set pattern sentence which uses variably substituted nouns or noun phrases or named entities may be determined to be equivalent to a computed actual pattern sentence even if nouns which occupy the designated locations in the pattern sentence are not identical to in the two pattern sentences. Any type of comparison may be performed. In at least one embodiment, a linguistic distance between a target output and an actual output is determined based on a number of words which are equivalent. Processes such as stemming and/or word substitution may be applied to a comparison function. Control is passed to operation 4335 and process 4300 continues.

In operation 4335, a determination is made as to whether an actual output is equivalent to a reference output. If in operation 4335 it is determined that an actual output is not equivalent to a reference output, control is passed to operation 4340 and process 4300 continues. If in operation 4335 it is determined that an actual output is equivalent to a reference output, control is passed to operation 4345 and process 4300 continues.

The determination in operation 4335 may be made based on various criteria. In at least one embodiment, a comparison such as that made in operation 4330 is compared to a threshold value to determine whether a fit between a reference output and a computed output is equivalent. In at least one embodiment, an exact match between a reference output and a computed output is used to determine that an actual output is equivalent to a reference output.

In operation 4340, modeling parameters of a personalization processor are adjusted. In at least one embodiment, parametric hidden variables of a neural network are adjusted based on results of the comparison in operation 4330. For example, if a variable has been adjusted in a positive direction and an error function associated with the variable has increased, the variable may be decreased. In at least one embodiment, a set of training inputs may be used to perform regression analysis for a neural network, or other personalization processor. Control is passed to operation 4325 and process 4300 continues.

In operation 4345, parametric values associated with a personalization processor are recorded. For example, hidden variables associated with a neural network used to select a personalized output may be recorded in the database 3620 (FIG. 36). Local storage in the personalization processor system 3650 may be used to record information of a personalization processor. Control is passed to operation 4305 (FIG. 43) and process 4300 continues.

Figure 44:
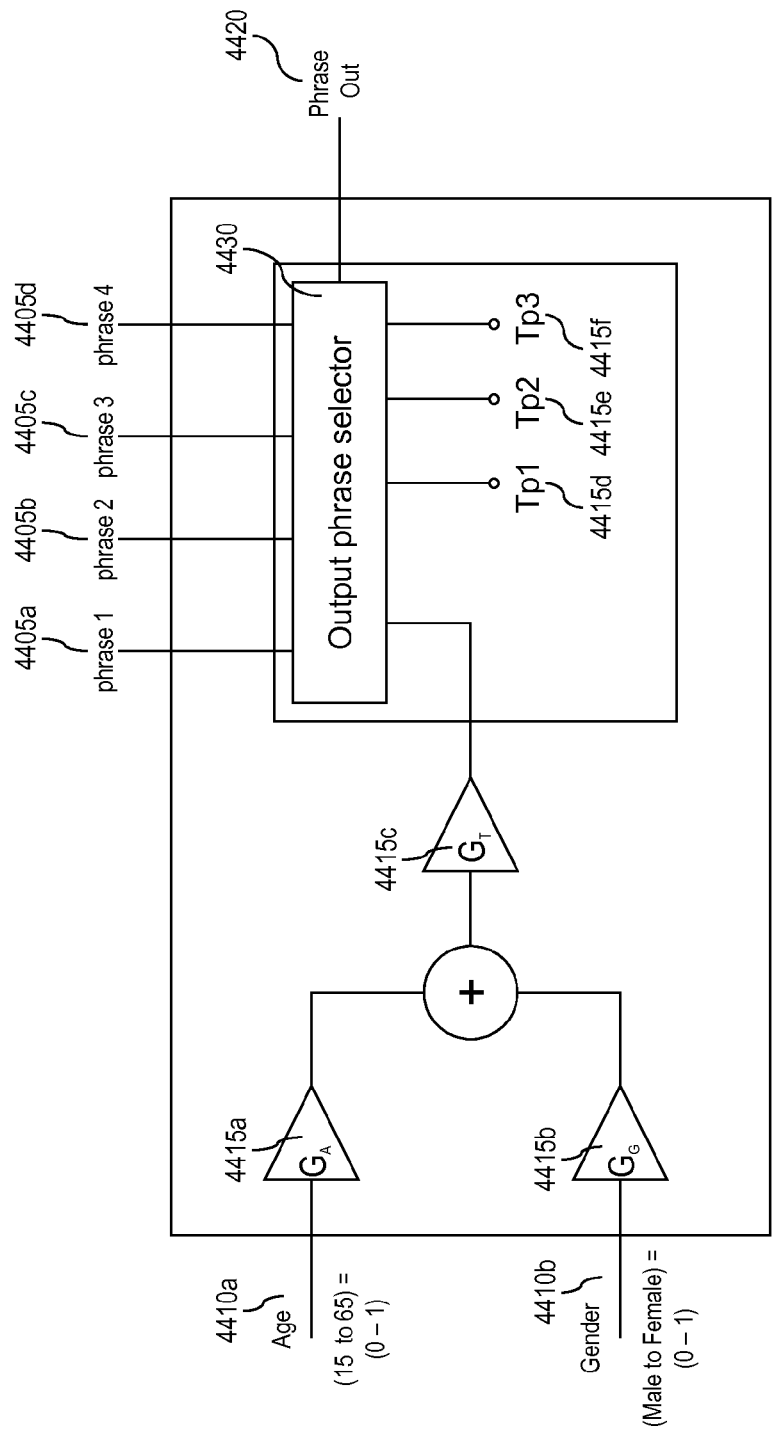
FIG. 44 illustrates a simplified neural network processor.

An exemplary neural network 4400 which may be used as a personalization processor is illustrated in FIG. 44. The neural network may include phrase type inputs 4405, personalization characteristic inputs 4410, hidden layer factors 4415 and an output phrase 4420 and an output phrase selector 4430.

The phrase type inputs may, for example, be a number of guide comments or personality snippets which may be static inputs such as the phrase inputs 4405*a*, 4405*b*, 4405*c*, and 4405*d*. In the example, any of four phrases at the phrase inputs 4405 may be selected by the output phrase selector 4430 based on the values of the characteristic inputs 4410.

The personalization characteristics may be any type of variable input which is used to select a phrase type input 4405. For example, the 'gender' characteristic input 4410*b* may be a binary value (Male=0, Female=1), the 'age' characteristic input 4410*a* might be quantized in years (age 15=0, age 65=1). Hidden layer factors 4415 relate the values of the characteristic inputs 4410 to the output phrase 4420. The hidden layer factors 4415 may be modified based on training sets provided to the neural network 4400.

In order to train a neural net, training sets are provided. A set of input values and a target output value are provided. Hidden layer factors may be varied until the target output is obtained. For example, training sets selected to use a selected set of values of each input characteristic may be provided with a corresponding output phrase, which will allow the hidden variables 4415 to be tuned to provide an expected phrase at the phrase output 4420 when a test input is provided at the characteristic inputs 4410.

The following simplified example is used for the purposes of illustration. If the output selector 4430 chooses a phrase input 4405 input based on a value of the output of a summation of the age input 4410*a* and the gender input 4410*b*, the hidden layer factor 4415*a* might have a multiplier (i.e., $G_A$) of 0.5 associated with normalized age and the hidden layer factor 4415*b* might have a multiplier (i.e., $G_G$) of 0.5 associated with gender. In this way, if the gender is 0 (male) 'phrase1' is selected for young and male, 'phrase2' is selected for old and male, 'phrase3' is selected for young and female, and 'phrase4' is selected for old and female. The hidden layer factors 4415*d*, 4415*e*, and 4415*f* (i.e. Tp1, Tp2, and Tp3) select a threshold applied to the output of the summation which may be initially set to 0.25, 0.5, 0.75. The hidden layer factor 4415*c* may be applied to vary the sensitivity of the output selector. The hidden layer factors 4415 may be initialized to the exemplary values, but training sets may be used to modify the multipliers, and the thresholds. Thus a neural network may self-adjust based on training sets which might for example change a multiplier, and/or a threshold used in the hidden layer. For example, if the inputs are constructed as normalized to use age fifteen as the minimum or zero input level and age sixty-five to the maximum or one input level (i.e., age 40 was the initial change between 'phrase1' and 'phrase2'), it may be that the neural net modifies the hidden layer factor 4415*d* which controls the threshold (Tp1) applied to the output of the summation to be higher or lower based on the training sets. For example, if a 'male, age thirty' training set and a 'male, age thirty-five' training set had the target output 'phrase2', the threshold (Tp1) might change from 0.25 to 0.15 responsive to the training sets. In this way, the neural net has 'learned' that males over thirty should receive the 'phrase2' phrase input 4405b, rather than the 'phrase1' phrase input which would have been selected with the initial values of threshold variable Tp1 4415d.

Using the personalization processor 4400, a search result identified based on stored information, a data feed, database, etc., might have a phrase appended to it based on a profile associated with the request. For example, if 'Result1.1' indicated in the request record 4000 (FIG. 40) is a response to a previously answered query, any guide comment associated with 'Result1.1' might be removed. A profile (i.e. 'Profile1') may be applied to the inputs 4410 of the personalization processor 4400 and the phrase at the phrase output 4420 may be appended to 'Result1.1' prior to presentation to a user. Similarly, if 'Advert4' permitted personalization, a version of 'Advert4' adapted based on 'Profile1' associated with 'Request1' may be presented as a personalized interstitial response in operation 4143 (FIG. 41).

While a simple example has been used for the purposes of illustration, no limitation is implied. It is expected that multiple inputs, and variable phrase types may be utilized as further described herein. A personalization functionality might employ various types of neural networks and/or multiple networks in order to process a result for personalization. For example, a first personalization process might be used to select a grammar construction for a response, and a second process might be used to select elements of the response such as vocabulary, colloquialisms, slang, etc.

Figure 45:
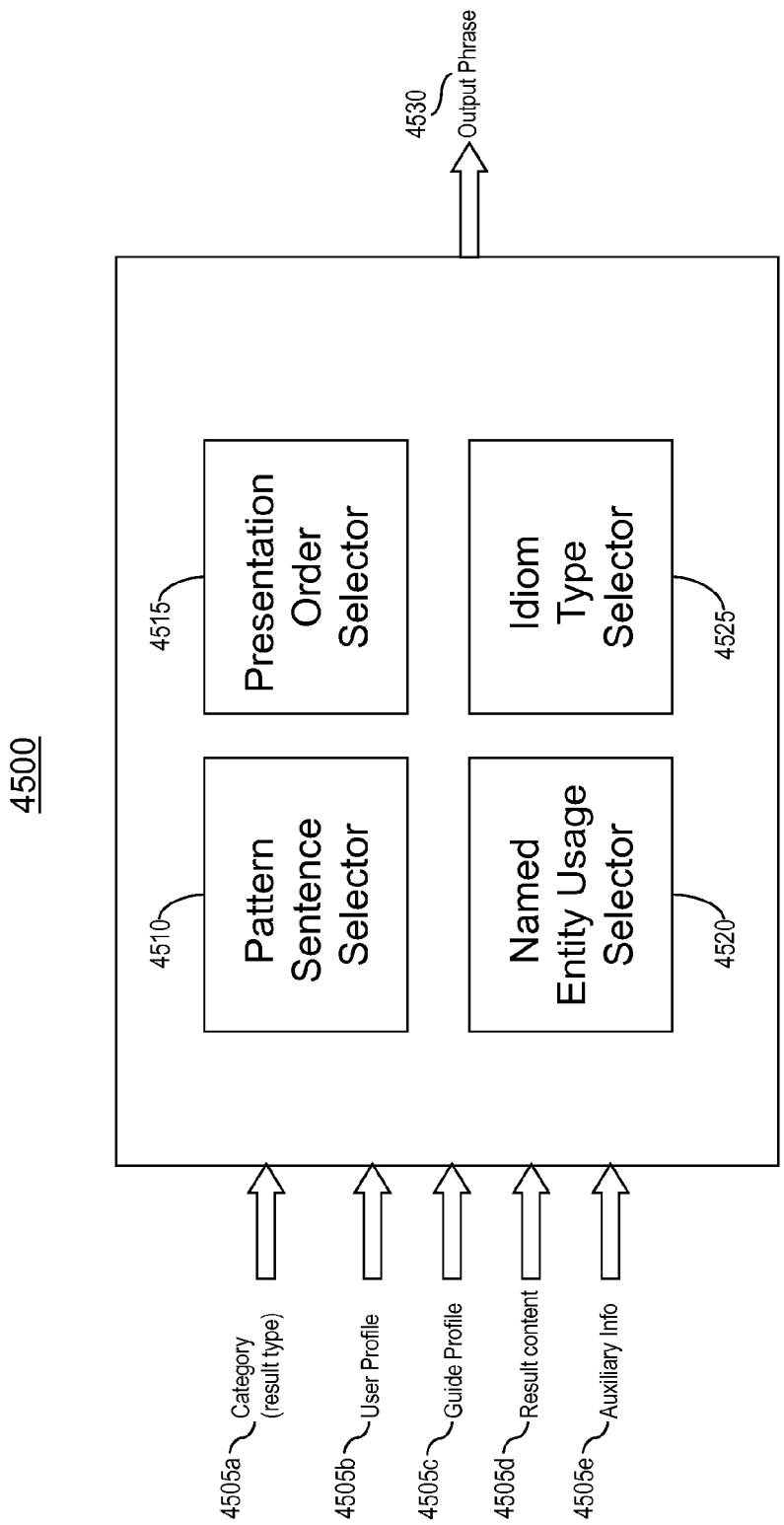
FIG. 45 illustrates an exemplary personalization processor.

A block diagram of an exemplary personalization processor 4500 for sports results is illustrated in FIG. 45. The personalization processor 4500 receives input variables 4505 which includes a category 4505a, a profile of a user 4505b, a profile of a guide 4505c, content of a result 4505d, and auxiliary information 4505e such as calendar information. In this example, the category 'Sports' (i.e., 'Category1') has been associated with the query 'What is the score of the Boilers game?' such as was illustrated with respect to the request record 4000 (FIG. 40). The result provided by 'Resource1' is provided to the personalization processor 4500 at 4505b.

The personalization processor 4500 may include a pattern sentence selector 4510, a presentation order selector 4515, a named entity usage selector 4520, and an idiom type selector 4525. The named entity selector 4520 may be influenced by factors associated with a user and/or responder profile. A "named entity" may include various nicknames associated with for example a sports team (e.g., the Cleveland MLB team might be the "Indians", the "Tribe", etc.). A more avid sports fan, as indicated in a profile of a user, might prefer a particular named entity designation of a sports team to be used in a response. The presentation order selector 4515 may determine an order of presentation of team names in a sports score. For example, a favorite team of a user associated with a profile may be presented first, regardless of an order of presentation by a resource. Using the example in FIG. 40, the score of 'Purdue' might be provided first because previous requests included 'Purdue' or 'Boilers' even if 'Resource1' provided Purdue as the second team in a game result. The pattern sentence selector 4510 may determine a sentence pattern to be used to construct a response. For example, a sentence pattern may be influenced by a result and profile information, wherein a close but favorable result to a user might select a first pattern, while a wide margin and an unfavorable result might select a different pattern. Similarly, a different set of sentence patterns might be selected based on gender, age, etc. The idiom type selector 4525 may be used to determine whether to modify grammar and/or usage. For example, age, gender, and/or geographic profile information may influence whether 'textisms' such as 'u r' or 'BFF', or intentional artifacts such as 'y'all' may be used in a response.

Returning to 'Request1' illustrated in the request record 4000 (FIG. 40), if it is determined that a search result may be produced based on information provided by 'Resource1', the 'scores for you' personalization processor 4500 associated with 'Resource1' may be provided with a search result (i.e., 'Result1.1') produced by 'Resource1'. The profiles 'User1' and 'Guide1' might cause the named entity selector to be set to 'on', the order selector 4515 might be set to 'Purdue', the narrow margin and the 'sports fan' profile of 'User1' may cause the pattern sentence selector 4510 to select the 'xxx won a tight one over yyy' sentence construction, and the idiom type selector 4525 might be set to 'off'. In such an instance the processor output 4530 would be 'The Boilers won a tight one over the Wolverines 88-85', which might have a guide comment added subsequently by a processor such as the personalization processor 4400 (FIG. 44). Factors such as time between a result being final and a current time might influence, for example, the pattern sentence selector 4510.

While a few personalization processor examples have been illustrated, other types of personalization processors for stored and/or automated information will readily occur to one of ordinary skill in the relevant art and are within the spirit and scope of the disclosure herein. For example, a personalization processor for stock quotes might use pattern sentences which might use named entities for companies, sentences influenced by value changes and previous requests, etc., a personalization processor for movie times might use pattern sentences influenced by show times, locations, box office reviews, time between releases, etc., a personalization processor for weather reports might utilize sentence patterns based on time of day, location of a user, comparative weather in a guide location, etc. A personalization processor may be created organically using a generalized neural network and selected queries and answers produced and/or reviewed by guides. In such an instance, an arbitrary personalization processor may be created for any resource which may produce results in a prescribed format. While the processing blocks and personalization processors are depicted as separate elements, any elements of a personalization processor may be implemented as hardware, software, and/or as a combination thereof.

Figure 46:
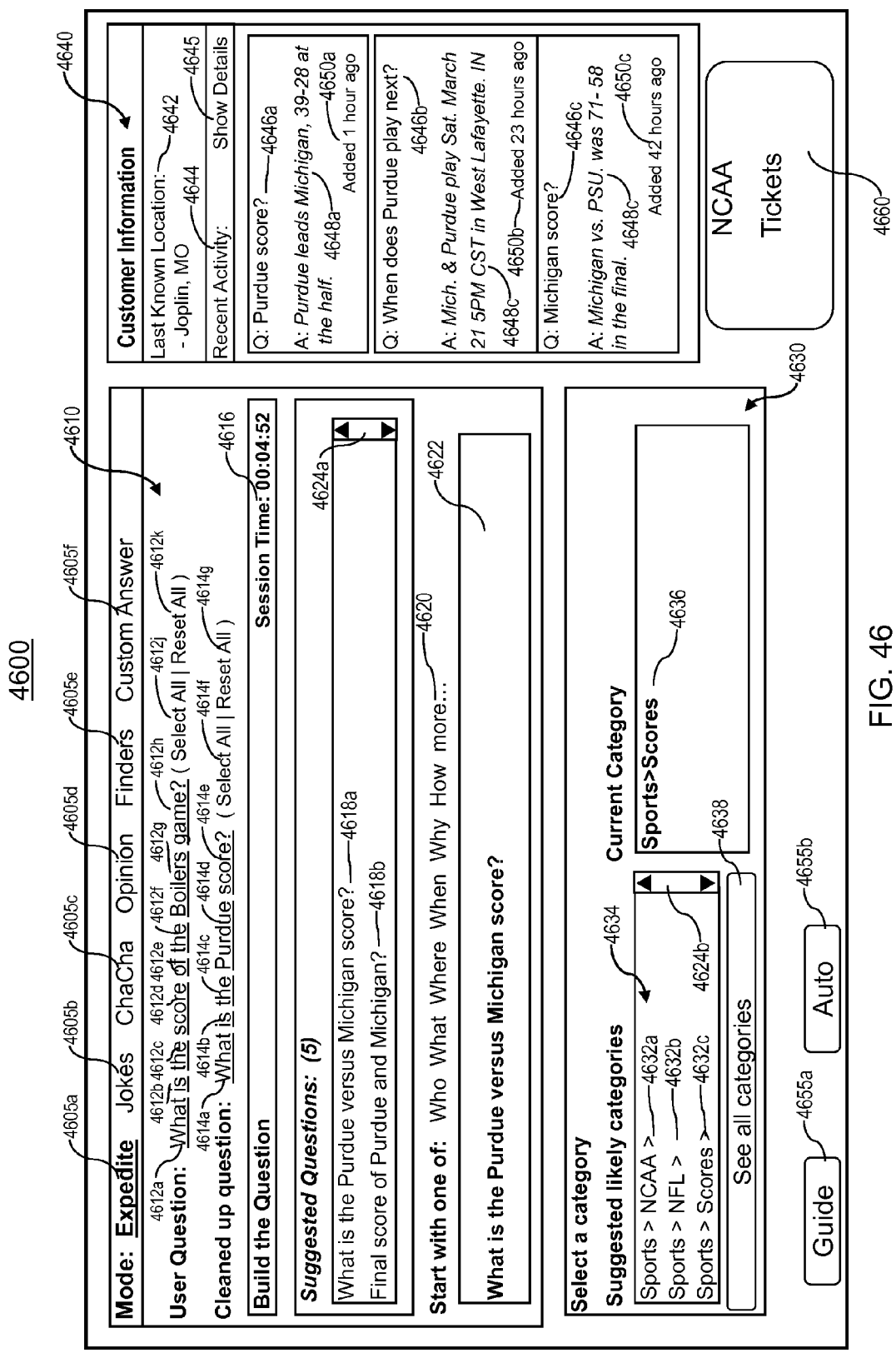
FIG. 46 illustrates an expediter graphical user interface (GUI).

A GUI 4600 for processing a query is illustrated in FIG. 46. The GUI 4600 may, for example, be presented to a guide using a browser functionality of the guide system 3605 (FIG. 36) responsive to a user request. The GUI 4600 may include mode indicators 4605, a query construction window 4610, query indicators 4612, succinct query indicators 4614, a session timer 4616, suggested question indicators 4618, initial phrase controls 4620, a query box 4622, scrolling controls 4624, a category selection window 4630, suggested category indicators 4632, a suggested category window 4634, a current category indicator 4636, a category menu control 4638, a user history window 4640, a location indicator 4642, a recent activity indicator 4644, a detail toggle 4645, previous query indicators 4646, previous answer indicators 4648, time stamp indicators 4650, action controls 4655, and an advertising window 4660.

The mode indicators 4605 may be used to indicate an activity which is being performed using the GUI 4600. For example, the 'Expedite' indicator 4605a may be used to indicate that an expediting task, which may include categorizing and constructing a query, is being performed. Activation of a mode indicator 4605 may cause a GUI associated with the activity to be provided. For example, activation of the 'Jokes' mode indicator 4605b may cause a GUI for selecting a type of Joke to be provided. Likewise the mode indicators 4605*c*, 4605*d*, 4605*e*, and 4605*f* may provide interfaces for selecting ChaCha', 'Opinion', 'Finders' and 'Custom Answer' results respectively. In at least one embodiment, the 'Finders' mode indicator 4605*e* may be used to select a resource which may be used to provide a search result, which may be personalized based on information of a user request and information determined by a guide.

The query construction window 4610 may include information which may be used to construct a query which may be used to obtain a response to a user request. The query indicators 4612 may provide information of a user request. As illustrated in FIG. 46, the query indicator 4612*a* may be used to transfer the word 'What' to the query box 4622. Similarly, the query indicators 4612*b*-4612*h* may be used to transfer the respective elements indicated to the query box 4622. The 'Select All' query indicator 4612*j* may be used to transfer all the elements of a query to the query box 4622. The 'Reset All' query indicator 4612*k* may be used to remove all the elements of a query to the query box 4622. While text is used for the purpose of illustration, other items such as a photo, a video, audio clip, a URL, etc., which may be indicated in a query indicator 4612, may be transferred to the query box 4622.

The succinct query indicators 4614 may provide information of a structured query which may be associated with a request. The succinct query indicators 4614*a*-4614*e* may be used to transfer the respective elements of a structured query to the query box 4622. The 'Select All' succinct query indicator 4614*f* may be used to transfer all the elements of a succinct query to the query box 4622. The 'Reset All' succinct query indicator 4614*g* may be used to remove all the elements of a succinct query from the query box 4622. While text is used for the purpose of illustration, other items such as a photo, a video, audio clip, a URL, etc., which may be indicated in a succinct query indicator 4614, may be transferred to the query box 4622.

The session timer 4616 may be used to indicate an amount of time spent by processing a request. Suggested question indicators 4618 may be used to indicate suggested succinct queries which may be associated with stored search results, which may be selected by an ambassador to provide a search result. Activation of the suggested query indicator 4618*a* may cause the suggested query 'What is the Purdue versus Michigan score?' to be transferred to the query box 4622. Activation of the suggested query indicator 4618*b* may cause the suggested query 'Final score of Purdue and Michigan?' to be transferred to the query box 4622. The initial phrase controls 4620 may be used to select an initial phrase which may be added to the query box 4622.

The category selection window 4630 may include information which may be used to categorize a request. The suggested category window 4634 may include information indicating categories which have been determined to be related to a query. The suggested category indicator 4632*a* indicates the category 'Sports>NCAA>'. The suggested category indicator 4632*b* indicates the category 'Sports>NFL>'. The suggested category indicator 4632*c* indicates the category 'Sports>Scores>'. Activation of the suggested category indicator 4632*c* may transfer the suggested category associated with the suggested category indicator 4632*c* to the current category indicator 4636. The current category indicator 4636 may indicate a category which is associated with a query indicated in the query box 4622. In at least one embodiment, only one current category indicator 4636 is provided. The category menu control 4638 may display a category selection menu when activated. The category menu control 4638 may be activated if a suitable category is not indicated in the suggested category window 4634. Scrolling controls 4624*a*, 4624*b*, may be used to navigate within content of the query construction window 4610, and the category selection window 4630 respectively.

The customer information window 4640 may include information of a customer. The location indicator 4642 may be used to indicate information of a location associated with a query. The location indicator 4642 may include named entities, latitude and longitude, etc. Activation of the location indicator 4642 may cause a menu of locations to be provided which may be selected to be associated with a query.

The recent activity indicator 4644 may be used to provide information of previous queries associated with a user. For example, activation of the recent activity indicator 4644 may provide a menu for selecting previous query information to be provided. The detail toggle 4645 may be used to display or hide detailed information associated with historical searches. Activation of the detail toggle 4645 may cause the answer indicators 4648, and the time stamp indicators 4650 to be suppressed or displayed. The previous query indicators 4646 may indicate information of a previous request which may, for example, be associated with a user submitting a request indicated in the query indicators 4612. The previous query indicator 4646*a* indicates the previous query 'Purdue score?' The previous query indicator 4646*b* indicates the previous query 'When does Purdue play next?' The previous query indicator 4646*c* indicates the previous query 'Michigan score?' The answer indicator 4648*a* indicates a response to 'Purdue score?' The answer indicator 4648*b* indicates a response to 'When does Purdue play next?' The answer indicator 4648*c* indicates a response to 'Michigan score?' The time stamp indicator 4650*a* indicates a time associated with 'Purdue score?' The time stamp indicator 4650*b* indicates a time associated with 'When does Purdue play next?' The time stamp indicator 4650*c* indicates a time associated with 'Michigan score?' The advertising window 4660 may include information of an advertisement associated with a query, which may be determined based on information indicated in the GUI 4600. In at least one embodiment, a guide may activate the advertisement window 4660 in order to select an advertisement to be provided to a user.

Activation of the 'Guide' action control 4655*a* may cause a query indicated in the query box 4622, and other information associated with the query to be provided to a guide for performing a search. Activation of the 'Auto' action control 4655*b* may cause a query to be submitted to an automated resource which may provide a response to a query based on stored information and/or a response from a resource such as data feed, a database, etc. Selection of an automated response may be done using a simple interface which may be presented to an expediter guide or ambassador based on a category which has been associated with a request. In at least one embodiment, activation of the 'Auto' action control 4655*b* may cause a GUI for providing an automated response associated with the category to be provided.

Figure 47:
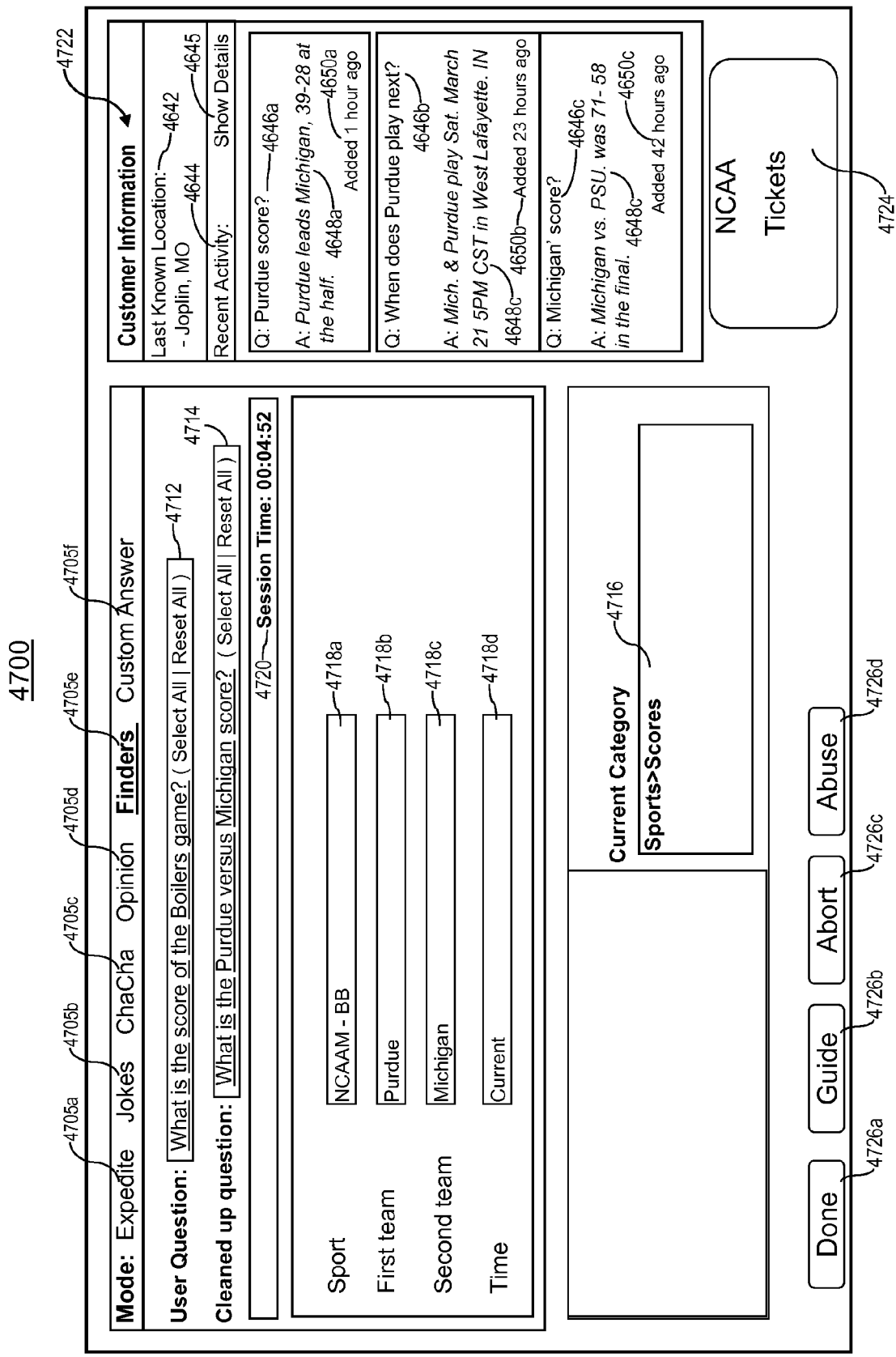
FIG. 47 illustrates an expediter GUI.

A GUI 4700 for creating a rapid response to a request regarding a sports score is illustrated in FIG. 47. The GUI 4700 may, for example, be presented to a guide using a browser functionality of the guide system 3605 (FIG. 36). The GUI 4700 may include mode indicators 4705, user query indicators 4712, succinct query indicators 4714, category indicator 4716, parameter inputs 4718, session timer 4720, a customer information window 4722, an advertising window 4724, and action controls 4726.

The mode indicators 4705 may be used to indicate an activity which is being performed using the GUI 4700. For example, the 'Expedite' indicator 4705*a* may be used to indicate that an expediting task, which may include categorizing and constructing a query, is being performed. Activation of a mode indicator 4705 may cause a GUI associated with the activity to be provided. For example, activation of the 'Expedite' mode indicator 4705*a* may cause the GUI 1100 (FIG. 11) to be provided. Activation of the 'Finders' indicator 4705*e* may cause the GUI 4700 (FIG. 47) to be provided. Likewise the mode indicators 4705*b*, 4705*c*, 4705*d*, and 4705*f* may provide interfaces for selecting 'Jokes', ChaCha', 'Opinion', and 'Custom Answer' results respectively.

The query indicators 4712 may provide information of a request. The succinct query indicators 4714 may provide information of a structured query which may be associated with a request. The category indicator 4716 may be used to indicate a category associated with a request. Activation of the category indicator 4716 may cause a menu of available categories and/or typing box to be provided for selection of a category.

The parameter inputs 4718 may be used to indicate values which are to be used to create an automated response to a user request. For example, information which may be provided to a data feed, to query a structured database, etc., may be provided using the parameter inputs 4718. Any number of parameter inputs 4718 may be provided. In at least one embodiment, content of the parameter inputs may be initialized by the search system 3630 (FIG. 36). As is well known in the art, "attention" is a pointer to a particular feature of a GUI. If the attention of the GUI 4700 is associated with the parameter input 4718*a*, activation of a query indicator associated with a query may cause a word or phrase associated with a query indicator to be added to the parameter input 4718*a*. The parameter inputs 4718 may, for example, be implemented as a drop-down menu which allows a guide to select named entities and/or other items which may be associated with current and/or previous queries of a user. In at least one embodiment, information of a category and/or a query may be used to determine default values provided in the parameter inputs 4718. The 'Sport' input 4718*a* may be used to designate a sport type for which a score is requested. The 'First team' input 4718*b* may be used to designate one participant in match. The 'Second team' input 4718*c* may be used to designate a second participant in a match. The 'Time' input 4718*d* may be used to designate time information associated with a request. Any type of information which may be available from and/or required or utilized by a resource which may respond to a query may be obtained using the parameter inputs 4718.

The session timer 4720 may be used to indicate an amount of time spent processing a request. The customer information window 4722 includes information of a user associated with a request and the advertising window 4724 includes information of advertisements. The 'Done' action control 4726*a* may be used to indicate that information indicated in the GUI 4700 is complete and is ready to be used to provide a result to a user. The 'Guide' action control 4726*b* may be used to indicate that a query indicated in the GUI 4700 is to be sent to a guide. The 'Abort' action control 4726*c* may be used to indicate that a query indicated in the GUI 4700 is to be sent to another ambassador. The 'Abuse' action control 4726*d* may be used to indicate that a query indicated in the GUI 4700 is abusive and should not be answered.

While a single 'Finder' functionality has been illustrated using the GUI 4700, any number of GUI's for providing an automated answer may be provided. The personalization processor 155 may process any search result in order to personalize the result.

Figure 48:
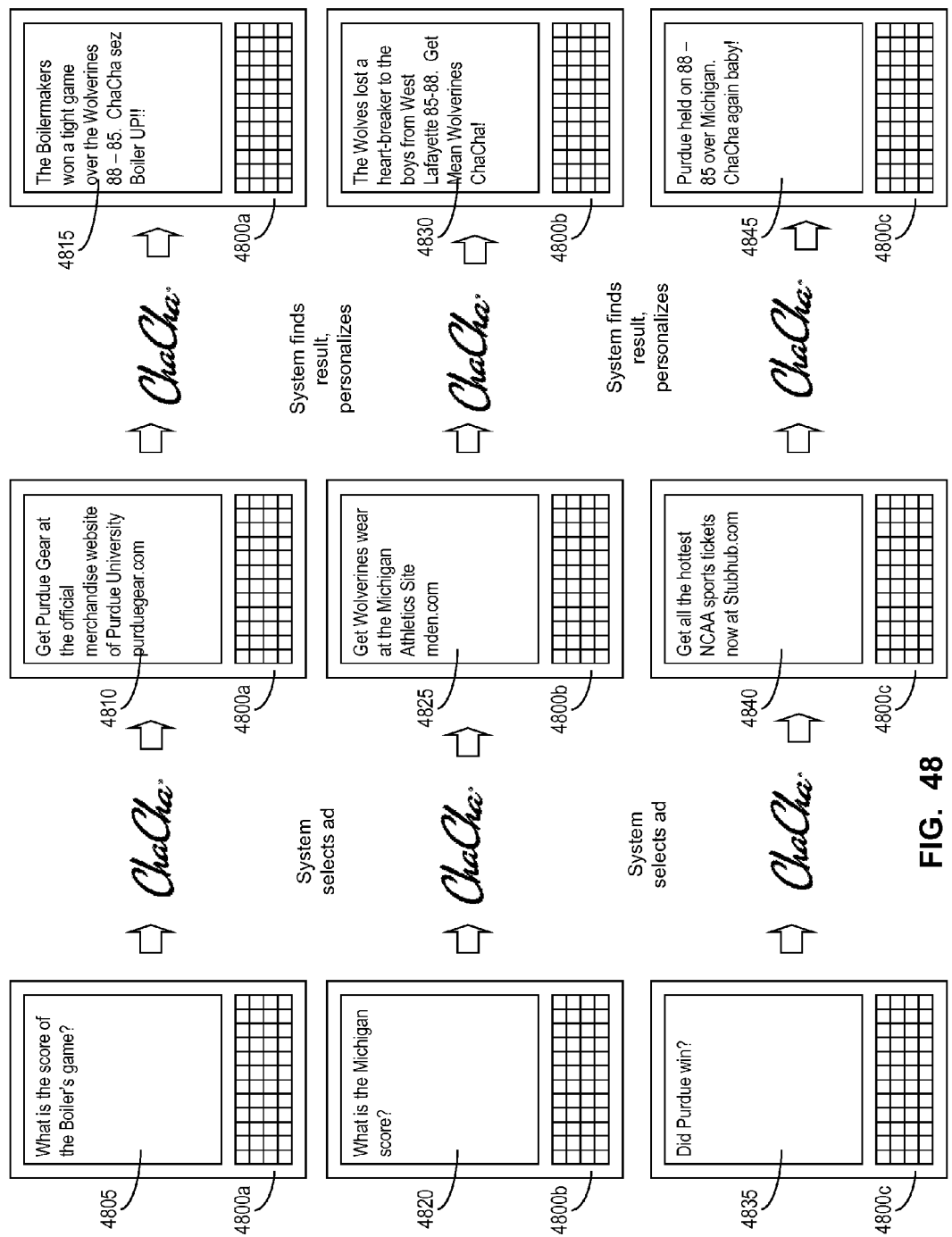
FIG. 48 illustrates an exemplary sequence of messages and responses.

An exemplary sequence of personalized responses to a user request is illustrated in FIG. 48. A personalized response may be delivered to one or more user devices and/or services. A text message embodiment is used for purposes of illustration, but the method and system may be applied to any types of messages and/or media.

User devices 4800 are any device which may originate a request for information. The user device 4800*a* may be associated with a user who is known to be a Purdue fan. The user device 4800*b* may be associated with a user who is known to be a Michigan fan. The user device 4800*c* may be associated with a user who does not have an NCAA basketball team preference. Preferences may be determined from a profile.

The user device 4800*a* may submit a request message 4805. The request message 4805 is processed by a search service, which may return an advertisement message 4810. The advertisement message 4810 may be targeted based on a keyword and/or profile associated with the request message 4805. A search result responsive to the request message is obtained. For example, the score and participants of the Purdue game may be obtained from a data feed which is determined with or without assistance from a guide. A search result message 4815 may be composed based on the search result and the user characteristics associated with the user device 4800*a*. A factual portion of the search result message may be produced from a personalization processor. A personality snippet may be selected based on a profile of the user. The search result message 4815 includes the factual portion, 'The Boilermakers won a tight game over the Wolverines' and the personality snippet 'ChaCha sez Boiler UP'.

Similarly if the user device 4800*b*, which is associated with the Michigan fan submits a request message 4820, an advertising message 4825 is selected based on keywords of a query and a profile associated with the user device 4800*b*. As before the search result is obtained, and personalized. The search result is personalized by reversing the order of the participants, and selecting a sentence pattern which indicates a close loss rather than a close victory. A customized factual result sentence is then combined with a personality snippet (i.e., Get Mean Wolverines ChaCha!) and a result message 4830 is provided to the user device 4800*b*.

If the user device 4800*c*, which is associated with an undifferentiated user, submits a request message 4835, an advertisement message 4840 may be selected based on a keyword and/or a profile which may affect an advertisement provided. For example, the advertisement message 4840 is not associated with a particular team, but is associated with sports. A search result for the request message is obtained and a search result message 4845 is created. The search result message includes a neutral tone statement of a result, and a personality snippet which may be based on other preferences expressed by a user.

A system is provided for personalizing responses from a search system. Personalization processing may be applied to any type of response. As a response is based on a known, defined format, sentence synthesis is facilitated. An element of a response which is intended for personalization or 'personality snippet is defined which may be added to any search result to simulate a comment made by a guide. If a search result is obtained from an automated resource which responds according to a predefined format, a search result obtained from the automated resource may be personalized according to a predefined set of conditions associated with a resource. An output from an API or other formatted information may be processed based on inputs to a personalization processor. A personalization processor may be used to apply a style, a pattern sentence, a vocabulary, a grammar, etc. to a result provided by a search resource. A personalization processor may be implemented by fixed logic and/or may be implemented using a learning system such as a neural net. A training set may be defined which is used to determine an input/output map for a personalization processor.

A personalization processor is created which may receive inputs of characteristics of a user, a guide and/or group of guides, a result to be provided to a user and a type of information to be provided to the user. As the result space may be large, and the types of users and guides may be large, a neural net may be used to map input parameters to selected patterns which may be processed in order to provide a personalized response to a user based on a search result. A personalization processor (e.g., a neural net) may be trained using training sets provided by interactions between users and guides. A training set may be selected by system administrators, and/or may be determined based on characteristics of guides and/or users associated with queries.

Inputs to a personalization processor may be determined based on characteristics of a user, characteristics of a guide, random selections, time, result content, etc. A personalization processor may reduce guide time spent in responding to a request, as a guide is not required to spend time and effort formulating a response which is customer friendly while meeting constraints. A personalization processor may allow an advertisement to be modified based on characteristics of a user receiving the advertisement. A personalization processor may allow a more uniform response to a user, which may improve a user experience. A personalization processor may allow a user to select a preferred type of guide response which may allow for a better user experience, and may improve targeting of information to the user.

A personalization processor may enhance a user experience in various types of systems other than human assisted search systems. A system which produces automated search results may be enhanced using a personalization processor as described herein. A training set provided may be produced from activities of users and agents, who may later be replaced by an automated or partially automated process. Any type of agent based customer service system might benefit from a personalization processor for various forms of communication such as voice, SMS, MMS, EMS, email, IM, etc.

The method and system described herein enable a more rapid and effective processing of a generalized request for information. If an automated processing of a request determines that the request is to be directed to a human searcher, the request is directed to a searcher who is provided with a toolset appropriate to the task which is determined to be associated with the request. A searcher who is trained in the query processing role or expediter is provided with resources and interfaces which speed the process of providing a result responsive to a request.

An expediter toolset may include an interface which allows the expediter to provide information required to obtain a search result using an automated and/or human assisted resource. An expediter is provided with access to resources, which may be inaccessible to the public, which may provide a response to a query based on a formatted query. A toolset is provided which allows an expediter to transfer information associated with a request to a format associated with an appropriate resource or 'finder'. Expediter judgment may be applied to determine intent of a query which may otherwise be ambiguous.

An expediter toolset may include an interface which may be used to rapidly respond to various ambiguous queries. For example, rhetorical, humorous, conversational, or curious questions may be presented in a 'Quick Answer' interface. A generalized processing interface is provided which may allow an expediter to rapidly select and provide a response to common queries and/or types of queries without the need to perform a search, or to send a request to a searcher.

An expediter toolset may include an interface for reviewing and locating queries and/or results which may be an approximate match to a request. An expediter may select a query and/or group of queries using any or all of a request. A modified query may be compared to previous queries to determine if a matching query exists, which may cause information of the previous queries and answers associated with the queries to be provided to the expediter. Answers associated with similar queries may be selected by an expediter, which may avoid the need for a search. Providing information of search results associated with approximate matches to a request, may allow an expediter to locate an existing search result which is a suitable response to a request.

Using the methods and systems described herein efficiency of a human assisted search system is increased, which may also lower the cost to respond to a query. An expediter capability is enhanced by providing tools which are specialized to the task of finding an answer to a generalized query without the use of a generalized search engine such as Ask®, Bing®, or Google®. Rather than following the previous methods of automated comparison and use of generalized tools, a classification of a type of query is performed prior to providing the query to a searcher. Before a query is presented to specialist searcher, the query is provided to a guide who can rapidly respond to a high percentage of queries. The system and methods described enhance the ability of the first responder to respond to a request. A higher percentage of queries may be handled by an expediter, and a user may receive a response more rapidly.

While the method and system are described in the context of a search system, they might also be applied to any type of customer service activity. In lieu of providing every representative with the same training and the same tools, tools which are suitable to the particular task assigned to the worker are provided. Although more effort may be expended on complex queries, as a high percentage of queries are not complex. As a consequence the time and effort to respond are greatly reduced.

Query processing may be enhanced, and may include a personalization feature to enhance user experience. An interactive activity may be determined by an expediter selection which may be personalized by a personalization processor associated with a profile of an expediter and/or a user associated with a request. Enhanced targeting of interactive activities and responses may be integrated with query processing to provide a more valuable offering to advertisers supporting an information delivery system.

According to an embodiment, the present invention may be implemented using a program stored, for example, in a computer-readable storage medium such as a CD-ROM, etc., or using one or more specialized terminals, devices or systems that is enabled to execute operation(s) described herein. The storage or recording medium used in an embodiment can be selected from among various persistent computer-readable media including, a disk, a DVD, an internal storage device (memory such as RAM or ROM) in a computer, etc.

As mentioned above, the embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the claimed invention are apparent from the detailed specification and thus, it is intended by the appended claims to cover all such features and advantages of the claimed invention that fall within the true spirit and scope of the invention. Further, since numerous modifications and changes will readily occur to those skilled in the art, it is not desired to limit the invention to the exact construction and operation illustrated and described for the disclosed embodiments, and accordingly all suitable modifications and equivalents may be resorted to, falling within the scope of the claimed invention. It will further be understood that the phrase "at least one of A, B and C" may be used herein as an alternative expression that means "one or more of A, B and C."

What is claimed is:

1. A method of responding to a request, comprising:
receiving the request;
determining automatically a type associated with the request; and
providing a portion of the request to a human assistant in an interface selected based on the type and providing information of a query in an order based on a ranking of the query.

2. The method of claim 1, comprising:
providing the portion of the request to the human assistant when a category confidence function of the request is below a predetermined value.

3. The method of claim 1, comprising:
providing the portion of the request to the human assistant when an automation confidence function of the request is above a predetermined value.

4. The method of claim 1, comprising:
providing the portion of the request to the human assistant when a geographic confidence function of the request is below a predetermined value.

5. The method of claim 1, comprising:
selecting a GUI associated with an automated response matched to a highest ranking automated resource for the request as the interface.

6. The method of claim 1, comprising:
computing a matching function for the query and the request;
comparing the matching function to a predetermined value; and
providing the interface including information of the query when the matching function exceeds the predetermined value.

7. The method of claim 6, comprising:
computing a rating of a response associated with the query;
ranking the response based on the rating;
suggesting the response to the human assistant based on the ranking; and
increasing the rating when the human assistant elects to deliver the response.

8. The method of claim 1, comprising:
evaluating a confidence function of the type; and
choosing an opinion functionality comprising a comment generator as the interface if the confidence function is below a predetermined value.

9. The method of claim 8, comprising:
presenting a plurality of comment generators in the opinion functionality;
providing an adlib response facility in the opinion functionality;
providing historical information of a user submitting the request in the opinion functionality; and
receiving a confirmation from the human assistant when a response is selected.

10. The method of claim 1, comprising:
selecting automatically a categorization associated with the request;
presenting an automatically generated phrase in the interface;
receiving from the human assistant a modification to the phrase; and
presenting the query when the query matches the phrase.

11. The method of claim 10, comprising:
evaluating a rating of an answer associated with the query;
setting the rating to a minimum value when the answer is not associated with a category; and
presenting the answer in the interface if the rating is above a predetermined value greater than the minimum value.

12. The method of claim 11, comprising:
increasing the rating of the answer if the answer includes a named entity of the request.

13. The method of claim 1, comprising:
providing the portion of the request to the human assistant when a category confidence function of the request is below a first predetermined value;
providing the portion of the request to the human assistant when an automation confidence function of the request is above a second predetermined value;
selecting a GUI associated with an automated response matched to a highest ranking automated resource for the request as the interface;
computing a matching function for the query and the request;
comparing the matching function to a third predetermined value;
providing the interface including information of the query in an order based on a ranking of the query when the matching function exceeds the predetermined value;
computing a rating of a response associated with the query;
ranking the response based on the rating;
suggesting the response to the human assistant based on the ranking;
increasing the rating when the human assistant elects to deliver the response;
presenting an automatically generated phrase in the interface;
receiving from the human assistant a modification to the phrase;
evaluating a similarity between the phrase and the query;
ranking the query based on the similarity;
displaying the query in an order based on the ranking;
receiving an indication from the human assistant that the response is rejected;

confirming that the response is rejected; and setting the rating of the response to a minimum value.

14. A query processing system, comprising:

a search system receiving information of a request, selecting a human assistant, delivering an interface to the human assistant, presenting a phrase in the interface, receiving a modification to the phrase, presenting a query in an order based on a ranking of the query based on the modification and providing a response;

a user system submitting a request for information; and an expediter system receiving information of the request, selecting a resource, and processing the request.

15. The system of claim 14, comprising:

a resource system receiving formatted information and providing the response; and a searcher system receiving the query and providing a search result.

16. A non-transitory computer readable medium storing therein a program for causing a computer to execute an operation including providing a reply to a request:

receiving the request;

determining automatically a type associated with the request; and providing a portion of the request to a human assistant in an interface selected based on the type and providing information of a query in an order based on a ranking of the query.

17. The computer readable medium of claim 16, comprising:

associating a location, a category, and a search resource with the request; and providing a tool to a specialist when the location, the category, and the search resource are determined with a specific confidence.

18. The computer readable medium of claim 16, comprising:

determining whether the request matches the query;

providing a tool to an expediter when the request does not match the query; and providing the request, the query and a reply associated with the request to the expediter.

19. The computer readable medium of claim 16, comprising:

parsing the request;

displaying an indicator associated with a word of the request; and transferring the word to an automated resource responsive to selection of the indicator by a guide.

20. The computer readable medium of claim 19, comprising:

receiving a selection of a tool from a guide;

providing information of previous requests filtered based on a plurality of parameters;

displaying to the guide an interactive activity based on a ranking of the interactive activity;

selecting by the guide the interactive activity;

determining a profile and a category associated with the interactive activity;

personalizing automatically the interactive activity based on the profile and the category;

delivering the interactive activity as a reply to the request;

taking by a user an action indicated by the interactive activity;

transmitting to the user an advertisement selected automatically by the action;

choosing by the guide a search resource;

receiving a response from the search resource;

personalizing the response based on the guide, the response, the profile and the category; and sending the personalized response.

* * * * *